(12) United States Patent
Miller et al.

(10) Patent No.: US 12,100,002 B2
(45) Date of Patent: Sep. 24, 2024

(54) MANAGING INFORMATION ON A COMPUTER SYSTEM

(71) Applicant: Apple Inc., Cupertino, CA (US)

(72) Inventors: Thomas J. Miller, San Jose, CA (US); Lisa Mirth, Cupertino, CA (US); Trevor W. Young, Livermore, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/101,037

(22) Filed: Jan. 24, 2023

(65) Prior Publication Data

US 2023/0236722 A1 Jul. 27, 2023

Related U.S. Application Data

(60) Provisional application No. 63/349,123, filed on Jun. 5, 2022, provisional application No. 63/303,002, filed on Jan. 25, 2022.

(51) Int. Cl.
  *G06F 3/048* (2013.01)
  *G06F 3/0346* (2013.01)
  (Continued)

(52) U.S. Cl.
  CPC ......... *G06Q 20/401* (2013.01); *G06F 3/0346* (2013.01); *G06F 3/0481* (2013.01);
  (Continued)

(58) Field of Classification Search
  CPC .... G06Q 20/401; G06Q 20/389; G06Q 20/10; G06Q 20/3224; G06Q 20/405;
  (Continued)

(56) References Cited

U.S. PATENT DOCUMENTS 8,254,642 B2   8/2012  Kobayashi et al.
8,254,647 B1   8/2012  Nechyba et al.
(Continued)

FOREIGN PATENT DOCUMENTS

CN   106575332 A   4/2017
CN   107797657 A   3/2018
(Continued)

OTHER PUBLICATIONS

Applicant-Initiated Interview Summary received for U.S. Appl. No. 16/369,355, mailed on Jul. 28, 2021, 2 pages.
(Continued)

*Primary Examiner* — Aleksey Olshannikov
(74) *Attorney, Agent, or Firm* — DLA Piper LLP (US)

(57) ABSTRACT

The present disclosure generally relates to methods and user interfaces for managing information on computer systems. In some embodiments, methods and user interfaces for managing display of user interface elements based on movement of the computer system and requesting account information are described. In some embodiments, methods and user interface for provisioning an account onto a computer system are described. In some embodiments, methods and user interfaces for associating a transfer amount with an account are described. In some embodiments, methods and user interfaces for displaying user interface elements corresponding to transaction types are described. In some embodiments, methods and user interfaces for managing one or more pending loans are described. In some embodiments, methods for entering a numeric sequence are described. In some embodiments, methods for locking a computer system while entering a number sequence are described.

42 Claims, 82 Drawing Sheets

(51) Int. Cl.
  *G06F 3/0481* (2022.01)
  *G06F 3/0484* (2022.01)
  *G06F 3/04845* (2022.01)
  *G06F 3/0488* (2022.01)
  *G06F 21/31* (2013.01)
  *G06K 7/10* (2006.01)
  *G06Q 20/38* (2012.01)
  *G06Q 20/40* (2012.01)

(52) U.S. Cl.
  CPC ........ *G06F 3/0484* (2013.01); *G06F 3/04845* (2013.01); *G06F 3/0488* (2013.01); *G06F 21/31* (2013.01); *G06K 7/10237* (2013.01); *G06Q 20/389* (2013.01)

(58) Field of Classification Search
  CPC .... G06F 3/0346; G06F 3/0481; G06F 3/0484; G06F 3/04845; G06F 3/0488; G06F 21/31; G06F 3/04847; G06F 3/04883; G06F 3/04886; G06F 3/04895; G06K 7/10237; G07G 1/01
  See application file for complete search history.

(56) References Cited

U.S. PATENT DOCUMENTS

| | | | |
|---|---|---|---|
| 8,827,153 | B1 | 9/2014 | Rhoades et al. |
| 9,678,571 | B1 | 6/2017 | Robert et al. |
| 9,753,541 | B1 | 9/2017 | Robert et al. |
| 10,032,100 | B2 | 7/2018 | Mullen et al. |
| 10,223,631 | B2 | 3/2019 | Mullen et al. |
| 10,255,545 | B2 | 4/2019 | Mullen et al. |
| 2009/0160785 | A1* | 6/2009 | Chen ................ G06F 3/04883 345/173 |
| 2010/0082444 | A1 | 4/2010 | Lin et al. |
| 2013/0015946 | A1 | 1/2013 | Lau et al. |
| 2014/0123275 | A1 | 5/2014 | Azar et al. |
| 2015/0074418 | A1 | 3/2015 | Lee et al. |
| 2015/0235098 | A1 | 8/2015 | Lee et al. |
| 2015/0349959 | A1 | 12/2015 | Marciniak |
| 2016/0171192 | A1 | 6/2016 | Holz et al. |
| 2016/0217310 | A1 | 7/2016 | Shah et al. |
| 2016/0234023 | A1 | 8/2016 | Mozer et al. |
| 2016/0294557 | A1 | 10/2016 | Baldwin et al. |
| 2016/0300100 | A1 | 10/2016 | Shen et al. |
| 2016/0342832 | A1 | 11/2016 | Newell et al. |
| 2017/0070680 | A1 | 3/2017 | Kobayashi |
| 2017/0076132 | A1 | 3/2017 | Sezan et al. |
| 2017/0103382 | A1* | 4/2017 | Kim ..................... G06Q 20/204 |
| 2017/0124328 | A1 | 5/2017 | Krishnapura |
| 2017/0139576 | A1 | 5/2017 | Jeong et al. |
| 2017/0169202 | A1 | 6/2017 | Duggan et al. |
| 2017/0169287 | A1 | 6/2017 | Tokunaga et al. |
| 2017/0180637 | A1 | 6/2017 | Lautenbach et al. |
| 2017/0357320 | A1 | 12/2017 | Chaudhri et al. |
| 2017/0357321 | A1* | 12/2017 | Fleizach ............... G04G 13/00 |
| 2018/0181737 | A1 | 6/2018 | Tussy |
| 2019/0156607 | A1 | 5/2019 | Tao et al. |
| 2019/0347391 | A1 | 11/2019 | Kim et al. |
| 2019/0370448 | A1 | 12/2019 | Devine et al. |
| 2020/0042685 | A1 | 2/2020 | Tussy et al. |
| 2020/0111334 | A1* | 4/2020 | Moussette ............ H04M 19/04 |
| 2020/0311509 | A1 | 10/2020 | Benkley et al. |
| 2020/0348822 | A1 | 11/2020 | Dascola et al. |
| 2021/0383386 | A1* | 12/2021 | Abrams ............... G06Q 20/206 |
| 2022/0027446 | A1 | 1/2022 | Van Os et al. |
| 2022/0156357 | A1* | 5/2022 | Ko ..................... H04N 21/4318 |
| 2023/0237287 | A1 | 7/2023 | Young et al. |
| 2023/0237480 | A1 | 7/2023 | Miller et al. |

FOREIGN PATENT DOCUMENTS

| | | |
|---|---|---|
| CN | 107870690 A | 4/2018 |
| EP | 2725521 A2 | 4/2014 |
| EP | 3076334 A1 | 10/2016 |
| GB | 2500321 A | 9/2013 |
| JP | 2008-33681 A | 2/2008 |
| JP | 2008-71158 A | 3/2008 |
| JP | 2009-42802 A | 2/2009 |
| JP | 2009-240523 A | 10/2009 |
| JP | 2016-224960 A | 12/2016 |
| JP | 2018-36965 A | 3/2018 |
| KR | 10-2015-0029495 A | 3/2015 |
| WO | 2010/086993 A1 | 8/2010 |
| WO | 2015/057320 A1 | 4/2015 |
| WO | 2016/025038 A1 | 2/2016 |
| WO | 2017/094052 A1 | 6/2017 |
| WO | 2018/048632 A1 | 3/2018 |

OTHER PUBLICATIONS

International Preliminary Report on Patentability received for PCT Patent Application No. PCT/US2019/035092, mailed on Dec. 17, 2020, 10 pages.
International Search Report and Written Opinion received for PCT Patent Application No. PCT/US2019/035092, mailed on Jan. 16, 2020, 16 pages.
Invitation to Pay Additional Fee received for PCT Patent Application No. PCT/US2019/035092, mailed on Nov. 20, 2019, 6 pages.
Invitation to Pay Search Fees received for European Patent Application No. 19731554.2, mailed on Dec. 16, 2021, 3 pages.
Non-Final Office Action received for U.S. Appl. No. 16/369,355, mailed on Apr. 29, 2021, 16 pages.
Notice of Allowance received for Korean Patent Application No. 10-2020-7034405, mailed on Jun. 20, 2022, 6 pages (2 pages of English Translation and 4 pages of Official Copy).
Notice of Allowance received for U.S. Appl. No. 16/369,355, mailed on Sep. 1, 2021, 10 pages.
Office Action received for Australian Patent Application No. 2019281965, mailed on Aug. 31, 2022, 5 pages.
Office Action received for Australian Patent Application No. 2019281965, mailed on May 11, 2022, 5 pages.
Office Action received for Australian Patent Application No. 2019281965, mailed on Nov. 18, 2022, 7 pages.
Office Action received for Australian Patent Application No. 2019281965, mailed on Nov. 30, 2021, 3 pages.
Office Action received for European Patent Application No. 19731554.2, mailed on Apr. 19, 2022, 8 pages.
Office Action received for Japanese Patent Application No. 2020-566978, mailed on Feb. 4, 2022, 12 pages (6 pages of English Translation and 6 pages of Official Copy).
Office Action received for Japanese Patent Application No. 2020-566978, mailed on Sep. 26, 2022, 4 pages (2 pages of English Translation and 2 pages of Official Copy).
Office Action received for Korean Patent Application No. 10-2020-7034405, mailed on Dec. 4, 2021, 15 pages (7 pages of English Translation and 8 pages of Official Copy).
The Youtube Tech Guy, "How to Setup Face Unlock on Your Android", Available online at: https://www.youtube.com/watch?v=iJYFLYkYvTk, Apr. 12, 2012, 1 page.
Notice of Acceptance received for Australian Patent Application No. 2022279466, mailed on Jan. 10, 2024, 3 pages.
Corrected Notice of Allowance received for U.S. Appl. No. 17/496,716, mailed on Dec. 6, 2023, 2 pages.
Supplemental Notice of Allowance received for U.S. Appl. No. 17/496,716, mailed on Nov. 17, 2023, 2 pages.
Applicant-Initiated Interview Summary received for U.S. Appl. No. 17/496,716, mailed on Sep. 14, 2023, 2 pages.
International Search Report and Written Opinion received for PCT Patent Application No. PCT/US2023/010234, mailed on Apr. 26, 2023, 18 pages.
Non-Final Office Action received for U.S. Appl. No. 17/496,716, mailed on Jul. 18, 2023, 15 pages.
Notice of Allowance received for Korean Patent Application No. 10-2022-7029609, mailed on Oct. 23, 2023, 8 pages (2 pages of English Translation and 6 pages of Official Copy).

(56) References Cited

OTHER PUBLICATIONS

Notice of Allowance received for U.S. Appl. No. 17/496,716, mailed on Nov. 8, 2023, 24 pages.
Office Action received for Australian Patent Application No. 2022279466, mailed on Oct. 25, 2023, 3 pages.
Office Action received for Korean Patent Application No. 10-2022-7029609, mailed on Apr. 28, 2023, 9 pages (4 pages of English Translation and 5 pages of Official Copy).
Pre-Appeal Review Report received for Japanese Patent Application No. 2020-566978, mailed on Feb. 21, 2023, 4 pages (2 pages of English Translation and 2 pages of Official Copy).
Supplemental Notice of Allowance received for U.S. Appl. No. 17/496,716, mailed on Feb. 1, 2024, 2 pages.
Mahfouz et al., "Android users in the wild: Their authentication and usage behavior", Pervasive and Mobile Computing, vol. 32, Jul. 11, 2016, pp. 50-61.
Notice of Allowance received for U.S. Appl. No. 17/886,845, mailed on Apr. 2, 2024, 11 pages.
Office Action received for Chinese Patent Application No. 202110011700.0, mailed on Jan. 24, 2024, 11 pages (5 pages of English Translation and 6 pages of Official Copy).
Office Action received for Japanese Patent Application No. 2023-009554, mailed on Apr. 1, 2024, 4 pages (2 pages of English Translation and 2 pages of Official Copy).

\* cited by examiner

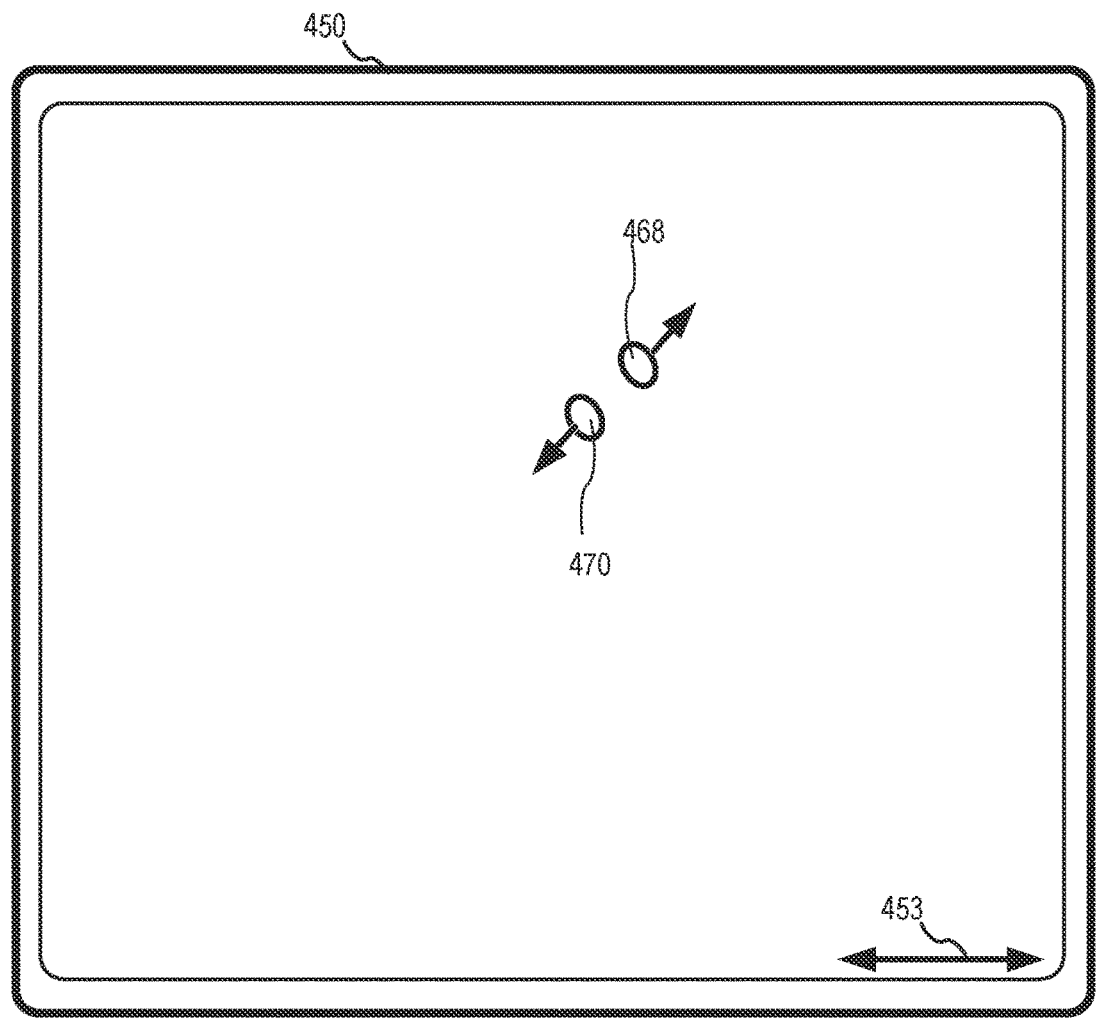
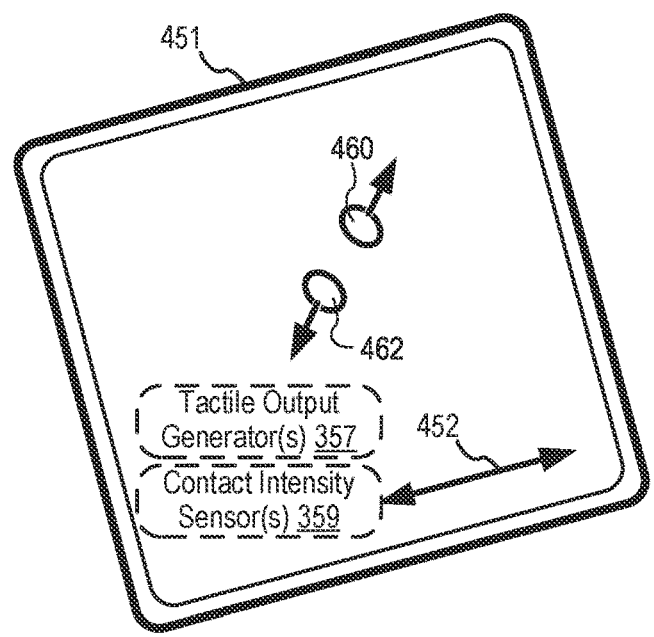
*FIG. 4B*

1200

1202
In response to detecting a sign-in of a user account after a software update:

1204
In accordance with a determination that a first set of provisioning criteria are met, including a first provisioning criterion that is met when an account associated with the user account exceeds a threshold amount, initiate a process to provision the account onto the computer system

1206
In accordance with a determination that the first set of provisioning criteria are not met, forgo initiating the process to provision the account onto the computer system

*FIG. 12*

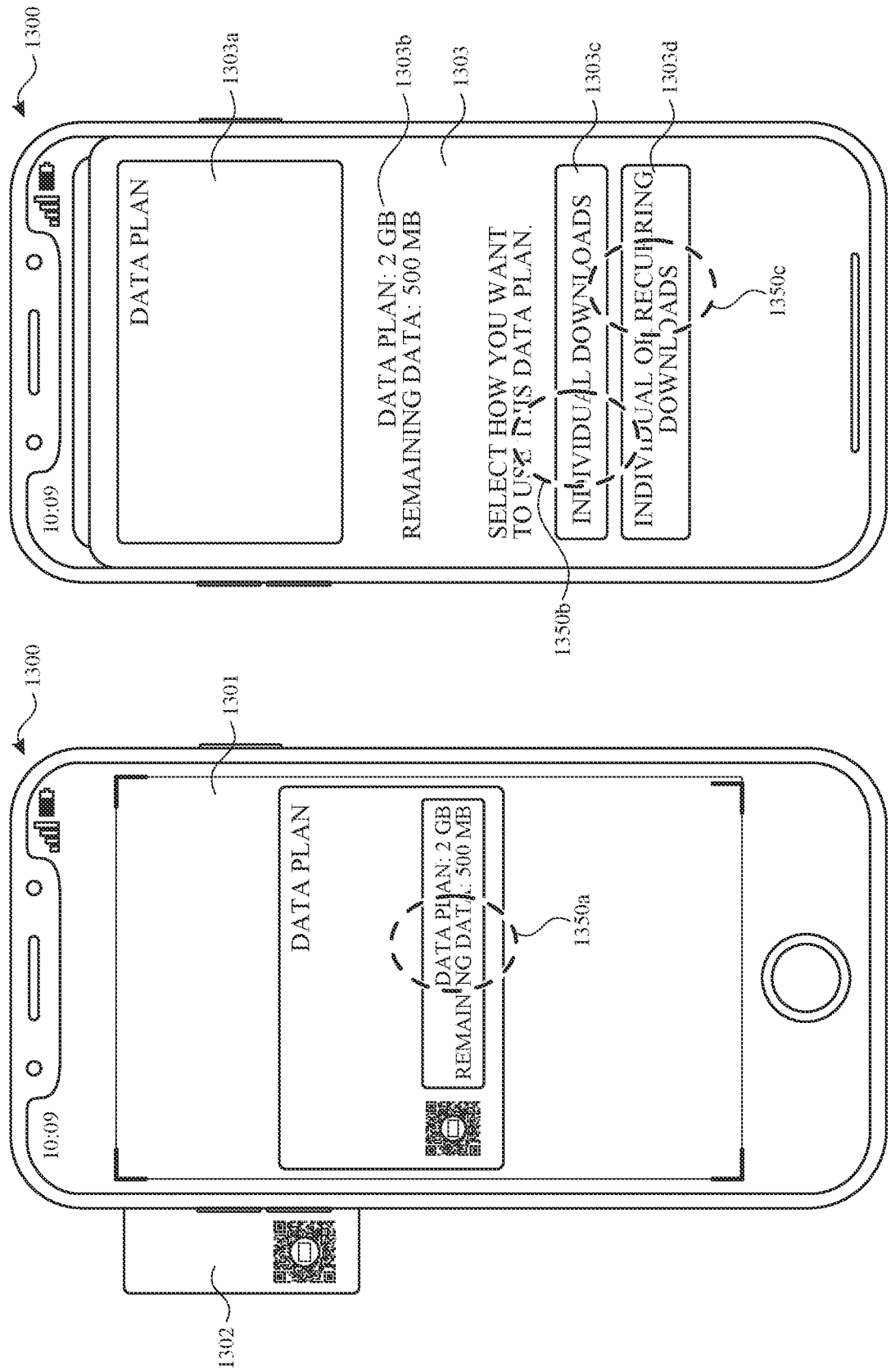

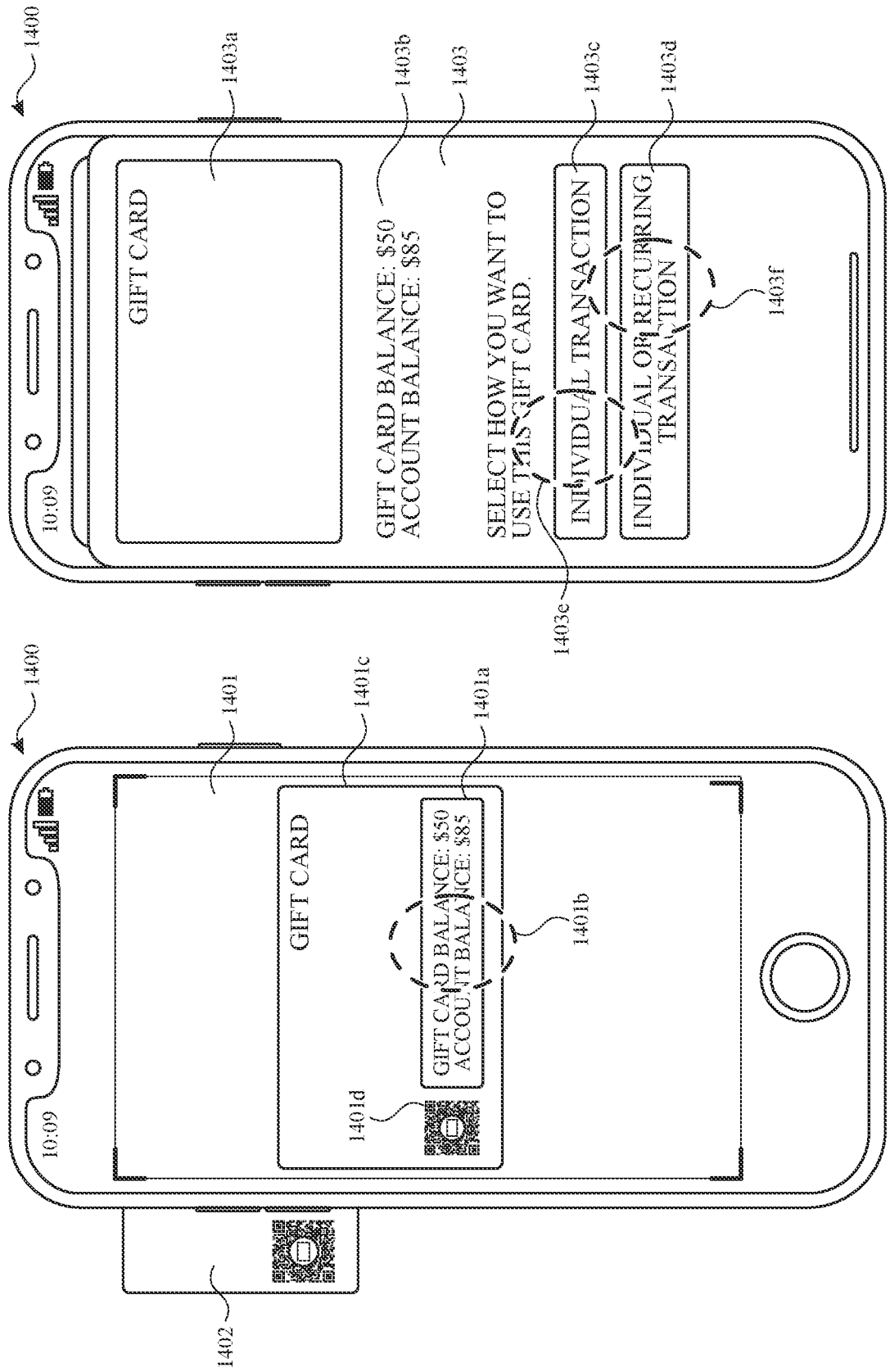

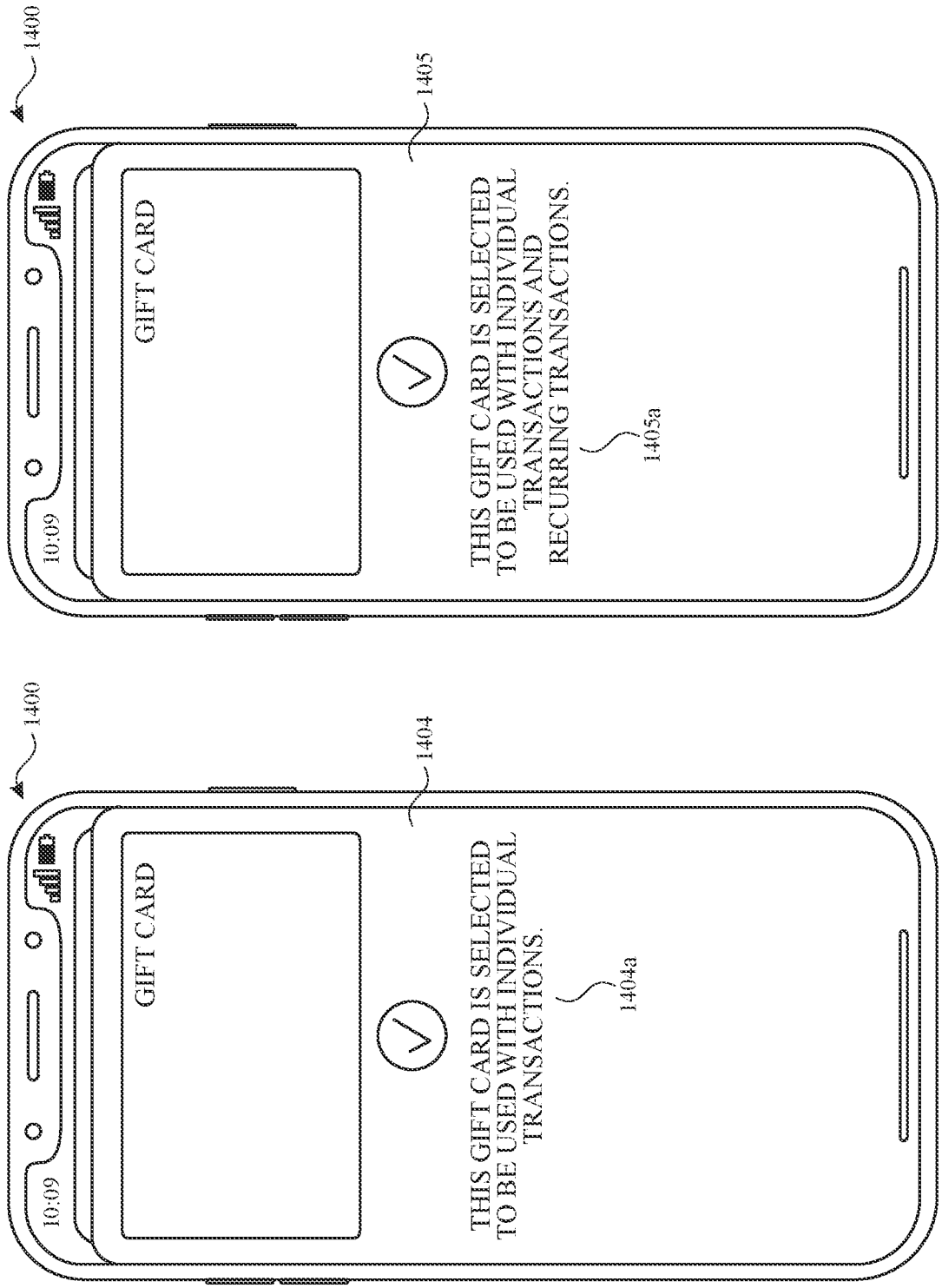

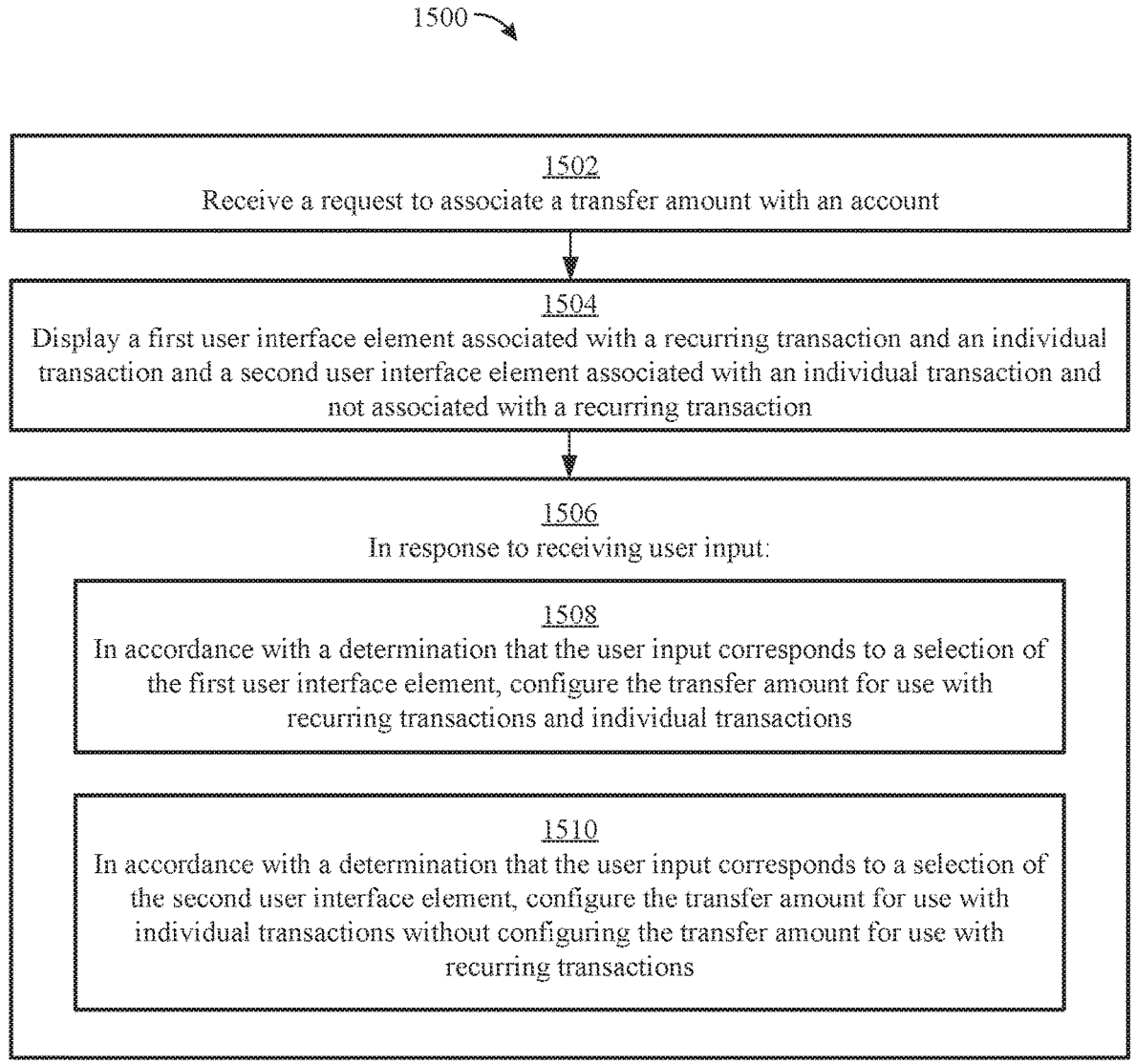
FIG. 15

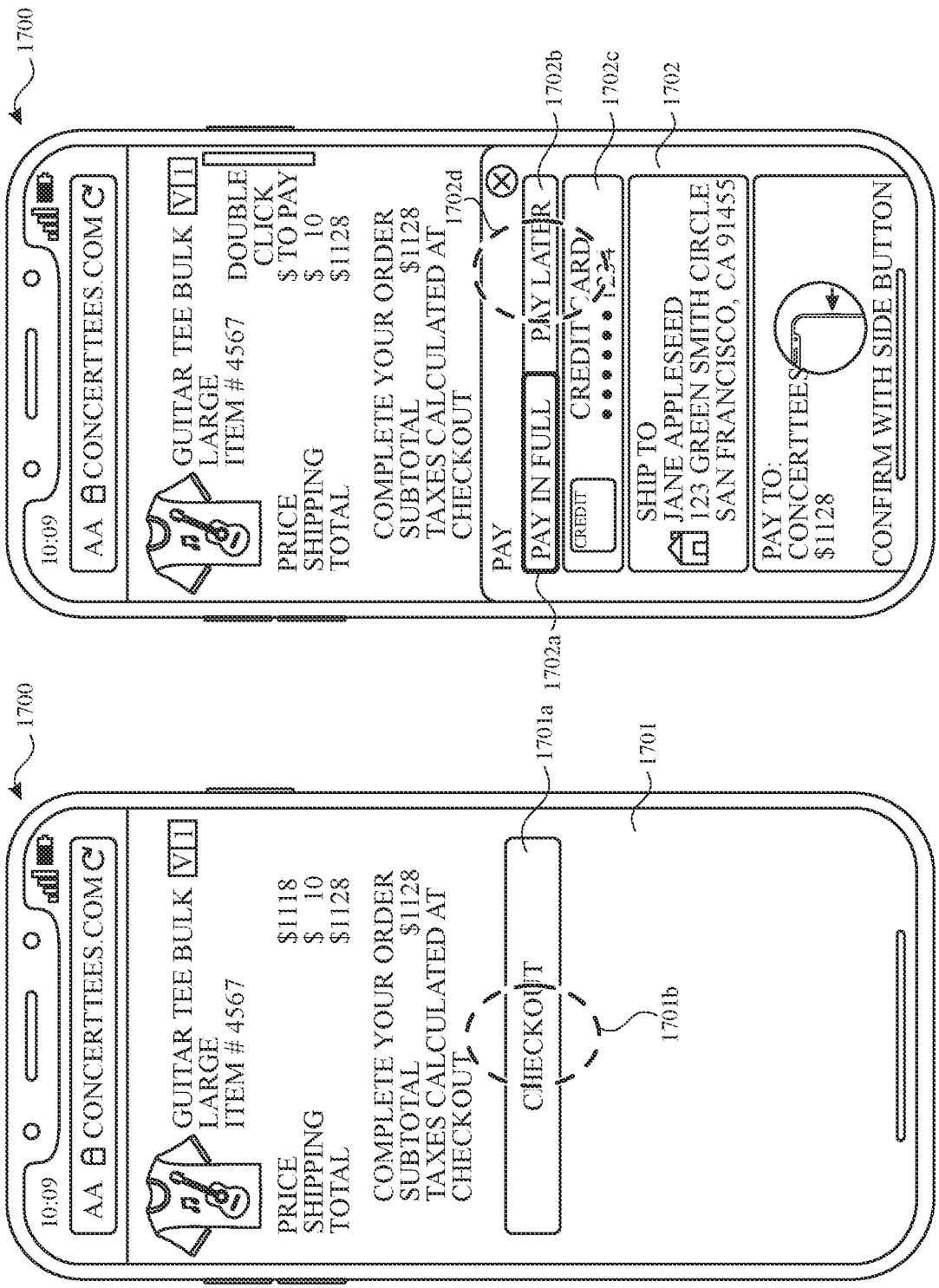

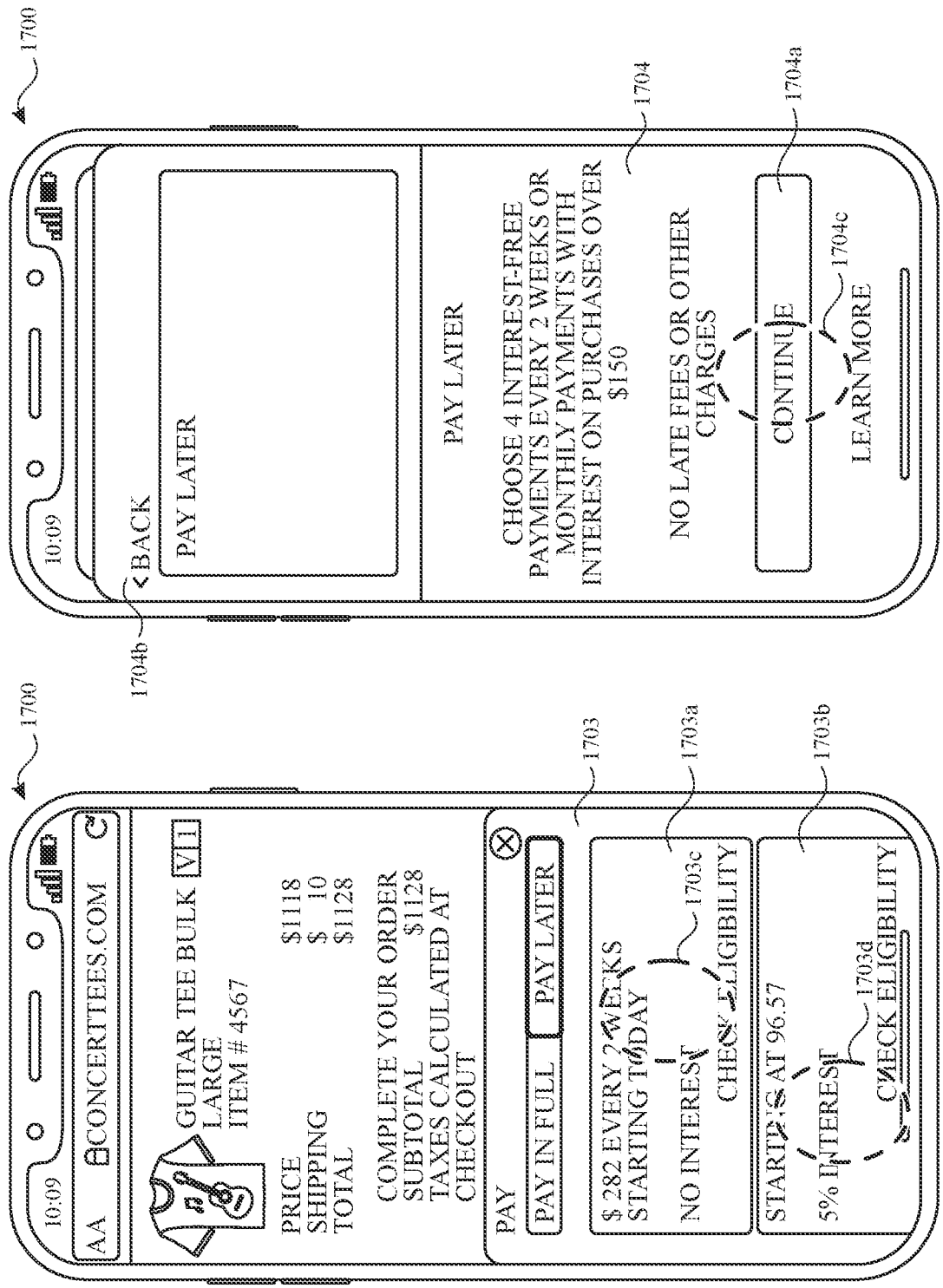

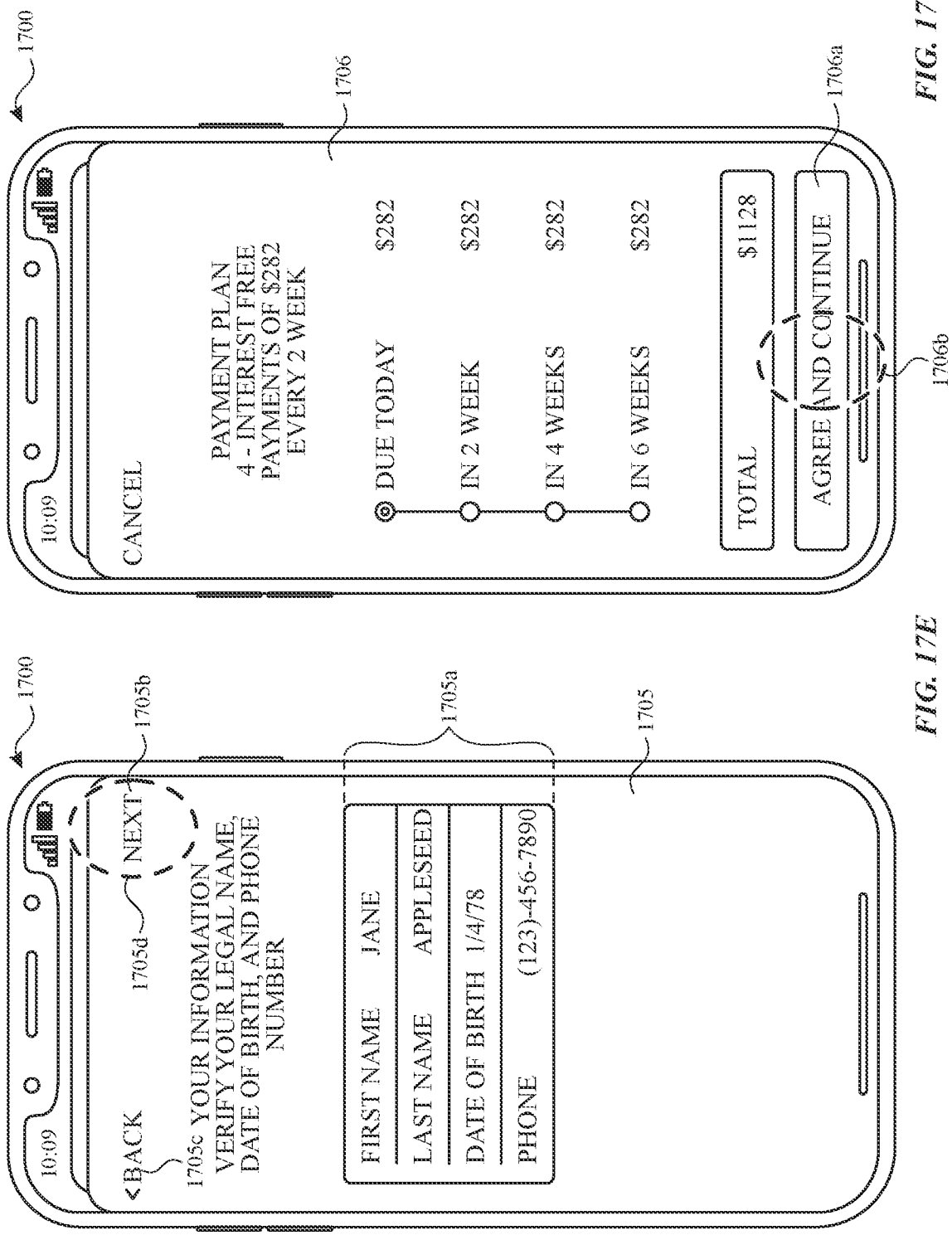

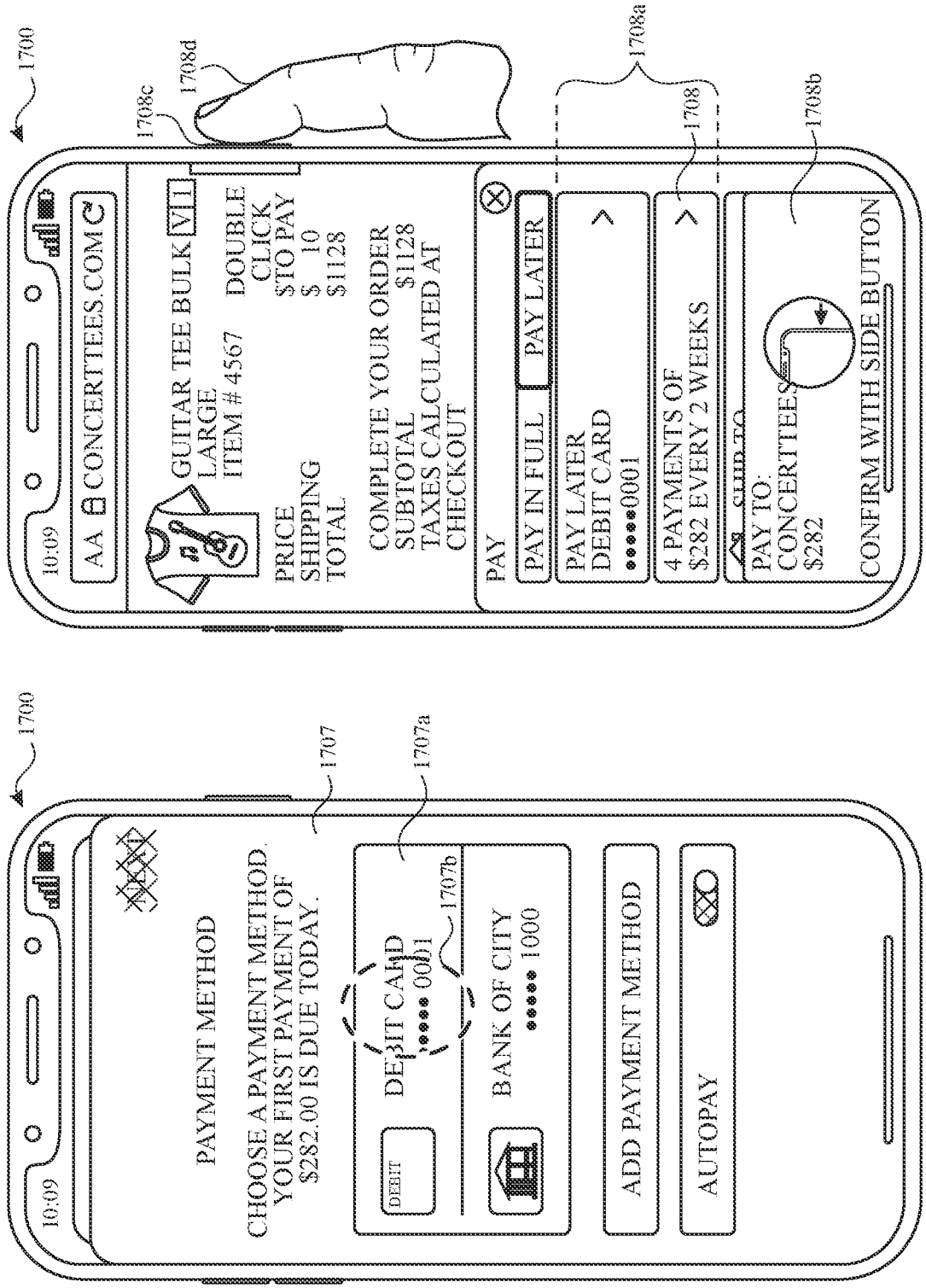

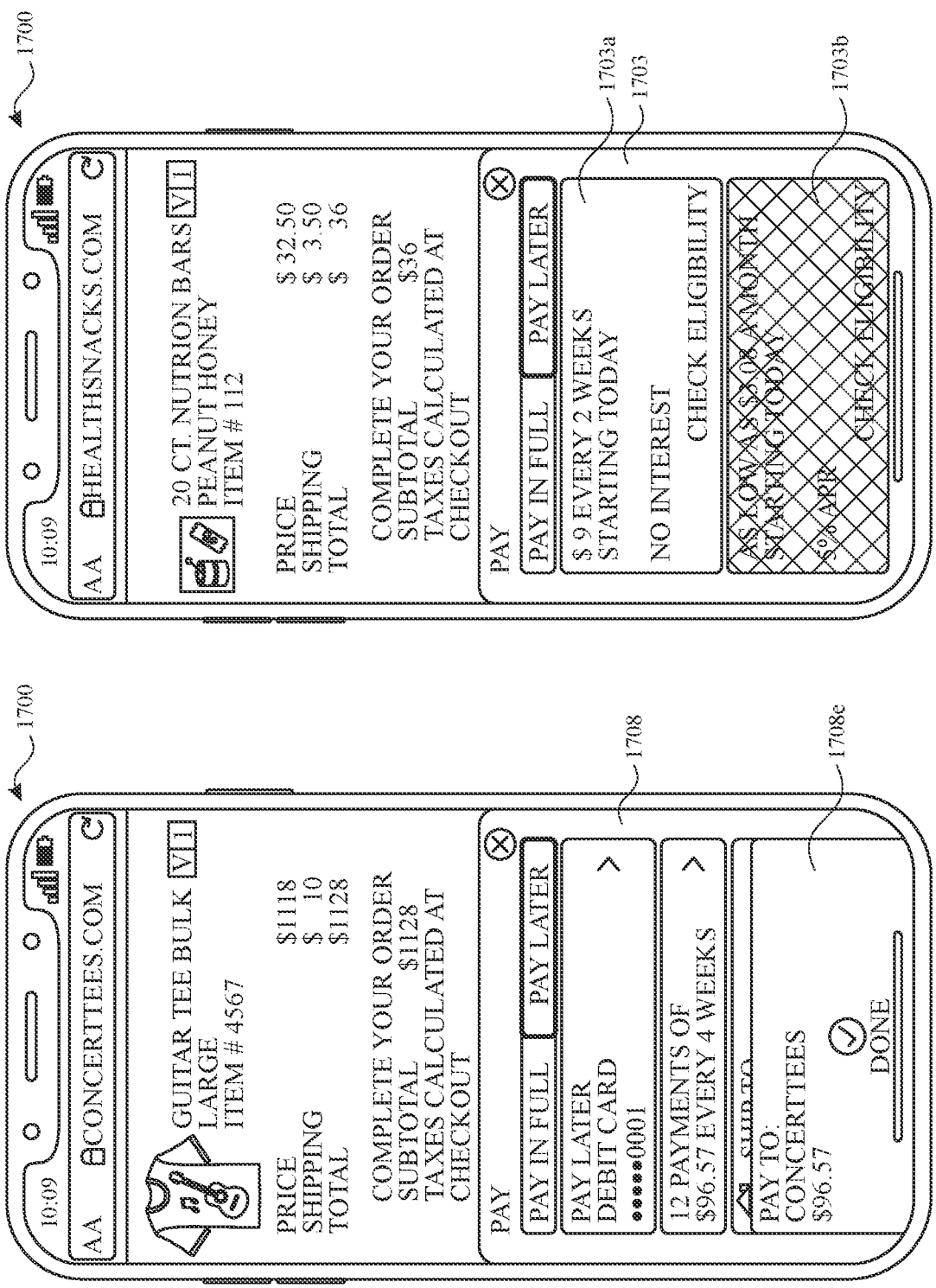

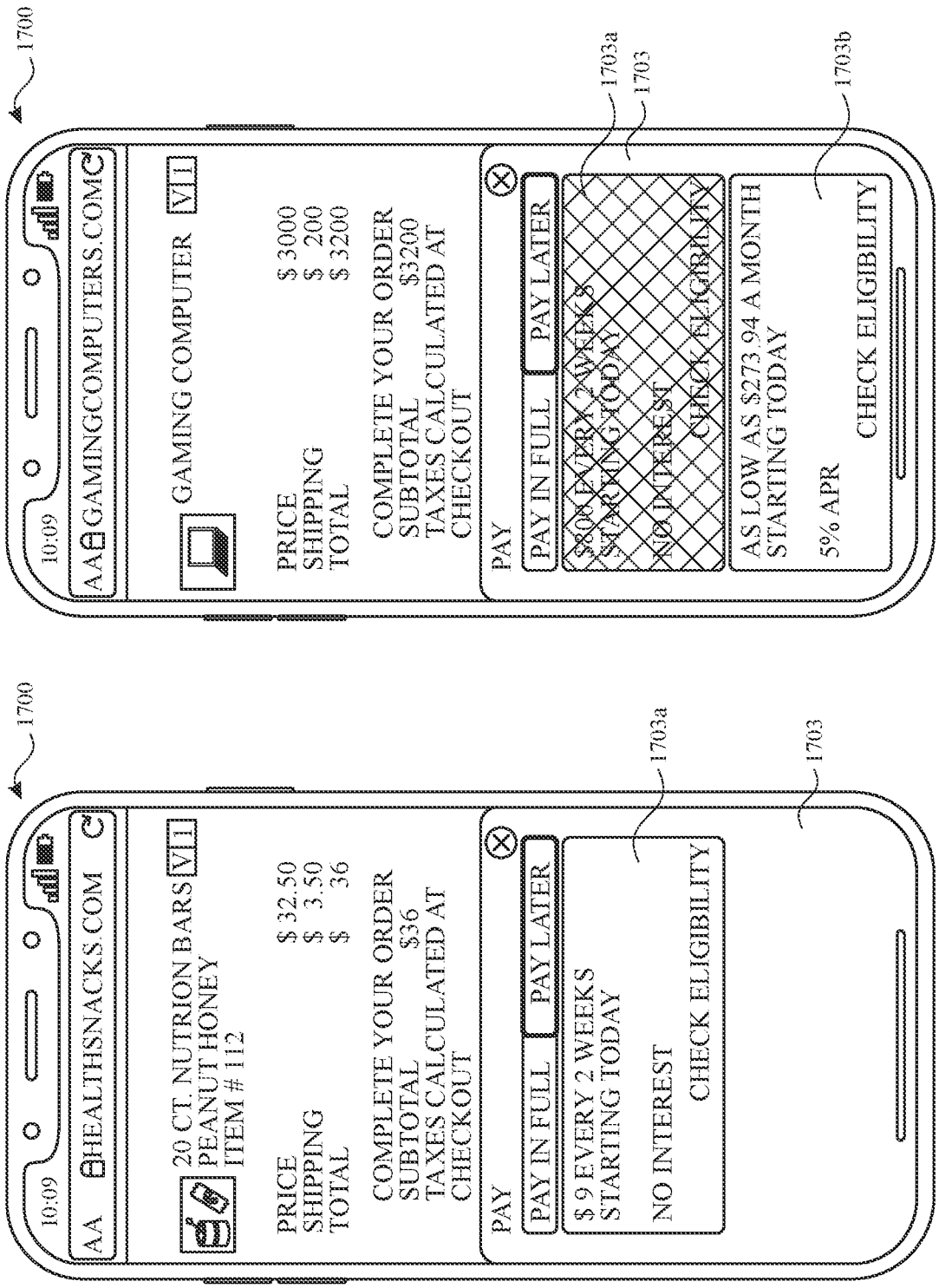

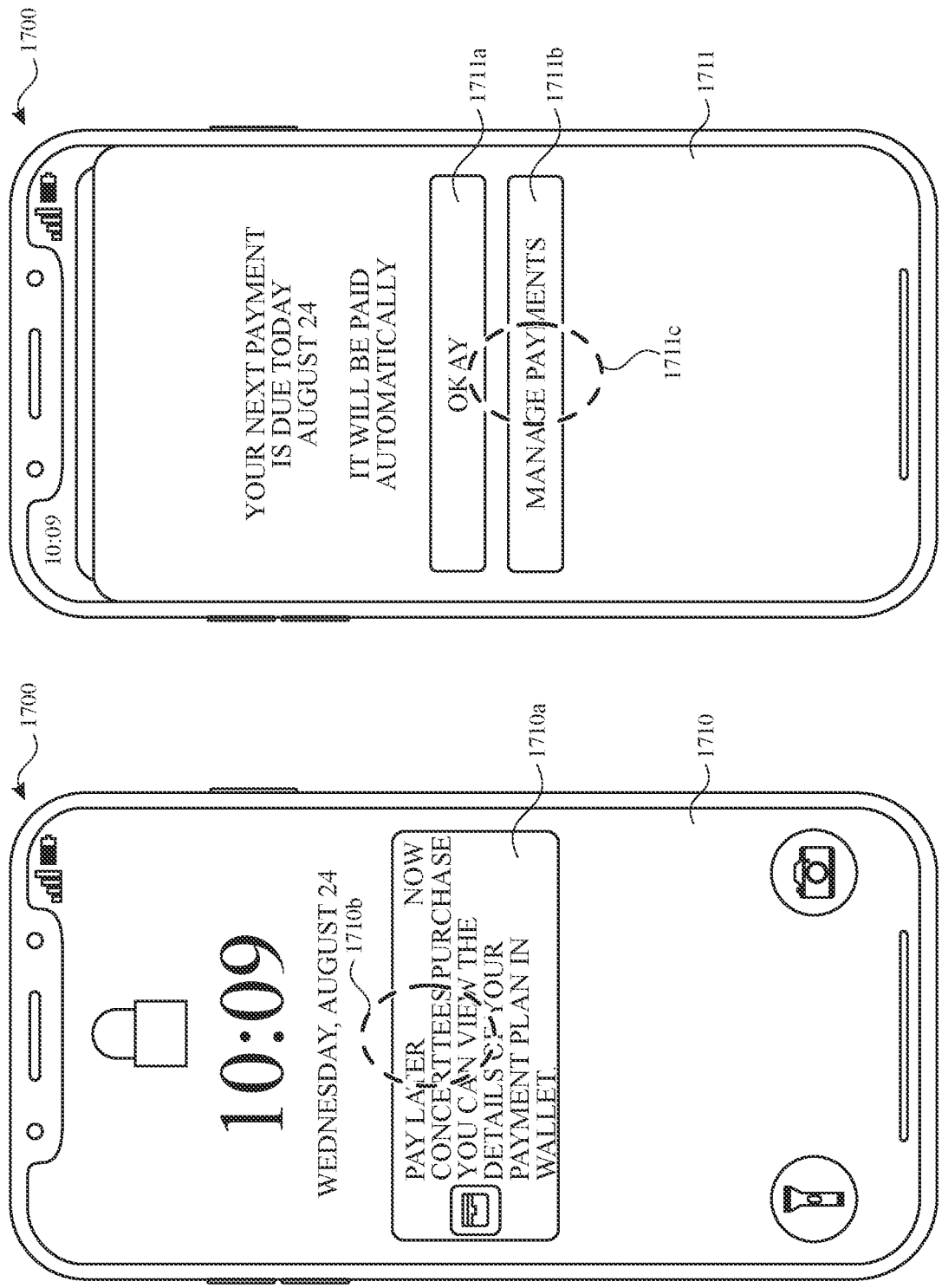

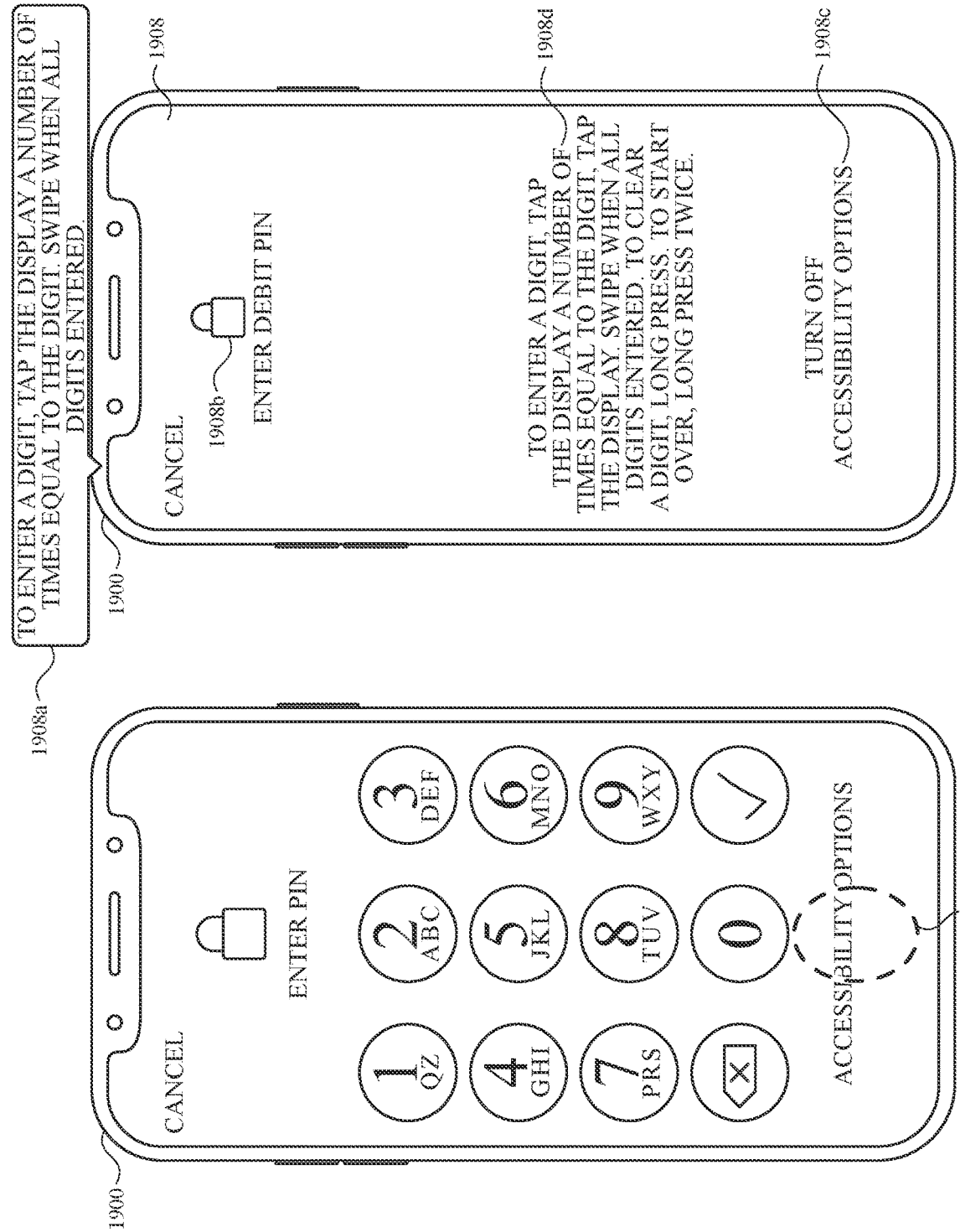

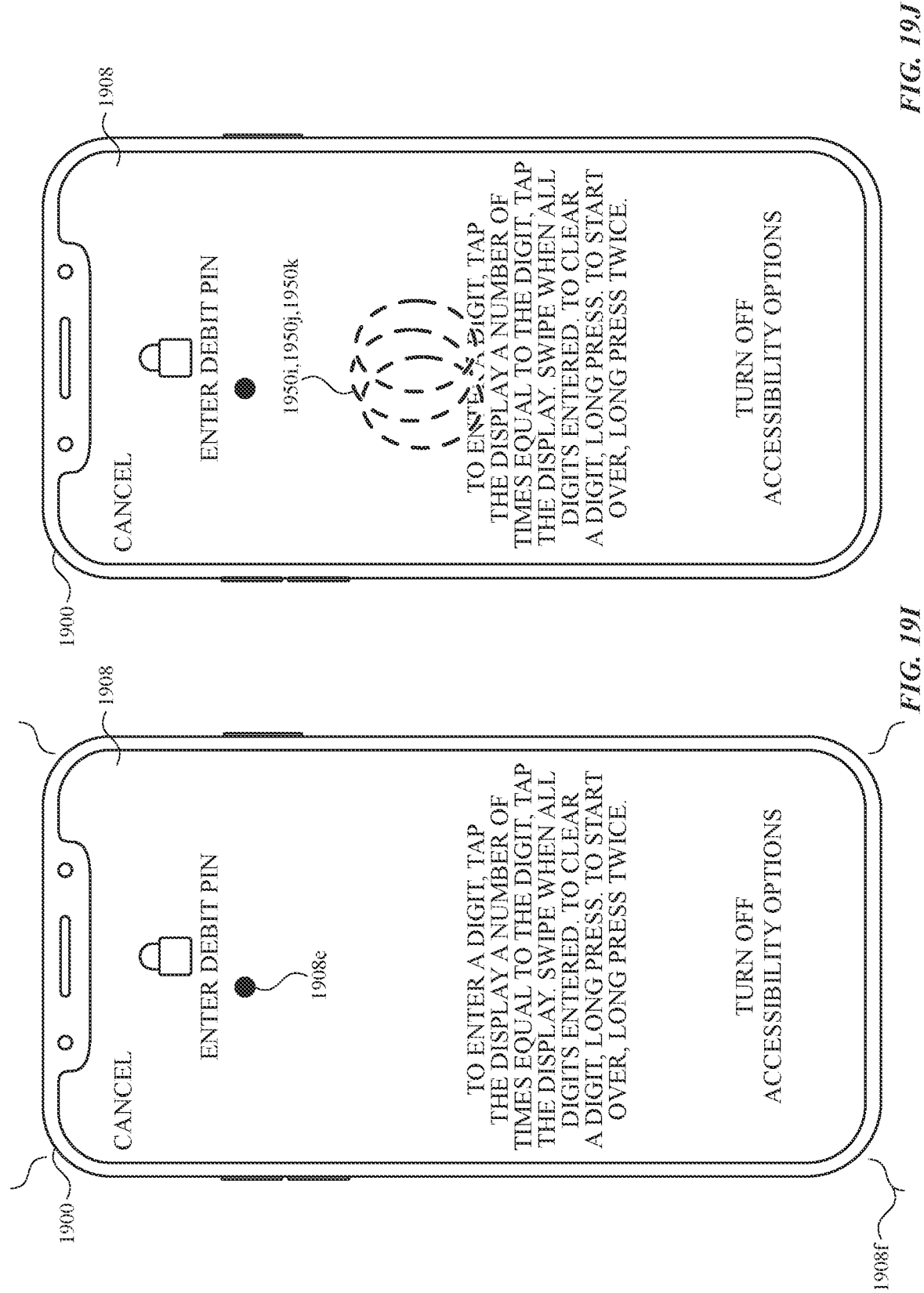

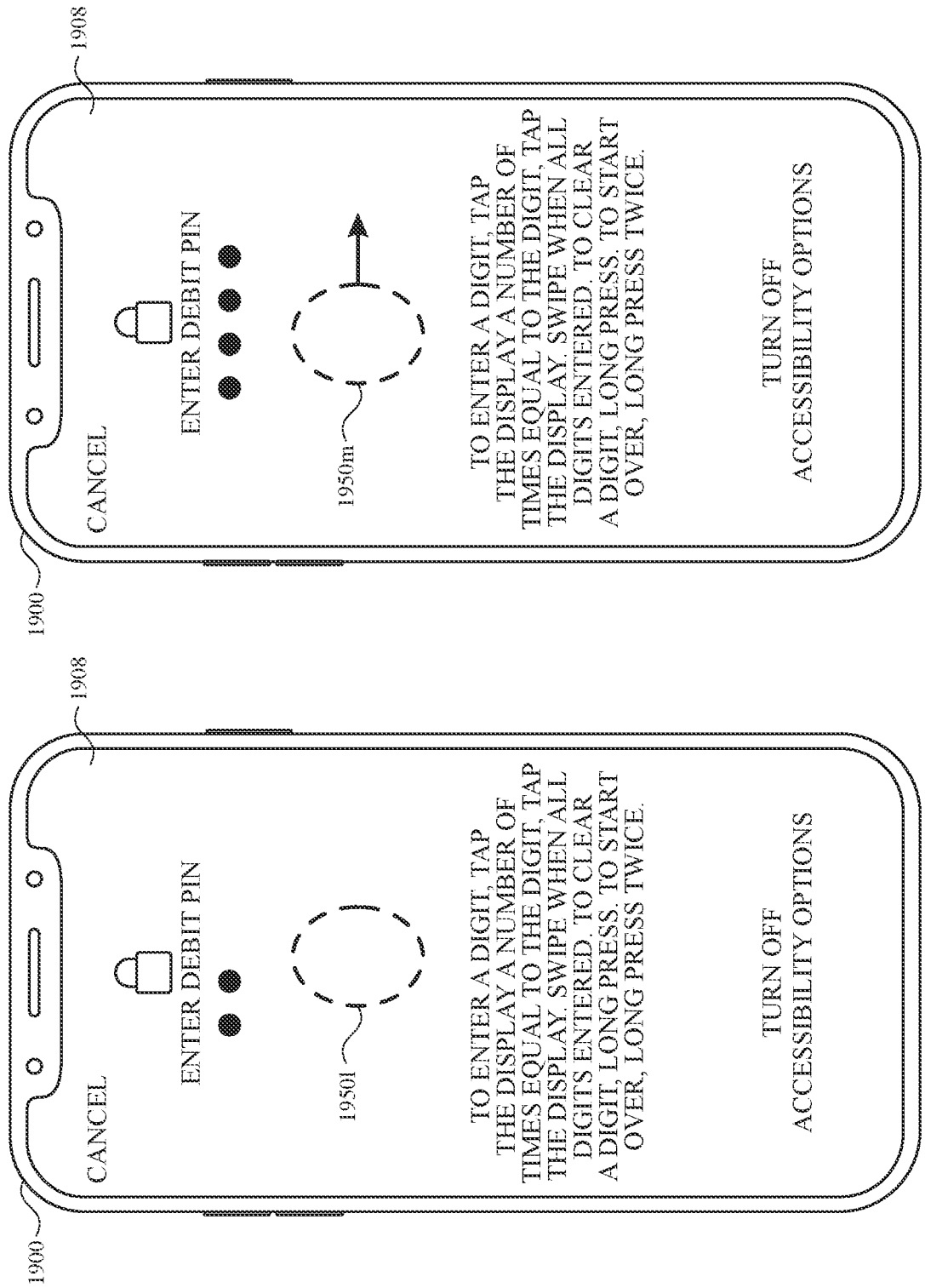

2010 ⟶

2012
While the computer system is unlocked and while displaying, via the display generation component, a user interface of a first application, receiving, via the one or more input devices, a first input.

2014
In response to receiving the first input:

2016
Displaying a first numeric keypad.

2018
In accordance with a first set of lock conditions being met, locking the computer system.

2020
In accordance with a first set of lock conditions not being met, forgoing locking the computer system.

2022
While displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence.

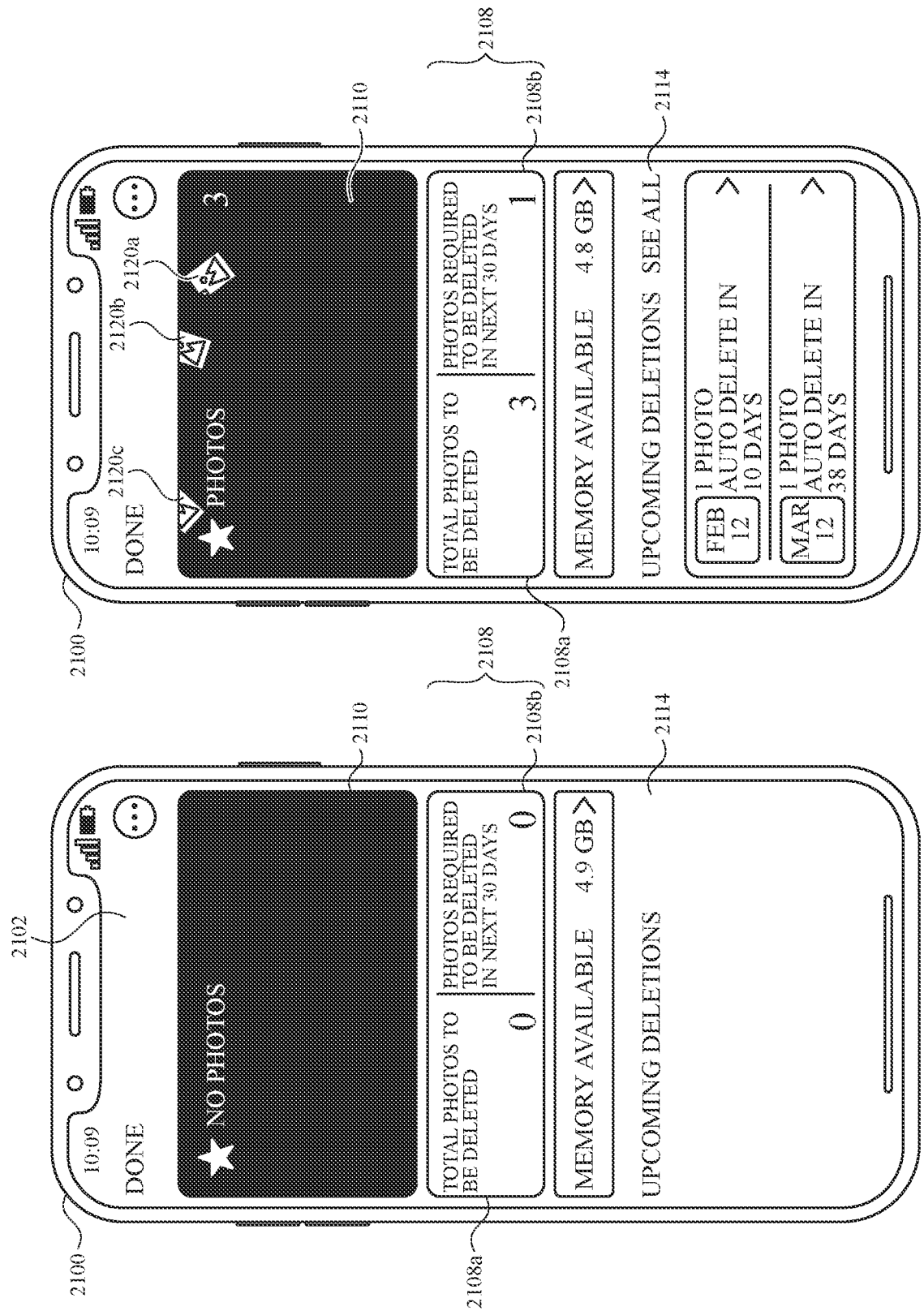

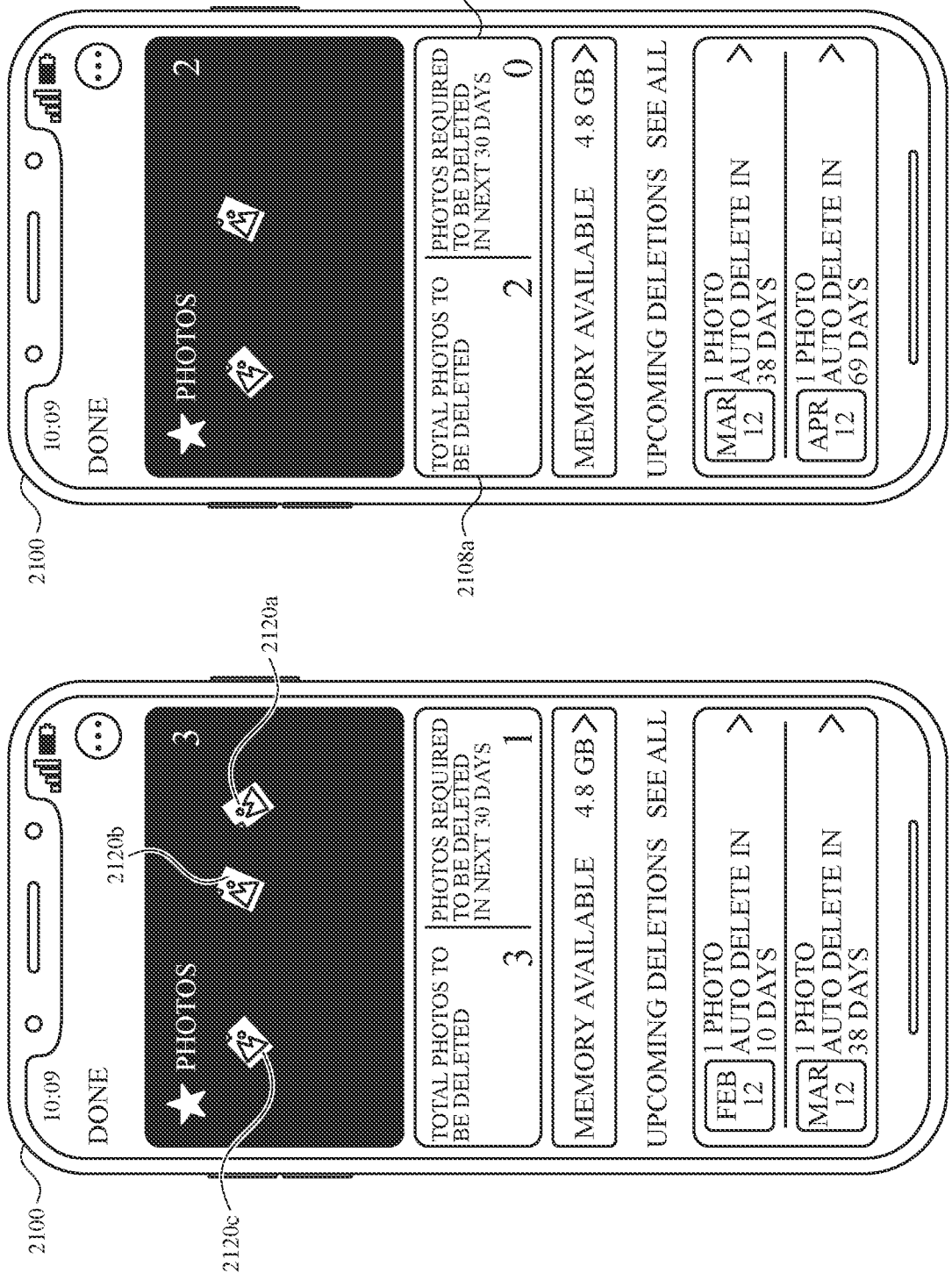

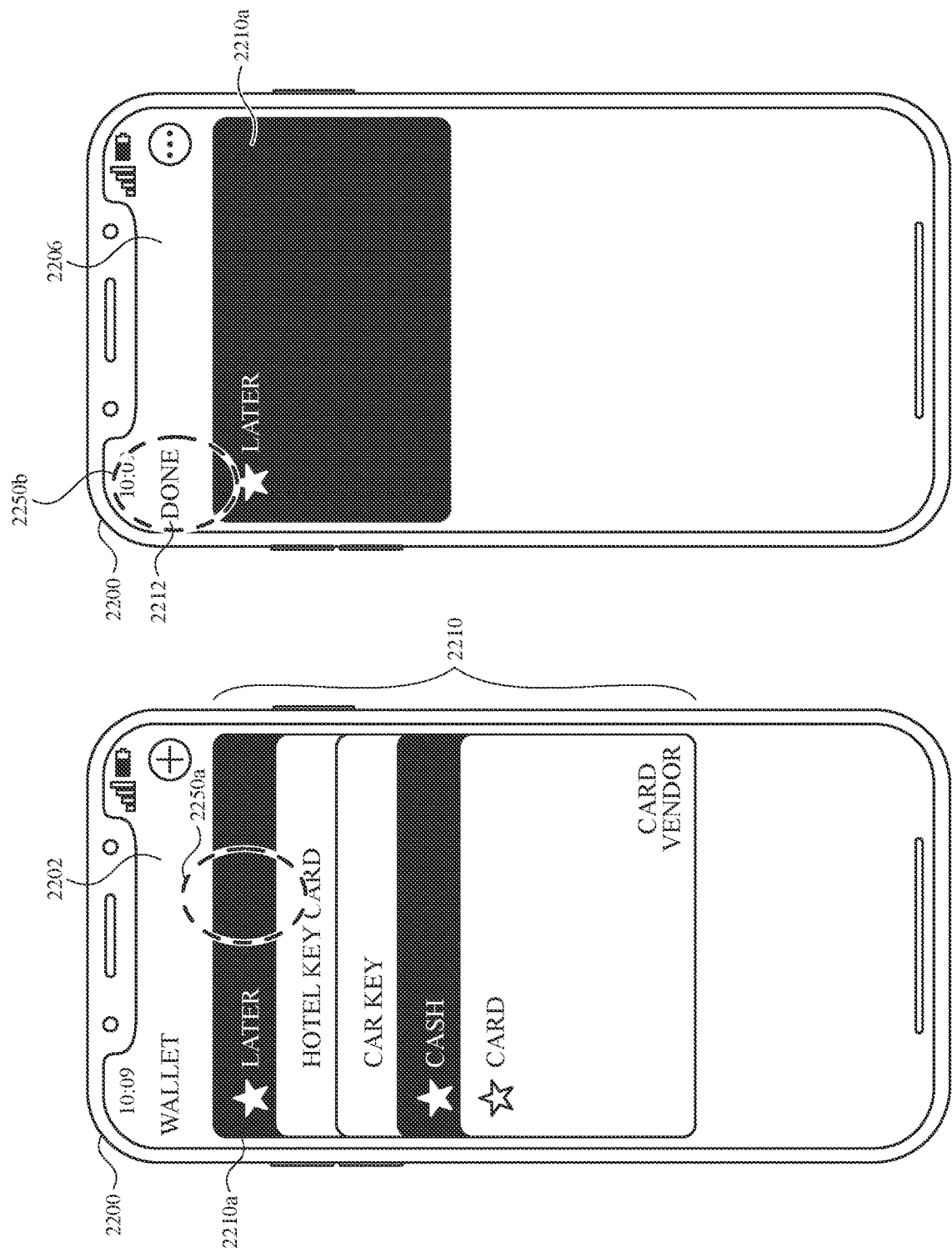

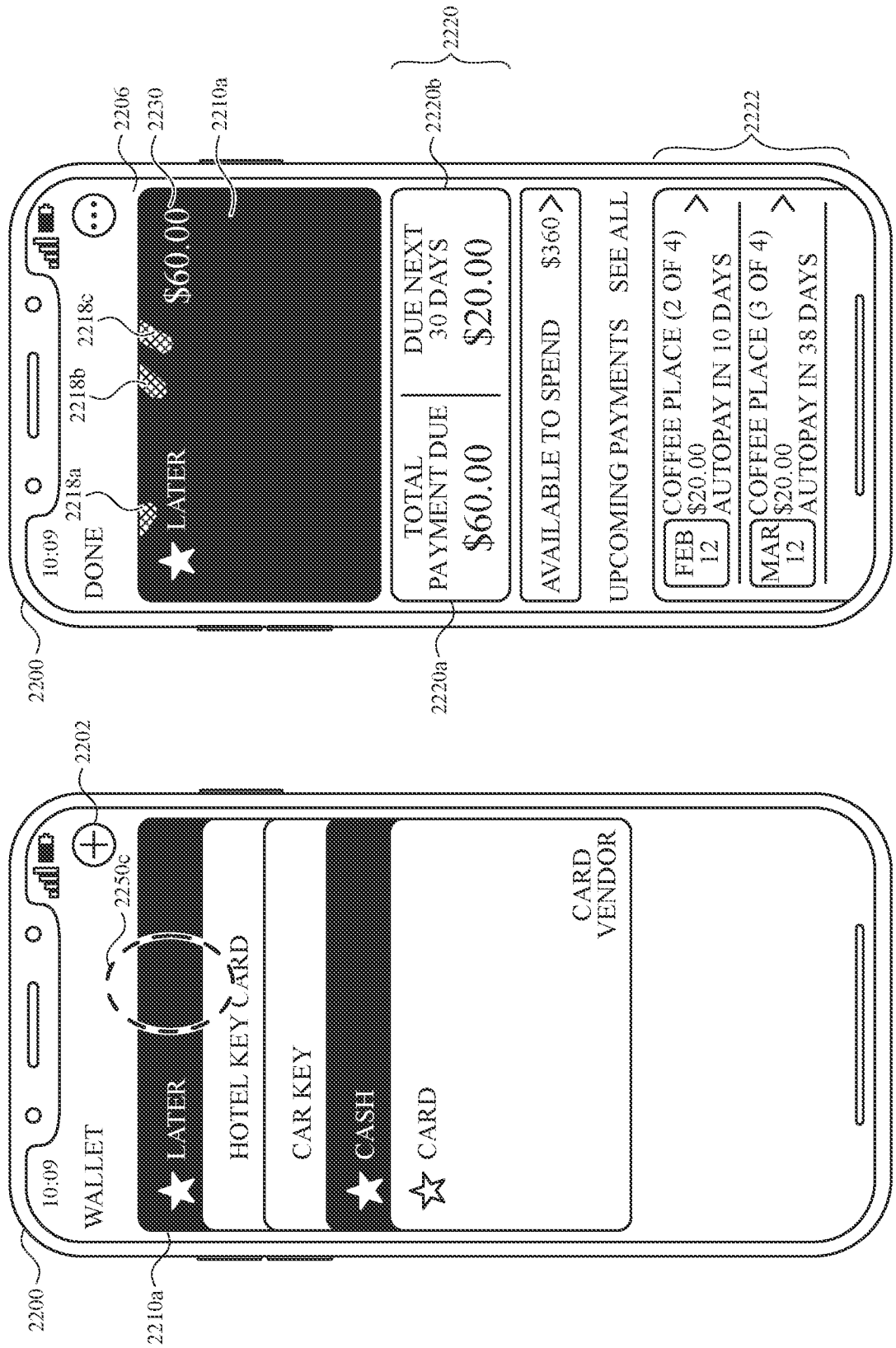

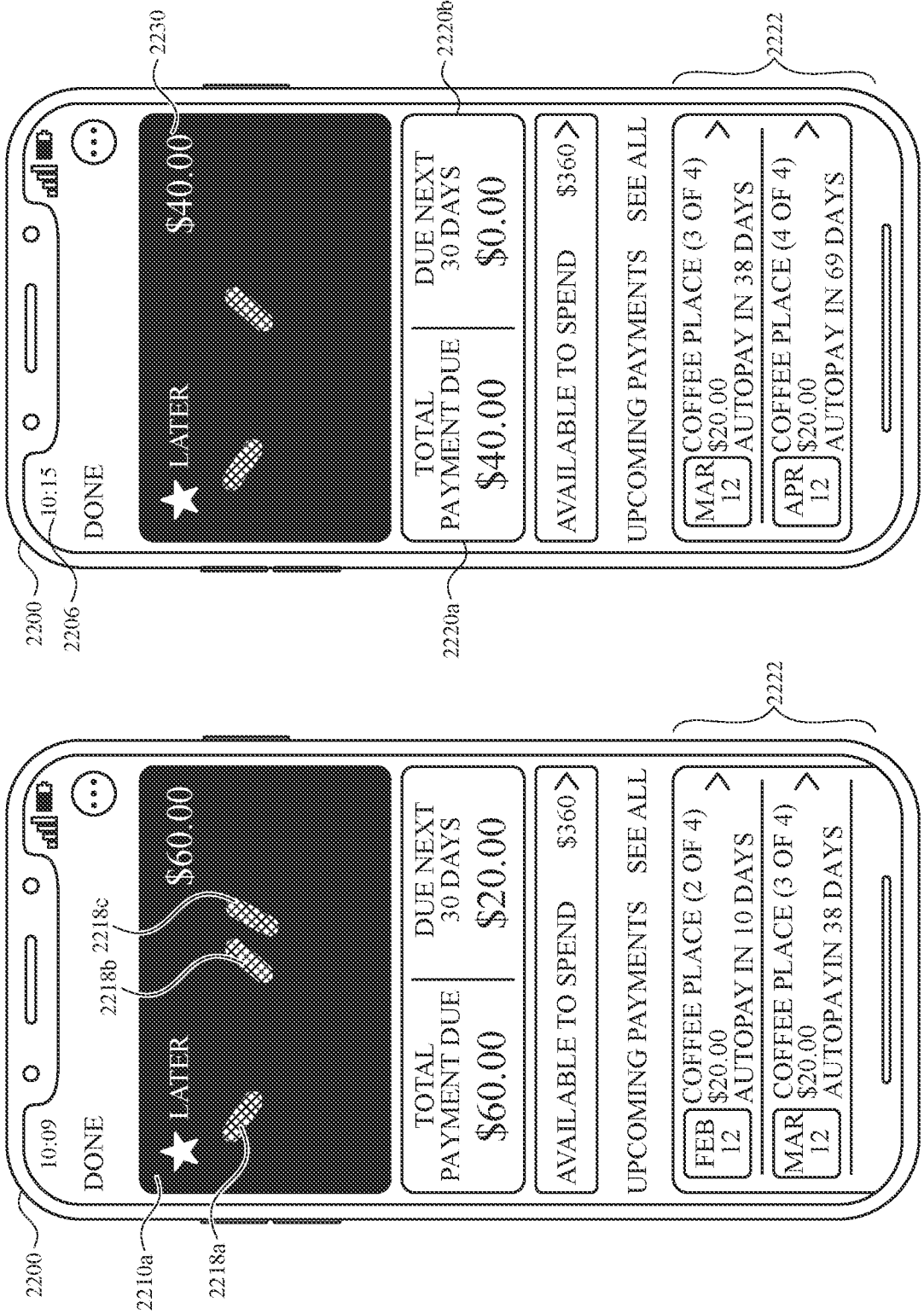

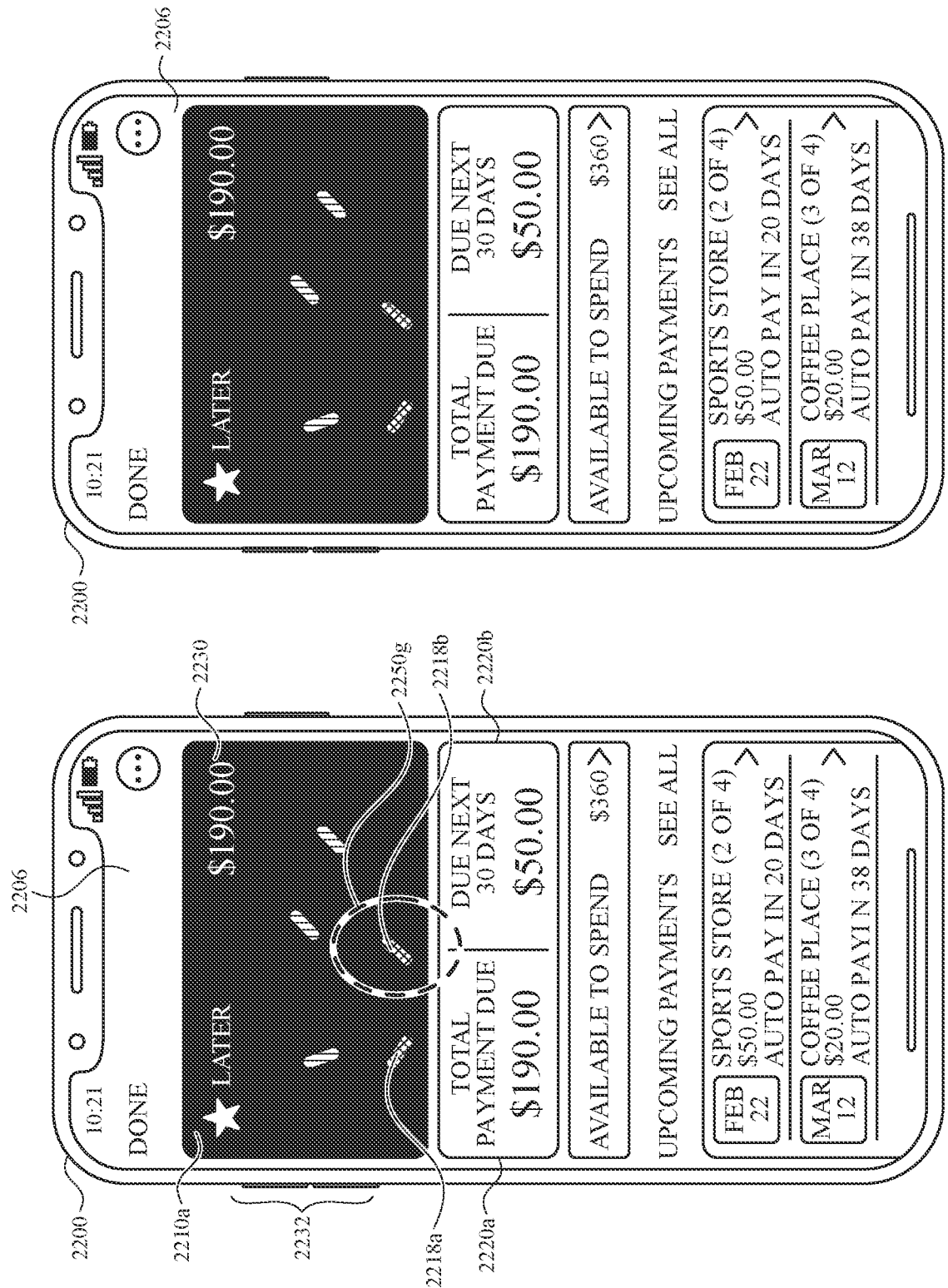

2300 ⤸

2302
Receiving, via the one or more input devices, an indication that a first set of transfer obligations has been generated.

2304
Receiving, via the one or more input devices, a request to display a transfer summary user interface.

2306
In response to receiving the request to display the transfer summary user interface, displaying, via the display generation component, the transfer summary user interface including a quantity of a first type of user interface elements, wherein displaying the transfer summary user interface includes:

2308
In accordance with a determination that the first set of transfer obligations includes a first quantity of transfer obligations, displaying, based on the first quantity, at least the first quantity of the first type of user interface elements.

2310
In accordance with a determination that the first set of transfer obligations includes a second quantity of transfer obligations, displaying, based on the second quantity, at least the second quantity of the first type of user interface elements.

MANAGING INFORMATION ON A COMPUTER SYSTEM

CROSS-REFERENCE TO RELATED APPLICATION

This application claims priority to U.S. Provisional Patent Application Ser. No. 63/349,123, entitled "MANAGING INFORMATION ON A COMPUTER SYSTEM," filed on Jun. 5, 2022, and U.S. Provisional Patent Application Ser. No. 63/303,002, entitled "MANAGING INFORMATION ON A COMPUTER SYSTEM," filed on Jan. 25, 2022, the content of which are hereby incorporated by reference in its entirety.

FIELD

The present disclosure relates generally to computer user interfaces, and more specifically to techniques for managing information on computer systems.

BACKGROUND

Users often perform operations using personal electronic devices, such as transferring information between devices. Such techniques typically require the user to provide various inputs and authorization to perform the operations.

BRIEF SUMMARY

Some techniques for managing information on computer systems and/or electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for receiving and provisioning information on electronic devices. Such methods and interfaces optionally complement or replace other methods for receiving and provisioning information on electronic devices. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: detecting, via one or more input devices, user input to initiate a transaction request; in response to detecting the user input to initiate the transaction request, displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; while displaying the transaction user interface, detecting a movement of the computer system; and in response to detecting the movement of the computer system, rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via one or more input devices, user input to initiate a transaction request; in response to detecting the user input to initiate the transaction request, displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; while displaying the transaction user interface, detecting a movement of the computer system; and in response to detecting the movement of the computer system, rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via one or more input devices, user input to initiate a transaction request; in response to detecting the user input to initiate the transaction request, displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; while displaying the transaction user interface, detecting a movement of the computer system; and in response to detecting the movement of the computer system, rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: detecting, via one or more input devices, user input to initiate a transaction request; in response to detecting the user input to initiate the transaction request, displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; while displaying the transaction user interface, detecting a movement of the computer system; and in response to detecting the movement of the computer system, rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a computer system is described. The computer system is in communication with a display generation component and one or more input devices. The computer system comprises: means for detecting, via one or more input devices, user input to initiate a transaction request; means, responsive to detecting the user input to initiate the transaction request, for displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; means, while displaying the transaction user interface, for detecting a movement of the computer system; and means, responsive to detecting the movement of the computer system, for rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a computer program product is described. The computer program product comprises one or more programs configured to be executed by one or more processors of a computer system that is in communication with a display generation component and one or more input devices, the one or more programs including instructions for: detecting, via one or more input devices, user input to initiate a transaction request; in response to detecting the user input to initiate the transaction request, displaying, via the display generation component, a transaction user interface, wherein displaying the transaction user interface includes display: at a first location, via the display generation component, a first graphical user interface element indicating a location of a reader of the computer system, and at a second location different from the first location, via the display generation component, a second graphical user interface element, wherein the second graphical user interface element is displayed in a first orientation; while displaying the transaction user interface, detecting a movement of the computer system; and in response to detecting the movement of the computer system, rotating the second graphical user interface element around a centroid of the second graphical user interface element to a second orientation different from the first orientation, while continuing to display, at the first location, the first graphical user interface element indicating the location of the reader of the computer system.

In accordance with some embodiments, a method performed at a computer system that is in communication with a display generation component and one or more input devices is described. The method comprises: detecting, via one or more input devices, user input to initiate a transaction request; communicating with a user device; in accordance with a determination that an account associated with a provider of the transaction request is available on the user device, requesting, from the user device, the account associated with the provider of the transaction request; and in accordance with a determination that the account associated with the provider of the transaction request is not available on the user device, forgoing requesting, from the user device, the account associated with the provider of the transaction request.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via one or more input devices, user input to initiate a transaction request; communicating with a user device; in accordance with a determination that an account associated with a provider of the transaction request is available on the user device, requesting, from the user device, the account associated with the provider of the transaction request; and in accordance with a determination that the account associated with the provider of the transaction request is not available on the user device, forgoing requesting, from the user device, the account associated with the provider of the transaction request.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via one or more input devices, user input to initiate a transaction request; communicating with a user device; in accordance with a determination that an account associated with a provider of the transaction request is available on the user device, requesting, from the user device, the account associated with the provider of the transaction request; and in accordance with a determination that the account associated with the provider of the transaction request is not available on the user device, forgoing requesting, from the user device, the account associated with the provider of the transaction request.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: detecting, via one or more input devices, user input to initiate a transaction request; communicating with a user device; in accordance with a determination that an account associated with a provider of the transaction request is available on the user device, requesting, from the user device, the account associated with the provider of the transaction request; and in accordance with a determination that the account associated with the provider of the transaction request is not available on the user device, forgoing requesting, from the user device, the account associated with the provider of the transaction request.

In accordance with some embodiments, a computer system is described. The computer system is in communication with a display generation component and one or more input devices. The computer system comprises: means for detecting, via one or more input devices, user input to initiate a transaction request; means for communicating with a user device; means, in accordance with a determination that an account associated with a provider of the transaction request is available on the user device, for requesting, from the user device, the account associated with the provider of the transaction request; and means, in accordance with a determination that the account associated with the provider of the transaction request is not available on the user device, for forgoing requesting, from the user device, the account associated with the provider of the transaction request.

In accordance with some embodiments, a computer program product is described. The computer program product comprises one or more programs configured to be executed by one or more processors of a computer system that is in communication with a display generation component and one or more input devices, the one or more programs including instructions for: detecting, via one or more input devices, user input to initiate a transaction request; communicating with a user device; in accordance with a determination that an account associated with a provider of the transaction request is available on the user device, requesting, from the user device, the account associated with the provider of the transaction request; and in accordance with a determination that the account associated with the provider of the transaction request is not available on the user device, forgoing requesting, from the user device, the account associated with the provider of the transaction request.

In accordance with some embodiments, a method performed at a computer system that is in communication with a display generation component and one or more input devices is described. The method comprises: in response to detecting a sign-in of a user account after a software update: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: in response to detecting a sign-in of a user account after a software update: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: in response to detecting a sign-in of a user account after a software update: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: in response to detecting a sign-in of a user account after a software update: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a computer system is described. The computer system is in communication with a display generation component and one or more input devices. The computer system comprises: means, responsive to detecting a sign-in of a user account after a software update for: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a computer program product is described. The computer program product comprises one or more programs configured to be executed by one or more processors of a computer system that is in communication with a display generation component and one or more input devices, the one or more programs including instructions for: in response to detecting a sign-in of a user account after a software update: in accordance with a determination that a first set of provision criteria are met, including a first provisioning criterion that is met when an account associated with the user account exceeds a threshold amount, initiating a process to provision the account onto the computer system; and in accordance with a determination that the first set of provisioning criteria are not met, forgoing initiating the process to provision the account onto the computer system.

In accordance with some embodiments, a method performed at a computer system that is in communication with a display generation component and one or more input devices is described. The method comprises: receiving a request to associate a transfer amount with an account; displaying a first user interface element associated with a recurring transaction and an individual transaction and a second user interface element associated with an individual transaction and not associated with a recurring transaction; and in response to receiving user input: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving a request to associate a transfer amount with an account; displaying a first user interface element associated with a recurring transaction and an individual transaction and a second user interface element associated with an individual transaction and not associated with a recurring transaction; and in response to receiving user input: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving a request to associate a transfer amount with an account; displaying a first user interface element associated with a recurring transaction and an individual transaction and a second user interface element associated with an individual transaction and not associated with a recurring transaction; and in response to receiving user input: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: receiving a request to associate a transfer amount with an account; displaying a first user interface element associated with a recurring transaction and an individual transaction and a second user interface element associated with an individual transaction and not associated with a recurring transaction; and in response to receiving user input: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a computer system is described. The computer system is in communication with a display generation component and one or more input devices. The computer system comprises: means for receiving a request to associate a transfer amount with an account; means for displaying a first user interface element associated with a recurring transaction and an individual transaction and a second user interface element associated with an individual transaction and not associated with a recurring transaction; and means, responsive to receiving user input, for: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a computer program product is described. The computer program product comprises one or more programs configured to be executed by one or more processors of a computer system that is in communication with a display generation component and one or more input devices, the one or more programs including instructions for: receiving a request to associate a transfer amount with an account; displaying a first user interface element associated with a recurring transaction and an individual transaction and a second user interface element associated with an individual transaction and not associated with a recurring transaction; and in response to receiving user input: in accordance with a determination that the user input corresponds to a selection of the first user interface element, configuring the transfer amount for use with recurring transactions and individual transactions; and in accordance with a determination that the user input corresponds to a selection of the second user interface element, configuring the transfer amount for use with individual transactions without configuring the transfer amount for use with recurring transactions.

In accordance with some embodiments, a method performed at a computer system that is in communication with a display generation component and one or more input devices is described. The method comprises: receiving a request corresponding to a transaction for a first amount; in accordance with a determination that a first set of conditions is met, displaying, via the display generation component, a first activatable user interface element corresponding to a first quantity of transactions and to the first amount; and in accordance with a determination that a second set of conditions is met, displaying via the display generation component, a second activatable user interface element corresponding to a second quantity of transactions and to a second amount that is different from the first amount.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving a request corresponding to a transaction for a first amount; in accordance with a determination that a first set of conditions is met, displaying, via the display generation component, a first activatable user interface element corresponding to a first quantity of transactions and to the first amount; and in accordance with a determination that a second set of conditions is met, displaying via the display generation component, a second activatable user interface element corresponding to a second quantity of transactions and to a second amount that is different from the first amount.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving a request corresponding to a transaction for a first amount; in accordance with a determination that a first set of conditions is met, displaying, via the display generation component, a first activatable user interface element corresponding to a first quantity of transactions and to the first amount; and in accordance with a determination that a second set of conditions is met, displaying via the display generation component, a second activatable user interface element corresponding to a second quantity of transactions and to a second amount that is different from the first amount.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: receiving a request corresponding to a transaction for a first amount; in accordance with a determination that a first set of conditions is met, displaying, via the display generation component, a first activatable user interface element corresponding to a first quantity of transactions and to the first amount; and in accordance with a determination that a second set of conditions is met, displaying via the display generation component, a second activatable user interface element corresponding to a second quantity of transactions and to a second amount that is different from the first amount.

In accordance with some embodiments, a computer system is described. The computer system is in communication with a display generation component and one or more input devices. The computer system comprises: means for receiving a request corresponding to a transaction for a first amount; means, in accordance with a determination that a first set of conditions is met, for displaying, via the display generation component, a first activatable user interface element corresponding to a first quantity of transactions and to the first amount; and means, in accordance with a determination that a second set of conditions is met, for displaying via the display generation component, a second activatable user interface element corresponding to a second quantity of transactions and to a second amount that is different from the first amount.

In accordance with some embodiments, a computer program product is described. The computer program product comprises one or more programs configured to be executed by one or more processors of a computer system that is in communication with a display generation component and one or more input devices, the one or more programs including instructions for: receiving a request corresponding to a transaction for a first amount; in accordance with a determination that a first set of conditions is met, displaying, via the display generation component, a first activatable user interface element corresponding to a first quantity of transactions and to the first amount; and in accordance with a determination that a second set of conditions is met, displaying via the display generation component, a second activatable user interface element corresponding to a second quantity of transactions and to a second amount that is different from the first amount.

In accordance with some embodiments, a method performed at a computer system that is in communication with a display generation component and with one or more input devices is described. The method comprises: detecting, via the one or more input devices, a first user input; in response to detecting the first user input, displaying, via the display generation component, a numeric entry user interface; while displaying the numeric entry user interface, detecting, via the one or more input devices, a second user input that includes a first set of one or more gestures; and in response to detecting a completion of the first set of one or more gestures, entering a numeric digit of a numeric sequence, the numeric digit based on a quantity of gestures in the first set of one or more gestures.

In accordance with some embodiments, a non-transitory computer-readable storage medium is described. The non-transitory computer readable storage medium stores one or more programs configured to be executed by one or more processors of a computer system with a display generation component and with one or more input devices, the one or more programs including instructions for: detecting, via the one or more input devices, a first user input; in response to detecting the first user input, displaying, via the display generation component, a numeric entry user interface; while displaying the numeric entry user interface, detecting, via the one or more input devices, a second user input that includes a first set of one or more gestures; and in response to detecting a completion of the first set of one or more gestures, entering a numeric digit of a numeric sequence, the numeric digit based on a quantity of gestures in the first set of one or more gestures.

In accordance with some embodiments, a transitory computer-readable storage medium is described. The transitory computer readable storage medium stores one or more programs configured to be executed by one or more processors of a computer system with a display generation component and with one or more input devices, the one or more programs including instructions for: detecting, via the one or more input devices, a first user input; in response to detecting the first user input, displaying, via the display generation component, a numeric entry user interface; while displaying the numeric entry user interface, detecting, via the one or more input devices, a second user input that includes a first set of one or more gestures; and in response to detecting a completion of the first set of one or more gestures, entering a numeric digit of a numeric sequence, the numeric digit based on a quantity of gestures in the first set of one or more gestures.

In accordance with some embodiments, a computer system that is in communication with a display generation component and one or more input devices is described. The computer system comprises: one or more processors; and memory storing one or more programs configured to be executed by the one or more processors, the one or more programs including instructions for: detecting, via the one or more input devices, a first user input; in response to detecting the first user input, displaying, via the display generation component, a numeric entry user interface; while displaying the numeric entry user interface, detecting, via the one or more input devices, a second user input that includes a first set of one or more gestures; and in response to detecting a completion of the first set of one or more gestures, entering a numeric digit of a numeric sequence, the numeric digit based on a quantity of gestures in the first set of one or more gestures.

In accordance with some embodiments, a computer system configured that is in communication with a display generation component and one or more input devices is described. The computer system comprising: means for detecting, via the one or more input devices, a first user input; means for in response to detecting the first user input, displaying, via the display generation component, a numeric entry user interface; means for while displaying the numeric entry user interface, detecting, via the one or more input devices, a second user input that includes a first set of one or more gestures; and means for in response to detecting a completion of the first set of one or more gestures, entering a numeric digit of a numeric sequence, the numeric digit based on a quantity of gestures in the first set of one or more gestures.

In accordance with some embodiments, a computer program product, comprising one or more programs configured to be executed by one or more processors of a computer system that is in communication with a display generation component one or more input devices is described. The one or more programs including instructions for: detecting, via the one or more input devices, a first user input; in response to detecting the first user input, displaying, via the display generation component, a numeric entry user interface; while displaying the numeric entry user interface, detecting, via the one or more input devices, a second user input that includes a first set of one or more gestures; and in response to detecting a completion of the first set of one or more gestures, entering a numeric digit of a numeric sequence, the numeric digit based on a quantity of gestures in the first set of one or more gestures.

In accordance with some embodiments, a method performed at a computer system is that is in communication with a display generation component and with one or more input devices is described. The method comprises: while the computer system is unlocked and while displaying, via the display generation component, a user interface of a first application, receiving, via the one or more input devices, a first input; in response to receiving the first input: displaying a first numeric keypad; in accordance with a first set of lock conditions being met, locking the computer system; and in accordance with the first set of lock conditions not being met, forgoing locking the computer system; while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and subsequent to receiving the second input and while the computer system is locked, receiving, via the one or more input devices, a third input that does not use the first numeric keypad; and in response to receiving the third input: in accordance with a determination, independent of the numeric sequence corresponding to the second input, that the third input matches an enrolled credential, unlocking the computer system; and in accordance with a determination, independent of the numeric sequence corresponding to the second input, that the third input does not match an enrolled credential, forgoing unlocking the computer system.

In accordance with some embodiments, a non-transitory computer-readable storage medium is described. The non-transitory computer readable storage medium stores one or more programs configured to be executed by one or more processors of a computer system with a display generation component and with one or more input devices, the one or more programs including instructions for: while the computer system is unlocked and while displaying, via the display generation component, a user interface of a first application, receiving, via the one or more input devices, a first input; in response to receiving the first input: displaying a first numeric keypad; in accordance with a first set of lock conditions being met, locking the computer system; and in accordance with the first set of lock conditions not being met, forgoing locking the computer system; while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and subsequent to receiving the second input and while the computer system is locked, receiving, via the one or more input devices, a third input that does not use the first numeric keypad; and in response to receiving the third input: in accordance with a determination, independent of the numeric sequence corresponding to the second input, that the third input matches an enrolled credential, unlocking the computer system; and in accordance with a determination, independent of the numeric sequence corresponding to the second input, that the third input does not match an enrolled credential, forgoing unlocking the computer system.

In accordance with some embodiments, a transitory computer-readable storage medium is described. The transitory computer readable storage medium stores one or more programs configured to be executed by one or more processors of a computer system with a display generation component and with one or more input devices, the one or more programs including instructions for: while the computer system is unlocked and while displaying, via the display generation component, a user interface of a first application, receiving, via the one or more input devices, a first input; in response to receiving the first input: displaying a first numeric keypad; in accordance with a first set of lock conditions being met, locking the computer system; and in accordance with the first set of lock conditions not being met, forgoing locking the computer system; while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and subsequent to receiving the second input and while the computer system is locked, receiving, via the one or more input devices, a third input that does not use the first numeric keypad; and in response to receiving the third input: in accordance with a determination, independent of the numeric sequence corresponding to the second input, that the third input matches an enrolled credential, unlocking the computer system; and in accordance with a determination, independent of the numeric sequence corresponding to the second input, that the third input does not match an enrolled credential, forgoing unlocking the computer system.

In accordance with some embodiments a computer system configured that is in communication with a display generation component and one or more input devices is described. The computer system comprising: one or more processors; and memory storing one or more programs configured to be executed by the one or more processors, the one or more programs including instructions for: while the computer system is unlocked and while displaying, via the display generation component, a user interface of a first application, receiving, via the one or more input devices, a first input; in response to receiving the first input: displaying a first numeric keypad; in accordance with a first set of lock conditions being met, locking the computer system; and in accordance with the first set of lock conditions not being met, forgoing locking the computer system; while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and subsequent to receiving the second input and while the computer system is locked, receiving, via the one or more input devices, a third input that does not use the first numeric keypad; and in response to receiving the third input: in accordance with a determination, independent of the numeric sequence corresponding to the second input, that the third input matches an enrolled credential, unlocking the computer system; and in accordance with a determination, independent of the numeric sequence corresponding to the second input, that the third input does not match an enrolled credential, forgoing unlocking the computer system.

In accordance with some embodiments a computer system that is in communication with a display generation component and one or more input devices is described. The computer system comprising: means for while the computer system is unlocked and while displaying, via the display generation component, a user interface of a first application, receiving, via the one or more input devices, a first input; means for in response to receiving the first input: means for displaying a first numeric keypad; means for in accordance with a first set of lock conditions being met, locking the computer system; and means for in accordance with the first set of lock conditions not being met, forgoing locking the computer system; means for while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and means for subsequent to receiving the second input and while the computer system is locked, receiving, via the one or more input devices, a third input that does not use the first numeric keypad; and means for in response to receiving the third input: means for in accordance with a determination, independent of the numeric sequence corresponding to the second input, that the third input matches an enrolled credential, unlocking the computer system; and means for in accordance with a determination, independent of the numeric sequence corresponding to the second input, that the third input does not match an enrolled credential, forgoing unlocking the computer system.

In accordance with some embodiments a computer program product comprising one or more programs configured to be executed by one or more processors of a computer system that is in communication with a display generation component one or more input devices is described. The one or more programs including instructions for: while the computer system is unlocked and while displaying, via the display generation component, a user interface of a first application, receiving, via the one or more input devices, a first input; in response to receiving the first input: displaying a first numeric keypad; in accordance with a first set of lock conditions being met, locking the computer system; and in accordance with the first set of lock conditions not being met, forgoing locking the computer system; while displaying the first numeric keypad, receiving, via the one or more input devices and using the first numeric keypad, a second input corresponding to a numeric sequence, wherein the computer system does not unlock based on the second input that uses the first numeric keypad regardless of the numeric sequence; and subsequent to receiving the second input and while the computer system is locked, receiving, via the one or more input devices, a third input that does not use the first numeric keypad; and in response to receiving the third input: in accordance with a determination, independent of the numeric sequence corresponding to the second input, that the third input matches an enrolled credential, unlocking the computer system; and in accordance with a determination, independent of the numeric sequence corresponding to the second input, that the third input does not match an enrolled credential, forgoing unlocking the computer system.

In accordance with some embodiments, a method performed at a computer system that is in communication with a display generation component and one or more input devices is described. The method comprises: receiving, via the one or more input devices, an indication that a first set of transfer obligations has been generated; receiving, via the one or more input devices, a request to display a transfer summary user interface; in response to receiving the request to display the transfer summary user interface, displaying, via the display generation component, the transfer summary user interface including a quantity of a first type of user interface elements, wherein displaying the transfer summary user interface includes; in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; subsequent to displaying the transfer summary user interface, receiving an indication that a respective transfer obligation in the first set of transfer obligations has been satisfied; and subsequent to receiving the indication that a respective transfer obligation in the first set of transfer obligations has been satisfied, displaying, via the display generation component and based on the indication that the respective transfer obligation in the first set of transfer obligations has been satisfied, the transfer summary user interface with one less than the quantity of the first type of user interface elements.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, an indication that a first set of transfer obligations has been generated; receiving, via the one or more input devices, a request to display a transfer summary user interface; in response to receiving the request to display the transfer summary user interface, displaying, via the display generation component, the transfer summary user interface including a quantity of a first type of user interface elements, wherein displaying the transfer summary user interface includes: in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; subsequent to displaying the transfer summary user interface, receiving an indication that a respective transfer obligation in the first set of transfer Obligations has been satisfied; and subsequent to receiving the indication that a respective transfer obligation in the first set of transfer obligations has been satisfied, displaying, via the display generation component and based on the indication that the respective transfer obligation in the first set of transfer obligations has been satisfied, the transfer summary user interface with one less than the quantity of the first type of user interface elements.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, an indication that a first set of transfer obligations has been generated; receiving, via the one or more input devices, a request to display a transfer summary user interface; in response to receiving the request to display the transfer summary user interface, displaying, via the display generation component, the transfer summary user interface including a quantity of a first type of user interface elements, wherein displaying the transfer summary user interface includes: in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; subsequent to displaying the transfer summary user interface, receiving an indication that a respective transfer obligation in the first set of transfer obligations has been satisfied; and subsequent to receiving the indication that a respective transfer obligation in the first set of transfer obligations has been satisfied, displaying, via the display generation component and based on the indication that the respective transfer obligation in the first set of transfer obligations has been satisfied, the transfer summary user interface with one less than the quantity of the first type of user interface elements.

In accordance with some embodiments, a computer system configured to communicate with a display generation component and one or more input devices is described. The computer system comprises: one or more processors; and memory storing one or more programs configured to be executed by the one or more processors, the one or more programs including instructions for: receiving, via the one or more input devices, an indication that a first set of transfer obligations has been generated; receiving, via the one or more input devices, a request to display a transfer summary user interface; in response to receiving the request to display the transfer summary user interface, displaying, via the display generation component, the transfer summary user interface including a quantity of a first type of user interface elements, wherein displaying the transfer summary user interface includes: in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; subsequent to displaying the transfer summary user interface, receiving an indication that a respective transfer obligation in the first set of transfer obligations has been satisfied; and subsequent to receiving the indication that a respective transfer obligation in the first set of transfer obligations has been satisfied, displaying, via the display generation component and based on the indication that the respective transfer obligation in the first set of transfer obligations has been satisfied, the transfer summary user interface with one less than the quantity of the first type of user interface elements.

In accordance with some embodiments, a computer system configured to communicate with a display generation component and one or more input devices is described. The computer system comprises: means for receiving, via the one or more input devices, an indication that a first set of transfer obligations has been generated; means for receiving, via the one or more input devices, a request to display a transfer summary user interface; means, responsive to receiving the request to display the transfer summary user interface, for displaying, via the display generation component, the transfer summary user interface including a quantity of a first type of user interface elements, wherein displaying the transfer summary user interface includes: in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; means, subsequent to displaying the transfer summary user interface, for receiving an indication that a respective transfer obligation in the first set of transfer obligations has been satisfied; and means, subsequent to receiving the indication that a respective transfer obligation in the first set of transfer obligations has been satisfied, for displaying, via the display generation component and based on the indication that the respective transfer obligation in the first set of transfer obligations has been satisfied, the transfer summary user interface with one less than the quantity of the first type of user interface elements.

In accordance with some embodiments, a computer program product is described. The computer program product comprises: one or more programs configured to be executed by one or more processors of a computer system that is in communication with a display generation component and one or more input devices, the one or more programs including instructions for: receiving, via the one or more input devices, an indication that a first set of transfer obligations has been generated; receiving, via the one or more input devices, a request to display a transfer summary user interface; in response to receiving the request to display the transfer summary user interface, displaying, via the display generation component, the transfer summary user interface including a quantity of a first type of user interface elements, wherein displaying the transfer summary user interface includes: in accordance with a determination that the first set of transfer obligations includes a first quantity of transfer obligations, displaying, based on the first quantity, at least the first quantity of the first type of user interface elements; and in accordance with a determination that the first set of transfer obligations includes a second quantity of transfer obligations, displaying, based on the second quantity, at least the second quantity of the first type of user interface elements; subsequent to displaying the transfer summary user interface, receiving an indication that a respective transfer obligation in the first set of transfer obligations has been satisfied; and subsequent to receiving the indication that a respective transfer obligation in the first set of transfer obligations has been satisfied, displaying, via the display generation component and based on the indication that the respective transfer obligation in the first set of transfer obligations has been satisfied, the transfer summary user interface with one less than the quantity of the first type of user interface elements.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for receiving and provisioning information on electronic devices, thereby increasing the effectiveness, efficiency, and user satisfaction with such devices. Such methods and interfaces may complement or replace other methods for receiving and provisioning information on electronic devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 12 is a flow diagram illustrating a method for provisioning an account onto a computer system, in accordance with some embodiments.

FIGS. 13A-13B illustrate exemplary user interfaces for adding data from a data plan to an account, in accordance with some embodiments.

FIGS. 14A-14F illustrate exemplary user interfaces for associating a transfer amount with an account, in accordance with some embodiments.

FIG. 15 is a flow diagram illustrating a method for associating a transfer amount with an account, in accordance with some embodiments.

FIGS. 20A-20C are flow diagrams illustrating a method for entering a number sequence, in accordance with some embodiments.

FIGS. 21A-21D illustrate exemplary user interfaces for managing photos on a photo server, in accordance with some embodiments.

FIGS. 22A-22H illustrate exemplary user interfaces for managing one or more pending loans, in accordance with some embodiments.

FIGS. 23A-23B are flow diagrams illustrating a method for managing information, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for receiving and provisioning information on electronic devices. For example, there is a need to provide efficient methods and interfaces for displaying user interface elements and requesting account information. As another example, there is a need to provide efficient methods and interfaces for provisioning an account onto a computer system. As another example, there is a need to provide efficient methods and interfaces for adding funds from a gift card to an account. As another example, there is a need to provide efficient methods and interfaces for selecting a transaction type. Such techniques can reduce the cognitive burden on a user who needs to receive and provision information on electronic devices, thereby enhancing productivity. Further, such techniques can reduce processor and battery power otherwise wasted on redundant user inputs.

Figure 7A:
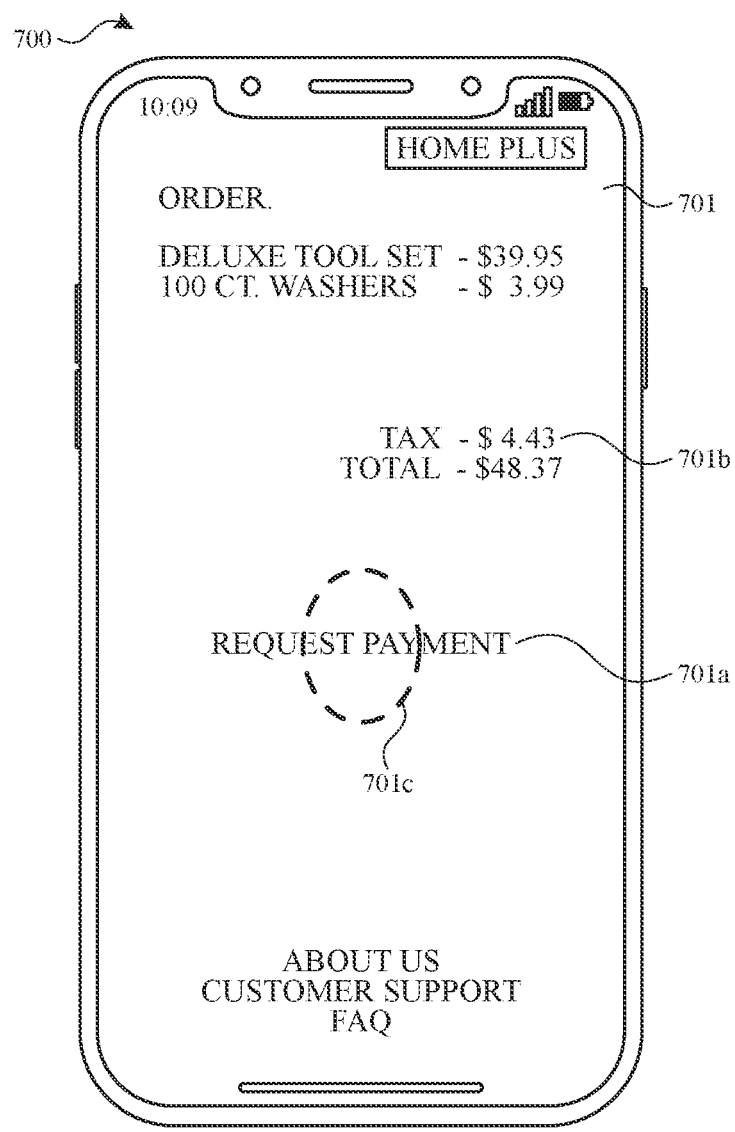
FIGS. 7A-7S illustrate exemplary user interfaces for managing display of user interface elements based on movement of a computer system and requesting account information, in accordance with some embodiments.
Figure 7S:
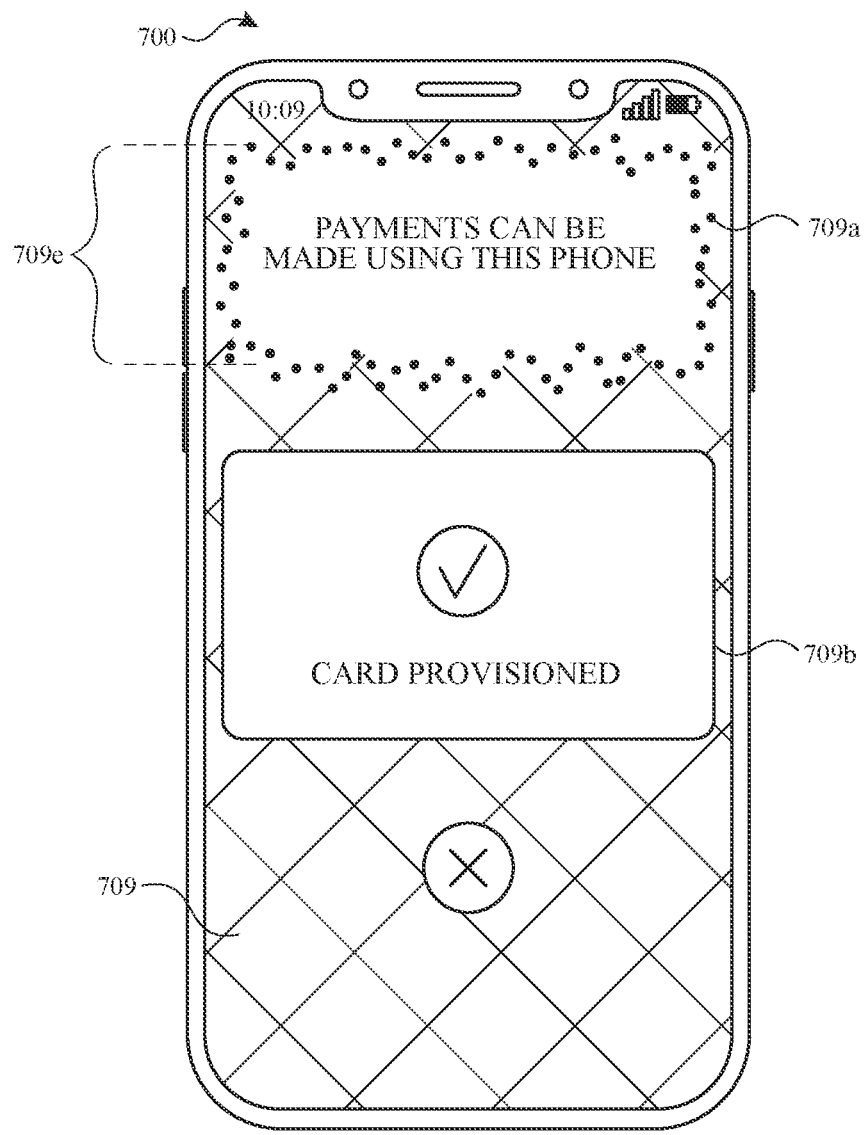
Figure 8:
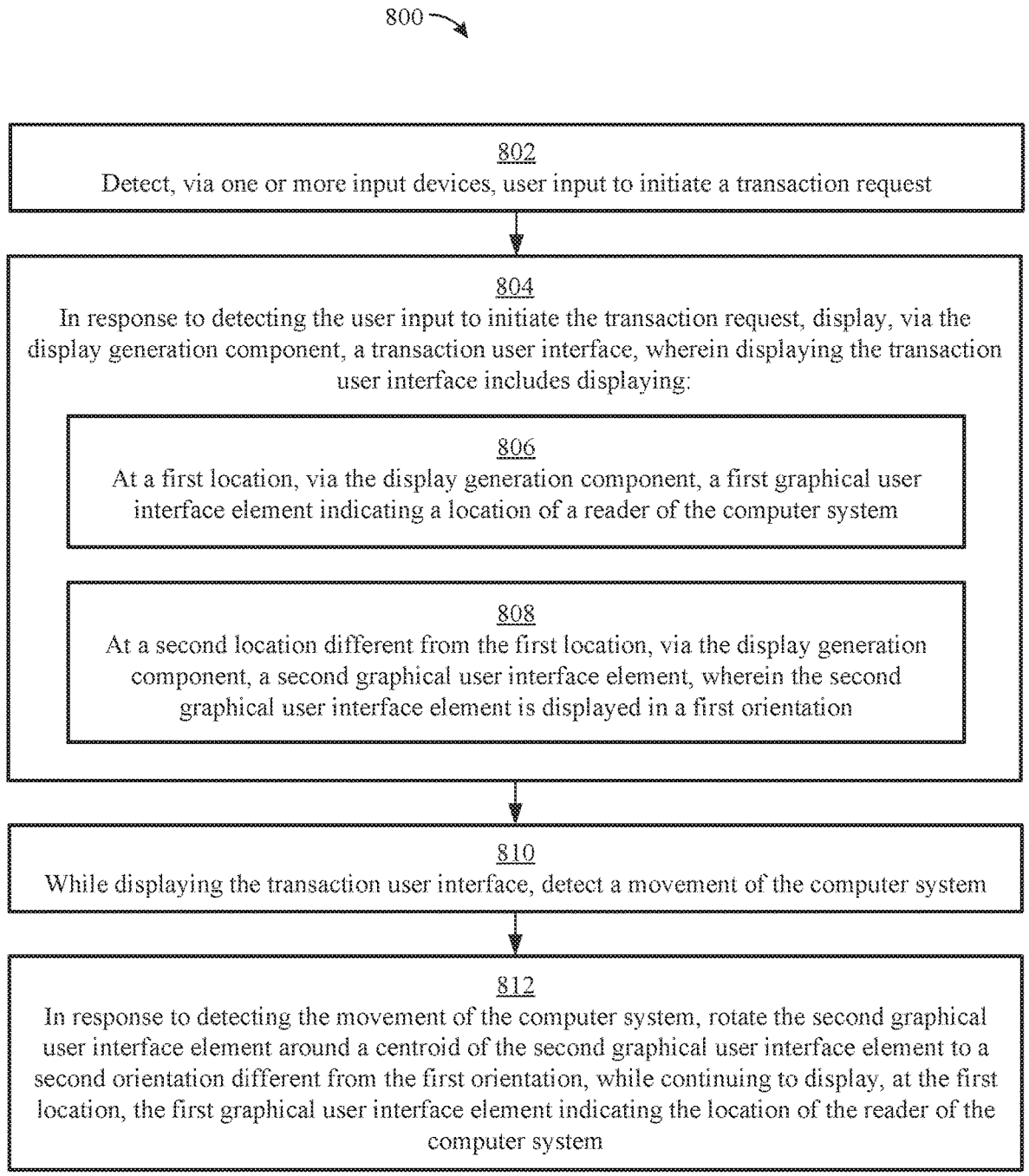
FIG. 8 is a flow diagram illustrating a method for managing display of user interface elements based on movement of a computer system, in accordance with some embodiments.
Figure 9:
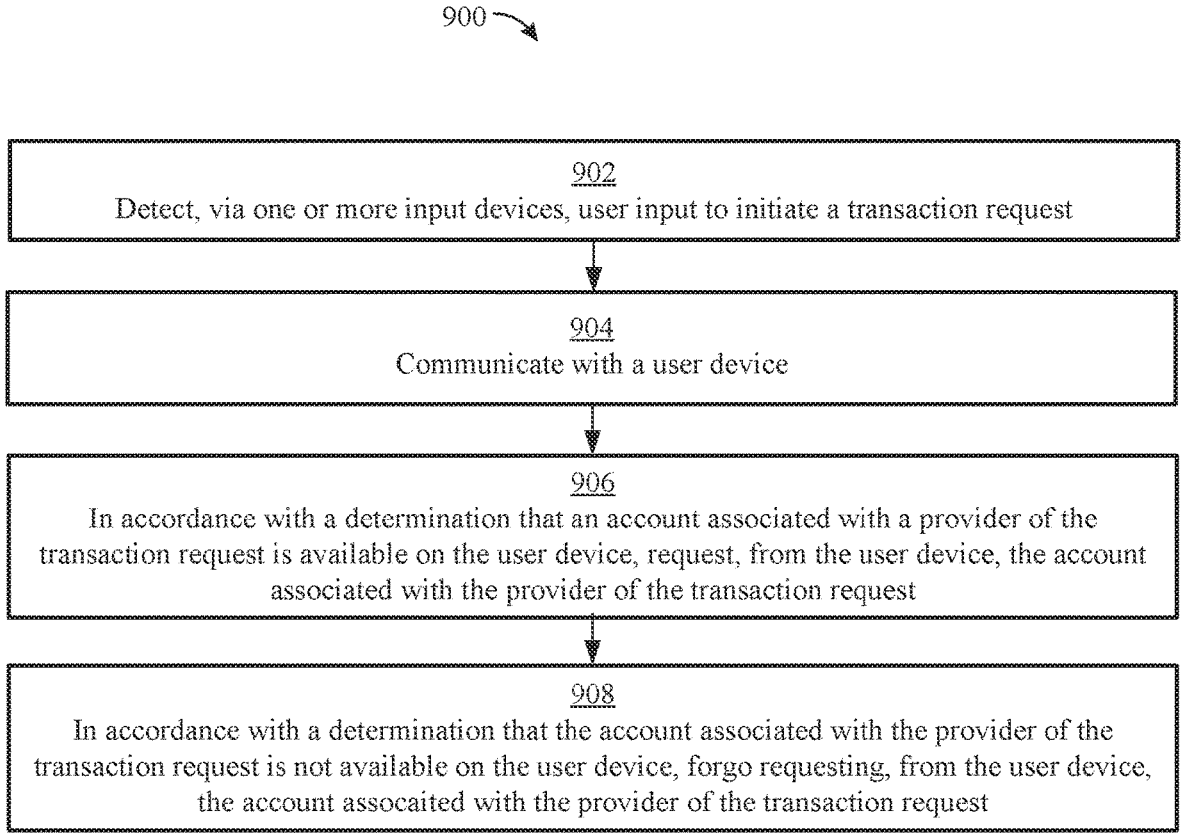
FIG. 9 is a flow diagram illustrating a method for requesting account information, in accordance with some embodiments.
Figure 10A:
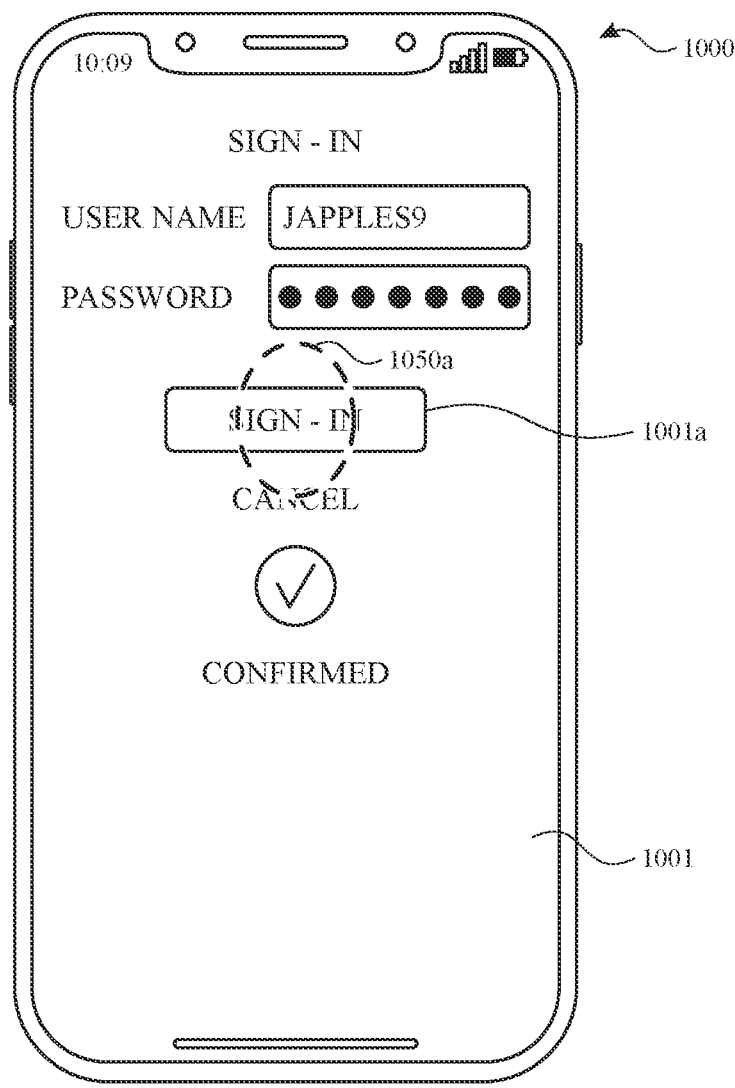
FIGS. 10A-10B illustrate example user interfaces for provisioning an SSH account onto a computer system, in accordance with some embodiments.
Figure 10B:
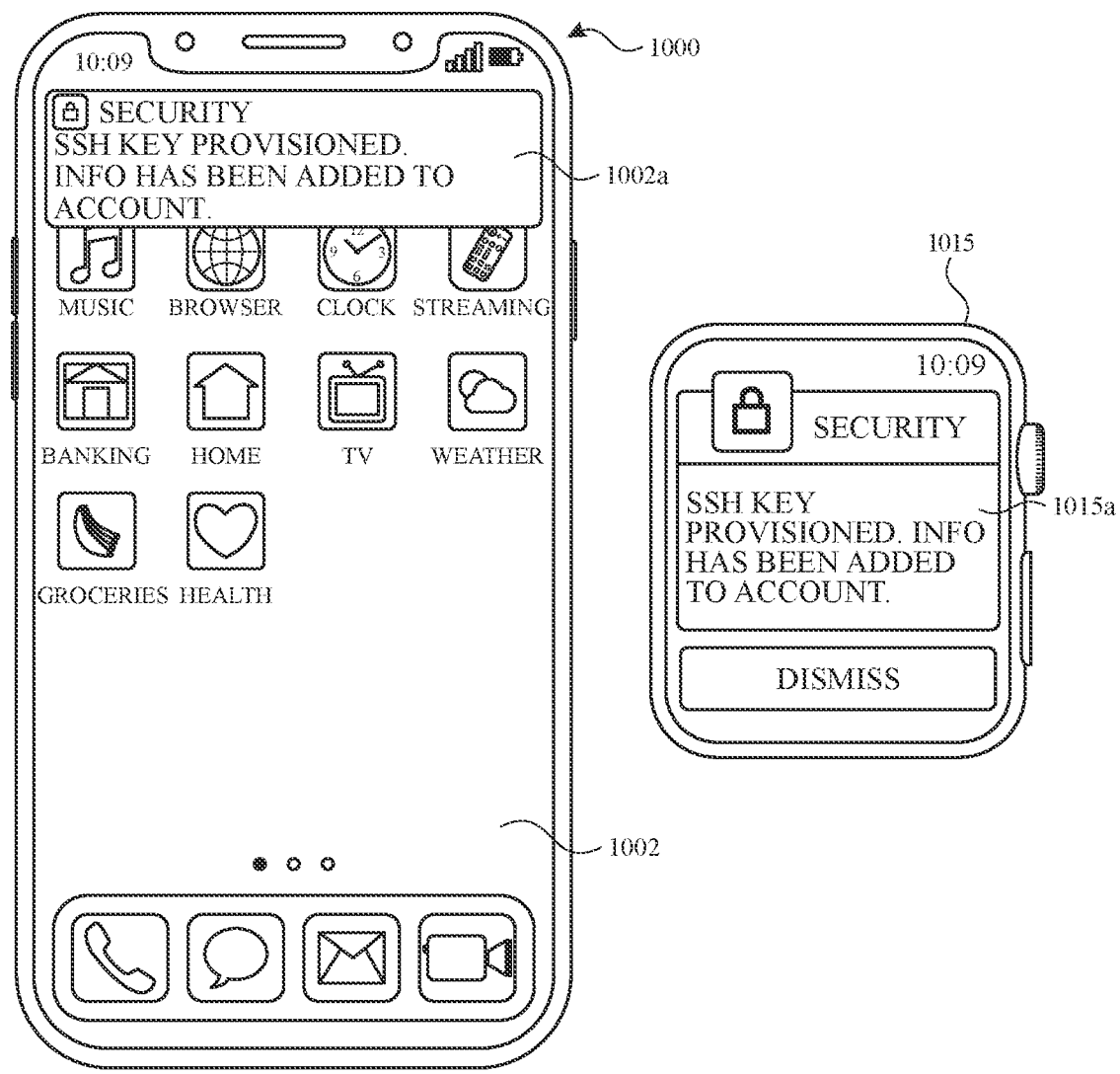
Figures 16A, 16B:
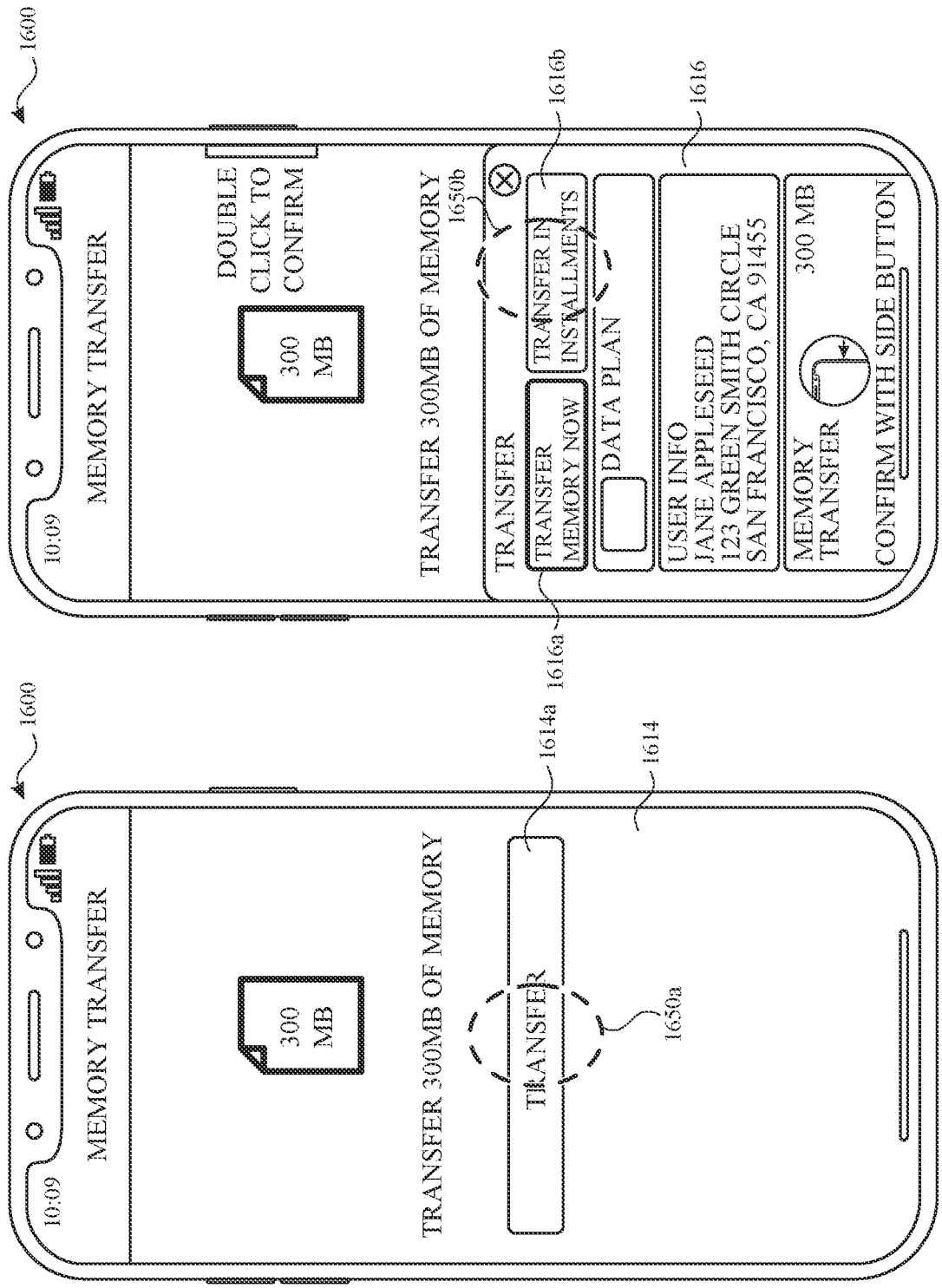
FIGS. 16A-16C illustrate exemplary user interfaces for allocating memory, in accordance with some embodiments.
Figure 16C:
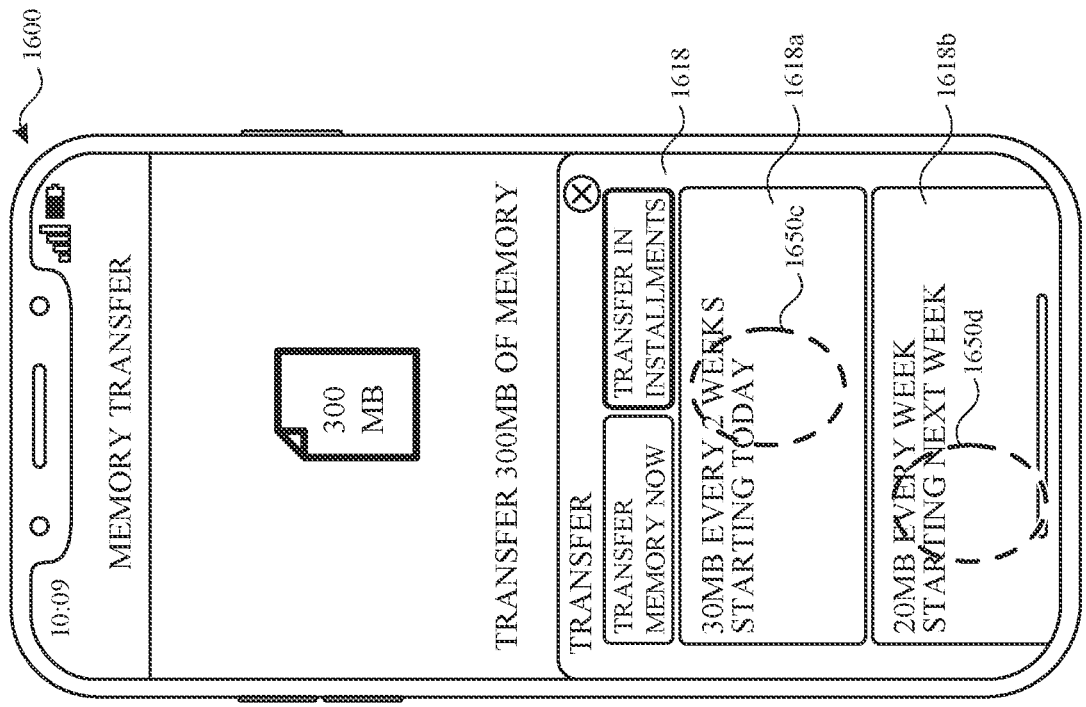
Figure 17J:
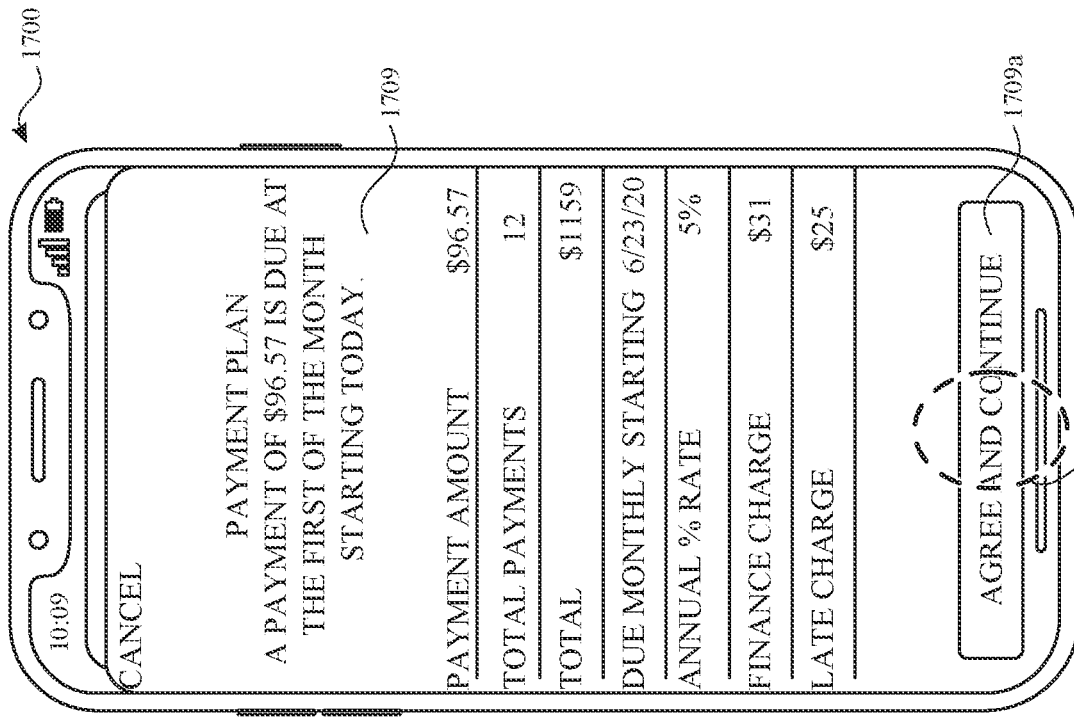
FIGS. 17A-17Q illustrate exemplary user interfaces for displaying user interface elements corresponding to transaction types, in accordance with some embodiments.
Figure 17I:
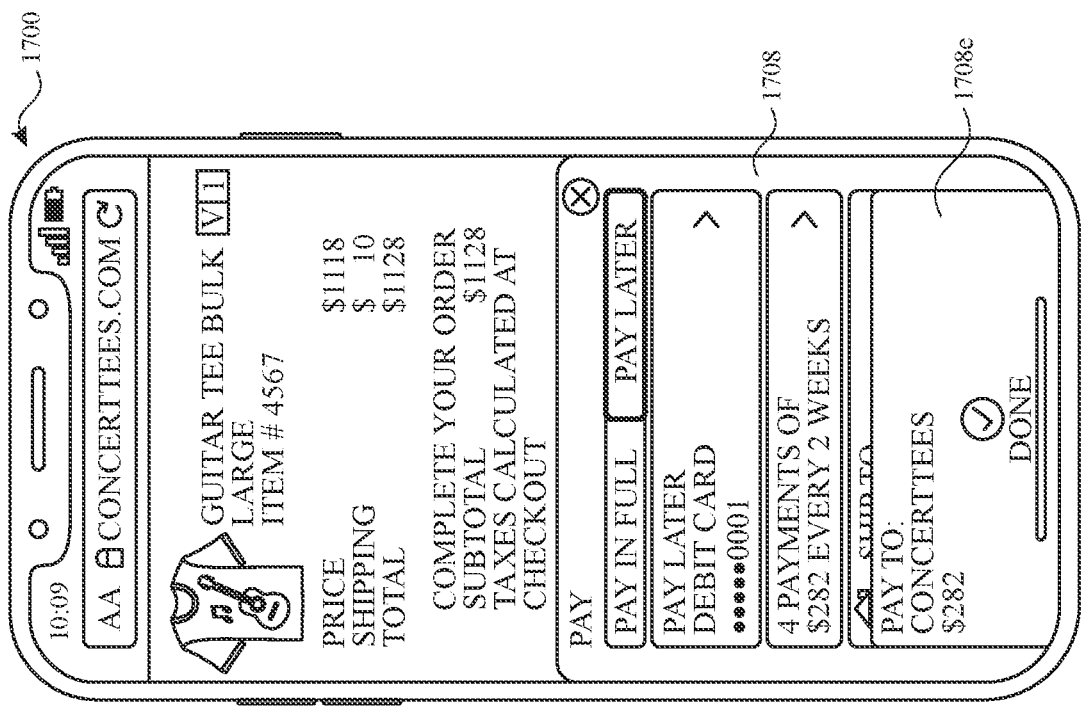
Figure 17Q:
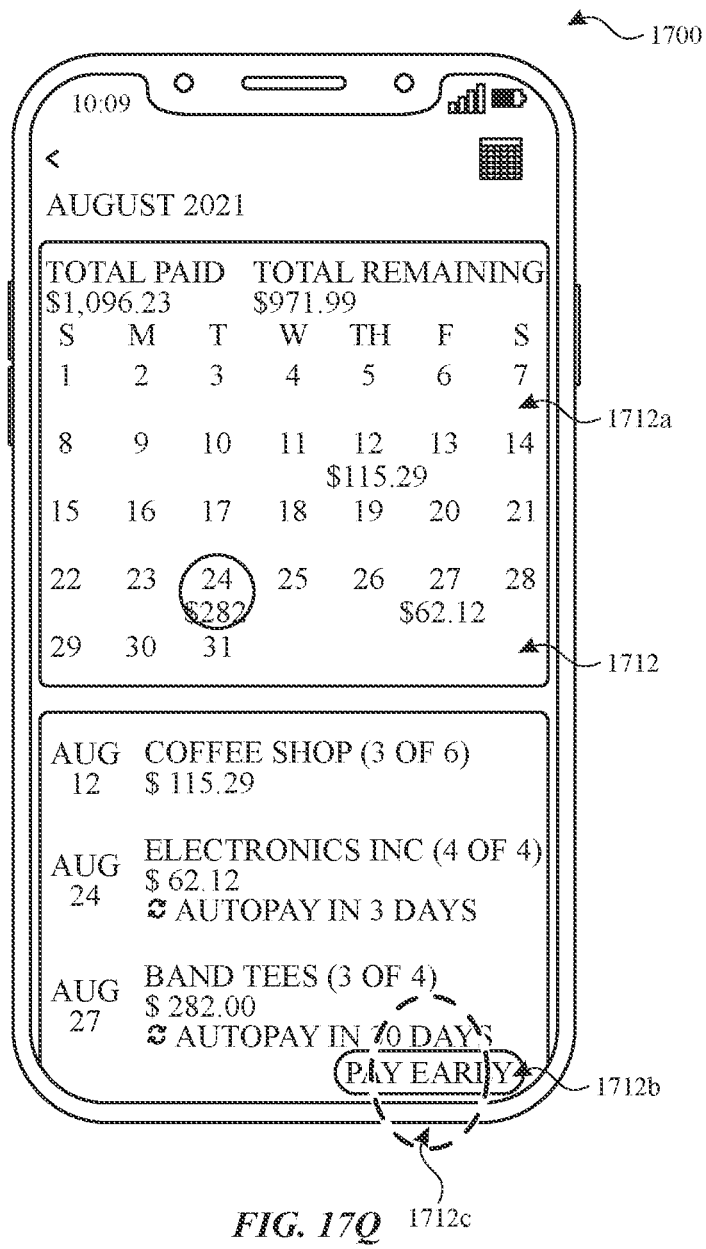
Figure 18:
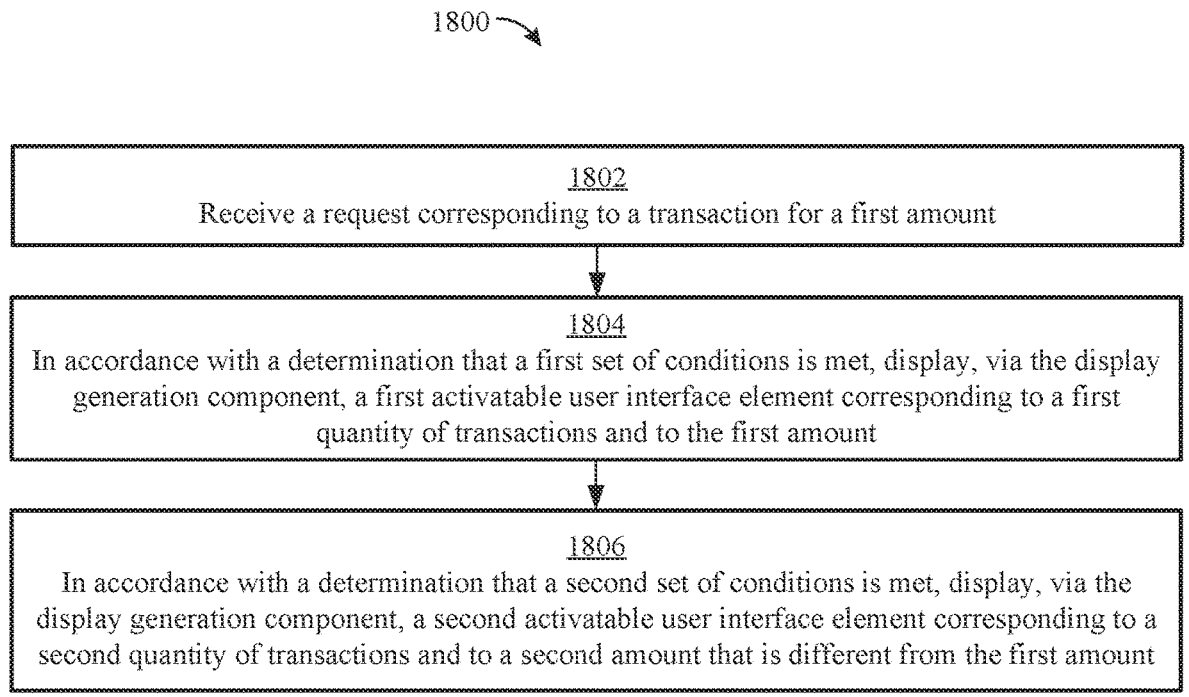
FIG. 18 is a flow diagram illustrating a method for displaying user interface elements corresponding to transaction types, in accordance with some embodiments.
Figure 19A:
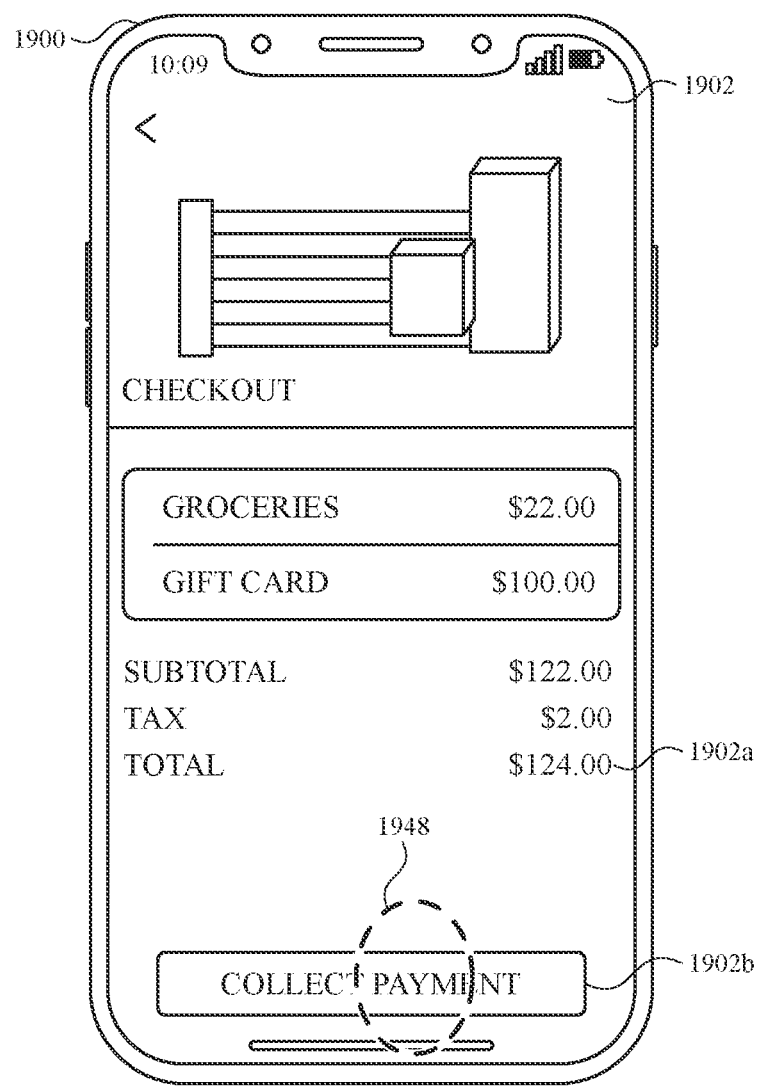
FIGS. 19A-19U illustrate exemplary user interfaces for entering a number sequence, in accordance with some embodiments.
Figure 19B:
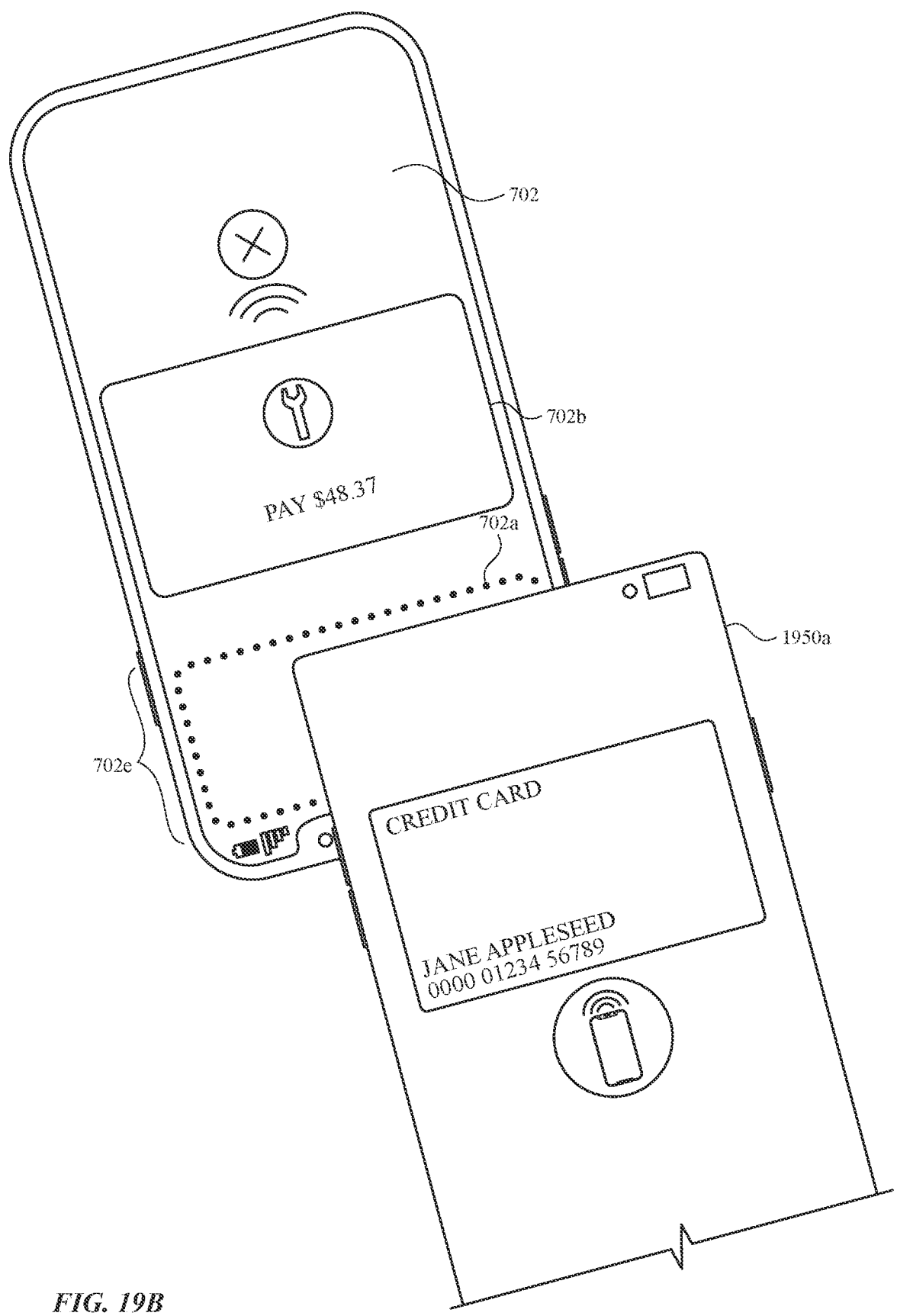
Figure 19C:
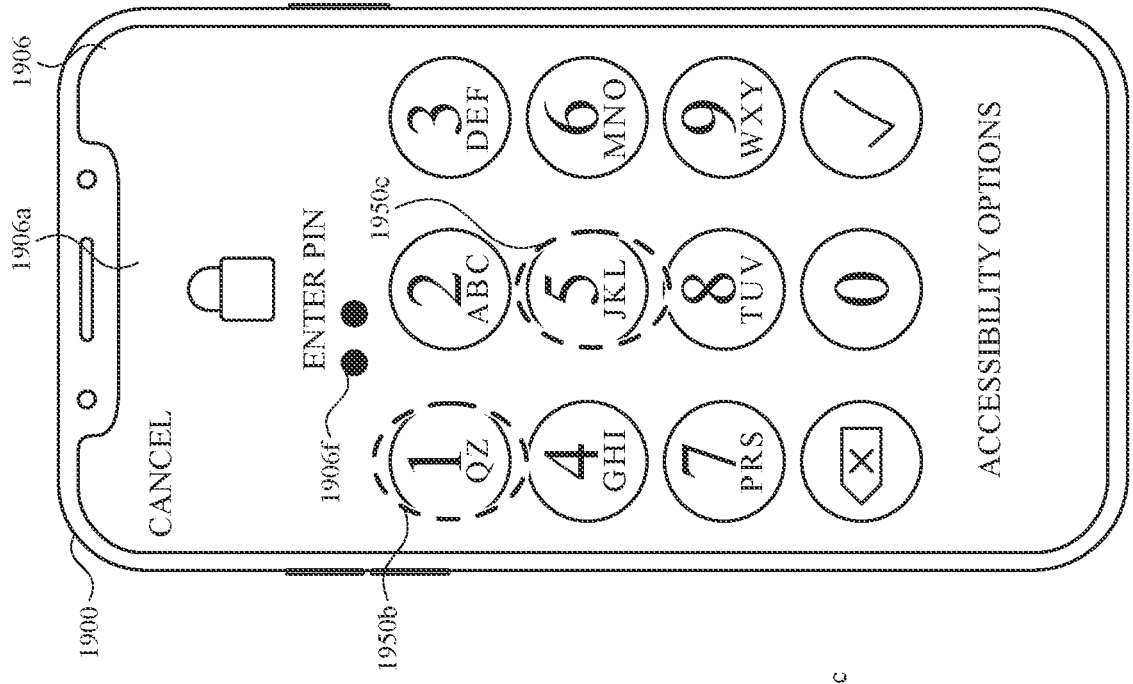
Figure 19D:
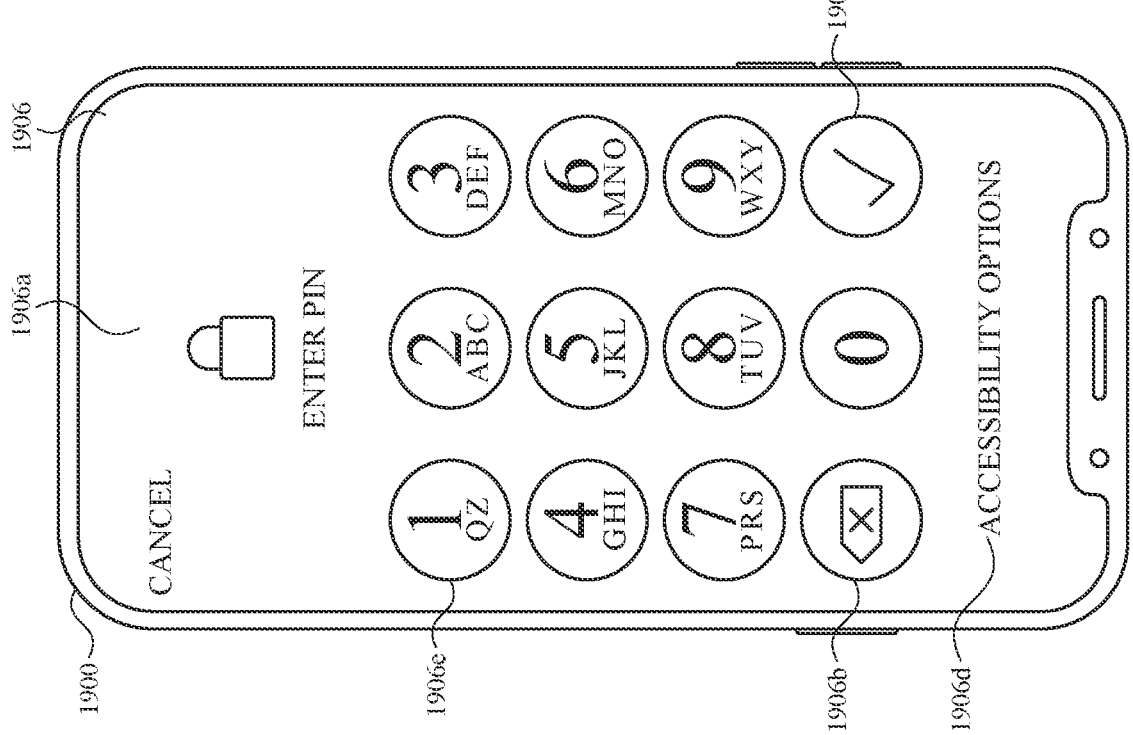
Figure 19N:
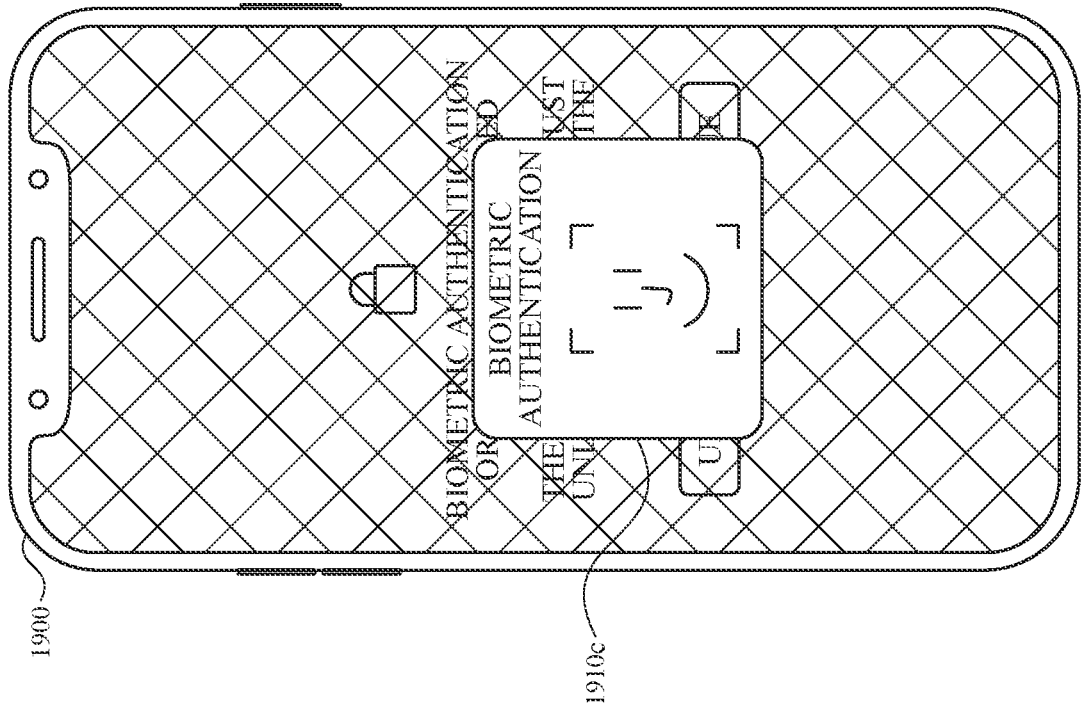
Figure 19M:
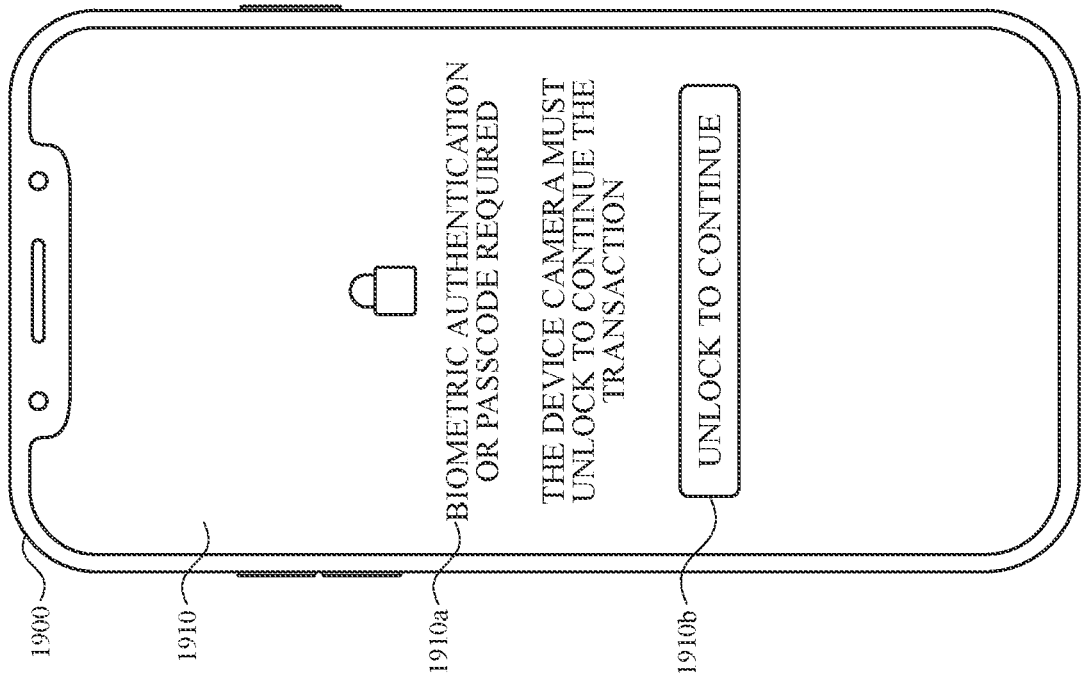
Figure 19P:
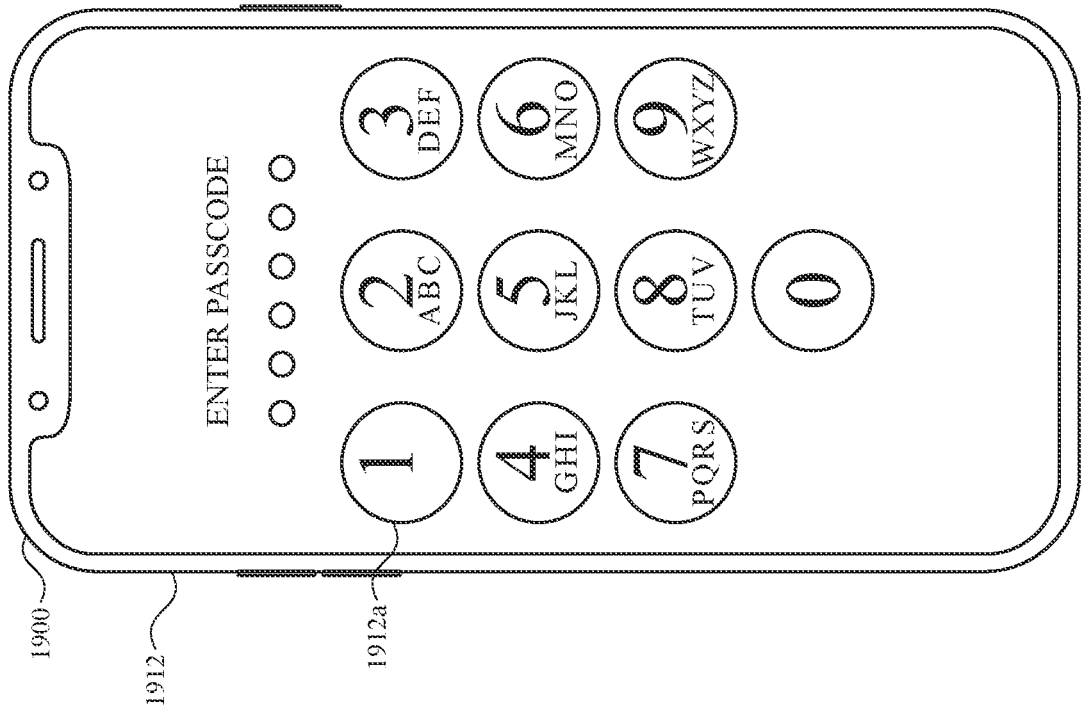
Figure 19O:
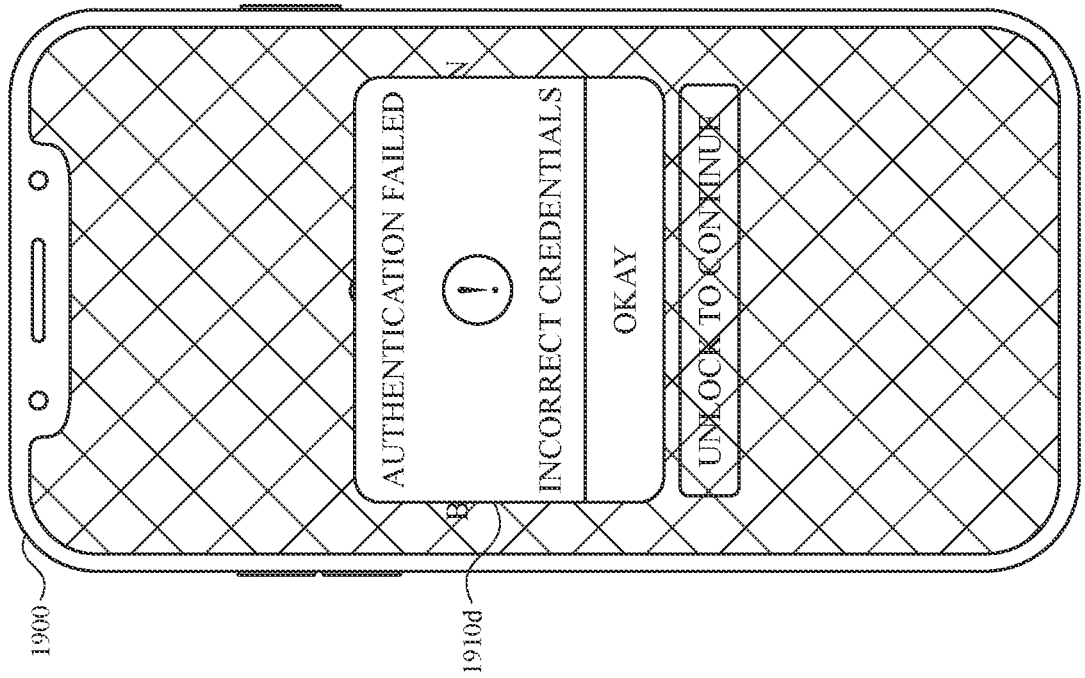
Figure 19U:
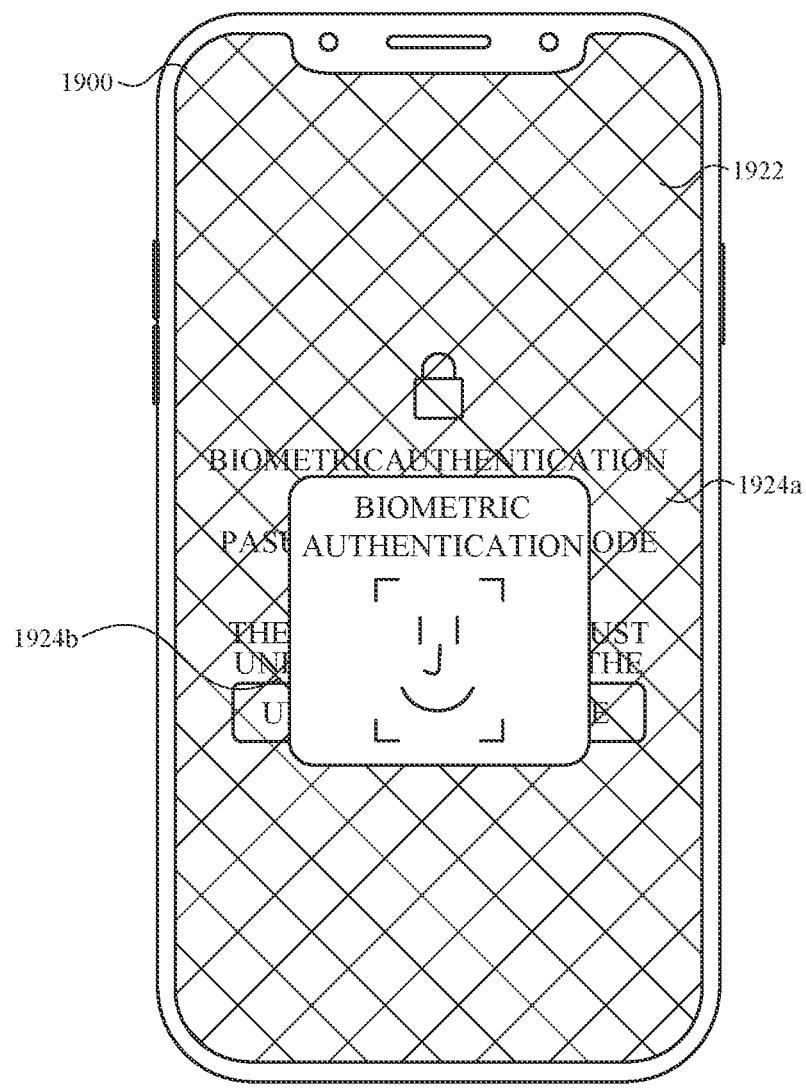
Figure 20A:
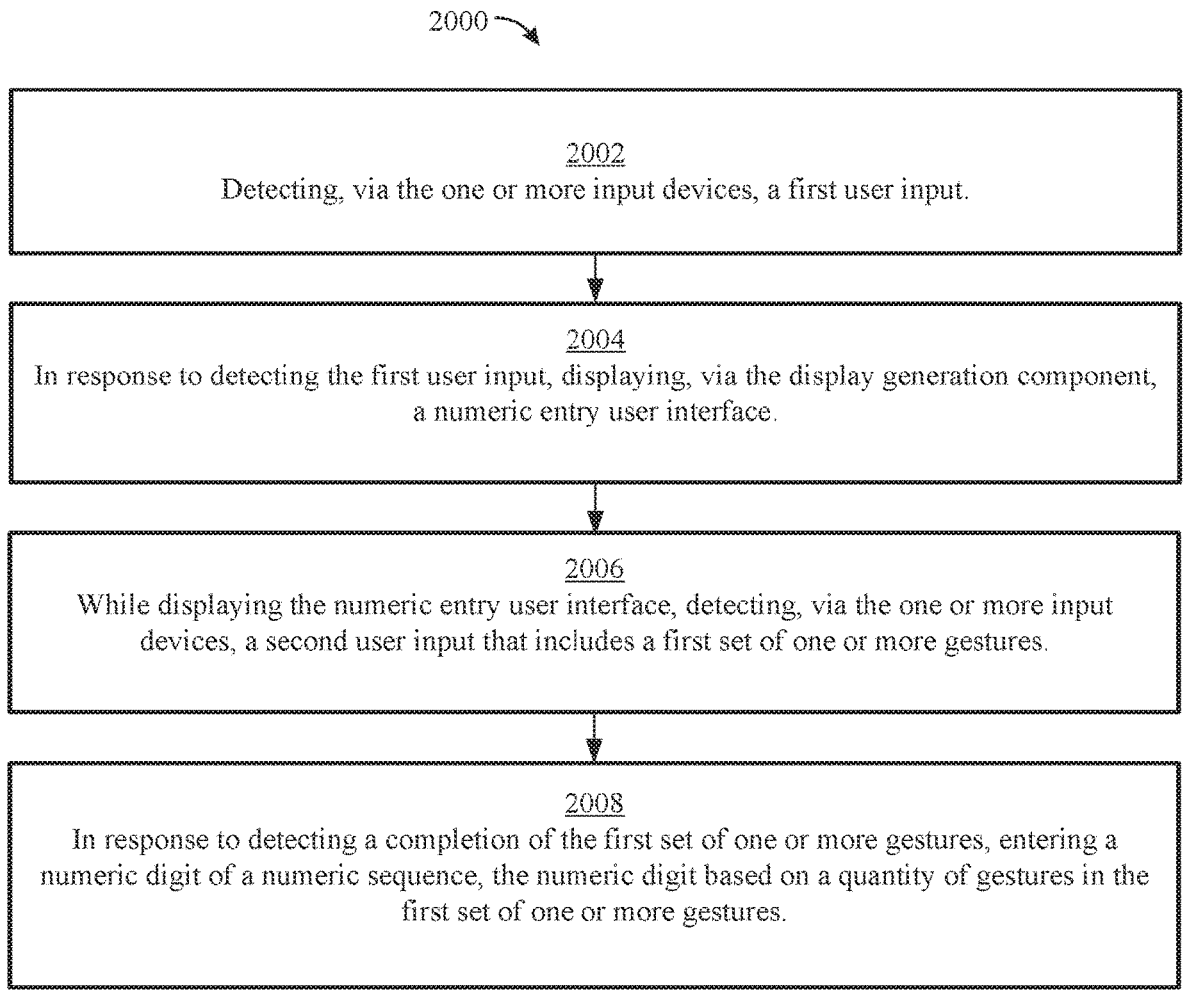
Figure 20C:
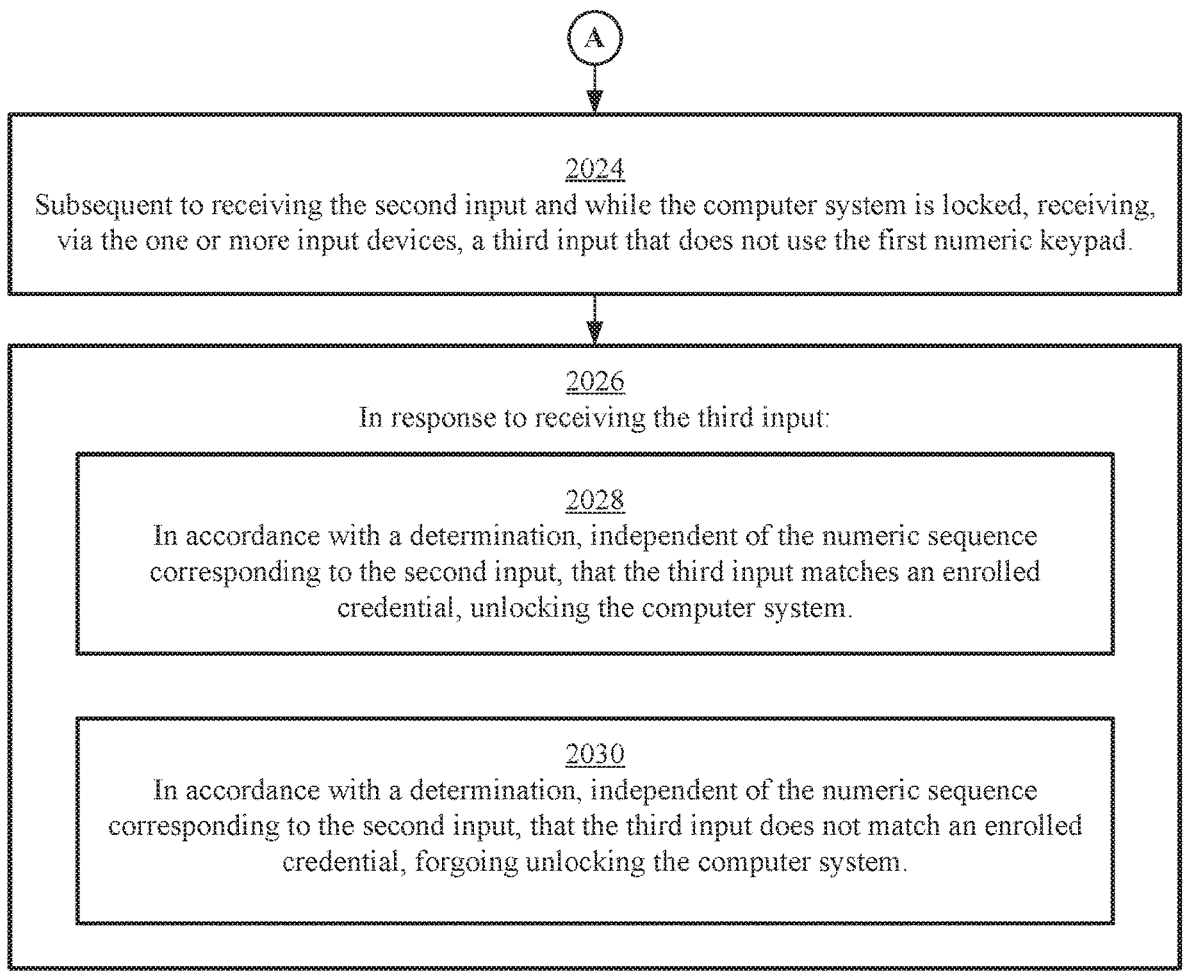
Figure 23B:
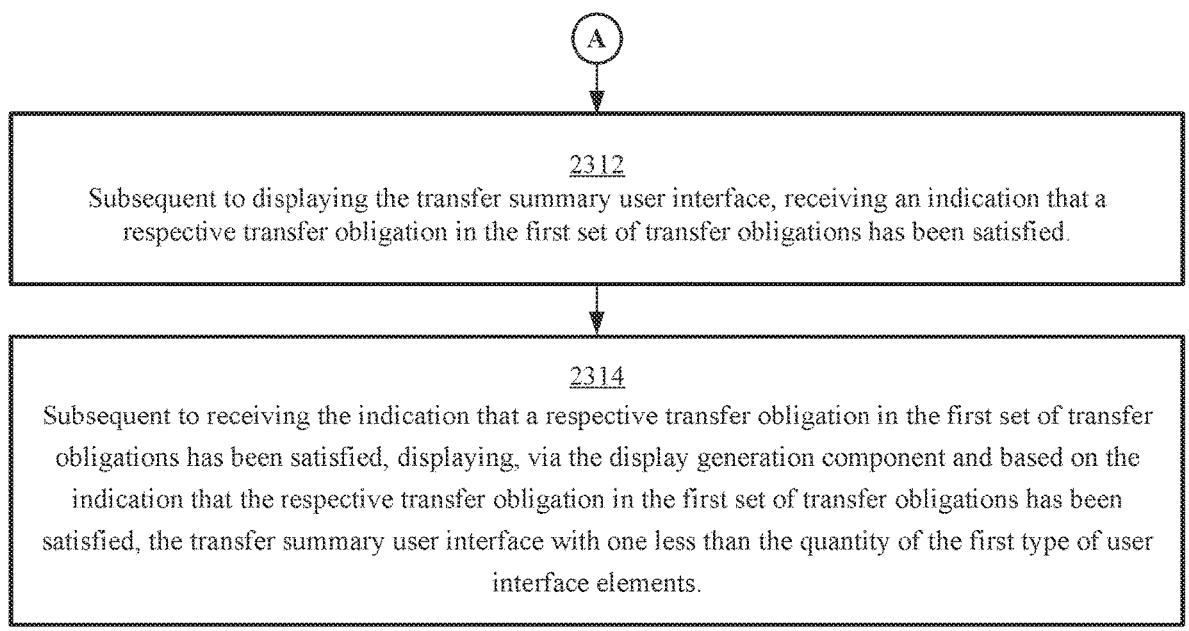

Below, FIGS. 1A-1B, 2, 3, 4A-4B, and 5A-5B provide a description of exemplary devices for performing the techniques for receiving and provisioning information on electronic devices. FIGS. 6A-6E illustrate exemplary user interfaces for managing display of user interface elements based on movement of a computer system and requesting account information, in accordance with some embodiments. FIGS. 7A-7S illustrate exemplary user interfaces for managing display of user interface elements based on movement of a computer system and requesting account information, in accordance with some embodiments. FIG. 8 is a flow diagram illustrating a method for managing display of user interface elements based on movement of a computer system, in accordance with some embodiments. FIG. 9 is a flow diagram illustrating a method for requesting account information, in accordance with some embodiments. The user interfaces in FIGS. 6A-6E and FIGS. 7A-7S are used to illustrate the processes described below, including the processes in FIGS. 8 and 9. FIGS. 10A-10B illustrate example user interfaces for provisioning an SSH account onto a computer system, in accordance with some embodiments. FIGS. 11A-11E illustrate exemplary user interfaces for provisioning an account onto a computer system, in accordance with some embodiments. FIG. 12 is a flow diagram illustrating a method for provisioning an account onto a computer system, in accordance with some embodiments. The user interfaces in FIGS. 10A-10B and FIGS. 11A-11E are used to illustrate the processes described below, including the processes in FIG. 12. FIGS. 13A-13B illustrate exemplary user interfaces for adding data from a data plan to an account, in accordance with some embodiments. FIGS. 14A-14F illustrate exemplary user interfaces for associating a transfer amount with an account, in accordance with some embodiments. FIG. 15 is a flow diagram illustrating a method for associating a transfer amount with an account, in accordance with some embodiments. The user interfaces in FIGS. 13A-13B and FIGS. 14A-14F are used to illustrate the processes described below, including the processes in FIG. 15. FIGS. 16A-16C illustrate exemplary user interfaces for allocating memory, in accordance with some embodiments. FIGS. 17A-17Q illustrate exemplary user interfaces for displaying user interface elements corresponding to transaction types, in accordance with some embodiments. FIG. 18 is a flow diagram illustrating a method for displaying user interface elements corresponding to transaction types, in accordance with some embodiments. The user interfaces in FIGS. 16A-16C and FIGS. 17A-17Q are used to illustrate the processes described below, including the processes in FIG. 18. FIGS. 19A-19U illustrate exemplary user interfaces for entering a numeric sequence and locking a computer system while entering a numeric sequence, in accordance with some embodiments. FIG. 20A is a flow diagram illustrating a method for entering a number sequence, in accordance with some embodiments. FIGS. 20B-20C are flow diagrams illustrating a method for locking a computer system while entering a numeric sequence, in accordance with some embodiments. The user interfaces in FIGS. 19A-19U are used to illustrate the processes described below, including the processes in FIGS. 20A-20C. FIGS. 21A-21D illustrate exemplary user interfaces for managing photos on a photo server, in accordance with some embodiments. FIGS. 22A-22H illustrate exemplary user interfaces for managing one or more loans, in accordance with some embodiments. FIGS. 23A-23B are flow diagrams illustrating a method for managing information, in accordance with some embodiments. The user interfaces in FIGS. 21A-21D and FIGS. 22A-22H are used to illustrate the processes described below, including the processes in FIGS. 23A-23B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
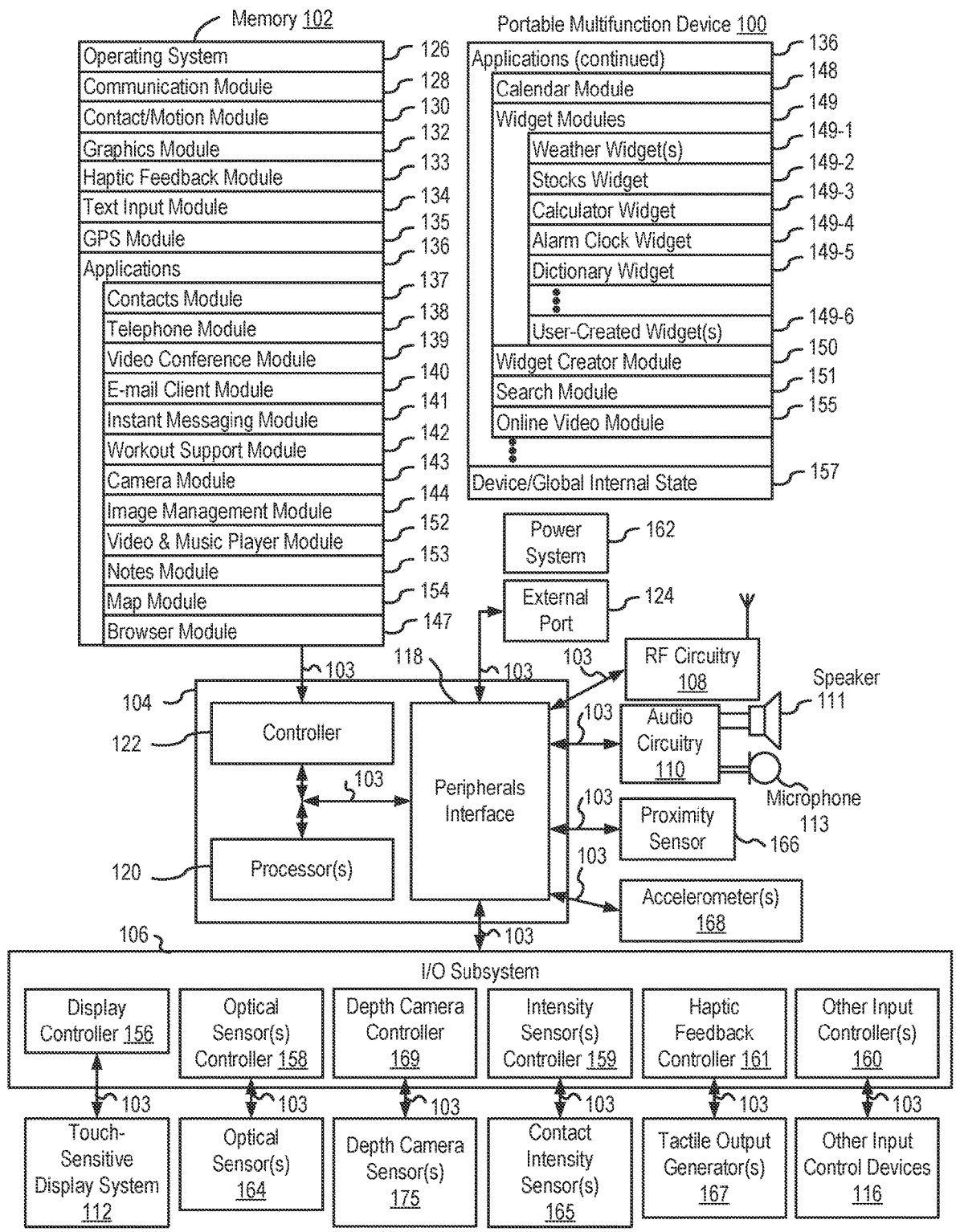
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
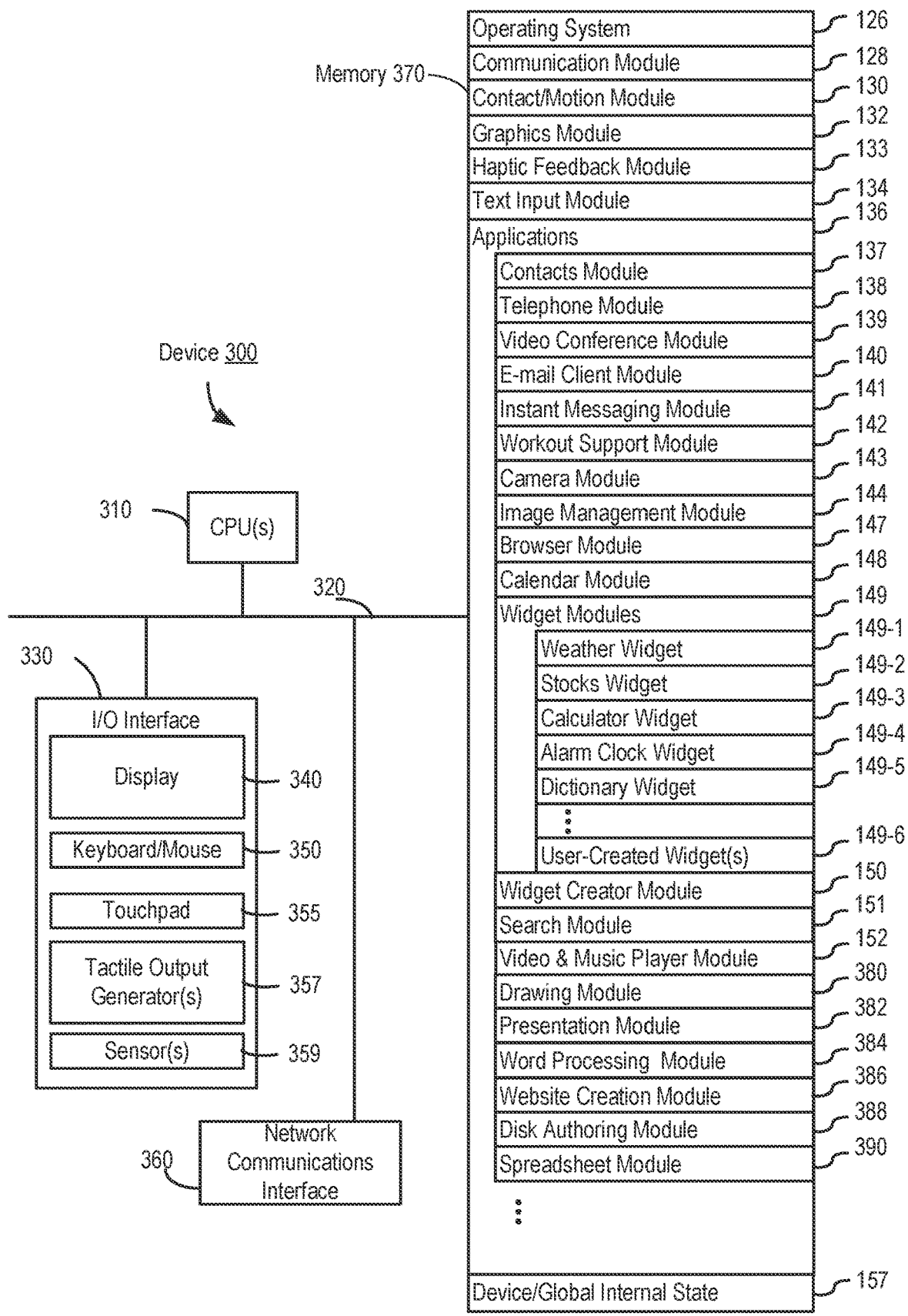
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
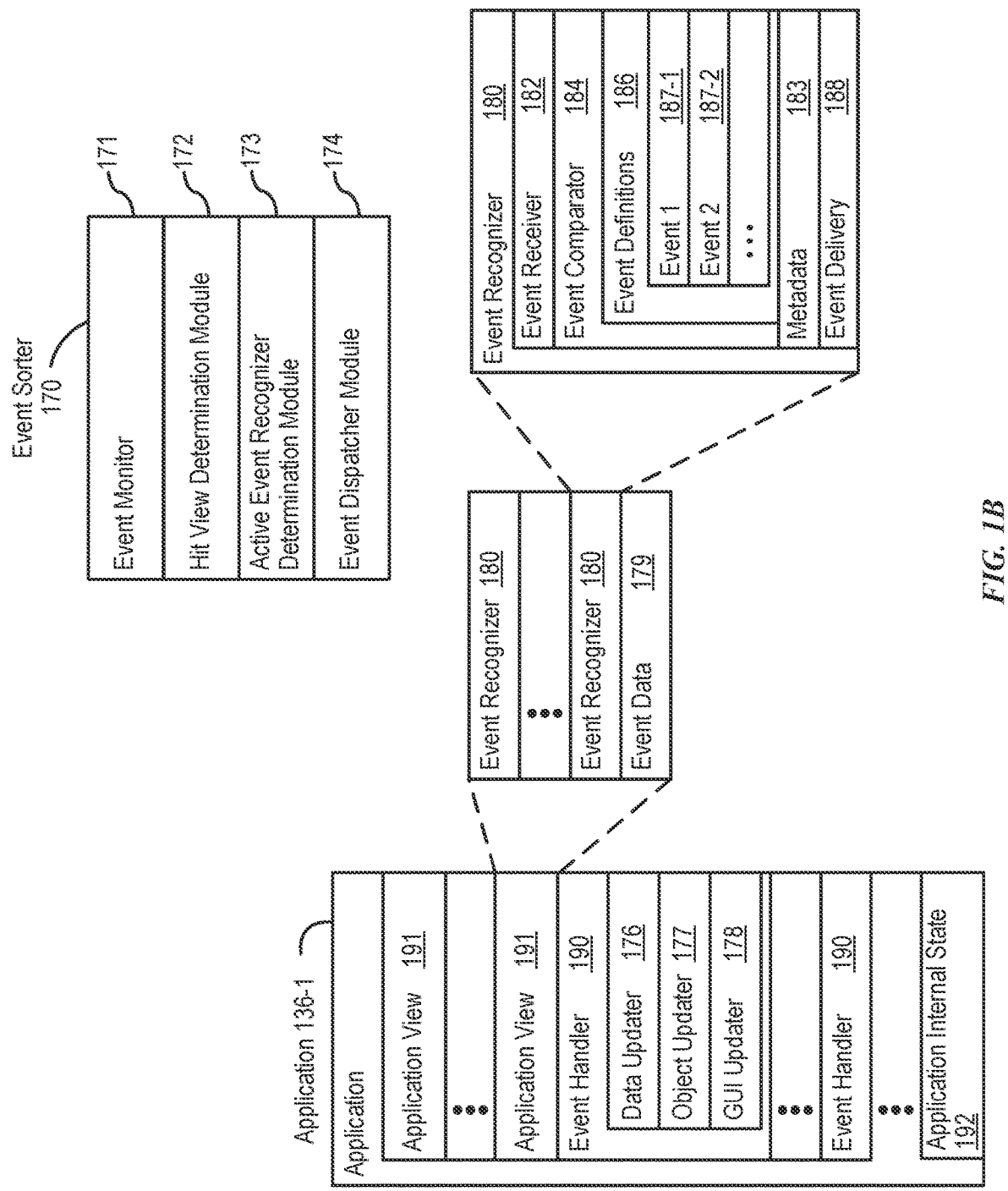
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
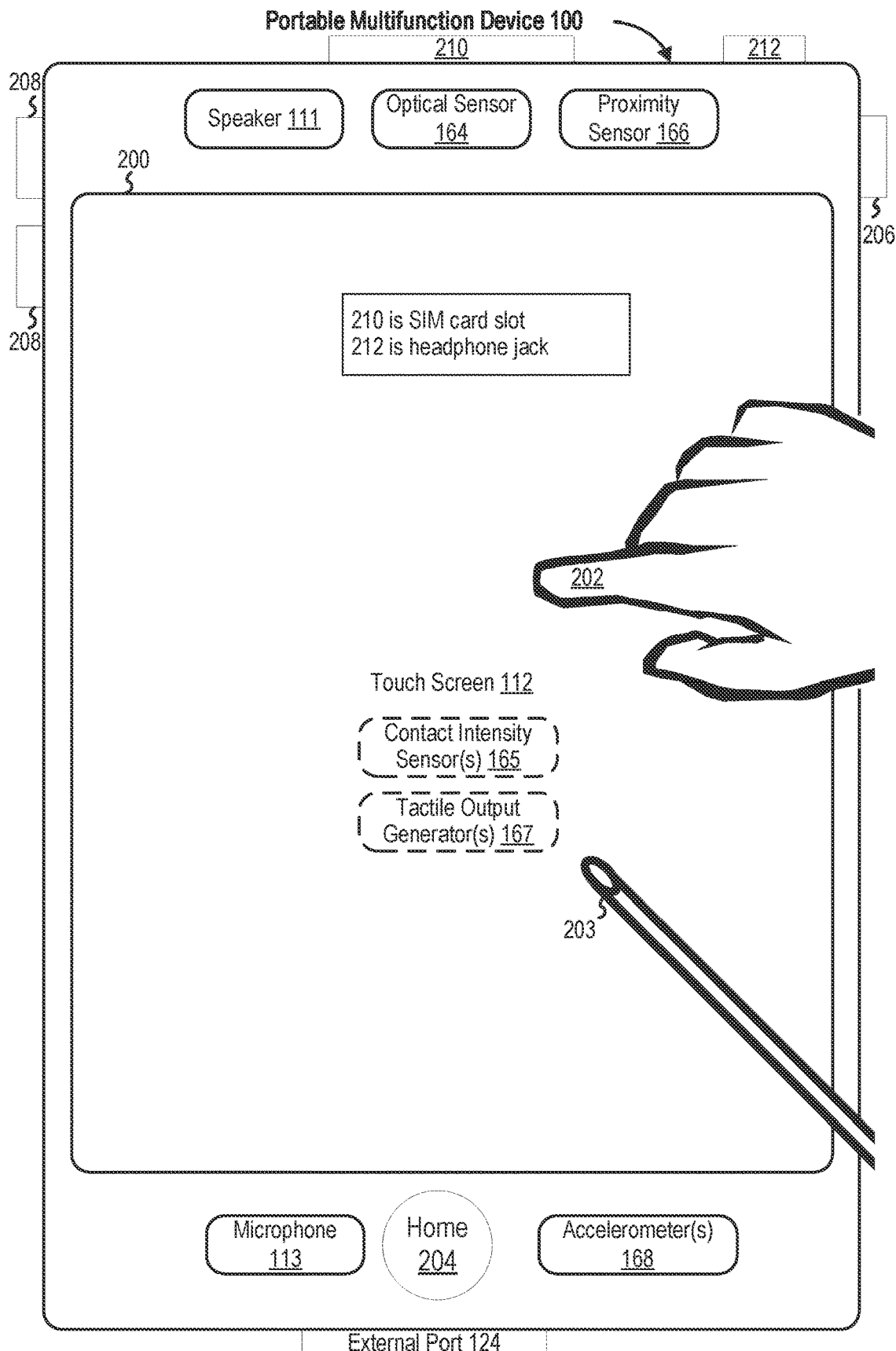
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
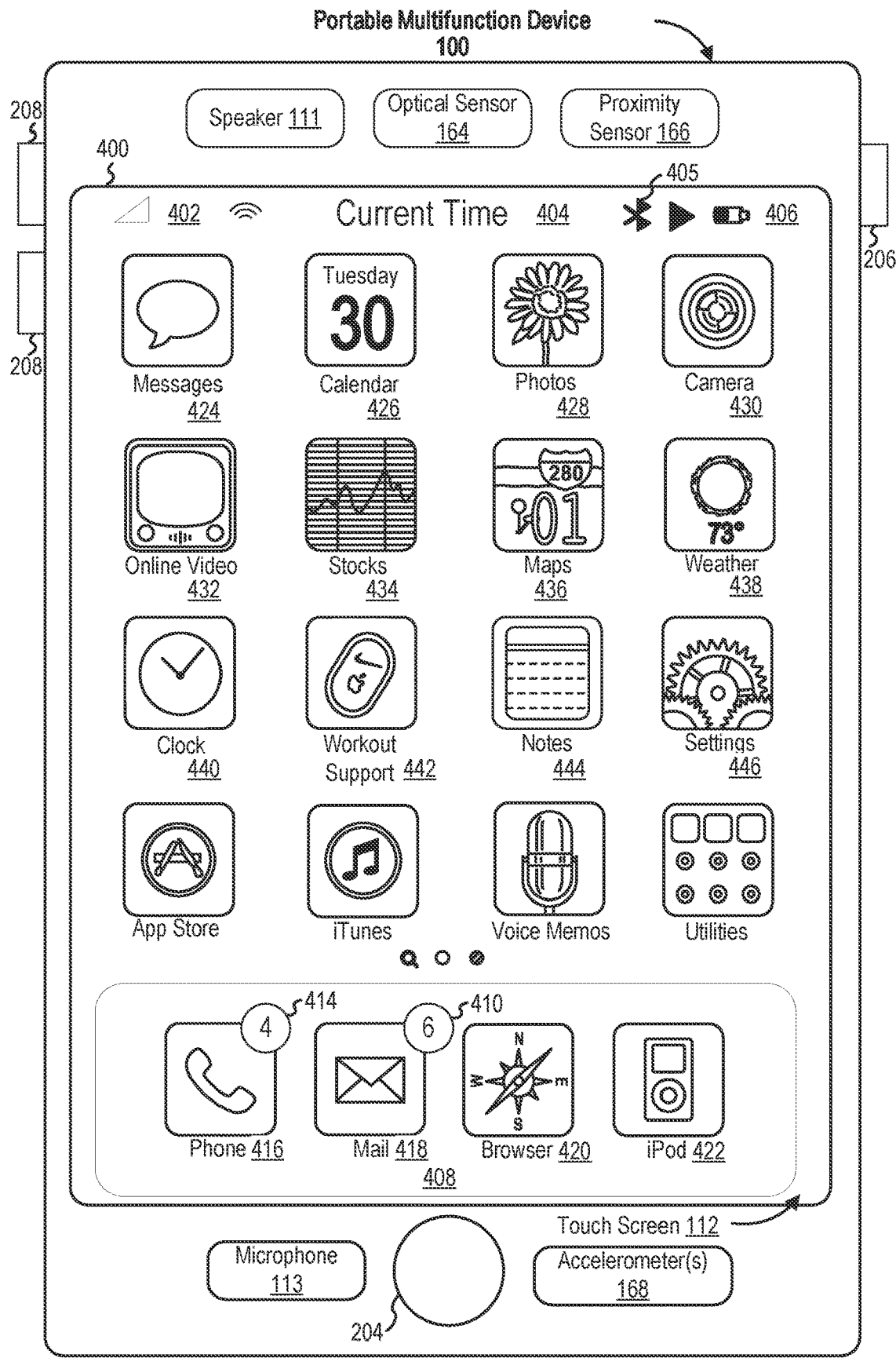
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
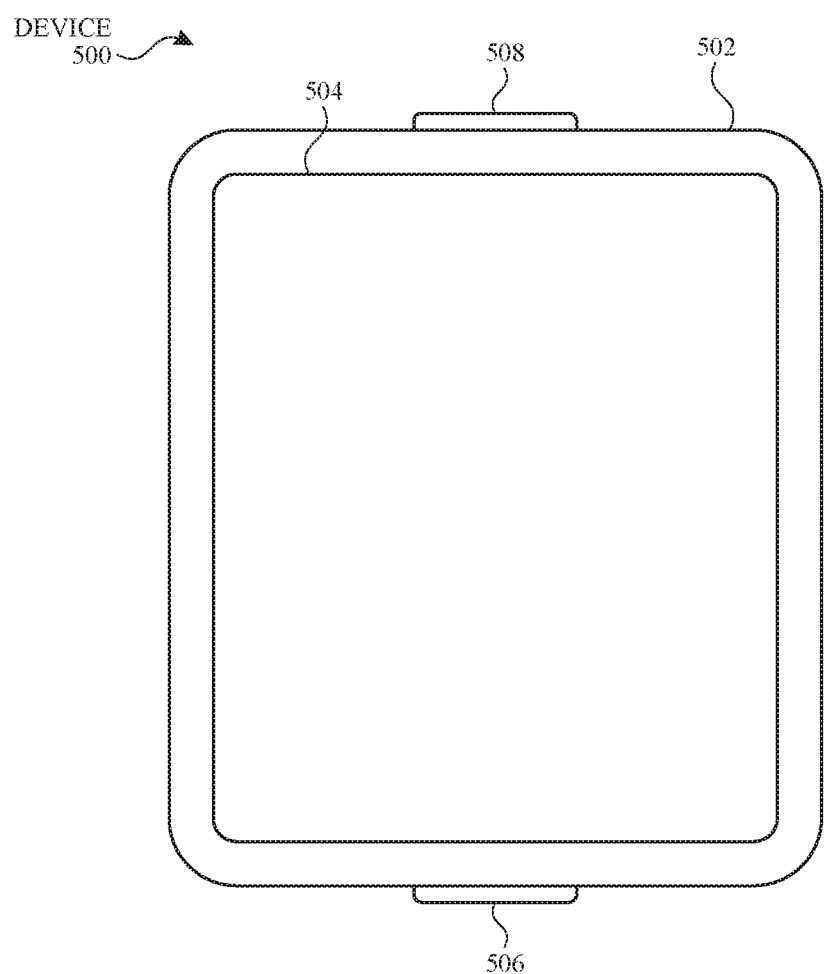
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
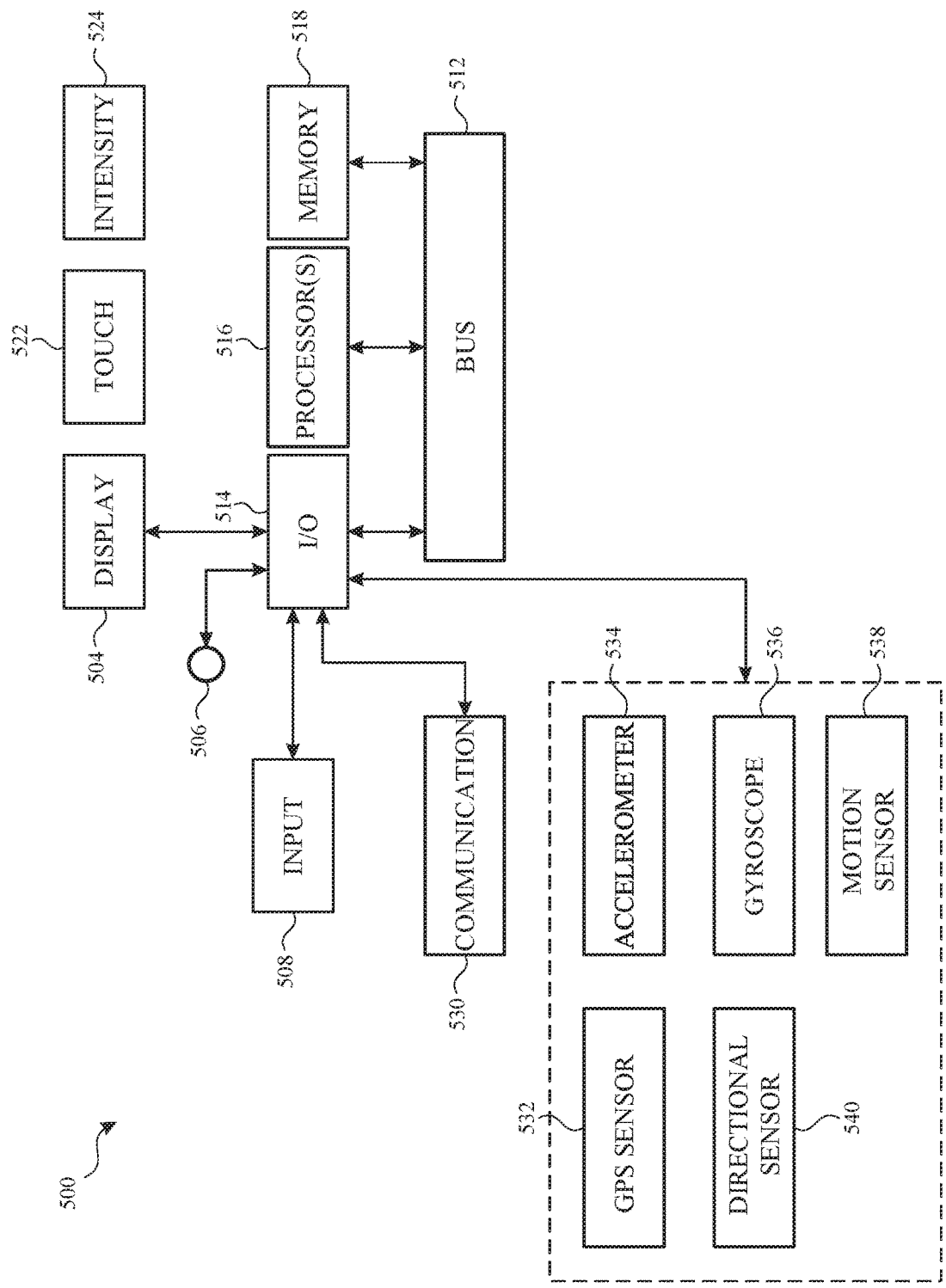
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 900, 1200, 1500, 1800, 2000, 2010, and 2300 (FIGS. 8, 9, 12, 15, 18, 20A-20C, and 23A-23B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
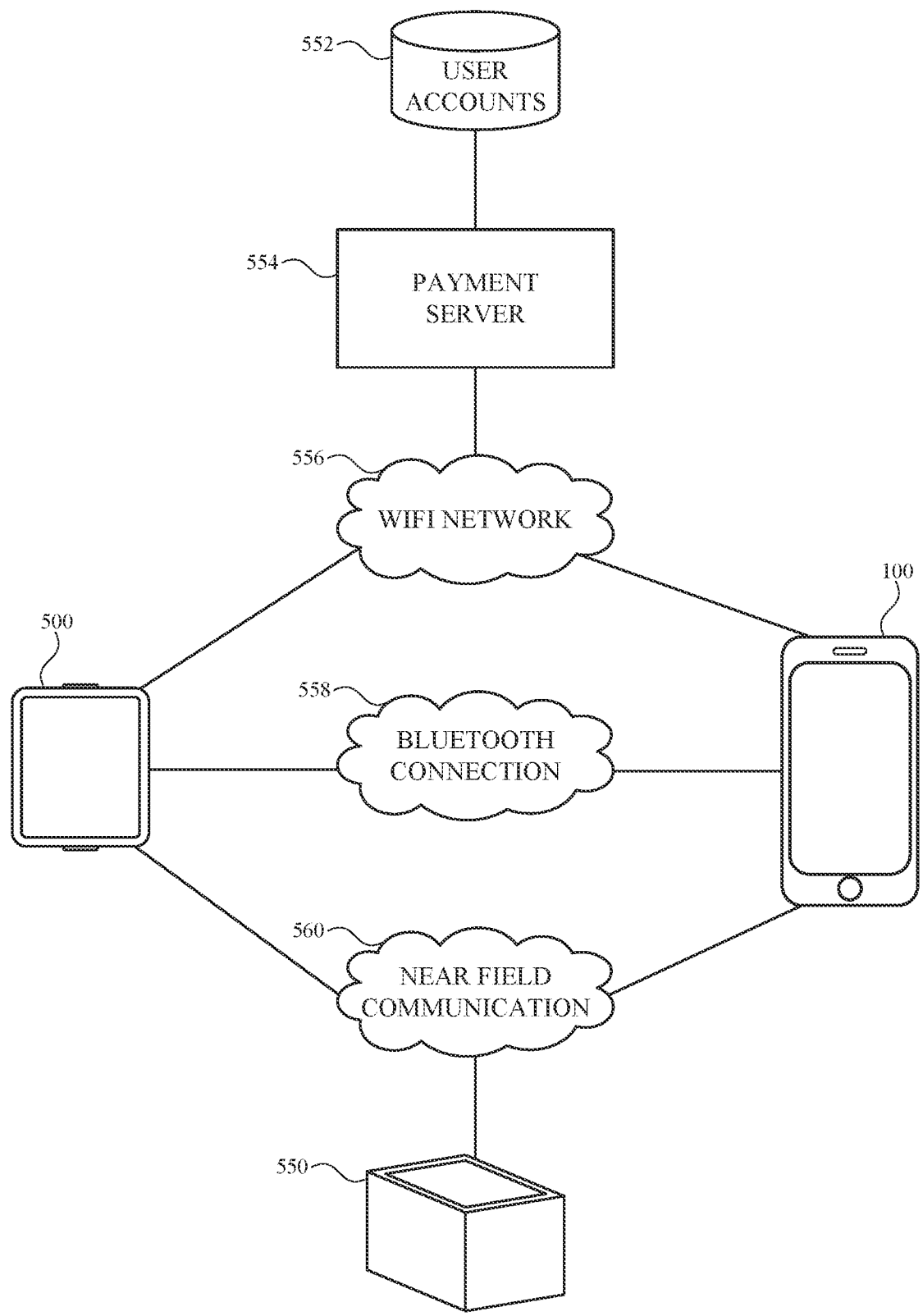
FIG. 5C illustrates exemplary devices connected via one or more communication channels, in accordance with some embodiments.

FIG. 5C illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 558 (e.g., which includes a traditional Bluetooth connection or a Bluetooth Low Energy connection) or using a WiFi network 556. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 550, which is optionally NFC-enabled. The communication optionally occurs using a variety of communication channels and/or technologies. In some embodiments, electronic device (e.g., 100, 300, 500) communicates with payment terminal 550 using an NFC channel 560. In some embodiments, payment terminal 550 communicates with an electronic device (e.g., 100, 300, 500) using a peer-to-peer NFC mode. Electronic device (e.g., 100, 300, 500) is optionally configured transmit a signal to payment terminal 550 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 550. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 550) is established within a defined time period from detection of the input, the secure element releases payment information to be transmitted to the other device (e.g., payment terminal 550). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 550 optionally uses the payment information to generate a signal to transmit to a payment server 554 to determine whether the payment is authorized. Payment server 554 optionally includes any device or system configured to receive payment information associated with a payment account and to determine whether a proposed purchase is authorized. In some embodiments, payment server 554 includes a server of an issuing bank. Payment terminal 550 communicates with payment server 554 directly or indirectly via one or more other devices or systems (e.g., a server of an acquiring bank and/or a server of a card network).

Payment server 554 optionally uses at least some of the payment information to identify a user account from among a database of user accounts (e.g., 552). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 554) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 554 responds to POS payment terminal 550 with an indication as to whether a proposed purchase is authorized or denied. In some embodiments, POS payment terminal 550 transmits a signal to the electronic device (e.g., 100, 300, 500) to identify the result. For example, POS payment terminal 550 sends a receipt to the electronic device (e.g., 100, 300, 500) when a purchase is authorized (e.g., via a transaction-coordination server that manages a transaction app on the user device). In some instances, POS payment terminal 550 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 550. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 6A-6E illustrate example user interfaces for transferring a file, in accordance with some embodiments. The user interfaces in these figures are used to illustrate the processes described above, including the processes in FIGS. 8 and 9.

Figure 6B:
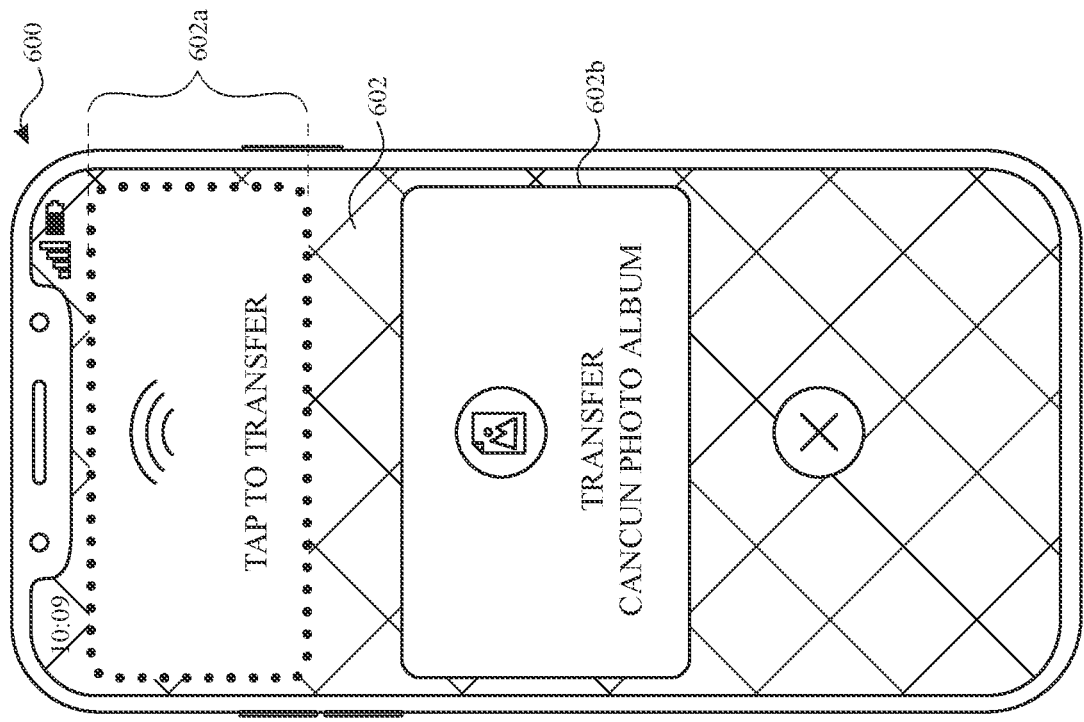
FIGS. 6A-6E illustrate exemplary user interfaces for managing display of user interface elements based on movement of a computer system and requesting account information, in accordance with some embodiments.
Figure 6A:
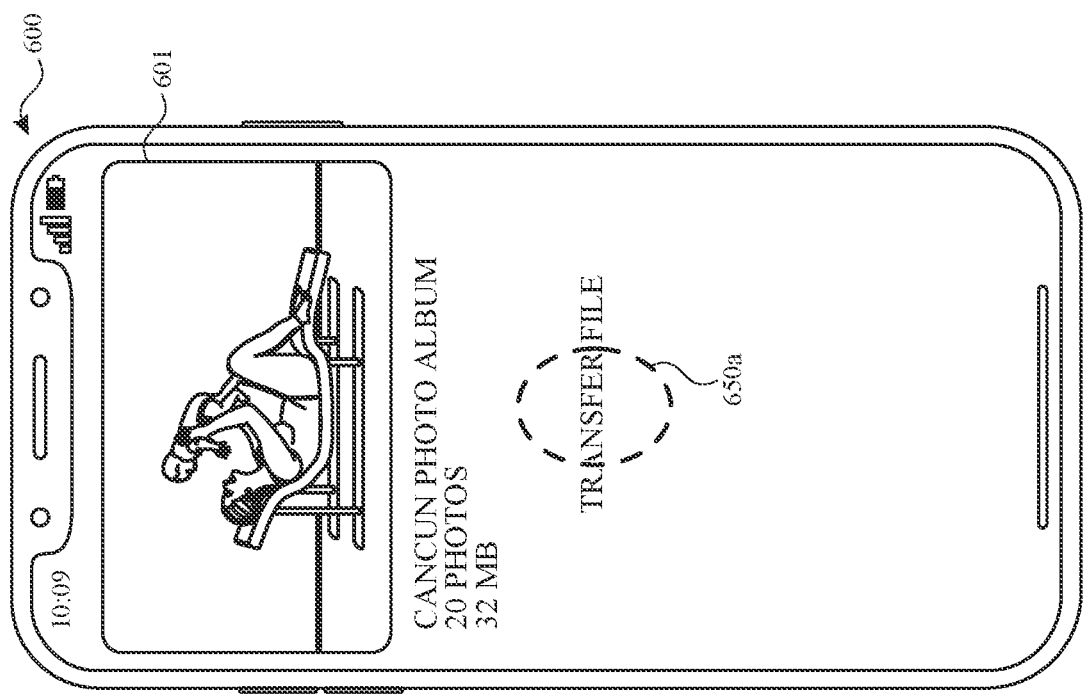
Figure 6C:
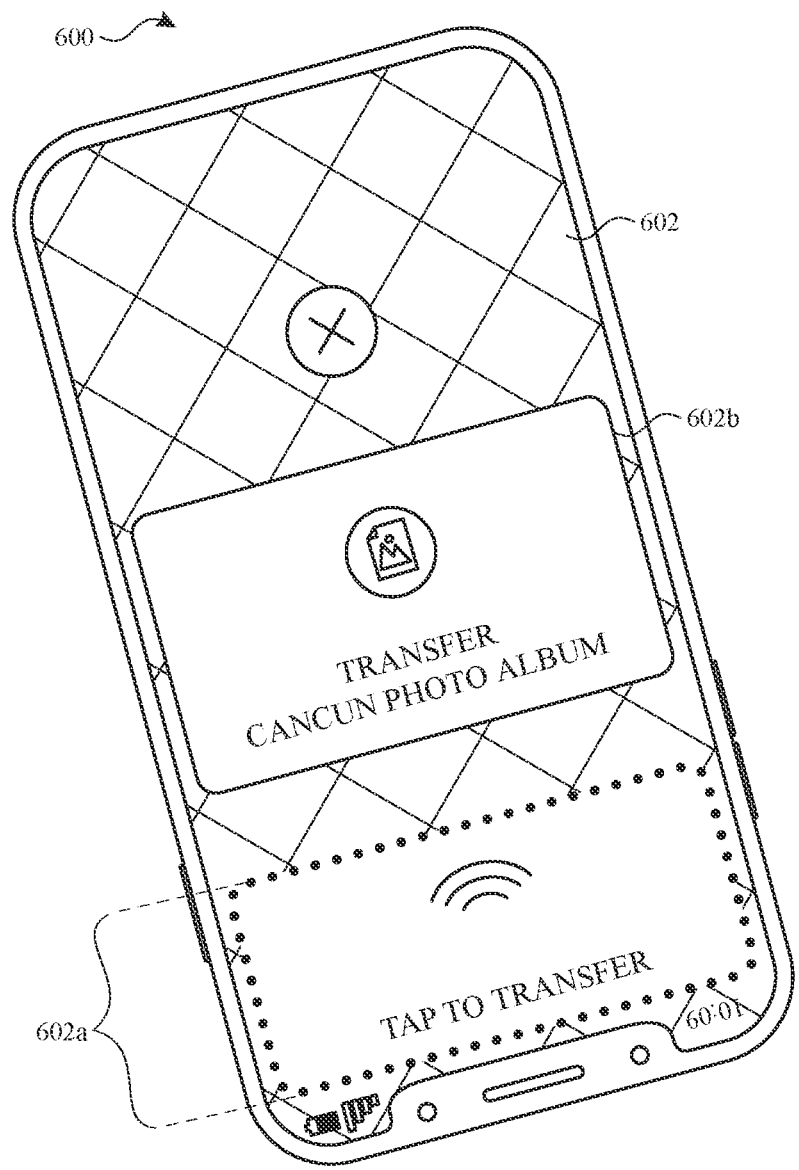
Figure 6D:
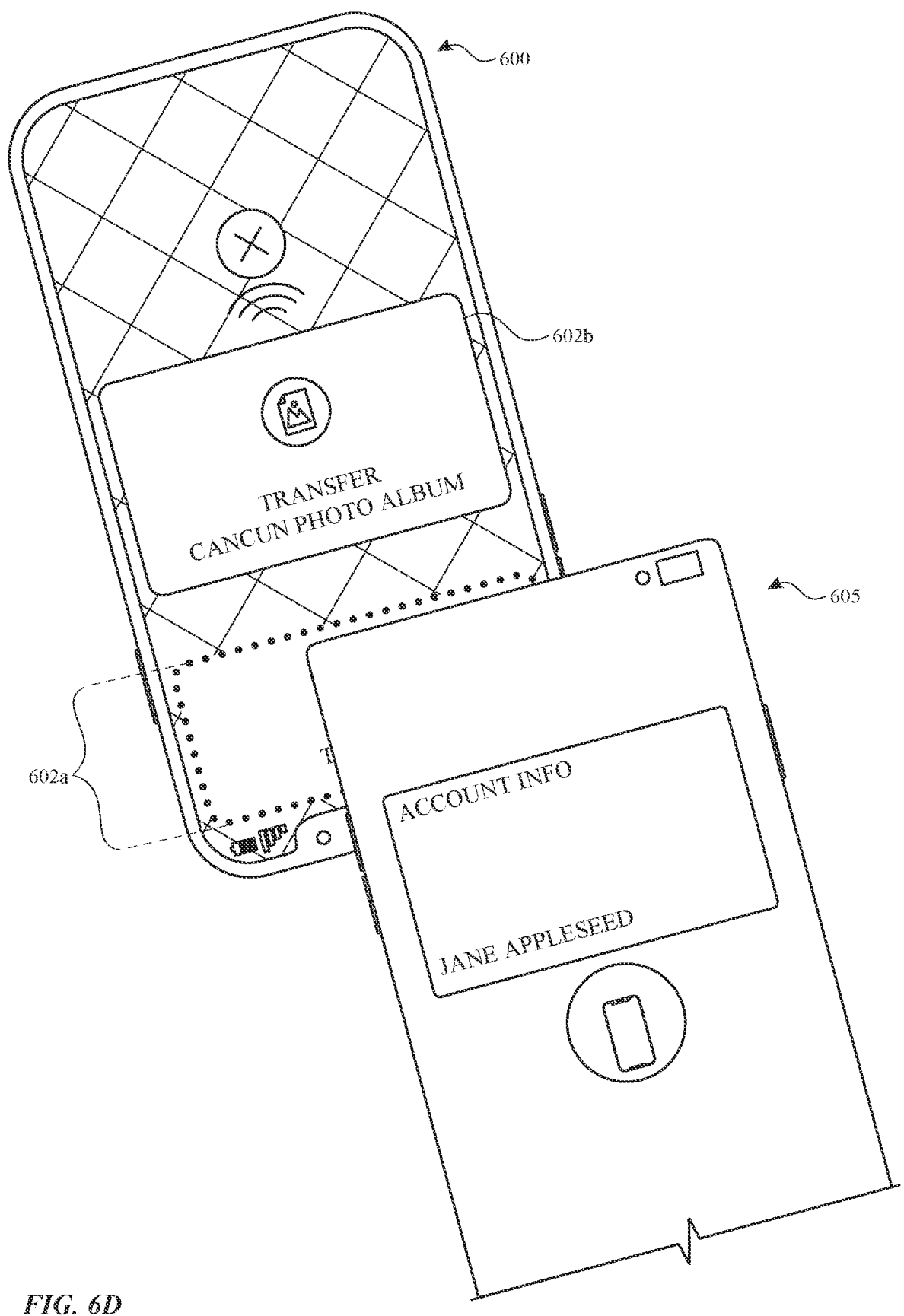
Figure 6E:
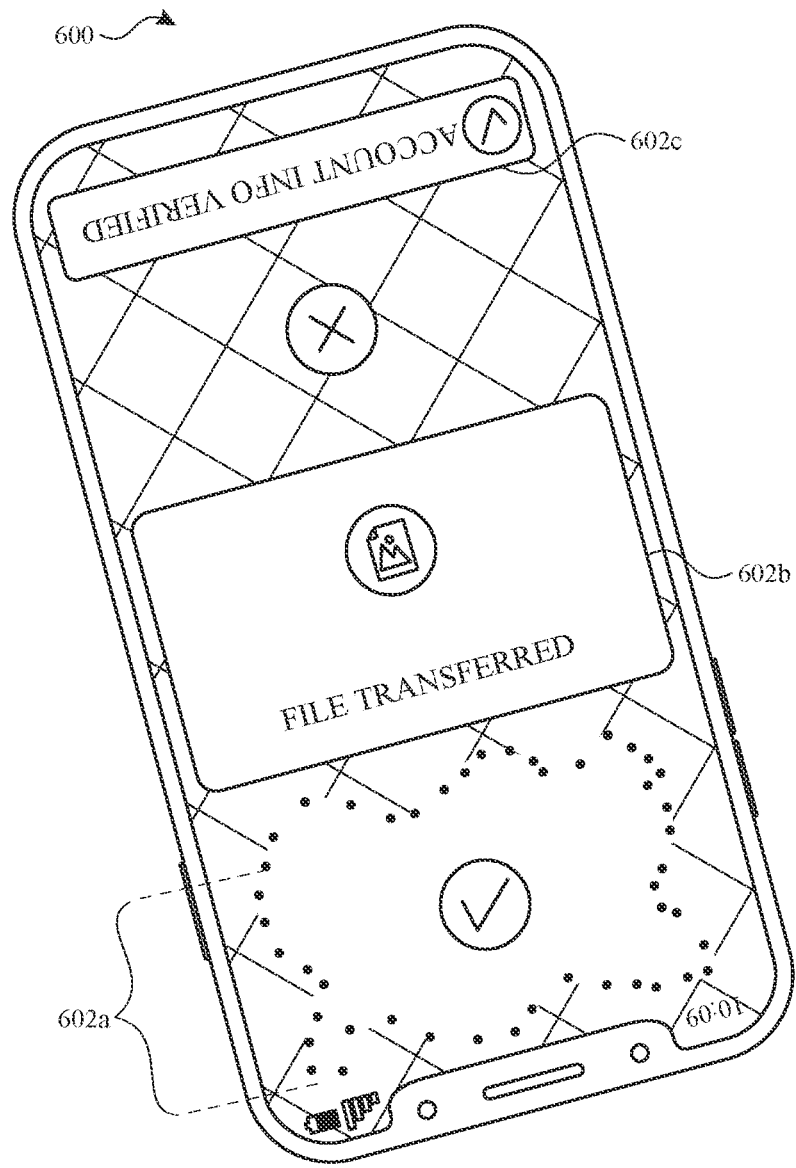

At FIG. 6A, computer system 600 displays user interface 601 of an application for a file transfer. Computer system 600 detects user input 650a (e.g., a tap input) which corresponds to the request to begin the file transfer. At FIG. 6B, in response to detecting user input 650a, computer system 600 displays user interface 602 including space 602a, which indicates where an NFC reader is located in computer system 600, and user interface element 602b, which indicates the file information of the file that is being transferred. At FIG. 6C, the user holding computer system 600 (e.g., the user transferring the file) rotates (e.g., dips the top of) computer system 600 down to reveal the display to another user (e.g., the user receiving the file) who is standing opposite the user holding computer system 600. After (e.g., in response to) detecting the rotation of computer system 600, computer system 600 rotates one or more elements of user interface 602, as shown in FIG. 6C. In some embodiments, the file transfer optionally requires account information from the user receiving the file (e.g., a user's name, a user's password, and/or how many times the user has received the file being transferred). At FIG. 6D, computer system 605 is tapped and/or moved near computer system 600. In particular, computer system 605 is placed near (e.g., tapped on) space 602a. This allows computer system 600 to request data from computer system 605, including information about the account being displayed on computer system 605 as well as other information that computer system 600 may require to complete an operation. In some embodiments, the information computer system 600 requests (and, optionally, receives) from computer system 605 includes one or more of an account information (e.g., username, password, and/or the number of times a user has performed an operation). In FIG. 6E, after (e.g., in response to) receiving the account information from computer system 605, computer system 600 updates user interface 602 to indicate that the operation was completed successfully. Additionally, computer system 600 displays banner 602c in user interface 602 to indicate that computer system 600 successfully account information associated with the user receiving the file.

FIGS. 7A-7S illustrate exemplary user interfaces for managing display of user interface elements based on movement of a computer system and requesting account information, in accordance with some embodiments. The devices and user interfaces in these figures are used to illustrate the processes described below, including the processes in FIGS. 8 and 9.

FIG. 7A illustrates computer system 700 displaying user interface 701 for processing payment. User interface 701 includes button 701a and amount 701b. User interface 701 is displayed as part of a merchant application to perform a transaction to receive payment for goods selected by a buyer. Accordingly, after computer system 700 has received (e.g., via user input) indications of the goods/services being purchased by the buyer, user interface 701 includes the amount 701b that is due for the goods/services and button 701a for starting the payment process. While displaying user interface 701, computer system 700 detects user input 701c on button 701a. In some embodiments, user input 701c includes a tap, swipe, and/or other gesture on a touch sensitive screen of computer system 700.

Figure 7B:
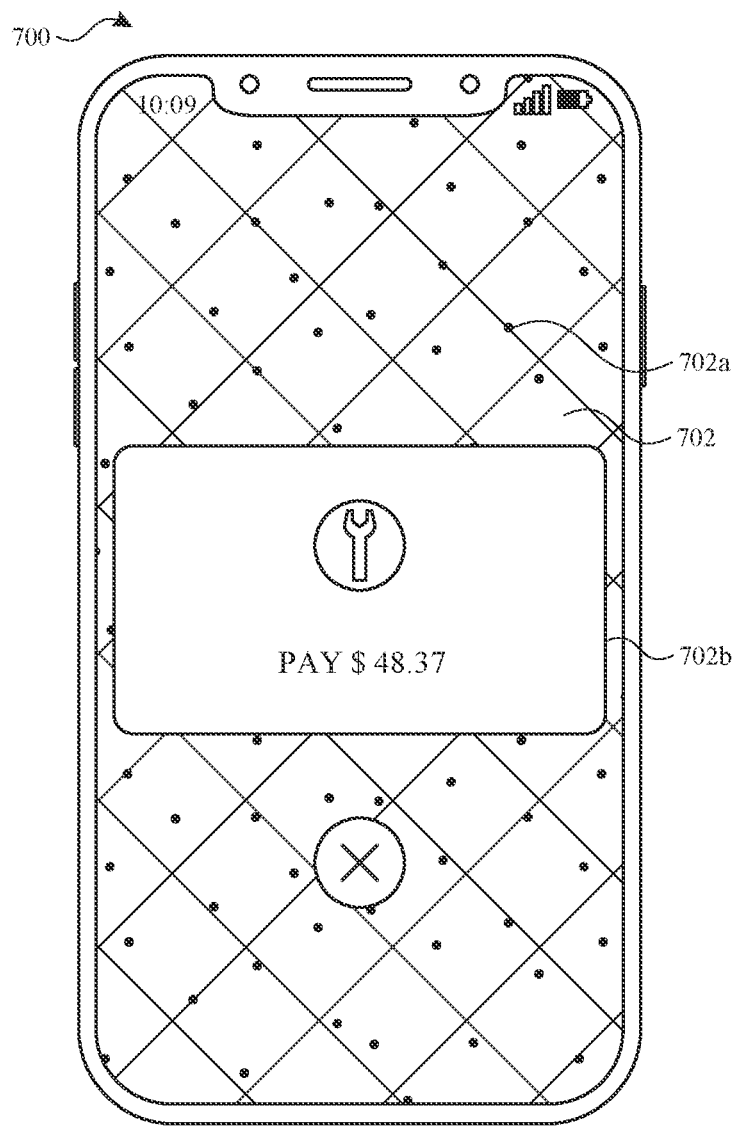

In response to detecting user input 701c on button 701a corresponding to a request for a transaction, computer system 700 displays user interface 702 as shown in FIG. 7B. User interface 702 includes user interface element 702a and request element 702b. User interface 702 comprises particles (e.g., user interface element 702a) spread over user interface 702 to provide an indication that computer system 700 is not yet ready (e.g., is performing an initialization process) to accept a payment (e.g., an NFC payment). Particles, e.g., user interface element 702a, may be dispersed across user interface 702. Each particle may be animated and/or colored in a way to distinguish it from other particles on the user interface. In some embodiments, particles, e.g., user interface element 702a, have visual characteristics based on the orientation and/or speed of movement of computer system 700. In some embodiments, while computer system 700 is not yet ready to accept a payment, the particles move about user interface 702 and are not limited to any particular area of user interface 702. In some embodiments, the particles are generated randomly or pseudo-randomly. User interface element 702b indicates the amount that is being requested in the current payment transaction. In some embodiments, user interface 702 is a user interface of a payment processor application (e.g., different from the merchant application). In some embodiments, user interface 702 is a user interface of an application different from the application associated with user interface 701. In some embodiments, user interface 701 is a user interface of a merchant application (e.g., a third-party application installed on the computer system) and user interface 702 is a user interface of the operating system of computer system 700 (e.g., a first-party application provided as part of the operating system).

Figure 7C:
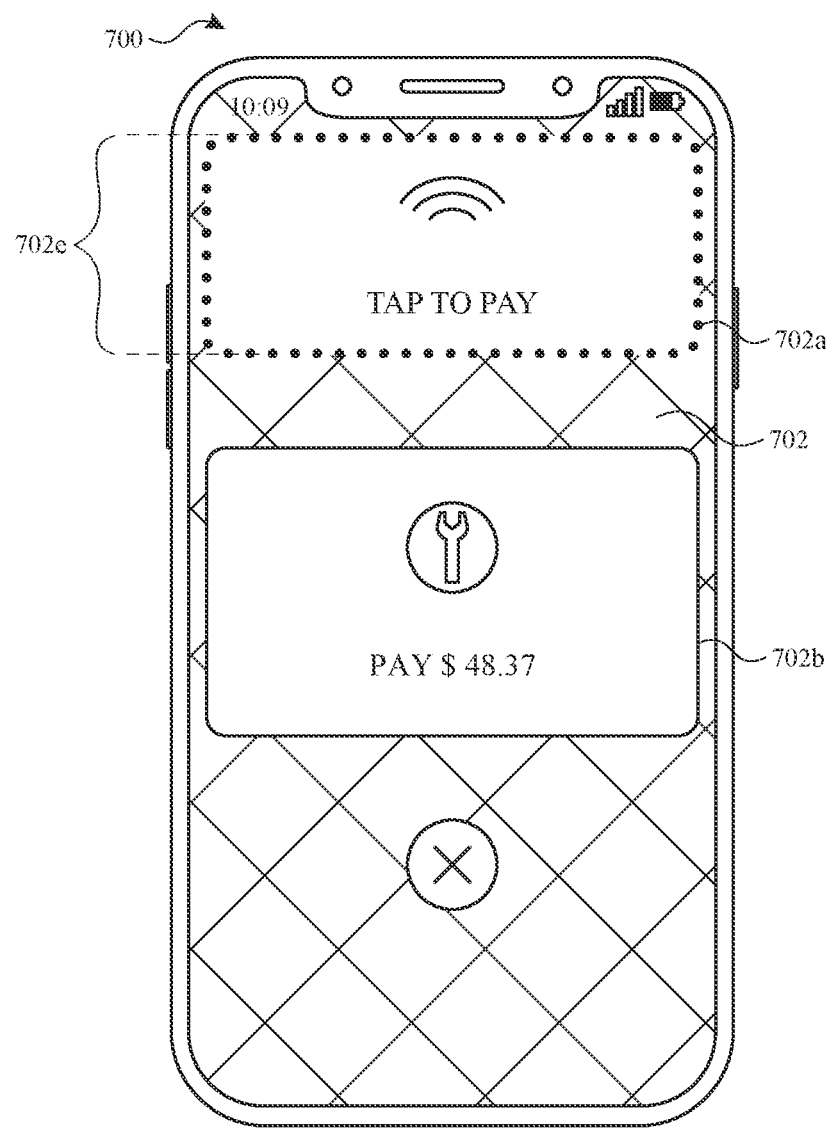

Once computer system 700 is ready to accept payments (e.g., the initialization process is complete), computer system 700 updates display of user interface 702, as shown in FIG. 7C. At FIG. 7C, because computer system 700 is ready to accept payments, the particles of user interface 702 transition to being displayed in a certain area (e.g., as indicated by space 702e) of the display. This area (e.g., as indicated by space 702e) may indicate where an NFC reader or other card reader (e.g., a hardware radio antenna) is located in computer system 700. In this example, the particles form an outline of a rectangle to indicate where a card or NFC-enabled device should be placed in order to be read by computer system 700. In some embodiments, the particles, e.g., user interface element 702a, form the shape of (e.g., outline of) a rectangle at space 702e (e.g., at an area of the display) to mimic the shape of a card (e.g., a credit card and/or a loyalty card) which is to be placed (e.g., tapped, brought close to) near the reader indicated by user interface element 702a. In other embodiments, the particles, e.g., user interface element 702a, may be displayed as a horizontal line at an edge of space 702e to indicate an area from the edge of computer system 700 to the portion of the screen on which a card (or NFC-enabled device, or UWB-enabled device) can be positioned to be read by a reader.

Figure 7D:
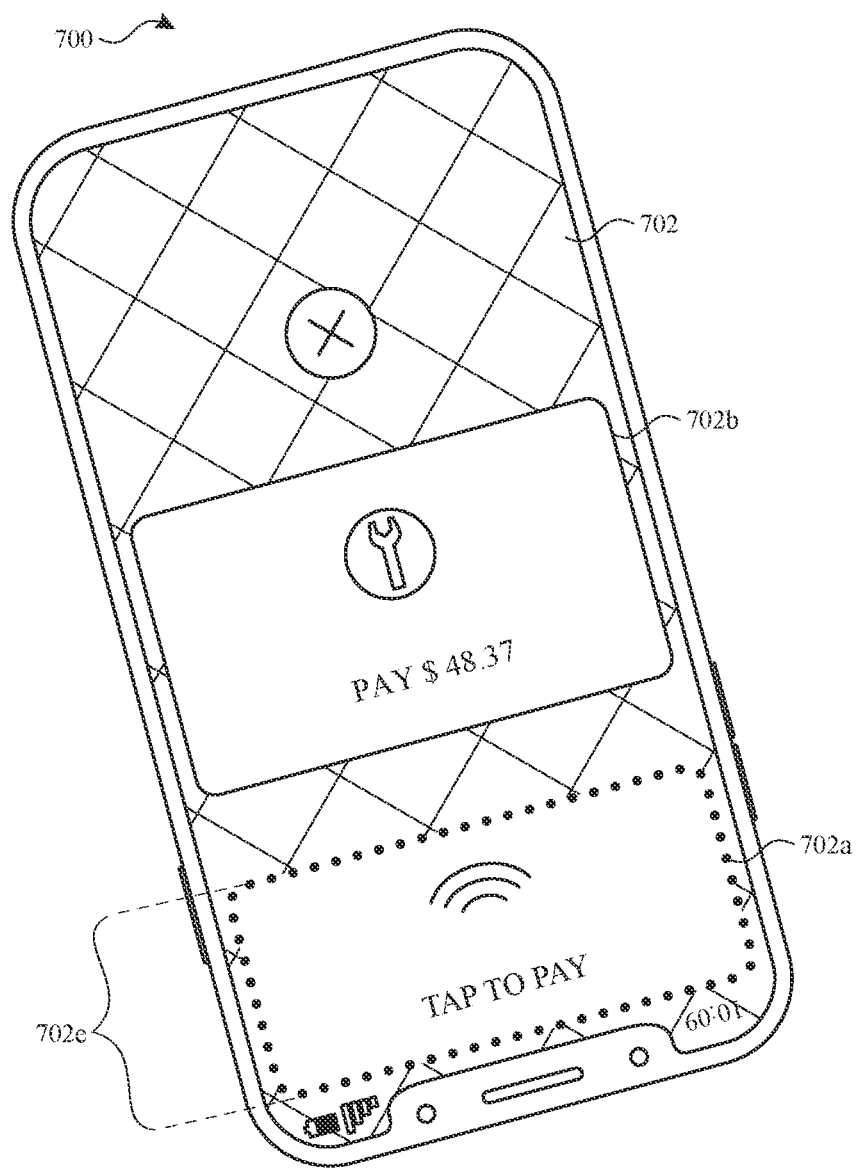

At FIG. 7D, the merchant holding computer system 700 rotates (e.g., dips the top of) computer system 700 down to reveal the display to a buyer who is standing opposite the merchant. Throughout FIGS. 7A-7S, the orientation of computer system 700 is indicated as shown in the respective figure. After (e.g., in response to) detecting the rotation of computer system 700, computer system 700 rotates one or more elements of user interface 702, as shown in FIG. 7D. For example, rather than rotating the entire contents of the display as a single unit, or rotating user interface 702 as a single unit, computer system 700 rotates individual elements of user interface 702 such that the elements are rotated but displayed at their previous location. In some embodiments, a first element is rotated around the centroid of the first element and a second element is rotated around the centroid of the second element. For example, the text displayed in space 702e is rotated around a centroid of space 702e and/or around a centroid of the text such that the text inside of space 702e is more easily read by the buyer standing opposite the merchant. Similarly, request element 702b is rotated around a centroid of request element 702b such that text inside request element 702b is also more easily read by the buyer standing opposite the merchant. In some embodiments, one or more elements are not rotated (e.g., time and/or a cancellation option (e.g., "X" button).

Figure 7E:
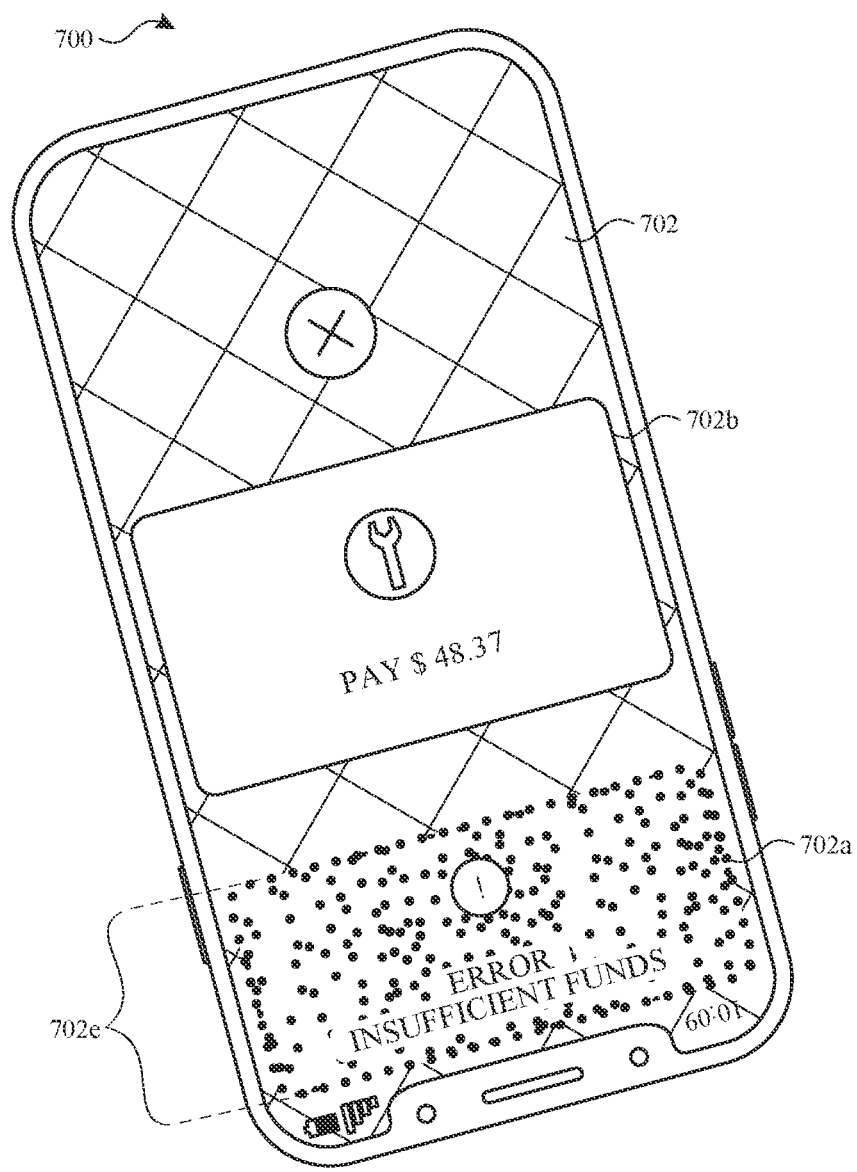

During the processing of the current requested transaction, computer system 700 can detect one or more error conditions and display a user interface element in response. In accordance with a determination that the one or more error conditions includes an error of a first type, such as an error associated with the buyer, computer system 700 updates the display of user interface 702, as shown in FIG. 7E. In FIG. 7E, because the error is a type of error associated with the buyer, the particles of user interface element 702a transition to indicate the error and the error is oriented such that the buy can more easily read the error (e.g., is displayed in the same orientation as the text of 702a). In this example, the particles fill (e.g., partially, fully, and/or more than before the error) user interface element 702a and shake (e.g., side-to-side and/or left-to-right) to indicate that the transaction was not successful. Further, the text displayed at space 702e is updated to include "Error Insufficient Funds" to indicate to the buyer the type of error that has occurred. In some embodiments, the particles, e.g., user interface element 702a, change color from something neutral, such as black, to a color that indicates an error, such as red. In some embodiments, fewer particles fill space 702e while computer system 700 is ready to perform a transaction and is not indicating an error as compared to the number of particles that appear in the same space when computer system 700 is indicating an error. Exemplary errors associated with the buyer include insufficient funds, a timeout condition due to incomplete account details, an incorrect type of payment being provided, and/or the payment device and/or physical payment card being placed in the incorrect location.

Figure 7F:
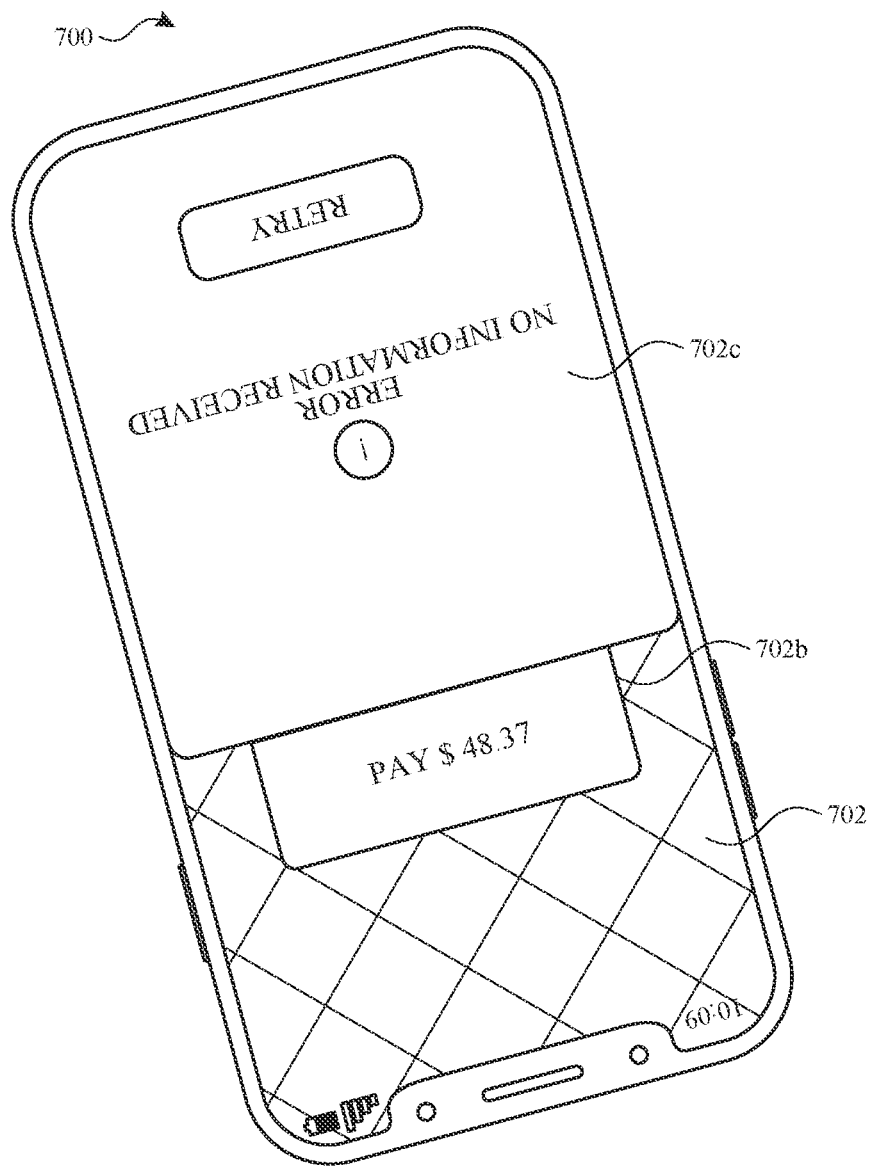

In accordance with a determination that the one or more error conditions includes an error of a second type, such as an error associated with the merchant, computer system 700 updates the display of user interface 702, as shown in FIG. 7F. In FIG. 7F, because the error is a type of error associate with the merchant, computer system 700 updates user interface 702 to (optionally) cease display of space 702e and display error element 702c. Error element 702c is displayed overlaid on the other elements of user interface 702, including request element 702b. Further, error element 702c is oriented towards the merchant such that error element 702c is more easily read by the merchant so that the merchant can more quickly address the error. Exemplary errors associated with the merchant include a timeout condition due to failing to detect a payment device and/or physical payment card within a threshold duration of time, a failure to communicate with the payment device and/or physical payment card, the card reader of the merchant's computer system not being enabled, and/or a lack of network connection.

In some embodiments, in response to detecting an error, computer system 700 includes a user interface element that provides directions to complete the transaction. For example, when the error is detecting incomplete account details during a time out period computer system 700 may display a user interface element or text that provides directions to try providing the complete account details again. In some embodiments, in response to detecting an error, computer system 700 provides an audio output indicating the error.

Figure 7G:
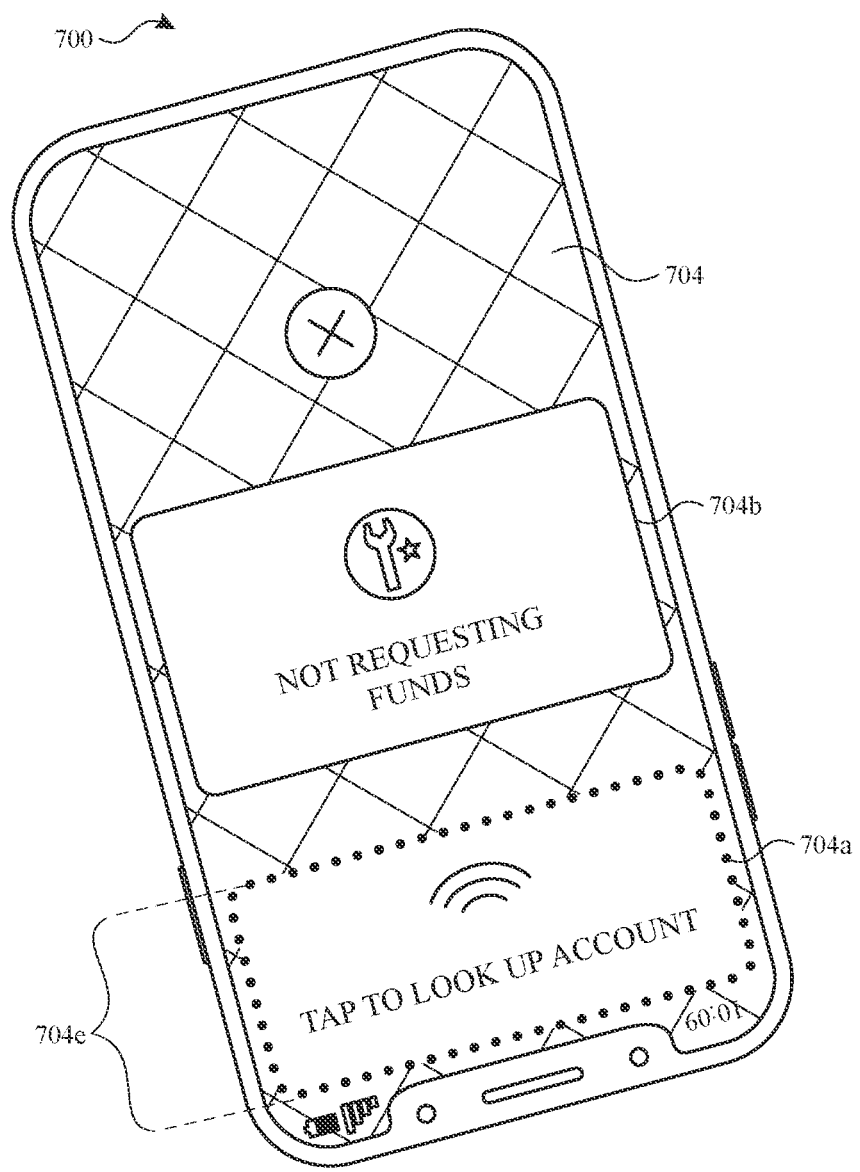

In some embodiments, as shown in FIG. 7G, computer system 700 displays user interface 704 for requesting information associated with a payment account. In some embodiments, user interface 704 has been initiated/requested by a first user. User interface 704 includes user interface element 704a, request element 704b, and space 704e. As described above with respect to FIGS. 7C and 7D, user interface 704 includes particles, e.g., user interface element 704a, arranged in an outline of a rectangle at space 704e to indicate that computer system 700 is ready to perform the transaction and to indicate the location of an NFC reader or other wireless card reader of computer system 700. The text in space 704e indicates to a second user providing an account that the second user should place (e.g., tap, bring close, make contact, and/or without making contact) a card or another computer system to the location indicated by the particles at space 704e to allow computer system 700 to look up information (e.g., a past purchase) without performing a payment. Request element 704b indicates to the second user that no funds will be requested. Accordingly, request element 704b is displayed in an orientation that makes it easy to view for the second user that is providing the requested account information (e.g., while the first user is holding computer system 700 and dipping computer system 700 down). In some embodiments, request element 704b is rotated (e.g., around a centroid of request element 704b) to the orientation shown in FIG. 7G from an orientation that is opposite (e.g., rotated 180 degrees) after (e.g., in response to) detecting a rotation of computer system 700 to the orientation shown in FIG. 7G. Further, the text at space 704e is rotated around a centroid of space 704e. In some embodiments, the particles, e.g., user interface element 704a, may be displayed as horizontal line at an edge of space 704e (e.g., without forming an outline of a rectangle) to indicate an area (from the edge of computer system 700 to the horizontal line) on which a card or NFC-enabled device can be positioned to be read by a reader.

Figure 7H:
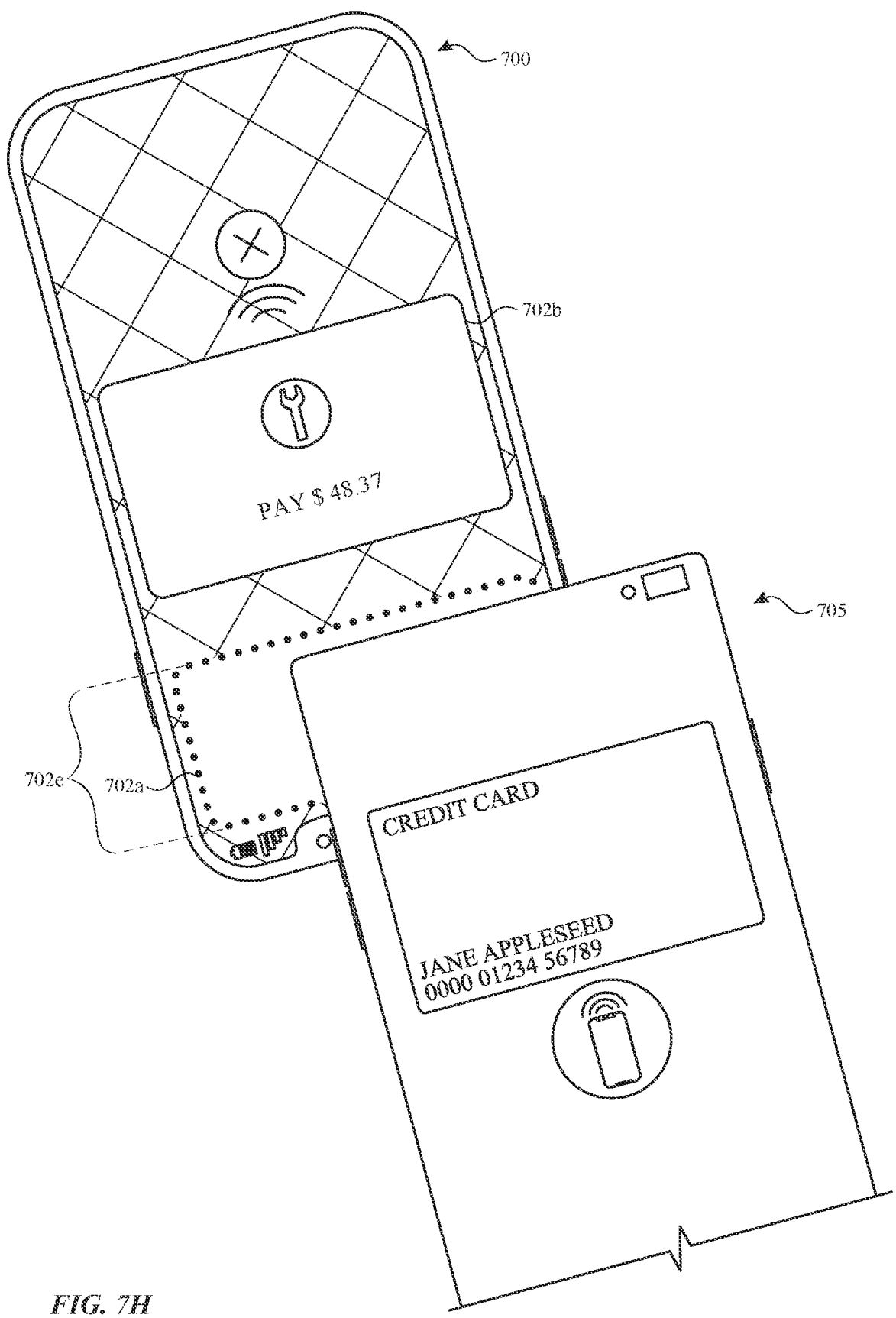

In FIG. 7H, continuing the payment example of FIG. 7D, computer system 705 is tapped and/or moved near computer system 700. In particular, computer system 705 is placed near (e.g., tapped on) space 702e, which indicates where a NFC reader or other wireless card reader is located in computer system 700. This allows computer system 700 to request data from computer system 705, including information about the credit card being displayed on computer system 705 as well as other information that computer system 700 may require to complete a transaction. In some embodiments, the information requested from computer system 705 is used or stored on computer system 700 without processing (or attempting to process) a payment transaction. In some embodiments, the information requested from computer system 705 is used to complete a payment transaction. In some embodiments, the information requested from computer system 705 includes information that is not displayed on computer system 705. In some embodiments, the information computer system 700 requests (and, optionally, receives) from computer system 705 includes one or more of an account information, an expiration date, and/or a name of an account holder.

Figure 7I:
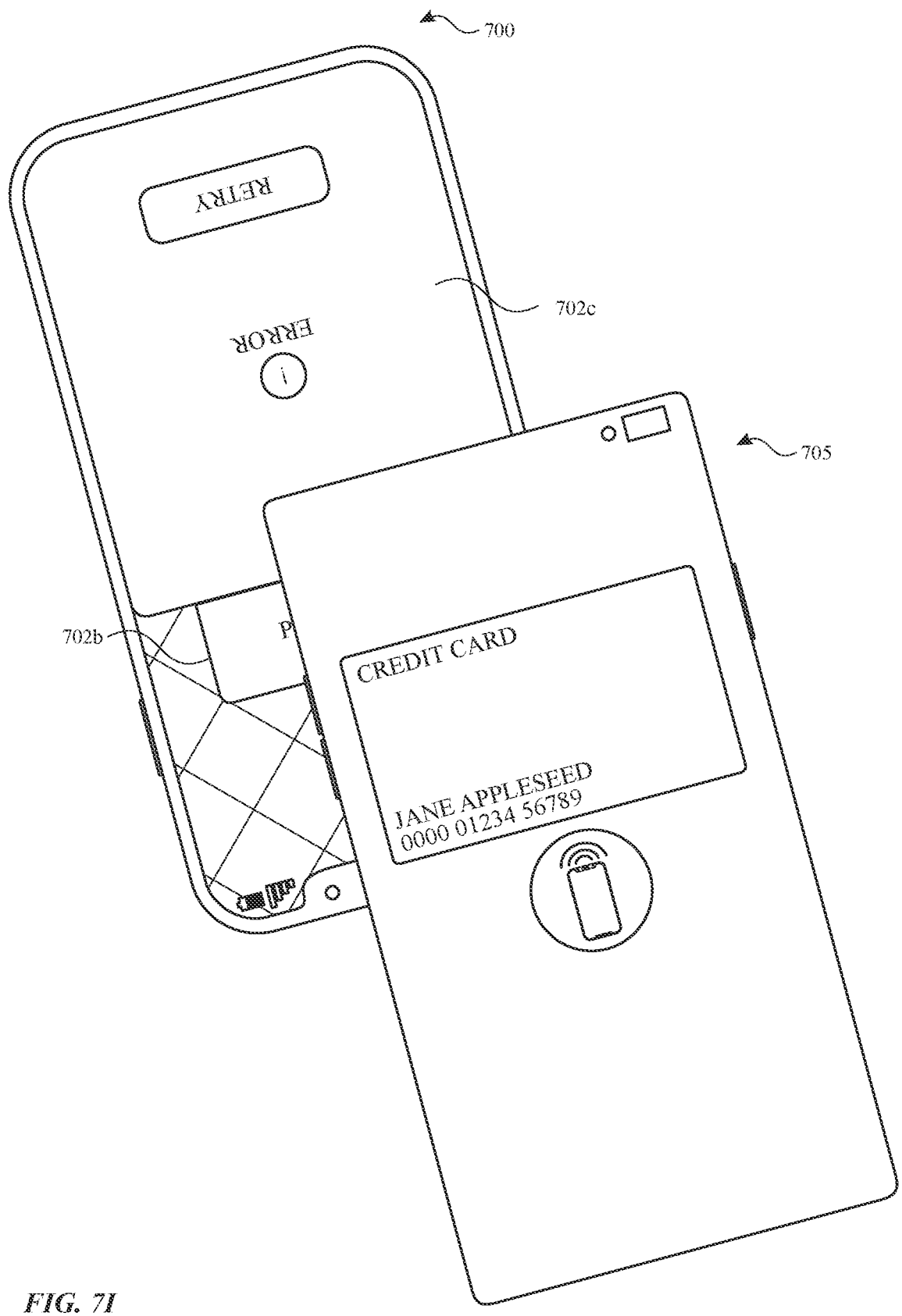

In some embodiments, computer system 700 encounters an error during the payment process. In FIG. 7I, in response to encountering an error, computer system 700 ceases display of space 702e and/or user interface element 702a and displays error element 702c as discussed above, with respect to FIG. 7F.

Figure 7J:
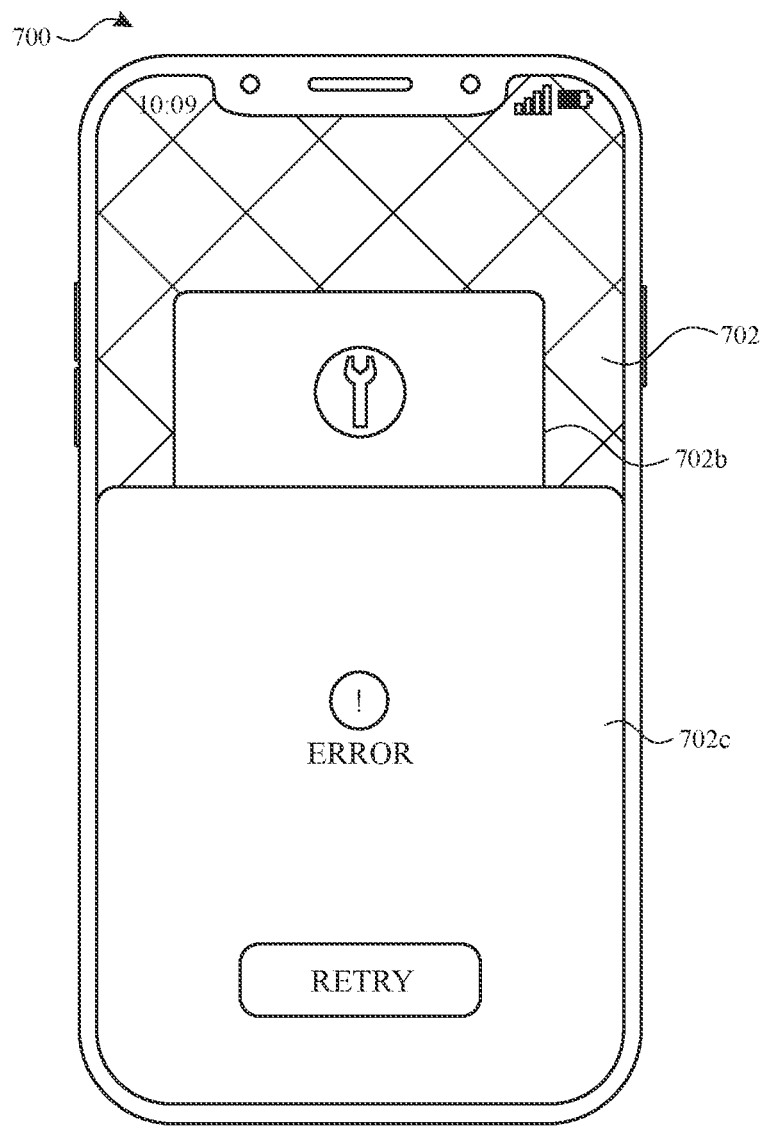

In FIG. 7J, computer system 700 has detected a rotation of computer system 700 into an orientation so that the merchant can view user interface 702. After (e.g., in response to) detecting the rotation of computer system 700 (e.g., into the orientation depicted in FIG. 7J), computer system 700 rotates request element 702b around a centroid of request element of 702b. Notably, the portion of request element 702b that is covered and/or blocked by error element 702c is different after computer system 700 has been rotated as shown in FIG. 7J in comparison to the portion of request element 702b that is blocked in FIG. 7I. Accordingly, a merchant can rotate computer system 700 to view error element 702c and other elements of user interface 702 in the same orientation.

Figure 7K:
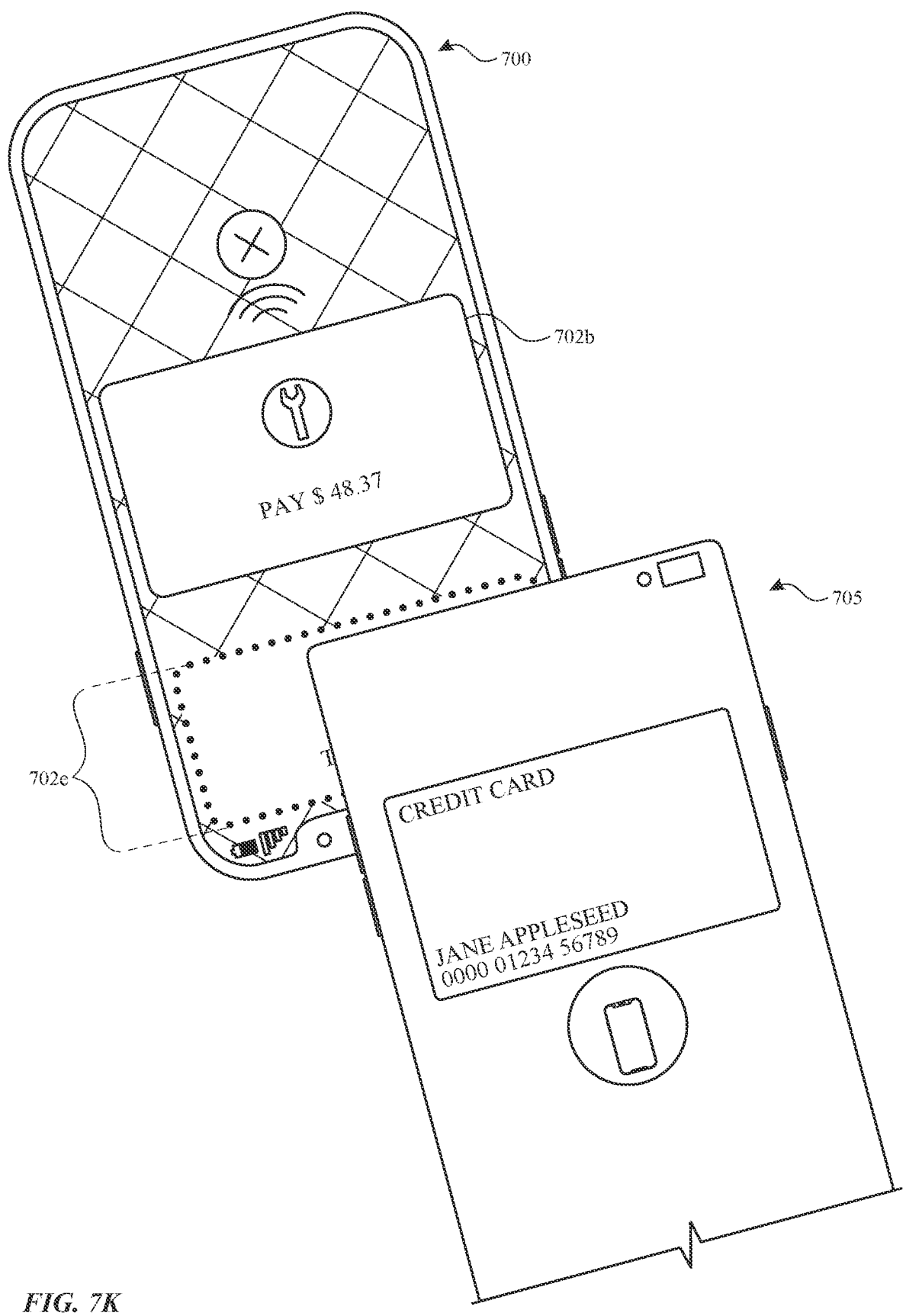

In FIG. 7K, computer system 705 is placed near and/or tapped on computer system 700 and computer system 700 requests payment in the amount of $48.37 from computer system 705. While computer system 700 is requesting they payment amount from computer system 705, computer system 700 also requests data other than payment data, such as information associated with a non-payment account, loyalty account, or rewards account.

Figure 7L:
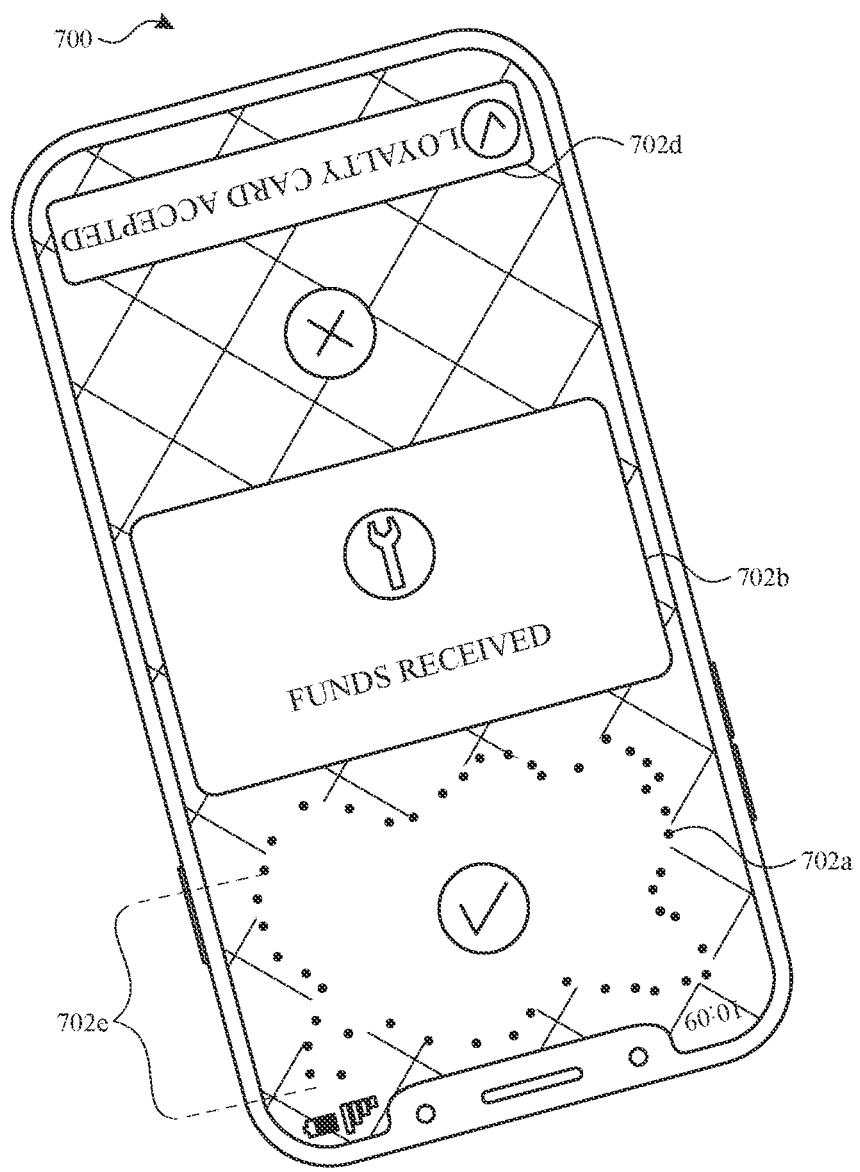

In FIG. 7L, after (e.g., in response to) receiving the requested payment and loyalty information from computer system 705, computer system 700 updates user interface 702 to indicate that the payment was received successfully. In particular, the particles, e.g., user interface element 702a, are displayed in an arrangement (e.g., animated) that appears to be exploding out of (e.g., expanding outward from) the previously displayed rectangle in FIG. 7H to indicate that the transaction was successful. In some embodiments, the particles move independent of other particles. In some embodiments, the particles, e.g., user interface element 702a, bounce and/or rebound off of the edges of the display of computer system 700. In some embodiments, the paths of the particles, user interface element 702a, are not restricted within the display of computer system 700. In some embodiments, the particles may change color from something neutral (e.g., black) to a color that indicates success such as green. In some embodiments, computer system 700 provides an audio output in addition to the displayed user interface elements to indicate that the transaction was successful. Request element 702b is updated to include the text "funds received" indicating that the transaction was successful. Additionally, computer system displays banner 702d in user interface 702 to indicate that computer system 700 also successfully retrieved loyalty information associated with the buyer. Banner 702d is displayed in an orientation towards the merchant holding computer system 700 to advise the merchant that the loyalty information was received (e.g., when loyalty information was not initially requested but was determined to be available on computer system 705). In some embodiments, banner 702d is displayed in an orientation consistent with request element 702b such that the buyer is able to more easily read banner 702d.

In some embodiments, in accordance with a determination that a loyalty account associated with the merchant is available on computer system 705, computer system 700 also requests from computer system 705 information associated with a payment account. In some embodiments, in accordance with a determination that the transaction request is a request for loyalty account information and computer system 705 provides loyalty account information, computer system 700 forgoes displaying banner 702d and/or another indication that loyalty account information is received. In some embodiments, in accordance with a determination that the transaction request is a request for loyalty account information and computer system 705 provides payment account information, computer system 700 displays an error indication (e.g., an error interface element) and does not provide the payment account information to an application associated with the merchant.

In some embodiments, computer system 700 requests loyalty account information and (e.g., while receiving the loyalty account information) receives payment account information and, in response, computer system 700 forgoes displaying banner 702d or any other indication that loyalty account information was received.

Figure 7M:
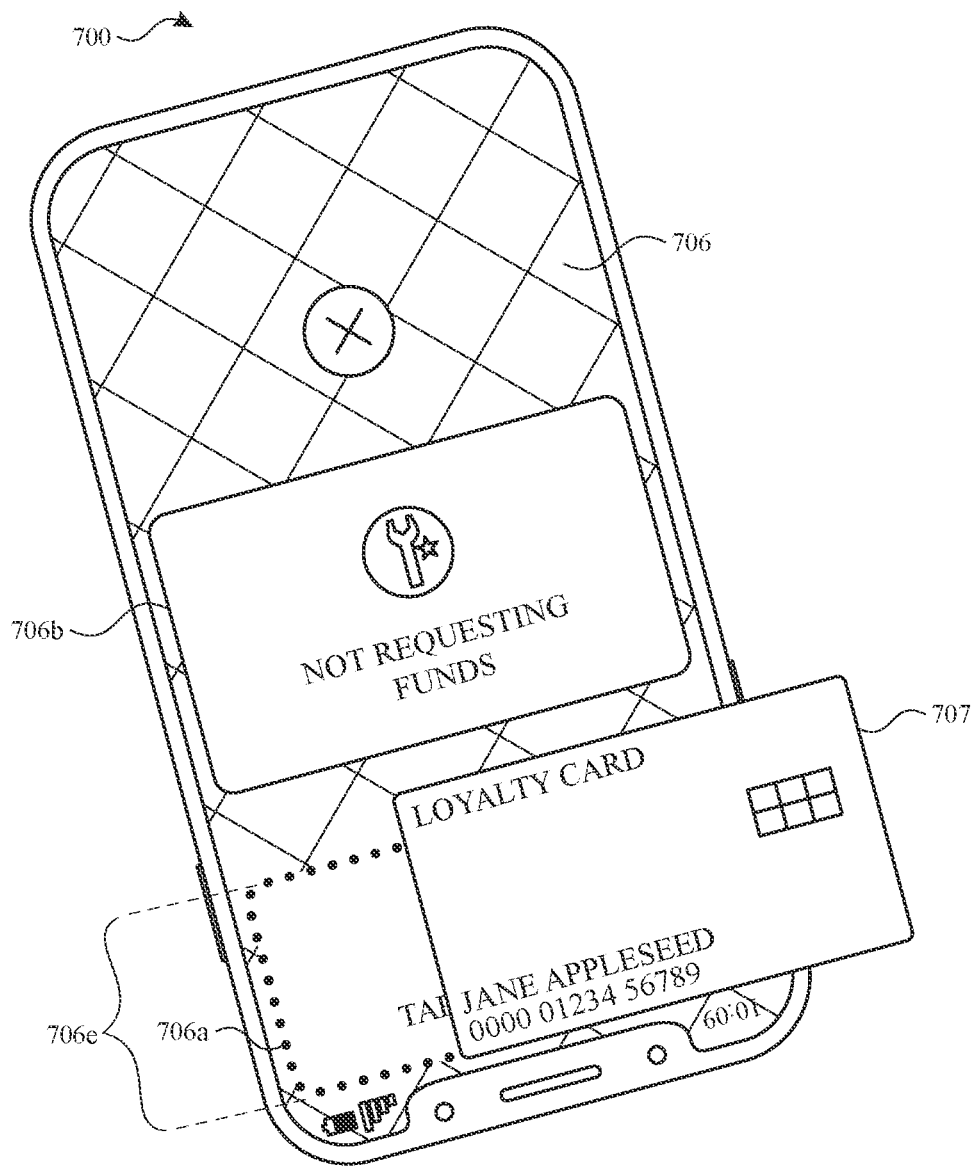

In FIG. 7M, as a first user (e.g., holding computer system 700) is dipping computer system 700 down for a second user to view, computer system 700 displays user interface 706 requesting loyalty information from the second user. Computer system 700 displays space 706e and request element 706b in an orientation towards the second user such that the text at space 706e and request element 706b is more easily read by the second user. In some embodiments, computer system 700 rotates the text at space 706e around a centroid of space 706e (and/or the centroid of the text) and rotates request element 706b around a centroid of request element 706b after (e.g., in response to) detecting rotation of (e.g., dipping down of) computer system 700 to the shown orientation. In response to detecting that the user places loyalty card 707 in a field of a short-range radio of computer system 700 (e.g., positioned near/under/adjacent to space 706e of user interface 706), computer system 700 receives loyalty information associated with the user from loyalty card 707 (e.g., via an NFC or UWB transaction).

Figure 7N:
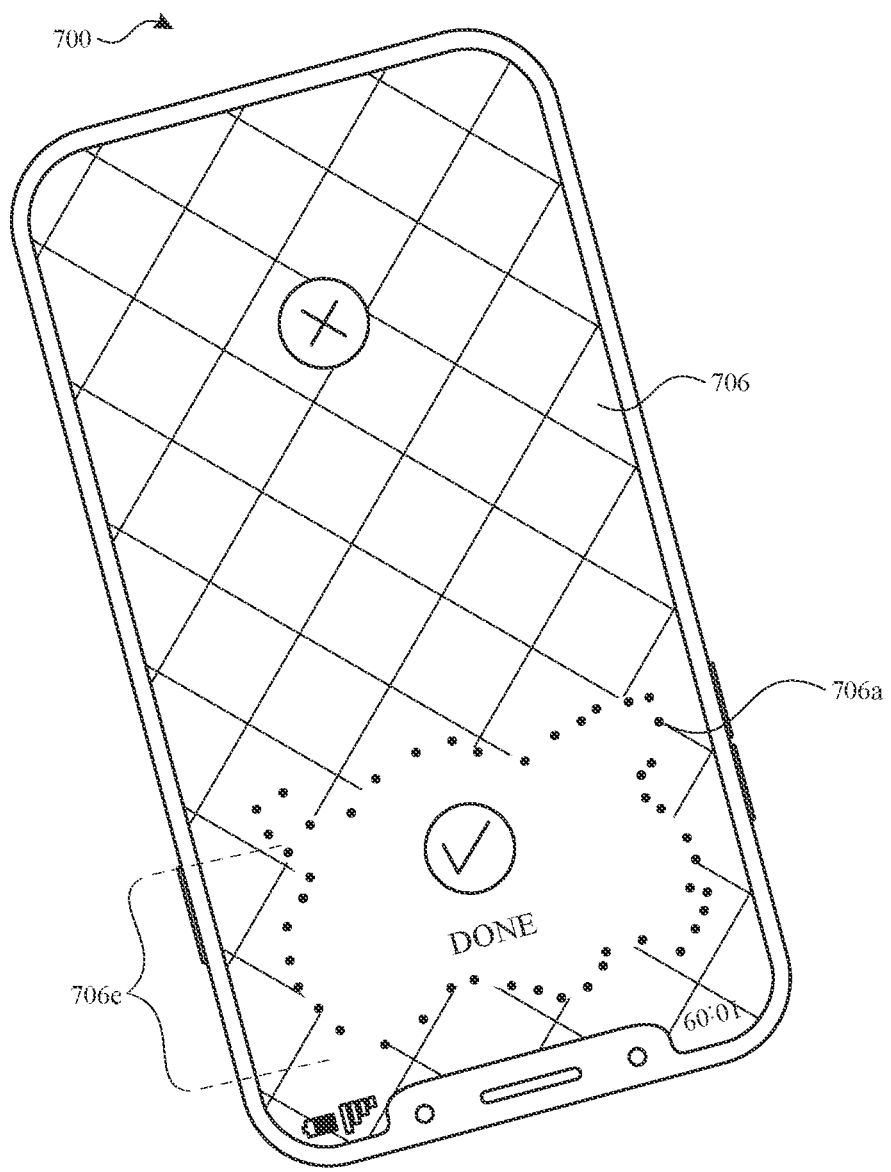

In FIG. 7N, after (e.g., in response to) successfully receiving the loyalty information from loyalty card 707, computer system 700 updates user interface 706. Computer system 700 updates the particles, e.g., user interface element 706a, of user interface 706 such that the particles appear to be exploding out of (e.g., animated, expanding away from) the previously displayed (e.g., outline of) rectangle of space 706e. In some embodiments, the particles, e.g., user interface element 706a, optionally change color (e.g., from black to green). In some embodiments, computer system 700 provides an audio and/or tactile output in addition to the displayed user interface elements to indicate that the transaction was successful.

Figure 7O:
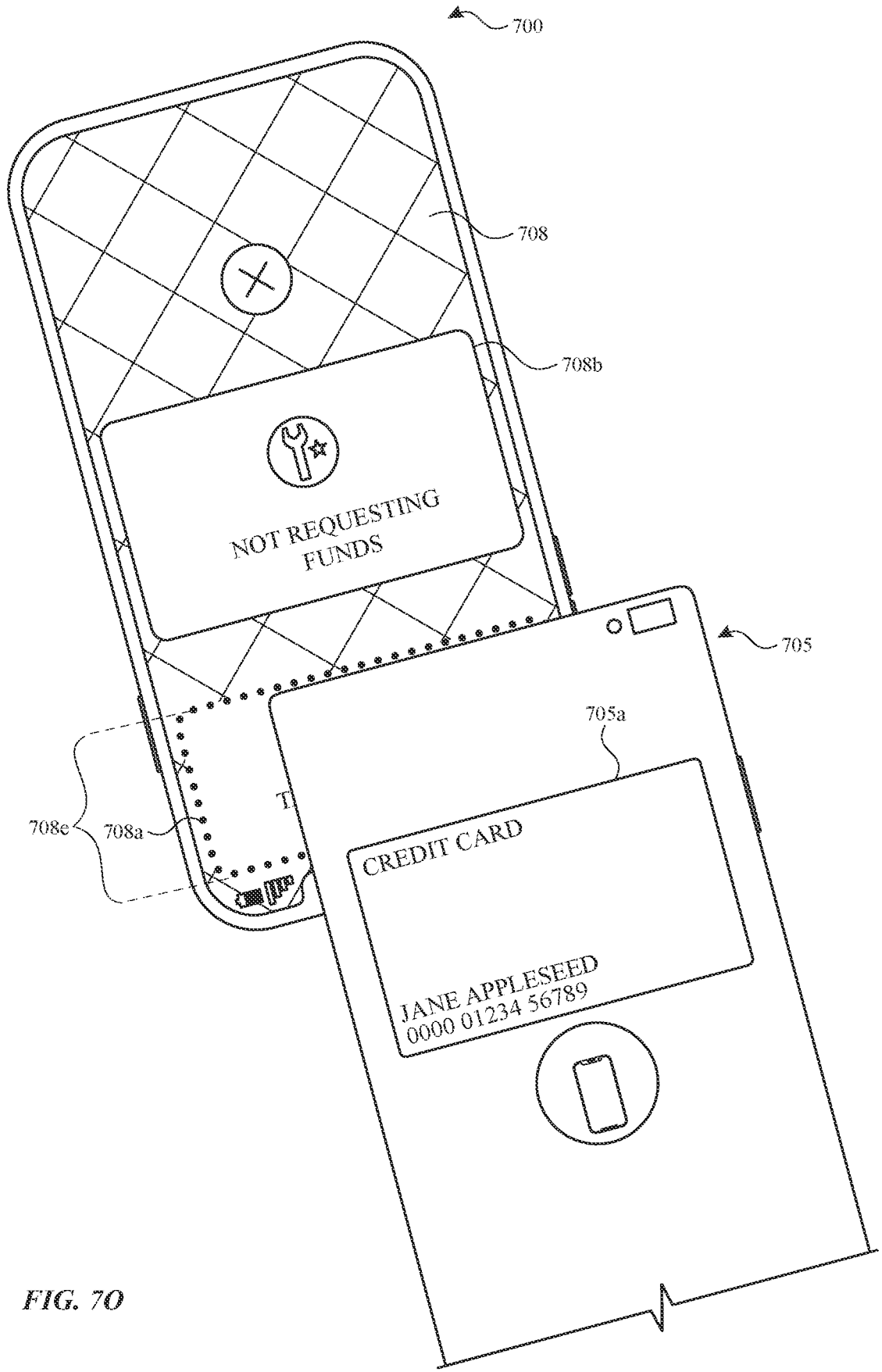

In FIG. 7O, computer system 700 displays user interface 708 for opening a tab (e.g., a bar tab such that multiple items are added throughout an evening before the tab is settled). Computer system 700 displays text at space 708e and request element 708b in an orientation towards the buyer (e.g., the person for whom the tab is to be opened), such that the text at space 708e and request element 708b are more easily read by the buyer. In some embodiments, computer system 700 rotates the text at space 708*e* around a centroid of space 708*e* (and/or the centroid of the text) and rotates request element 708*b* around a centroid of request element 708*b* after (e.g., in response to) detecting rotation of computer system 700 to the shown orientation. In response to detecting that the user places computer system 705 in a field of a short-range radio of computer system 700 (e.g., positioned near/under/adjacent to space 708*e* of user interface 708), computer system 700 receives payment account information associated with the buyer without completing a payment transaction. Computer system 700 receives information associated with credit card 705*a* displayed on computer system 705, including a credit card number, the buyer's name, the credit card expiration date, and/or other information needed to open a tab for the buyer and/or charge the buyer's account at a later time (e.g., when the tab is settled at the end of the evening).

Figure 7P:
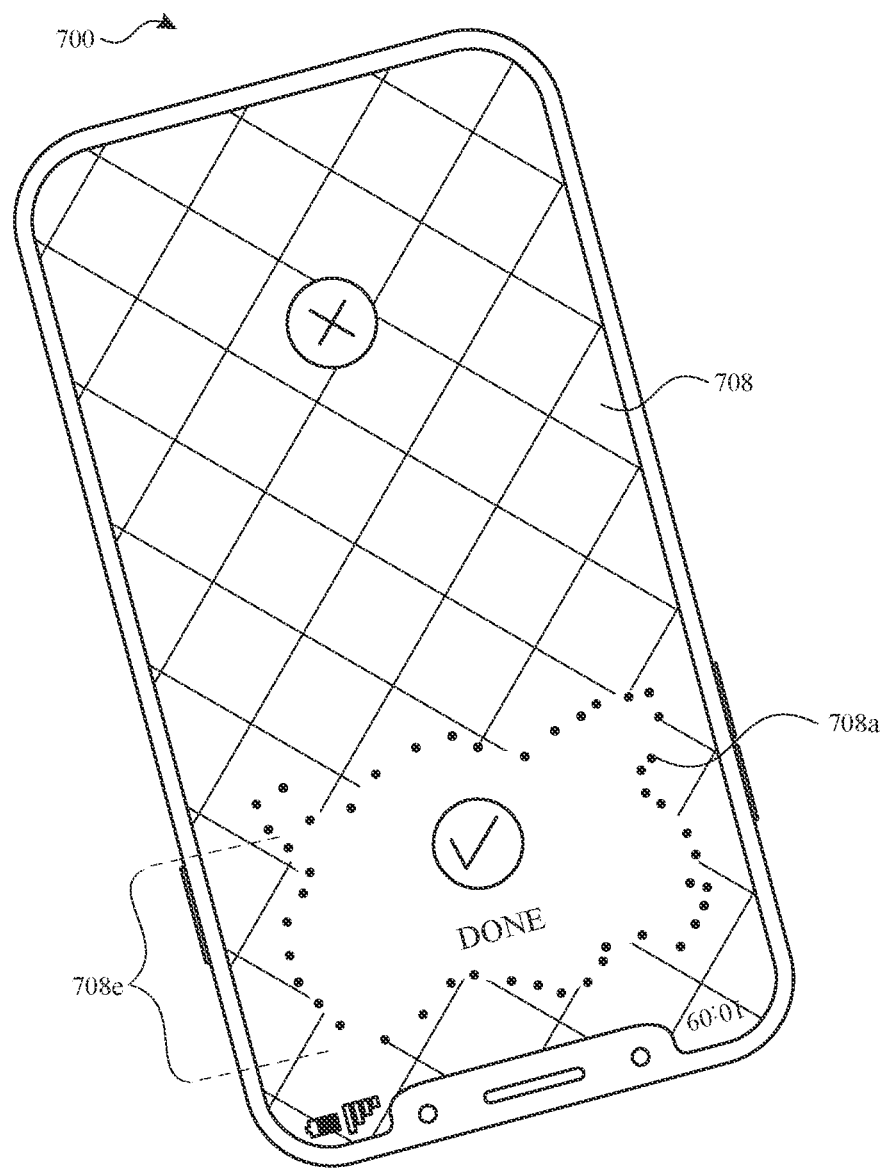

In FIG. 7P, after (e.g., in response to) computer system 700 receiving the requested information required to open a tab for Jane, computer system 700 opens the tab and updates user interface 708 to indicate that the transaction was a success. Computer system 700 updates the particles, e.g., user interface element 708*a*, such that the particles appear to be exploding out of (e.g., animated, expanding away from) the previously displayed rectangle. In some embodiments, the particles, e.g., user interface element 708*a*, optionally change color (e.g., from black to green). In some embodiments, computer system 700 provides an audio and/or tactile output in addition to the displayed user interface elements to indicate that the transaction was successful.

Figure 7Q:
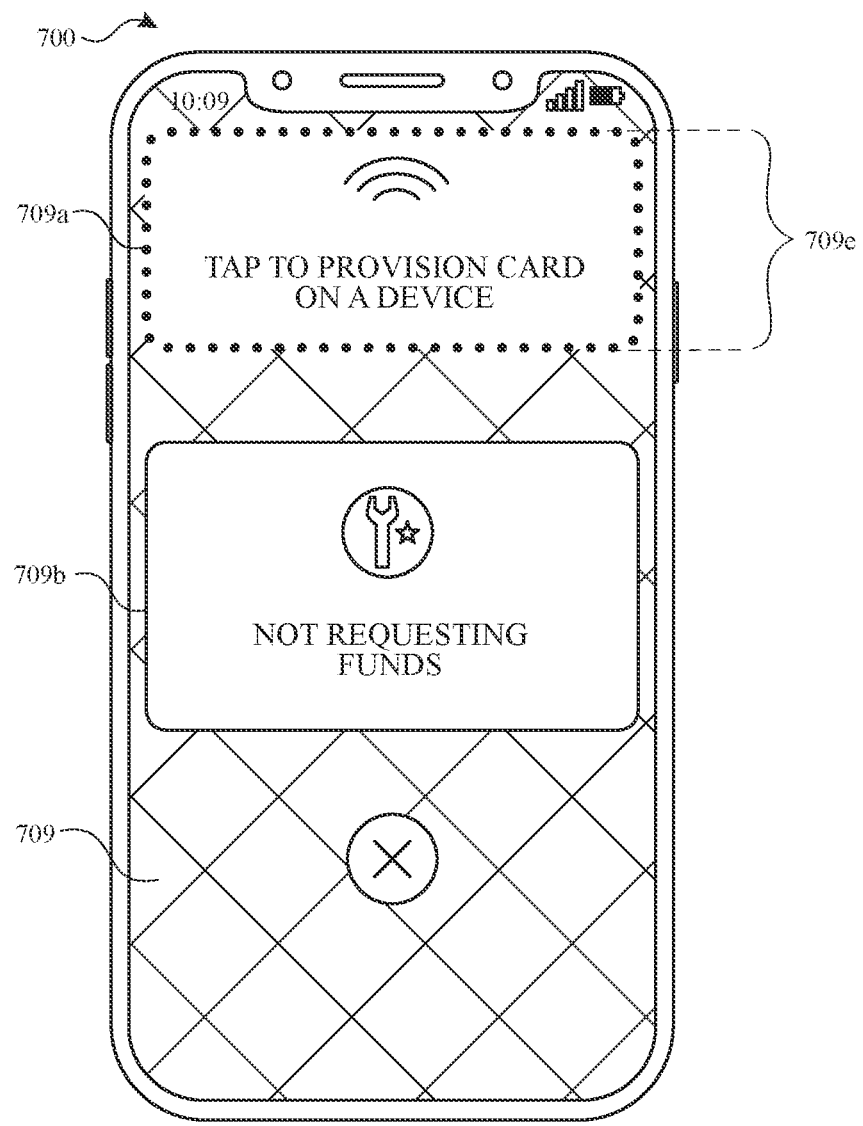

In FIG. 7Q, computer system 700 displays user interface 709 for provisioning a card (e.g., a payment account, a loyalty account, a key account, and/or an identification account) onto computer system 700.

Figure 7R:
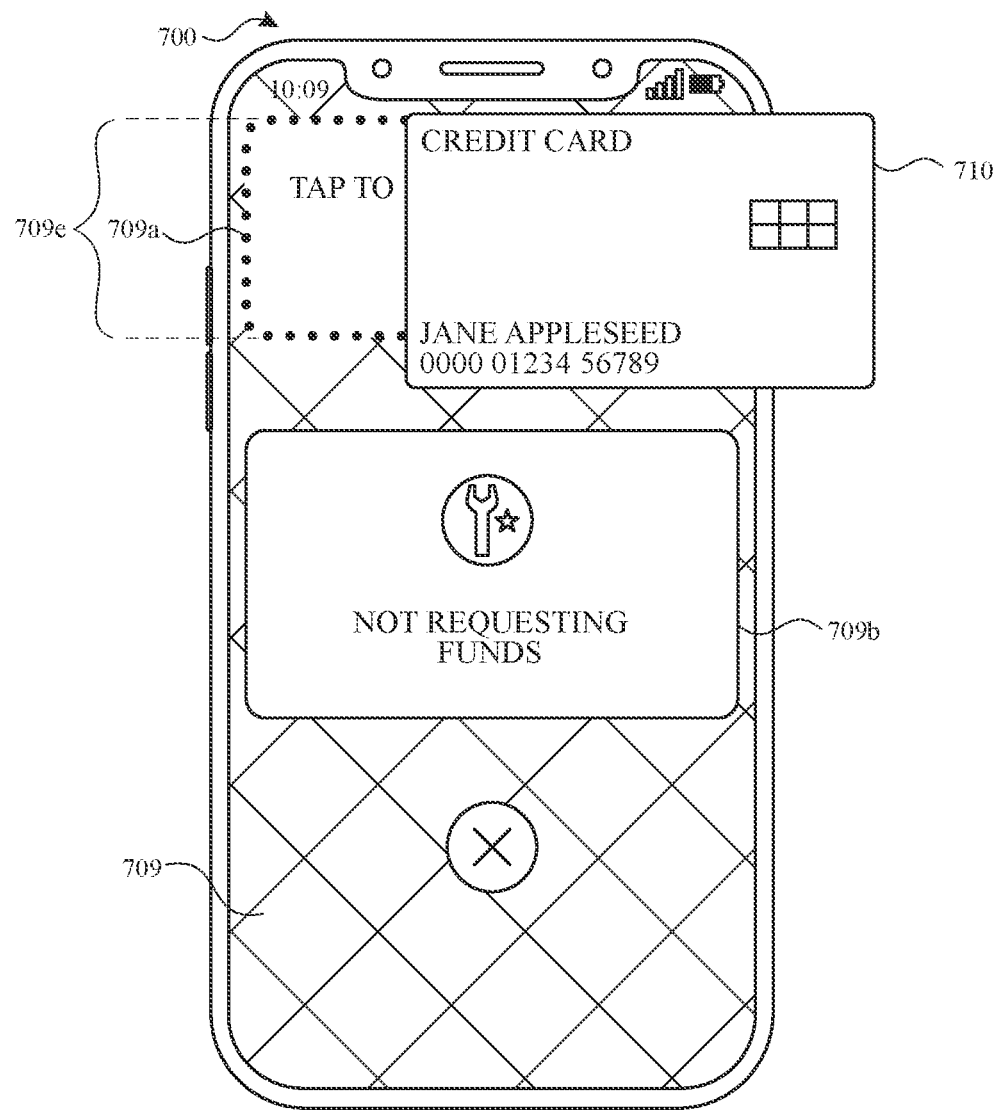

In FIG. 7R, the user places credit card 710 in a field of a short-range radio of computer system 700 (e.g., positioned near/under/adjacent to space 709*e* of user interface 709). After (e.g., in response to) detecting that credit card 710, computer system 700 receives account information associated with credit card 710. Computer system 700 receives information associated with credit card 710 including a credit card number, the account holder's name, the credit card expiration date, and/or other information needed to provision credit card 710 onto computer system 700.

In FIG. 7S, after receiving information associated with credit card 710, computer system 700 provisions credit card 710 onto computer system 700 and updates user interface 709 to indicate that the provisioning was a success. Computer system 700 updates the particles, e.g., user interface element 709*a*, such that the particles appear to be exploding out of (e.g., animated, expanding away from) the previously displayed rectangle. In some embodiments, the particles optionally change color (e.g., from black to green). In some embodiments, computer system 700 provides an audio and/or tactile output in addition to the displayed user interface elements to indicate that the transaction was successful. Computer system 700 also updates request element 709*b* to include text indicating that the card was provisioned and updates the text of user interface element 709*a* to indicate that payments (e.g., NFC and/or UWB payments) can be made with computer system 700 using the newly provisioned account.

In some embodiments, computer system 700 receives a request to display information associated with an account (e.g., a payment account and/or a non-payment account), including prior transactions or other information that indicates a history of the account. Accordingly, in addition to requesting loyalty information, opening a tab, and/or provisioning a card, as discussed above, the user interface can also display a request for account information which can be used to access other information associated with the account, such as historical or prior transaction data. For example, computer system 700 can receive information about a payment account and (without processing a payment), displaying past purchases made using the payment account. As a result, the merchant can quickly and efficiently find past transaction information for a buyer.

FIG. 8 is a flow diagram illustrating a method for displaying user interface elements and requesting account information using a computer system in accordance with some embodiments. Method 800 is performed at a computer system (e.g., 100, 300, 500, 700, 1100, 1400, 1700) that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface). Some operations in method 800 are, optionally, combined, the orders of some operations are, optionally, changed, and some operations are, optionally, omitted.

As described below, method 800 provides an intuitive way for managing display of user interface elements based on movement of a computer system. The method reduces the cognitive burden on a user for viewing user interface elements on the computer system, thereby creating a more efficient human-machine interface. For battery-operated computing devices, enabling a user to display user interface elements and request account information using a computer system faster and more efficiently conserves power and increases the time between battery charges.

The computer system (e.g., 700) (e.g., a smartwatch, a wearable electronic device, a smartphone, a desktop computer, a laptop, or a tablet) detects (802), via one or more input devices, user input (e.g., 701*c*) to initiate a transaction request (e.g., a request for payment).

In response (804) to detecting the user input (e.g., 701*c*) to initiate the transaction request, the computer system (e.g., 700) displays (e.g., while the computer system is in a first position), via the display generation component, a transaction user interface (e.g., 702) (e.g., a payment user interface). Displaying the transaction user interface (e.g., 702) includes displaying: at a first location, via the display generation component, a first graphical user interface element (e.g., 702*a* in FIG. 7C) (806) (e.g., an arrow, text box, and/or a plurality of particles) indicating a location of a reader (e.g., a barcode reader, a credit card reader, and/or a camera) of the computer system (e.g., 700), and at a second location different from the first location, via the display generation component, a second graphical user interface element (e.g., 702*b* at FIG. 7C) (808) (e.g., an indication of an amount of the transaction and/or an indication of the state of the computer system), wherein the second graphical user interface element is displayed in a first orientation (e.g., towards the user (the retailer) of the computer system).

While displaying the transaction user interface (e.g., 702 at FIGS. 7C-7D), the computer system detects (810) a movement (e.g., a rotation, a change in orientation, a tilt, and/or a lifting) of the computer system (e.g., 700) (e.g., to a second position).

In response to detecting the movement of the computer system, the computer system rotates (812) (e.g., via a rotation animation and/or a cross-fade animation) the second graphical user interface element (e.g., 702*b* at FIG. 7D)

(e.g., the indication of an amount of the transaction and/or the indication of the state of the computer system) around a centroid of the second graphical user interface element to a second orientation different from the first orientation, while continuing to display, at the first location, the first graphical user interface element (e.g., 702a at FIG. 7D) indicating the location of the reader of the computer system.

Automatically rotating some user interface elements based on movement of the computer system enables users of the computer system to read content on the display without requiring the user to provide additional input to rotate those elements (such that they are properly oriented), thereby reducing the number of inputs needed to perform the operation.

In some embodiments, multiple graphical user interface elements rotate about their respective centroids in response to detecting movement of the computer system. In some embodiments, the first graphical user interface is an animated visual element. In some embodiments, the first graphical user interface does not rotate based on and/or is not affected by the detected movement of the computer system. In some embodiments, the first graphical user interface rotates in response to the movement of the computer system and is displayed (after rotation) at the first location (e.g., continues to be displayed at the same location, though rotated).

In some embodiments, prior to detecting the movement of the computer system, the computer system displays, via the display generation component, a third graphical user interface element in the first orientation. In some embodiments, in response to detecting the movement of the computer system, the computer system rotates (e.g., via a rotation animation and/or a cross-fade animation) the third graphical user interface element (e.g., the indication of an amount of the transaction and/or the indication of the state of the computer system) around a centroid of the third graphical user interface element to the second orientation. Automatically rotating some user interface elements based on movement of the computer system enables users of the computer system to read content on the display without requiring the user to provide additional input to rotate those elements (such that they are properly oriented), thereby reducing the number of inputs needed to perform the operation.

In some embodiments, while the second graphical user interface element is displayed in the second orientation, the computer system detects an error condition. In some embodiments, in response to detecting the error condition: in accordance with a determination that the error condition is a first type of error (e.g., an error directed to the user that initiated the transaction request, an error directed to a merchant (rather than a customer), and/or an error for an individual positioned at a first side of the computer system), the computer system displays, via the display generation component, an indication (e.g., error of text of the error condition in a third orientation (e.g., same as the first orientation and/or different from the second orientation, towards the user that initiated the transaction request, towards the merchant, towards the first side of the computer system) and in accordance with a determination that the error condition is a second type of error (e.g., an error directed to a user that did not initiate the transaction request, an error directed to a customer (rather than merchant), and/or an error for an individual positioned at a second side (different from the first side and/or opposite the first side) of the computer system), the computer system displays, via the display generation component, an indication of the error condition in a fourth orientation (e.g., same as the second orientation and/or different from the first orientation, towards a user that did not initiate the transaction request, towards the customer, towards the second side of the computer system) that is different from the third orientation. Displaying notifications of error conditions oriented differently based on whether the error condition is directed to one user (e.g., a merchant) or another user (e.g., a purchaser) enables users of the computer system to read content on the display without requiring the user to provide additional input to rotate those elements (such that they are properly oriented), thereby reducing the number of inputs needed to perform the operation.

In some embodiments, the error condition is a timeout (e.g., 702c at FIG. 7F). In some embodiments, the timeout is based on a failure to communicate with a payment terminal and/or payment server to process information (e.g., a payment transaction, a lookup of prior purchases). In some embodiments, the timeout is based on a failure to communicate with a payment device (e.g., a phone (such as an NFC-enabled phone that is armed for payment) and/or a physical payment card (such as a credit card). In some embodiments, communicating includes communicating via short-range radio to read account information (e.g., account number, account expiration date, and/or user account name) of the corresponding account.

In some embodiments, the third orientation is different from the second orientation (e.g., FIG. 7E vs 7F).

In some embodiments, the second graphical user interface element (e.g., payment information, transaction amount, a text box, a request for information, a notification, and/or a banner) of the transaction user interface is oriented based on a position of the computer system to increase recognizability (e.g., legibility and/or readability) of the second graphical user interface element for an expected user of the computer system. Orienting displayed user interface elements to increase recognizability of the user interface elements enables users of the computer system to better read content on the display without requiring the user to provide additional input to rotate those elements (such that they are properly oriented), thereby reducing the number of inputs needed to perform the operation.

In some embodiments, detecting user input to initiate the transaction request includes detecting (e.g., via a touch-sensitive surface) activation of (e.g., a tap at a location corresponding to) a displayed request-transaction graphical user interface element (e.g., 701a). In some embodiments, the transaction user interface includes (e.g., in response to and/or after detecting the user input to initiate the transaction) a display of the graphical user interface element (e.g., 702e) indicating the location of the reader (e.g., a sensor, such as a short-range communication component and/or NFC reader) of the computer system for processing the transaction).

In some embodiments, the transaction user interface (e.g., 702) is a user interface of a first application (e.g., a payment application) and the request-transaction graphical user interface element is displayed as part of a user interface of a second application (e.g., 701) (e.g., a payment processor application and/or a retailer application) that is different from the first application. In some embodiments, the first application is an operating system of the computer system (and the second application is not). Using separate applications to initiate the transaction request and to performing the transaction increases security by relying on a secure and/or known application (e.g., an application that is part of the operating system of the computer system) to perform portions of the technique that require higher levels of security.

In some embodiments, the transaction request includes a payment request (e.g., a payment transaction, a receipt of funds (such as a purchase) and/or a refund of funds (such as a return of a purchase)), a loyalty request (e.g., a loyalty transaction that does not include a payment of money), and/or a request to identify prior transactions (e.g., using received account information, such as an account number and/or expiration date (without performing a payment or loyalty transaction)). Initiating a transaction that includes a payment request, a loyalty request, and/or a request to identify prior transactions enables the computer system to receive information required to perform the transaction with requiring the additional user input, thereby reducing the number inputs needed to perform the operation(s).

In some embodiments, the transaction user interface (e.g., prior to and/or while the second graphical user interface element of the transaction user interface is displayed in the second orientation) identifies a type of transaction (e.g., indicates "tap to pay", "tap to refund", and/or "tap to collect information" to identify prior transactions). In some embodiments, the request is a request for a payment transaction (e.g., a receipt of funds (such as a purchase) and/or a refund of funds (such as a return of a purchase)). In some embodiments, the request is a request for a loyalty request (e.g., a loyalty transaction that does not include a payment of money). In some embodiments, the request is a request to identify prior transactions (e.g., using received account information, such as an account number and/or expiration date (without performing a payment or loyalty transaction)).

In some embodiments, while displaying the transaction user interface, the computer system detects, via a short-range communication radio (e.g., NFC and/or UWB), account details (e.g., account information, such as account number, account expiration date, name associated with the account) (e.g., as in FIG. 7K). In some embodiments, in response to detecting account details and in accordance with a determination that the account details are valid (e.g., the account number is a valid number, the account is not expired, and/or a name associated with the account is available), the computer system transfers one or more (e.g., all or less than all) of the account details to a retailer application (e.g., not a first-party application of the computer system) of the computer system (e.g., without processing the transaction and/or without displaying an error). In some embodiments, the computer system collects account information using a first application (e.g., an operating system and/or an application provided by the manufacturer of the computer system) and passes some or all of the account information to a second application that is different from the first application (e.g., a third-party application). Transferring account details to a retailer application enables the retailer application to use the account details while a separate application (e.g., a more secure application) is responsible for collecting the account details, thereby increasing the security of the computer system.

In some embodiments, in response to detecting account details and in accordance with a determination that the account details are not valid (e.g., the account number is not a valid number, the account is expired, and/or a name associated with the account is not available), the computer system displays (e.g., in the second orientation), via the display generation component, an indication of an error (e.g., as in FIG. 7J) (e.g., without transferring one or more (e.g., all or less than all) of the account details to a retailer application (e.g., not a first-party application of the computer system) of the computer system (e.g., without processing the transaction)). Displaying an indication of the error provides the user with visual feedback about the error state of the computer system, thereby providing improved visual feedback to the user.

In some embodiments, detecting account details includes reading (e.g., as in FIG. 7M) account details from a physical card (e.g., 707) (e.g., a credit card, a loyalty card, and/or a card that is NFC-enabled). Detecting account details from either a physical card and/or an external computer system without requiring the user to select the source (e.g., physical card or external computer system) of the account details reduces the inputs required to perform the transaction, thereby reducing the number of inputs needed to perform an operation.

In some embodiments, detecting account details includes reading account details from an external computer system (e.g., 705) (e.g., a smartphone that is NFC-enabled). Detecting account details from either a physical card and/or an external computer system without requiring the user to select the source (e.g., physical card or external computer system) of the account details reduces the inputs required to perform the transaction, thereby reducing the number of inputs needed to perform an operation.

In some embodiments, subsequent to transferring one or more (e.g., all or less than all) of the account details to the retailer application (e.g., the second application and/or not a first-party application of the computer system) of the computer system, the computer system processes the transaction (e.g., as in FIG. 7N) (e.g., using the retailer application and/or the second application). In some embodiments, the transaction user interface is a user interface of first-party application (e.g., an operating system) and the account details are passed to a different application (e.g., a third-party application and/or a retailer application) to process the transaction. In some embodiments, the transaction user interface is a user interface of first-party application (e.g., an operating system) and the first-party application uses the account details to process the transaction.

In some embodiments, while the second graphical user interface element of the transaction user interface is displayed in the second orientation, the computer system receives input (e.g., movement of the computer system, detecting a change in orientation of the computer system back to facing the merchant, and/or detecting user input on a touch-sensitive surface/display). In some embodiments, in response to receiving the input, the computer system rotates the second graphical user interface element (e.g., payment information, transaction amount, a text box, a request for information, a notification, and/or a banner) of the transaction user interface to the first orientation (e.g., while maintaining in the first orientation the graphical user interface element (e.g., 702e) indicating the location of the reader of the computer system). In some embodiments, the input cases the graphical user interface element to be displayed as it was (e.g., in the first orientation) before the movement of the computer system was detected, thereby allowing the original user of the computer system (e.g., the merchant) to more easily read the elements of the user interface. Rotating a user interface element in response to user input enables the computer system to orient the user interface element to make the user interface element more readily recognizable to the viewer based on the location of the viewer with respect to the computer system, thereby providing improved visual feedback to the user.

In some embodiments, receiving the input includes detecting movement of the computer system (e.g., transition between FIGS. 7I and 7J) (e.g., detecting that the computer system's display is tilted back towards the initial user, such as the merchant). Rotating a user interface element in response to movement of the computer system enables the computer system to orient the user interface element to make the user interface element more readily recognizable to the viewer based on the location of the viewer with respect to the computer system, thereby providing improved visual feedback to the user.

In some embodiments, receiving the input includes detecting activation of a displayed graphical user element (e.g., detecting that a cancel button has been pressed). Rotating a user interface element in response to activation of a displayed graphical user element enables the computer system to orient the user interface element to make the user interface element more readily recognizable to the viewer based on the location of the viewer with respect to the computer system, thereby providing improved visual feedback to the user.

In some embodiments, while the second graphical user interface element of the transaction user interface is displayed in the second orientation, the computer system detects, during a timeout period (e.g., 4 seconds or 8 seconds), incomplete account details (e.g., account information) (e.g., detecting an account number without detecting an expiration date and/or detecting an initiation of communication to receive account information without receiving complete account information). In some embodiments, in response to detecting the incomplete account details during the timeout period, the computer system extends the timeout period and displays, via the display generation component, directions to complete the transaction (e.g., "tap your device and hold until confirmation (tone/haptic) is received" or "tap your card again"). Automatically extending the timeout period when incomplete account details are detected performs an operation when a set of conditions has been met without requiring further user input.

In some embodiments, the computer system detects (e.g., while displaying the transaction user interface with the second graphical user interface element in the second orientation) (e.g., via a short-range communication radio (e.g., NFC and/or UWB) or via a camera of the computer system) account details (e.g., account information, such as account number, account expiration date, name associated with the account). In some embodiments, in accordance with a determination that the transaction has been processed (e.g., account details are valid and process is complete) (and, optionally, in response to detecting account details), the computer system provides a first audio output indicating a successful transaction. In some embodiments, in accordance with a determination that an error is detected (such as an error condition) (and, optionally, that the transaction has not been processed) (and, optionally, in response to detecting account details), providing a second audio output, different from the first audio output, indicating an error. Providing audio output based on a successful transaction or an error enables the computer system to provide the user with the state of the computer system, thereby providing improved audio feedback to the user.

In some embodiments, the transaction request is a request to provision an account onto the computer system and the computer system detects (e.g., while displaying the transaction user interface with the second graphical user interface element in the second orientation), via a short-range communication radio (e.g., NFC and/or UWB), account details (e.g., account number, account expiration date, name associated with the account) (e.g., as in FIG. 7S). In some embodiments, subsequent to (e.g., in response to) detecting account details (and, optionally, in accordance with a determination that the account details were received from a physical card (e.g., a debit card, a bank card, and/or a credit card) and not a computer system (e.g., a smart phone or a laptop)), provisioning an account onto the computer system using some (e.g., all or less than all) of the account details. In some embodiments, subsequent to (e.g., in response to) detecting account details and in accordance with a determination that the account details were not received from a physical card, forgoing provisioning the account onto the computer system.

In some embodiments, the computer system detects (e.g., while displaying the transaction user interface with the second graphical user interface element in the second orientation) (e.g., receiving from the user device, via a short-range communication radio (e.g., NFC and/or UWB) or via a camera of the computer system) account details (e.g., account number, account expiration date, name associated with the account). In some embodiments, the computer system performs an operation using some (e.g., all of, not all of) of the account details without attempting to transfer funds (e.g., without processing a payment).

In some embodiments, the operation is a transaction lookup operation that uses some of the account details to identify (and, optionally, display details of) a previously performed transaction.

In some embodiments, the operation adds an amount (and/or an item or service for purchase) to a tab (e.g., a running total of charges that an individual or group accumulates for subsequent settlement, such as a bar tab) associated with (e.g., identified using) some of the account details.

In some embodiments, the graphical user interface element (e.g., space 702*e*) indicating the location of the reader (e.g., a sensor, such as a short-range communication component and/or NFC reader) comprises displayed particles (e.g., a plurality of particles being emitted from one or more particle emitter locations and/or moving on the display) that have visual characteristics (e.g., speed of movement, location of particles) based on orientation and/or speed of movement of the computer system. In some embodiments, the particles move on the display based on the movement (e.g., rotation, dipping, raising, and/or lowering) of the computer system.

In some embodiments, in the graphical user interface element (e.g., space 702*e*) indicating the location of the reader (e.g., a sensor, such as a short-range communication component and/or NFC reader) comprises displayed particles (e.g., a plurality of particles being emitted from one or more particle emitter locations and/or moving on the display) and wherein, subsequent to detecting the user input to initiate the transaction request and prior to the computer system being ready to receive account details (e.g., account information, such as account number, account expiration date, name associated with the account), the displayed particles have a first visual characteristic (e.g., 702*a* in FIG. 7B) (e.g., are scattered, do not form a discernable shape, are not limited to a first area of the display, and/or are a first color, such as white or yellow). Displaying particles with a first visual characteristics provides the user with visual feedback of the state of the computer system (not yet ready to receive account details), thereby providing improved visual feedback to the user.

In some embodiments, subsequent to the computer system being ready to receive account details and prior to receiving the account details (e.g., account information, such as account number, account expiration date, name associated with the account), the displayed particles have a second visual characteristic (e.g., 702a in FIG. 7C) (e.g., are limited to the first area of the display, form a discernable shape or outline of a shape such as a rectangle, square, or circle, and/or are a second color, such as blue or purple) different from the first visual characteristic. In some embodiments, once the computer system is ready to receive account details the particles animate to transition from having the first visual characteristic to having the second visual characteristic. Displaying particles with a second visual characteristics provides the user with visual feedback of the state of the computer system (ready to receive account details), thereby providing improved visual feedback to the user.

In some embodiments, in accordance with a determination that an error condition is detected, the computer system displays, via the display generation component, the particles with a third visual characteristic (e.g., 702a in FIG. 7E) (e.g., are limited to the first area of the display, fill in the discernable shape such as the rectangle, square, or circle, and/or are a third color, such as red or orange) that is different from the first visual characteristic and the second visual characteristic. In some embodiments, once the computer system is detects the error condition, the particles animate to transition from having the first or second visual characteristic to having the third visual characteristic. In some embodiments, in accordance with a determination that the error condition exists, the computer system displays the particles with the third visual characteristic, provides a tactile output, and/or provides an audio output (to indicate an error). Displaying particles with a third visual characteristics provides the user with visual feedback of the state of the computer system (error detected), thereby providing improved visual feedback to the user.

In some embodiments, in accordance with a determination that account details are successfully detected (e.g., successfully receiving from the user device, via a short-range communication radio (e.g., NFC and/or UWB) or via a camera of the computer system), the computer system displays, via the display generation component, the particles with a fourth visual characteristic (e.g., 702a in FIG. 7L) (e.g., particles move away from each other (such as extending beyond the first area of the display) and/or are a fourth color, such as green or gray) that is different from the first visual characteristic, the second visual characteristic, and the third visual characteristic. In some embodiments, once the computer system detects that account details are successfully received, the particles animate to transition from having the first or second visual characteristic to having the fourth visual characteristic (e.g., the particles transition from forming a rectangular outline to moving away from each other, such as to appear like they are exploding away from each other (e.g., animated)). In some embodiments, in accordance with a determination that the error condition exists, the computer system displays the particles with the fourth visual characteristic, provides a tactile output, and/or provides an audio output (to indicate that account details are successfully detected). Displaying particles with a first visual characteristics provides the user with visual feedback of the state of the computer system (account details successfully received), thereby providing improved visual feedback to the user.

Note that details of the processes described above with respect to method 800 (e.g., FIG. 8) are also applicable in an analogous manner to the methods described below/above. For example, method 900 optionally includes one or more of the characteristics of the various methods described above with reference to method 800. For example, method 900 may request information as discussed above with reference to method 800. As another example, method 1200 optionally includes one or more of the characteristics of the various methods described above with reference to method 800. For example, method 1200 may provision an account using user interfaces discussed above with reference to method 800. As another example, method 1500 optionally includes one or more of the characteristics of the various methods described above with reference to method 800. For example, method 1500 may receive gift card information through the process discussed above with reference to method 800. For example, method 1800 optionally includes one or more of the characteristics of the various methods described above with reference to method 800. For example, method 1800 may receive payment accounts as discussed above with reference to method 800. For brevity, these details are not repeated below. For example, method 2000 optionally includes one or more various methods described above with reference to method 800. For example, during numeric sequence entry computer system 1900 optionally rotates one of user interface elements in response to detecting movement of computer system 1900 as described in method 800. As another example, method 800 optionally includes one or more of the various methods described below with reference to method 2010. For example, during numeric sequence entry computer system 1900 optionally rotates one of user interface elements in response to detecting movement of computer system 1900 as described in method 800. As another example, method 800 optionally includes one or more various methods described below with reference to method 2300. For example, a quantity of a first type of user interface elements as described in method 2300 may rotate in response to detecting movement of the computer system.

FIG. 9 is a flow diagram illustrating a method for requesting account information using a computer system, in accordance with some embodiments. Method 900 is performed at a computer system (e.g., 100, 300, 500, 700, 1100, 1400, 1700) that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface). Some operations in method 800 are, optionally, combined, the orders of some operations are, optionally, changed, and some operations are, optionally, omitted.

As described below, method 900 provides an intuitive way for requesting account information using a computer system. The method reduces the cognitive burden on a user for requesting account information using a computer system, thereby creating a more efficient human-machine interface. For battery-operated computing devices, enabling a user to display user interface elements and request account information using a computer system faster and more efficiently conserves power and increases the time between battery charges.

The computer system (e.g., 700) (e.g., a smartwatch, a wearable electronic device, a smartphone, a desktop computer, a laptop, or a tablet) detects (902), via one or more input devices, user input (e.g., 701c) to initiate a transaction request (e.g., a request for a loyalty account or for payment).

The computer system (e.g., 700) communicates (904) (e.g., direct and/or via NFC) with a user device (e.g., 705) (e.g., a user smartphone, smartwatch, and/or wearable electronic device).

In accordance with a determination (e.g., via communication (e.g., direct and/or NFC) with a user device) that an account (e.g., a payment account, a loyalty account, a memory account) associated with a provider (e.g., the store, a store associated with the request for payment) of the transaction request is available on the user device (e.g., 705), the computer system requests (906), from the user device, the account associated with the provider of the transaction request.

In accordance with a determination that the account associated with the provider of the transaction request is not available on the user device, the computer system forgoes requesting (908), from the user device, the account associated with the provider of the transaction request. In some embodiments, displaying a banner corresponding to the account associated with the provider of the transaction request when requesting the account. In some embodiments, also requesting payment information (e.g., account). In some embodiments, displaying the banner over a user interface for the payment request. In some embodiments, information corresponding to the account is stored on the computer system (e.g., a user is asking another user for the information (e.g., sharing a loyalty account with another user, starting a tab)). In some embodiments, requesting an account from an external device includes requesting information (e.g., an account number, an expiration date, and/or a name associated with the account) about the account.

Enabling the computer system to access accounts on the user device (e.g., reading the accounts, such as cards (e.g., payment cards), available in an electronic wallet of the user device) to request a specific account when it is available on the user device reduces the need for the user to provide additional inputs at the computer system to specify which account to request, thereby reducing the number of user inputs required to perform an operation.

In some embodiments, the transaction request is for a first type of account (e.g., a payment account, a) and the account associated with the provider of the transaction request is of a second type of account (e.g., a loyalty account) that is different from the first type of account. Enabling the computer system to request a different type of account than the user initially initiated the transaction for reduces the need for the user to provide additional inputs at the computer system to specify which account to request, thereby reducing the number of user inputs required to perform an operation.

In some embodiments, in accordance with a determination that the account associated with the provider of the transaction request is not available on the user device (e.g., the user device is not provisioned with a loyalty account particular to the provider of the transaction request, such as a merchant), the computer system requests, from the user device, the first type of account (e.g., requesting a payment account). Enabling the computer system to access accounts on the user device (e.g., reading the accounts, such as cards (e.g., payment cards), available in an electronic wallet of the user device) to request a specific account when it is available (and not request it when it is not available) on the user device reduces the need for the user to provide additional inputs at the computer system to specify which account to request, thereby reducing the number of user inputs required to perform an operation.

In some embodiments, in accordance with a determination that an account (e.g., a payment account, a loyalty account, a memory account) associated with the provider (e.g., the store, a store associated with the request for payment) of the transaction request is available on the user device, the computer system requests, from the user device, the first type of account (in addition to the account associated with the provider of the transaction request). In some embodiments, the computer system determines (e.g., based on communication with the user device) that the user device has an account that is associated with the provider of the transaction request and, as a result, the computer system requests (from the user device) information (e.g., account number, expiration dates, and/or name associated with account) about both accounts (e.g., a loyalty account and a payment account). Enabling the computer system to access accounts on the user device (e.g., reading the accounts, such as cards (e.g., payment cards), available in an electronic wallet of the user device) to request a specific account when it is available (and not request it when it is not available) on the user device reduces the need for the user to provide additional inputs at the computer system to specify which account to request, thereby reducing the number of user inputs required to perform an operation.

In some embodiments, in accordance with a determination that the transaction request is a request for non-loyalty account information (e.g., that the user of the computer system has selection an option for requesting account information from the user device that is not loyalty information, such as in a retail application) and that the user device provides (e.g., in response to a request from the computer system) loyalty account information, the computer system displays (e.g., via a banner the is displayed at the top of the display), via the display generation component, an indication (e.g., 702d) that loyalty account information was received. Providing visual feedback about the account information that was received indicates the state of the computer system to the user, thereby providing the user with improved visual feedback.

In some embodiments, in accordance with a determination that the transaction request is a request for loyalty account information (e.g., that the user of the computer system has selection an option for requesting loyalty account information from the user device, such as in a retail application) and that the user device provides (e.g., in response to a request from the computer system) loyalty account information, the computer system forgoes displaying an indication that loyalty account information was received.

In some embodiments, in accordance with a determination that the transaction request is a request for non-loyalty account information (e.g., that the user of the computer system has selection an option for requesting account information from the user device that is not loyalty information, such as in a retail application) and that the user device provides (e.g., in response to a request from the computer system) both loyalty account information and non-loyalty account information (e.g., payment information), the computer system displays, via the display generation component, an indication (e.g., 702d) (e.g., via a banner the is displayed at the top of the display) that loyalty account information was received. Providing visual feedback about the account information that was received indicates the state of the computer system to the user, thereby providing the user with improved visual feedback.

In some embodiments, in accordance with a determination that the transaction request is a request for loyalty account information (e.g., that the user of the computer system has selection an option for requesting loyalty account information from the user device, such as in a retail application) and that the user device provides (e.g., in response to a request from the computer system) non-loyalty account information (e.g., payment information) the computer system displays, via the display generation component, an error indication (e.g., based on an error condition) without transferring one or more (e.g., all or less than all) account details (e.g., account information, such as an account number, an account expiration date, and/or a name associated with the account) of the non-loyalty account information to a retailer application (e.g., an application that initiated the request, a second application, and/or not a first-party application of the computer system) of the computer system. Providing visual feedback about an error that was encountered indicates the state of the computer system to the user, thereby providing the user with improved visual feedback.

In some embodiments, in accordance with a determination that the transaction request is a request for loyalty account information (e.g., that the user of the computer system has selection an option for requesting loyalty account information from the user device, such as in a retail application) and that the user device provides (e.g., in response to a request from the computer system) both loyalty account information and non-loyalty account information (e.g., payment information), the computer system forgoes displaying, via the display generation component, an indication (e.g., via a banner the is displayed at the top of the display) that loyalty account information was received. Providing visual feedback about the account information that was received indicates the state of the computer system to the user, thereby providing the user with improved visual feedback.

In some embodiments, detecting, via one or more input devices, user input to initiate the transaction request includes detecting (e.g., via a touch-sensitive surface) activation (e.g., 701c) of (e.g., a tap at a location corresponding to) a displayed request-transaction graphical user interface element (e.g., 701a).

In some embodiments, in response to detecting user input (e.g., 701c) to initiate a transaction request, the computer system displays a request-transaction user interface (e.g., 702) of a first application (e.g., a payment application) and the request-transaction graphical user interface element (e.g., 701a) is displayed as part of a user interface (e.g., 701) of a second application (e.g., a payment processor application and/or a retailer application) that is different from the first application. Using separate applications to initiate the transaction request and to performing the transaction increases security by relying on a secure and/or known application (e.g., an application that is part of the operating system of the computer system) to perform portions of the technique that require higher levels of security.

In some embodiments, the computer system detects (e.g., while displaying the transaction user interface with the one or more elements in the second orientation) (e.g., receiving from the user device, via a short-range communication radio (e.g., NFC and/or UWB) or via a camera of the computer system) account details (e.g., account information, such as account number, account expiration date, and/or name associated with the account). In some embodiments, the computer system performs an operation using some (e.g., all of, not all of) of the account details without attempting to transfer funds (e.g., without processing a payment).

In some embodiments, the operation is a transaction lookup operation that uses some of the account details to identify (and, optionally, display details of) a previously performed transaction.

In some embodiments, the operation is a provisioning operation that uses some of the account details to provision the account onto the computer system (e.g., store details about the account at the computer system such that the computer system can, subsequently, perform transactions (e.g., transmit payment account information, such as to a contactless payment terminal)).

In some embodiments, the operation adds an amount (and/or an item or service for purchase) to a tab (e.g., FIG. 7O) (e.g., a running total of charges that an individual or group accumulates for subsequent settlement, such as a bar tab) associated with (e.g., identified using) some of the account details.

In some embodiments, the operation includes verifying account ownership based on the account details. In some embodiments, the operation is an operation other than performing a transfer of funds.

Note that details of the processes described above with respect to method 900 (e.g., FIG. 9) are also applicable in an analogous manner to the methods described below/above. For example, method 1200 optionally includes one or more of the characteristics of the various methods described above with reference to method 900. For example, method 1200 may request information to provision an account as discussed above with reference to method 800. As another example, method 1500 optionally includes one or more of the characteristics of the various methods described above with reference to method 900. For example, method 1500 may receive gift card information through the process discussed above with reference to method 900. As another example, method 1800 optionally includes one or more of the characteristics of the various methods described above with reference to method 900. For example, method 1800 may receive payment accounts as discussed above with reference to method 900. For brevity, these details are not repeated below. As another example, method 900 optionally includes one or more various methods described above with reference to method 2000. For example, computer system 1900 optionally requires entry of a numeric sequence in response to receiving a request corresponding to a transaction for a first amount as described in method 2000. As another example, method 900 optionally includes one or more of the various methods described below with reference to method 2010. For example, computer system 1900 optionally locks in response to receiving a request corresponding to a transaction as described in method 2010. As another example, method 900 optionally includes one or more various methods described below with reference to method 2300. For example, computer system 1900 optionally, in response to receiving a request corresponding to a transaction, displays a quantity of a first type of user interface elements as described in method 2300.

FIGS. 10A-10B illustrate example user interfaces for provisioning an SSH account onto a computer system, in accordance with some embodiments. The user interfaces in these figures are used to illustrate the processes described above, including the processes in FIG. 12.

At FIG. 10A, computer system 1000 displays user interface 1001 for signing into computer system 1000, wherein computer system 1000 has at least one SSH key, after computer system 1000 has completed an update (e.g., an update of the operating system of computer system 1000). Computer system 1000 receives credentials (e.g., login and/or password), as indicated by the content in the username and password fields in FIG. 10A. In response to detecting user input 1050a (e.g., tap, swipe, and/or other gesture) on sign-in user interface element 1001a, computer system 1000 confirms whether the received credentials are valid and, if the credentials are valid, computer system 1000 initiates a process to provision the SSH account onto the computer system and displays user interface 1002, as shown in FIG. 10B. At FIG. 10B, user interface 1002 is displayed on computer system 1000 which includes banner 1002a indicating that the SSH account associated with the user has automatically been set up on computer system 1000. FIG. 10B also includes computer system 1015, which is displaying notification 1015*a* indicating that the user's account has been automatically set up on computer system 1015.

FIGS. 11A-11E illustrate exemplary user interfaces for provisioning an account onto a computer system, in accordance with some embodiments. The user interfaces in these figures are used to illustrate the processes described below, including the processes in FIG. 12.

Figure 11A:
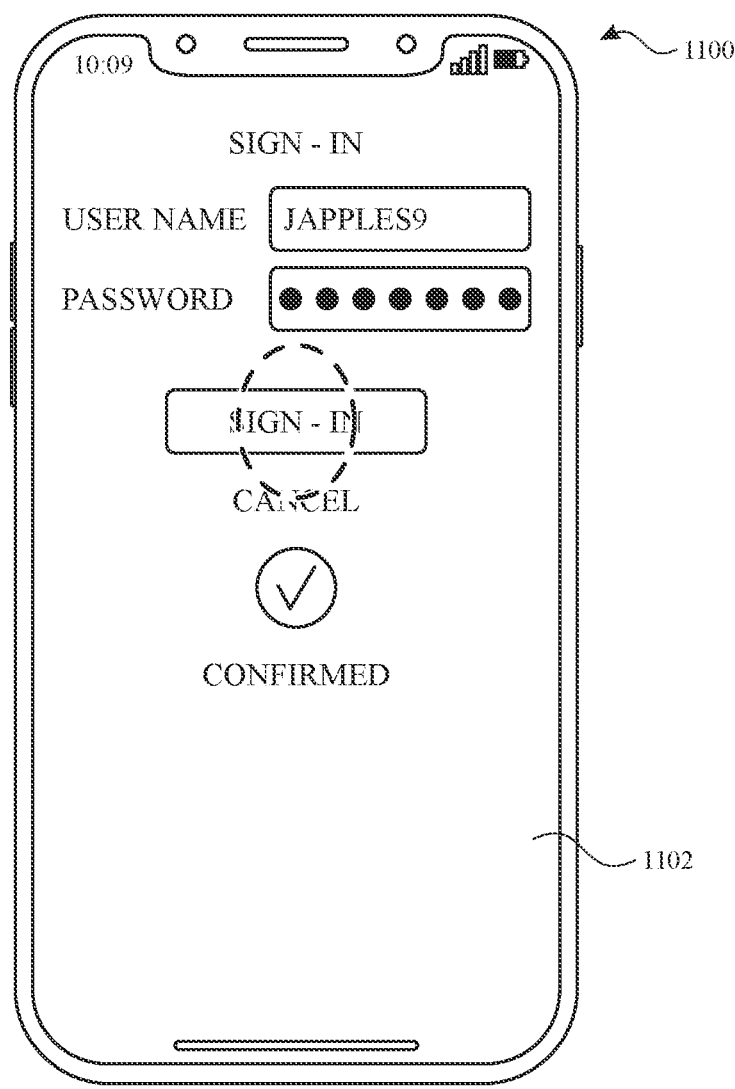
FIGS. 11A-11E illustrate exemplary user interfaces for provisioning an account onto a computer system, in accordance with some embodiments.

In FIG. 11A, computer system 1100 displays user interface 1101 for signing into a user account of computer system 1100 after computer system 1100 has completed an update (e.g., an update of the operating system of computer system 1100). Computer system 1100 receives credentials (e.g., login and/or password) for the user account, as indicated by the content in the username and password fields in FIG. 11A. In response to detecting user input 1101*b* (e.g., tap, swipe, and/or other gesture) on sign-in user interface element 1101*a*, computer system 1100 confirms whether the received credentials are valid and, if the credentials are valid, computer system 1100 displays user interface 1102, as shown in FIG. 11B.

After (e.g., in response to) detecting that the user has successfully signed into computer system 1100 after computer system 1100 has completed an update (e.g., a software update and/or an update to the operating system of computer system 1100), computer system 1100 determines whether a set of provisioning criteria are met. In some embodiments, the set of provisioning criteria is met when all criteria of the set of provisioning criteria are met. In some embodiments, the set of provisioning criteria includes a criterion that is met when an account (e.g., a payment account, a value storage account, a loyalty account, and/or an identification account) associated with the user account (e.g., corresponding to the login/password) exceeds a threshold amount (e.g., exceeds 0, exceeds 100) or includes a balance (e.g., includes some funds). In some embodiments, the set of provisioning criteria includes a criterion that is met when the account associated with the user account has not previously been removed from computer system 1100. For example, if the account was previously provisioned onto computer system 1100 and then removed (e.g., was not provisioned onto computer system 1100 when the update was initiated at computer system 1100), then the account will not be automatically provisioned on computer system 1100 because the user has indicated they do not want the account to be provisioned onto computer system 1100.

When the set of provisioning criteria is met (e.g., the account is carrying a balance), then computer system 1100 provisions the account associated with the user account onto computer system 1100 so that the account may be used in conjunction with computer system 1100. For example, computer system 1100 can automatically provision a payment account associated with the user account based on the set of provisioning criteria being met such that the user may utilize the payment account (e.g., make NFC payments and/or transmit payment account information) soon after the update without needing to manually provision the payment account (e.g., without providing details that are specific to the payment account and/or without entering an account number of the payment account). In some embodiments, in response to detecting that the user has successfully signed into computer system 1100 and in accordance with a determination that the set of provisioning criteria is met, computer system 1100 proceeds to provision the account onto computer system 1100 without requiring and/or receiving further user input. In some embodiments, the set of provisioning criteria includes a update criterion that is met when a software (e.g., operating system and/or wallet application) of the computer system has been upgraded. When the set of provisioning criteria is not met, the computer system forgoes automatically provisioning the account onto computer system 1100.

Figure 11B:
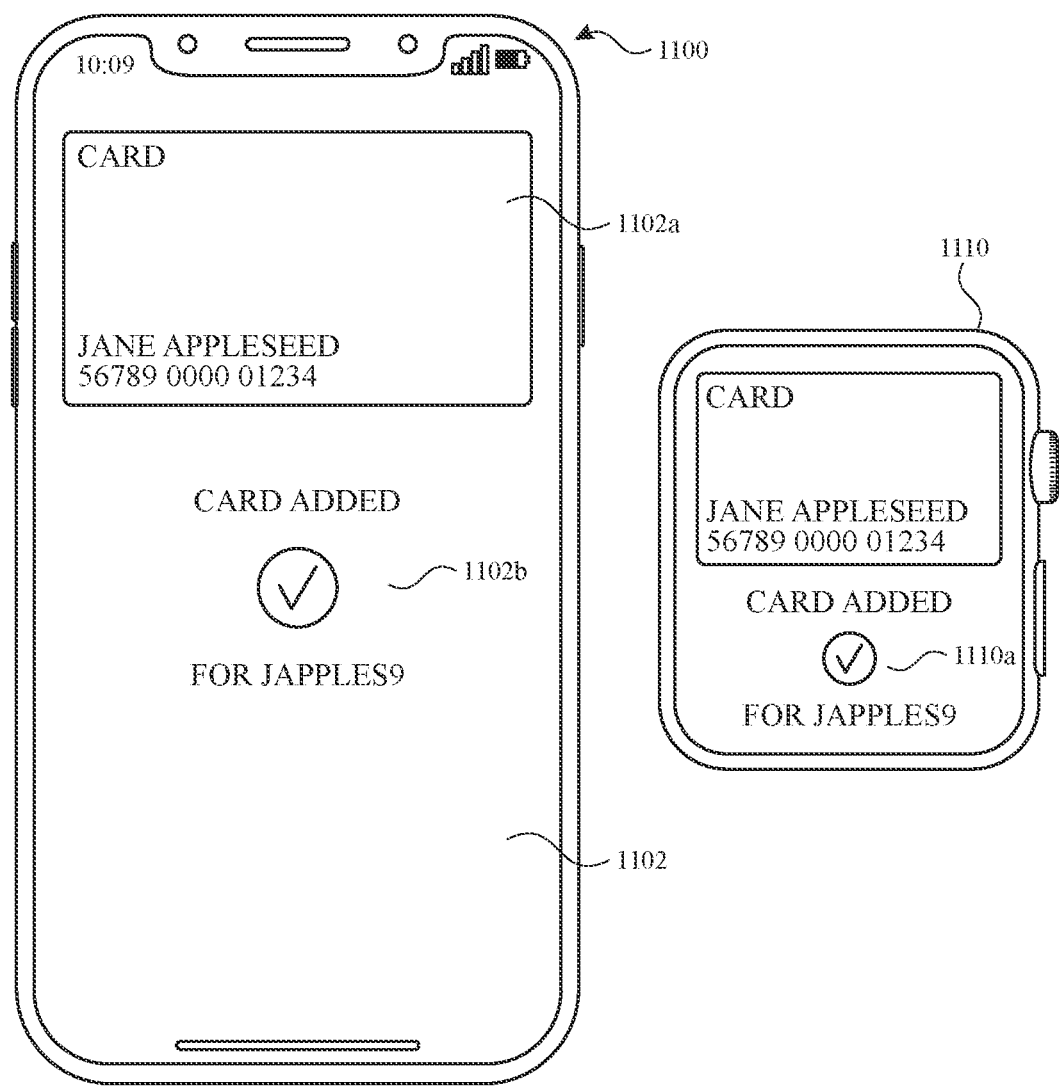

In FIG. 11B, user interface 1102 is displayed providing a notification to the user that the account (e.g., a payment account) has been automatically provisioned on computer system 1100. User interface 1102 includes virtual card 1102*a* which indicates the account that was provisioned onto computer system 1100 and text 1102*b* indicating to the user that the account was provisioned successfully.

In some embodiments, the user may have another computer system (e.g., a phone, watch, tablet, or computer) associated with (e.g., paired to and/or in a special paired relationship with) computer system 1100. Accordingly, the account associated with the user account is also automatically provisioned on the secondary computer system when the set of provisioning criteria is met (e.g., once the set of provisioning criteria is met (and therefore the account will be provisioned onto computer system 1100), computer system 1100 initiates a process to provision the same account onto the secondary computer system). In some embodiments, in accordance with a determination that the set of provisioning criteria is met and that an associated external computer system has also recently been updated, computer system 1100 initiates the process to provision the account onto the secondary computer system. In some embodiments, in accordance with a determination that the set of provisioning criteria is met (or not met) and that an associated external computer system has not recently been updated, computer system 1100 forgoes initiating the process to provision the account onto the secondary computer system. In FIG. 11B secondary computer system 1110, which is associated with computer system 1100, is also illustrated. Computer system 1110 is displaying user interface 1110*a* providing a notification to the user that the account associated with the user account has been automatically provisioned onto computer system 1110. In some embodiments, the provisioning of the account on computer system 1110 is initiated by computer system 1100 when the set of provisioning criteria is met. In some embodiments, provisioning the account onto a respective computer system includes storing information about the account (e.g., a primary account number, an account number, an expiration date, and/or a name of the user associated with the account) in a secure element of the respective computer system. The respective computer system subsequently (e.g., in response to authentication/authorization) releases (e.g., transmits via short-range communication radio, via NFC, and/or via UWB) account details (e.g., payment account details, loyalty account details) of the account to participate in a transaction (e.g., a payment transaction or a loyalty transaction).

Figure 11C:
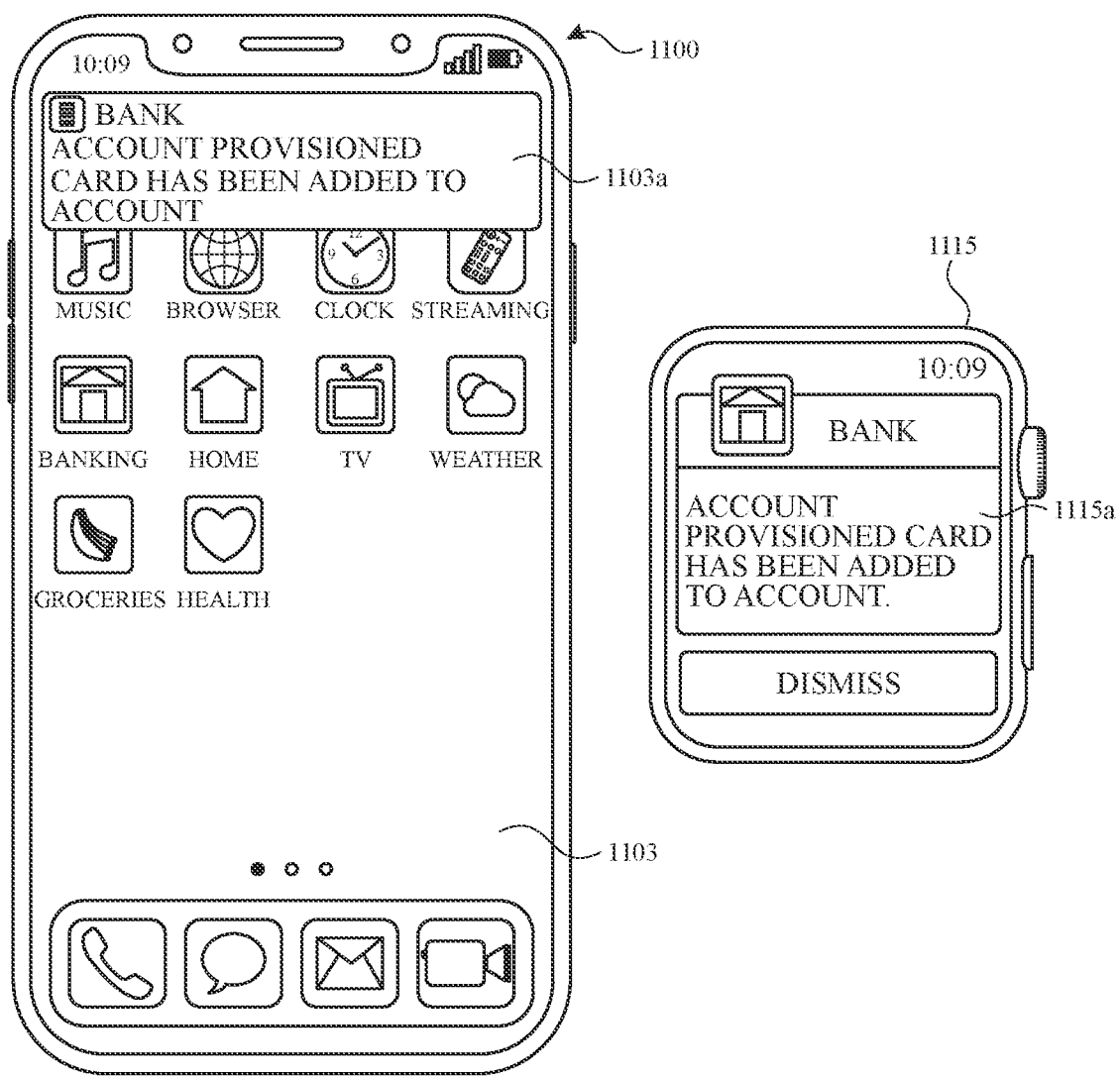

In FIG. 11C, user interface 1103 is displayed on computer system 1100 which includes banner 1103*a* indicating that the account associated with the user has been provisioned on computer system 1100. Banner 1103*a* is displayed over a home user interface and includes the text "Account Provisioned card has been added to account" to notify the user that their account has been automatically provisioned on computer system 1100. By providing banner 1103*a* rather than user interface 1102 discussed above with regard to FIG. 11B the user may see and access other applications of the device while also being notified about the provision of their account. For example, the provisioning process is initiated and proceeds in the background while computer system 1100 and/or 1110 are accessed by the user. Once the provisioning process is complete for a respective computer system, the respective computer system provides a notification (e.g., 1103, 1115a) indicating that the account has been provisioned onto the respective computer system. Accordingly, the respective computer system can be used for other purposes while the provisioning process progresses and the user is notified of the completion of the provisioning process.

FIG. 11C also includes computer system 1115 which is displaying notification 1115a indicating that the user's account has been automatically provisioned to computer system 1115. The user may dismiss notification 1115a by providing a touch input (e.g., tap) on the button labeled dismiss or by providing a swipe down or up to display other notifications being provided by computer system 1115.

Figure 11E:
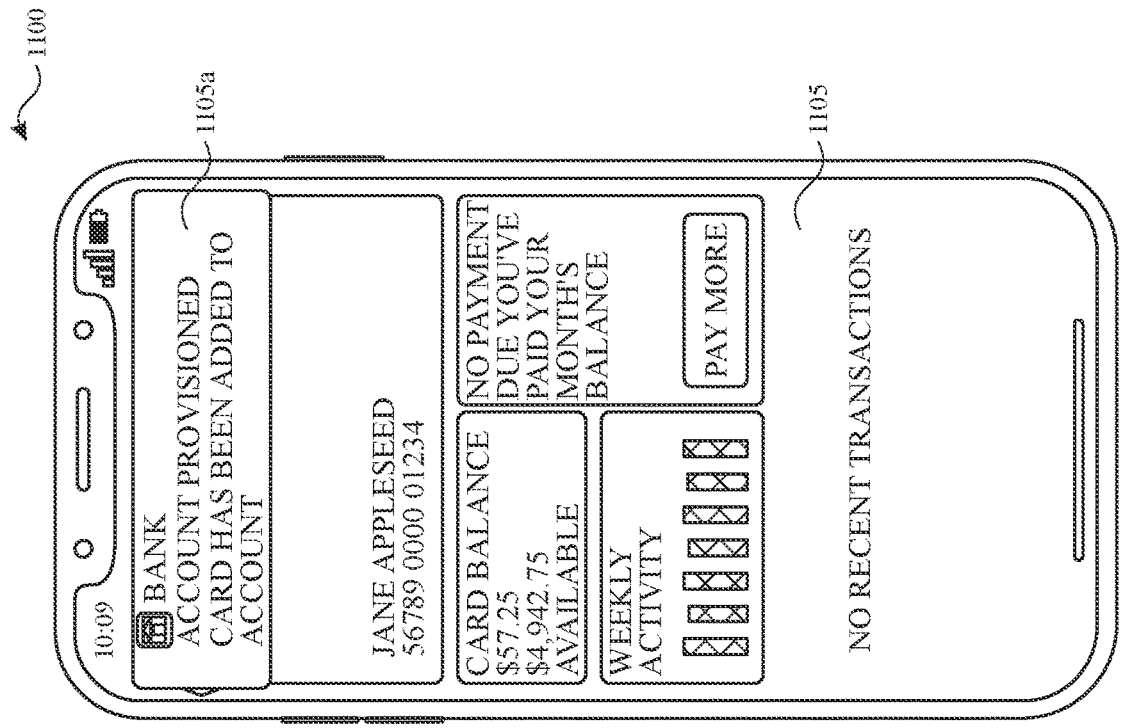
Figure 11D:
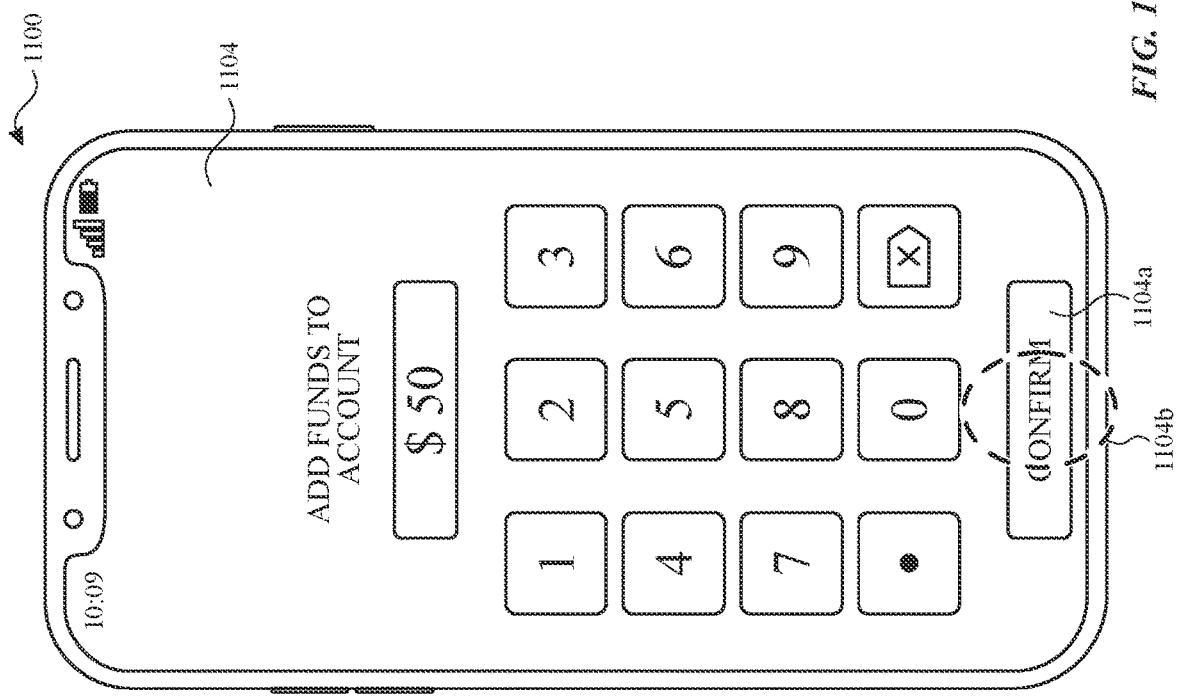

FIGS. 11D-11E illustrate exemplary user interfaces for a technique where the account associated with the user account is provisioned onto computer system 1100 based on a request to add funds to the account associated with the user account. In FIG. 11D, computer system 1100 displays user interface 1104 for adding funds to the account associated with the user account (e.g., in response to user input requesting to display a user interface for adding funds). In some embodiments, the account associated with the user account was not previously automatically provisioned onto computer system 1100 after computer system 1100 completed an updated (e.g., because the account did not have a balance/funds at that time). Accordingly, computer system 1100 receives a request to add funds to the account associated with the user account using user interface 1104 (e.g., of a payment application) via user input 1104b on (e.g., a tap on and/or selection of) user interface element 1104a.

In response to detecting user input 1104b, computer system 1100 adds the funds to the account associated with the user account and displays user interface 1105, as shown in FIG. 11E. User interface 1105 provides the user with information about the account, such as the available funds on the account. In response to detecting user input 1104b, computer system 1100 determines whether a second set of provisioning criteria is met (e.g., that the account associated with the user account was not previously deprovisioned from computer system 1100 and/or that the account is not already provisioned onto computer system 1100). In accordance with a determination that the second set of provisioning criteria is met, computer system 1100 automatically provisions (or initiates a process to provision) the account onto computer system 1100 so that the user can utilize the account using computer system 1100 (e.g., via payments and/or loyalty transactions; using NFC and/or UWB). After automatically provisioning (or initiating the process to provision), in accordance with a determination that the account associated with the user account has been provisioned onto computer system 1100, computer system 1100 displays banner 1105a indicating that the account associated with the user has been provisioned on computer system 1100, as shown in FIG. 11E. In accordance with a determination that the account associated with the user account has not (e.g., yet) been provisioned onto computer system 1100, computer system 1100 forgoes displaying banner 1105a. Accordingly, the account associated with the user account is provisioned on computer system 1100 in response to the user adding funds to the account, thereby enabling easy use of the account on computer system 1100.

In some embodiments, in accordance with a determination that the second set of provisioning criteria is not met, computer system 1100 forgoes automatically provisioning (or initiating the process to provision) the account associated with the user account onto computer system 1100, computer system 1110, or computer system 1115.

In some embodiments, after the account has been provisioned onto computer system 1100, computer system 1110, and/or computer system 1115, an option is provided (e.g., at computer system 1100, 1110, and/or 1115) to remove the account from one or more of computer system 1100, computer system 1110, and/or computer system 1115. In response to receiving user input selecting the option to remove the account from one or more of computer system 1100, computer system 1110, and/or computer system 1115 a process is initiated to remove the account from the selected computer system.

In some embodiments, after removing the account from one or more of computer system 1100, computer system 1110, and/or computer system 1115 a setting user interface is displayed and a user input to provision the account onto one or more of computer system 1100, computer system 1110, and/or computer system 1115 is received. In response to receiving the user input to provision the account associated with the user, a process is initiated to provision the account on the selected computer system. Thus, computer system 1100 (and, optionally, computer systems 1110, 1115) enable the user to manually remove and/or add the account (and other payment, loyalty, and/or transaction accounts) to computer system 1100 (and, optionally, 1110 and 1115).

In some embodiments, the account associated with the user account is a stored-value account to which funds can be transferred and from which funds can be used to make payments. In some embodiments, a gift card can be redeemed to add funds to the account. In some embodiments, a visual representation (e.g., 1102a of FIG. 11B) of the account is based on a most recently redeemed gift card and is displayed on one or more of computer system 1100, computer system 1110, and/or computer system 1115. For example, the visual representation of the account can include an image, a background color, and/or other visual elements based on an image, a background color, and/or other visual elements of the redeemed gift card.

FIG. 12 is a flow diagram illustrating a method for provisioning an account onto a computer system in accordance with some embodiments. Method 1200 is performed at a computer system (e.g., 100, 300, 500, 700, 1100, 1400, 1700) (e.g., a smartwatch, a wearable electronic device, a smartphone, a desktop computer, a laptop, or a tablet) (e.g., that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface)). Some operations in method 1200 are, optionally, combined, the orders of some operations are, optionally, changed, and some operations are, optionally, omitted.

As described below, method 1200 provides an intuitive way for provisioning an account onto a computer system. The method reduces the cognitive burden on a user provisioning an account onto a computer system, thereby creating a more efficient human-machine interface. For battery-operated computing devices, enabling a user to provision an account onto a computer system faster and more efficiently conserves power and increases the time between battery charges.

In response to detecting (1202) a sign-in (e.g., as in FIG. 11A) of a user account after a software update (e.g., an update of the operating system, update of a payment application) and in accordance with a determination that a first set of provisioning criteria are met, including a first provisioning criterion that is met when an account (e.g., a payment account, a memory storage account) associated with the user account exceeds a threshold amount (e.g., exceeds a balance of zero, exceeds a balance of one hundred, exceeds a balance of one thousand), the computer system (e.g., 1100) (e.g., a smartwatch, a wearable electronic device, a smartphone, a desktop computer, a laptop, or a tablet) initiates (1204) a process to provision (e.g., assigning the account, making the account available for use) the account onto the computer system. In some embodiments, the computer system forgoes initiating the process to provision the account onto the computer system (e.g., even if the first set of provisioning criteria are met) when the detected sign-in of the user account is not after (e.g., is not the first sign-in of that user's account on the computer system after) a software update. Automatically initiating a process to provision an account onto a computer system after a software update when the first set of provisioning criteria are met reduces the need for the user to provide input to provision the account, thereby reducing the number of inputs needed to perform an operation and performing an operation when a set of conditions has been met without requiring further user input.

In response to detecting (1202) a sign-in of a user account after a software update and in accordance with a determination that the first set of provisioning criteria are not met (e.g., the account associated with the user account does not exceed a threshold amount), the computer system forgoes (1206) initiating the process to provision the account onto the computer system. In some embodiments, the sign-in of the user account after the software update is the first sign-in of the user account since the software update has been installed.

In some embodiments, in response to detecting the sign-in (e.g., as in FIG. 11A) of the user account after the software update and in accordance with the determination that first set of provisioning criteria are met, the computer system initiates a process to provision (e.g., assigning the account, making the account available for use) the account onto an external device (e.g., 1110) (e.g., a smart watch or a laptop computer). In some embodiments, the set of provisioning criteria includes a paired criterion that is met when the computer system is paired to (and, optionally, in communication with) an external device. In some embodiments, the same user account is logged into both the computer system and the external device. Automatically initiating a process to provision an account onto an external device of the user after a software update when the first set of provisioning criteria are met reduces the need for the user to provide input to provision the account, thereby reducing the number of inputs needed to perform an operation and performing an operation when a set of conditions has been met without requiring further user input.

In some embodiments, the first set of provisioning criteria includes a second criterion that is met when the account (e.g., a payment account, a memory storage account) associated with the user account has not previously been removed from the computer system. In some embodiments, prior to the software update and while the account associated with the user account is provisioned onto the computer system, the computer system receives user input to remove (deprovision) the account associated with the user account from the computer system. In response to receiving the user input to remove the account associated with the user account from the computer system, the computer system removes (deprovisions) the account associated with the user account from the computer system. Subsequently, the computer system does not automatically provision the account associated with the user account onto the computer system, even in response to detecting a sign-in of the user account after the software update. Forgoing automatically initiating a process to provision the account onto the computer system when the user has previously removed the account prevents the account from being provisioned on the computer system when the user has made intentional inputs to remove the account from the computer system, thereby reducing the need (and inputs) for the user to again remove the account from the computer system.

In some embodiments, subsequent to (e.g., in response to) provisioning (e.g., assigning the account, making the account available for use) the account onto the computer system, the computer system provides a notification (e.g., 1102a, 1103a) (e.g., displaying a visual notification via a display generation component, providing an audio notification via a speaker of the computer system, and/or providing a tactile notification via tactile output) that the account has been provisioned onto the computer system (e.g., 1100). Providing a notification that the account has been provisioned provides the user with feedback about the state of the computer system.

In some embodiments, the computer system receives (e.g., subsequent to the software update, prior to the software update) user input (e.g., 1104b) authorizing adding funds to the account associated with the user account. In some embodiments, in response to receiving user input authorizing adding funds to the account associated with the user account and in accordance with a determination that a second set of provisioning criteria are met, including a criterion that is met when the account associated with the user account is not provisioned onto the computer system, the computer system provisions the account onto the computer system. In some embodiments, when the account associated with the user account is already provisioned onto the computer system, the second set of provisioning criteria is not met and the computer system forgoes provisioning the account onto the computer system. Automatically initiating a process to provision the account onto a computer system (e.g., regardless of whether it is after a software update) when the second set of provisioning criteria are met reduces the need for the user to provide input to provision the account, thereby reducing the number of inputs needed to perform an operation and performing an operation when a set of conditions has been met without requiring further user input.

In some embodiments, wherein the second set of provisioning criteria includes a criterion that is met when the account (e.g., a payment account, a memory storage account) associated with the user account has not previously been removed from the computer system. In some embodiments, while the account associated with the user account is provisioned onto the computer system, the computer system receives user input to remove (deprovision) the account associated with the user account from the computer system. In response to receiving the user input to remove the account associated with the user account from the computer system, the computer system removes (deprovisions) the account associated with the user account from the computer system. Subsequently, the computer system does not automatically provision the account associated with the user account onto the computer system, even in response to detecting user input authorizing adding funds to the account associated with the user account. Forgoing automatically initiating a process to provision the account onto the computer system when the user has previously removed the account prevents the account from being provisioned on the computer system when the user has made intentional inputs to remove the account from the computer system, thereby reducing the need (and inputs) for the user to again remove the account from the computer system.

In some embodiments, subsequent to provisioning the account associated with the user account onto the computer system (e.g., automatically provisioning in response to receiving user input authorizing adding funds to the account associated with the user account and/or automatically provisioning in response to detecting the sign-in of the user account after the software update), the computer system provides (e.g., displaying, via the display generation component) an option to remove the account from the computer system. In some embodiments, the computer system receives (e.g., while providing the option to remove the account from the computer system) user input selecting the option to remove the account from the computer system. In some embodiments, in response to receiving user input selecting the option to remove the account from the computer system, the computer system initiates a process to remove (deprovision) the account from the computer system. Enabling the user to manually initiate a process to remove the account from the computer system allows the computer system to free up memory, thereby improving the performance of the computer system.

In some embodiments, subsequent to removing the account from the computer system, the computer system displays a settings user interface. In some embodiments, while displaying the settings user interface, the computer system receives user input to provision the account associated with the user account onto the computer system. In some embodiments, in response to receiving user input to provision the account associated with the user account onto the computer system, initiating a process to provision the account onto the computer system. Enabling the user to manually initiate a process to provision the account onto the computer system allows the computer system to use the account in future transactions, thereby improving the capabilities of the computer system.

In some embodiments, the computer system displays (e.g., as part of an electronic wallet of the computer system and/or after provisioning the account onto the computer system) a visual representation (e.g., the "Jane Appleseed" card as in FIG. 11E) of the account that is associated with the user account, wherein the visual representation includes a graphical visual element (e.g., an image, a logo, and/or a background color) that is based on a most recently redeemed gift account (e.g., redeemed gift card and/or redeemed value from a gift account). In some embodiments, the graphical visual element is not an indication of quantity or funds. In some embodiments, the computer system receives user input to access an electronic wallet of the computer system. The electronic wallet includes a visual representation of the newly provisioned account. In some embodiments, the visual representation of the newly provisioned account includes an image, logo, visual style, and/or background color that is based on (e.g., matches) that of a most recently redeemed gift account (e.g., same image, same logo, same style, and/or same background color). Displaying a visual representation of an account (e.g., based on a most recently redeemed gift card) provides the user with visual feedback about the account, such as how it was most recently funded, thereby providing improved visual feedback to the user.

Note that details of the processes described above with respect to method 1200 (e.g., FIG. 12) are also applicable in an analogous manner to the methods described below/above.

For example, method 1500 optionally includes one or more of the characteristics of the various methods described above with reference to method 1200. For example, method 1500 may automatically provision a gift card through the process discussed above with reference to method 1200. As another example, method 1800 optionally includes one or more of the characteristics of the various methods described above with reference to method 1200. For example, method 1800 may provision payment accounts as discussed above with reference to method 1200. For brevity, these details are not repeated below. As another example, method 1500 optionally includes one or more various methods described below with reference to method 2000. For example, computer system 1900 optionally requires entry of a numeric sequence in response to detecting a sign-in of a user account as described in method 1500. As another example, method 1500 optionally includes one or more of the various methods described below with reference to method 2010. For example, computer system 1900 optionally locks in response to detecting a sign-in of a user account as described in method 2010. As another example, method 1500 optionally includes one or more various methods described below with reference to method 2300. For example, computer system 1900 optionally, in response to detecting a sign-in of a user account, displays a quantity of a first type of user interface elements as described in method 2300.

FIGS. 13A-13B illustrate exemplary user interfaces for adding data from a data plan to an account, in accordance with some embodiments. The user interfaces in these figures are used to illustrate the processes described above, including the processes in FIG. 15.

At FIG. 13A, computer system 1300 displays camera user interface 1301. One or more cameras of computer system 1300 have been directed towards data plan card 1302 (a physical data plan card) such that data card 1302 is in a field-of-view of the one or more cameras and is being displayed in camera user interface 1301. In response to detecting a QR code of data card 1302, computer system 1300 displays balance element 1301a overlaid on camera user interface 1301. Computer system 1300 detects user input 1350a corresponding to a request to transfer the data plan balance to the balance of the user account. At FIG. 13B, computer system 1300 displays user interface 1303. User interface 1303 includes data plan summary 1303a and data plan summary 1303b. In some embodiments, computer system 1300 detects user input 1350c (e.g., a tap or a tap-and-hold) on individual and recurring transaction button 1303d indicating that the user wants to add the data card balance to their account for use with both individual (e.g., downloading an app and/or visiting a website) and recurring downloads (e.g., updating an app and/or updating an email inbox). In response to receiving user input 1350c on individual and recurring downloads button 1303d, the data plan card balance is identified as being available for use for both individual downloads and recurring downloads and is, optionally (e.g., without receiving further user inputs or based on additional user inputs), added to the user's data balance and can be used for any download, individual or recurring. In some embodiments, computer system 1300 detects user input 1350b on individual downloads button 1303c. In response to receiving user input 1350b on individual downloads button 1303c, the data plan card balance is identified as being available for use for individual downloads (and not available for use for recurring downloads) and is, optionally (e.g., without receiving further user inputs or based on additional user inputs), added to the user's data balance and can be used for individual downloads.

FIGS. 14A-14F illustrate exemplary user interfaces for adding funds from a gift card to an account (e.g., an account associated with a user account, as described with respect to FIGS. 11A-11E), in accordance with some embodiments. The user interfaces in these figures are used to illustrate the processes described below, including the processes in FIG. 15.

FIG. 14A includes computer system 1400 which is displaying camera user interface 1401. One or more cameras of computer system 1400 have been directed towards gift card 1402 (a physical gift card) such that gift card 1402 is in a field-of-view of the one or more cameras. Thus, an image 1401c of gift card 1402 is being captured by the one or more cameras of computer system 1400 and is being displayed in camera user interface 1401 (e.g., in a viewfinder of a camera application). In response to detecting a QR code of gift card 1402, computer system 1400 displays balance element 1401a overlaid on camera user interface 1401 and, optionally, on image 1401c of the gift card. In some embodiments, balance element 1401a is displayed adjacent to QR code 1401d. In some embodiments, as gift card 1402 and computer system 1400 move with respect to each other, causing image 1401c of gift card 1402 to also move on the display, computer system 1400 updates the display location of balance element 1401a such that balance element 1401a remains displayed adjacent to QR code 1401d, thereby informing the user that the information of displayed as part of balance element 1401a corresponds to information gathered based on the QR code. Balance element 1401a shows the balance of gift card 1402 and/or the balance of the account (e.g., a payment account) associated with the user account. Balance element 1401a provides information to the user to make a decision on whether to add the gift card balance to the balance of their account. When the user decides to add the gift card balance to their account, the user provides input 1401b (e.g., a tap or a tap-and-hold) on balance element 1401a displayed in camera user interface 1401.

In response to receiving user input 1401b, computer system 1400 displays user interface 1403 for adding the gift card balance in FIG. 14B. User interface 1403 provides the user with different options for adding the gift card balance to their account, including a first option for adding the gift card balance for use with individual transactions (e.g., because the user wants to ensure that their gift card balance is used towards a one-time purchase that they select as a gift) and a second option for adding the gift card balance for use with individual and recurring transactions (e.g., because the user prefers to use the balance from the gift card for all of their purchases). The second option allows the user to specify that the added balance can be used for recurring (e.g., monthly or weekly) transactions such as streaming, gaming, or music services and individual transactions like purchasing a single game or movie or just for the individual transactions.

User interface 1403 includes card representation 1403a, balance element 1403b, individual transaction button 1403c, and individual and recurring transaction button 1403d. Card representation 1403a includes a picture or graphical representation of gift card 1402, retrieved based on the QR code that was scanned using camera user interface 1401. Balance element 1403b includes the same information provided in camera user interface 1401 including, optionally, the balance of the gift card to be added and the current balance of the account (e.g., payment account) associated with the user (to which the balance of the gift card will be added).

In some embodiments, computer system 1400 receives user input 1403e (e.g., a tap or a tap-and-hold) on individual transaction button 1403c indicating that the user wants to add the gift card balance to their account for use with individual transactions. In response to receiving user input 1043e on individual transaction button 1403c the balance of the gift card balance is identified as being preserved for use with individual transactions and not for use with recurring transactions and is, optionally (e.g., without receiving further user inputs or based on additional user inputs), added to the user's account balance (while being preserved for use with individual transactions and not for recurring transactions). Thus, the fifty dollar gift card balance that is added to the user's account will not be used for the next recurring transaction or other recurring transactions that pull funds from the user's account.

After (e.g., in response to) adding the gift card balance for use with individual transactions, computer system 1400 displays confirmation interface 1404 as shown in FIG. 14C. Confirmation 1404a provides text to the user indicating that the gift card balance has been added for use with individual transactions.

Returning to FIG. 14B, in some embodiments, computer system 1400 receives user input 1403f (e.g., a tap or a tap-and-hold) on individual and recurring transaction button 1403d indicating that the user wants to add the gift card balance to their account for use with both individual transactions and recurring transactions. In response to receiving user input 1403f on individual and recurring transaction button 1403d, the gift card balance is identified as being available for use for both individual transactions and recurring transactions and is, optionally (e.g., without receiving further user inputs or based on additional user inputs), added to the user's account balance and can be used for any transaction, individual or recurring. Thus, the fifty dollar gift card balance that is added to the user's account can be accessed when the next request to pull funds from the user's account is received, regardless of the type of transaction (e.g., recurring or not recurring transaction).

After (e.g., in response to) adding the gift card balance for use with individual and recurring transactions, computer system 1400 displays confirmation interface 1405 as shown in FIG. 14D. Confirmation 1405a provides text to the user indicating that the gift card balance has been added for use with both individual transactions and recurring transactions (in other words, but recurring and non-recurring transactions).

In some embodiments, computer system 1400 receives an instant message (e.g., a text message, an SMS message, and/or an MMS message) from another user sending a gift card (or gift amount) to the user of computer system 1400. In response to receiving the instant message, computer system 1400 notification 1406a, as part of user interface 1406 as shown in FIG. 14E, corresponding to the instant message received from another user which includes a gift card (or gift amount) with an optional indication of the value of the amount (e.g., for fifty dollars). In some embodiments, computer system 1400 receives user input 1406b (e.g., a tap, a tap-and-hold) on notification 1406a corresponding to the instant message.

Figure 14F:
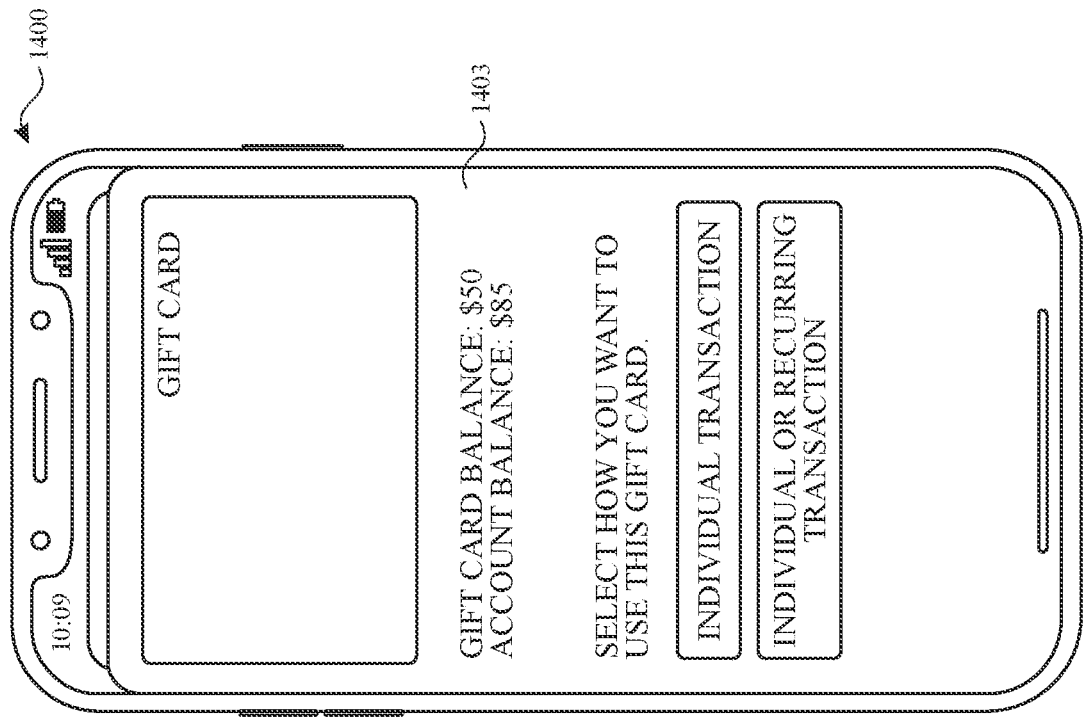
Figure 14E:
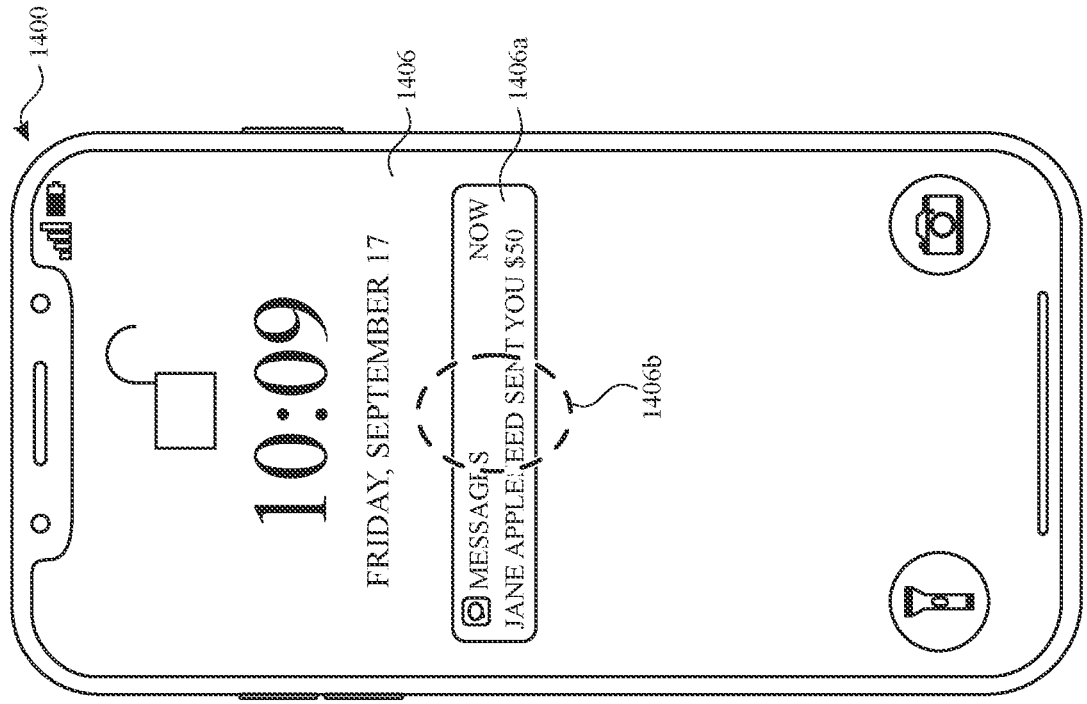

After (e.g., in response to) detecting user input 1406b on notification 1406a (e.g., when computer system 1400 is in an unlocked state), computer system 1400 displays user interface 1403 for adding the gift card balance to the user's account, as shown in FIG. 14F. As discussed above with regard to FIG. 14B, user interface 1403 provides the user with options on how to add the gift card balance including a first option to add the balance for use for individual transactions (and not for recurring transactions) and a second option to add the balance for use for both individual and recurring transactions.

In some embodiments, subsequent to adding the gift card balance to the user's account, a first authorized request is made to the user's account to make a payment for an individual (not recurring) transaction and, in response, the gift card funds are available for the transaction regardless of whether the gift card funds were added with the first option (individual transactions) or the second option (individual and recurring transactions). In some embodiments, subsequent to adding the gift card balance to the user's account, a second authorized request is made to the user's account to make a payment for a recurring transaction (e.g., a monthly music subscription payment, a monthly gym membership payment, a yearly video streaming service payment) and, in response, the gift card funds are available for the transaction if the gift card funds were added with the second option (individual and recurring transactions), but the gift card funds are not available for the transaction if the gift card funds were added with the first option (individual transactions), though other funds of the account are available (e.g., funds previously added without being limited for use with individual transactions). Accordingly, the user can specify whether funds added to an account should be preserved for use for only individual transactions or whether the funds added to the account should be used for both recurring and non-recurring transactions).

FIG. 15 is a flow diagram illustrating a method for adding funds from a gift card to an account in accordance with some embodiments. Method 1500 is performed at a computer system (e.g., 100, 300, 500, 700, 1100, 1400, 1700) that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface). Some operations in method 1500 are, optionally, combined, the orders of some operations are, optionally, changed, and some operations are, optionally, omitted.

As described below, method 1500 provides an intuitive way for associating a transfer amount with an account. The method reduces the cognitive burden on a user adding funds from, for example, a gift card to an account, thereby creating a more efficient human-machine interface. For battery-operated computing devices, enabling a user add funds from a gift card to an account faster and more efficiently conserves power and increases the time between battery charges.

The computer system (e.g., 1400) (e.g., a smartwatch, a wearable electronic device, a smartphone, a desktop computer, a laptop, or a tablet) receives a request (e.g., 1401*b*) (e.g., a request for memory allocation or a request for payment) to associate a transfer amount (e.g., allocated memory, data, a balance, and/or funds) with an account (e.g., a user account and/or a payment account).

The computer system displays (e.g., in response to receiving the request) a first user interface element (e.g., 1403*d*) associated with a recurring transaction (e.g., a subscription payment plan) and an individual transaction (e.g., one time transaction) and a second user interface element (e.g., 1403*c*) associated with an individual transaction and not associated with a recurring transaction.

In response to receiving user input (e.g., tapping on the first user interface element or the second user interface element, tapping on the first user interface element or the second user interface element and tapping another affordance (e.g., go, next)) and in accordance with a determination that the user input (e.g., 1403*f*) corresponds to a selection of the first user interface element (e.g., 1403*d*), the computer system configures (e.g., assigning, and/or setting up for use) the transfer amount for use with recurring transactions and individual transactions.

In response to receiving user input and in accordance with a determination that the user input (e.g., 1403*e*) corresponds to a selection of the second user interface element (e.g., 1403*c*), the computer system configures the transfer amount for use with individual transactions without configuring the transfer amount for use with recurring transactions.

Configuring the transfer amount (e.g., funds from a gift card) for use with individual transactions enables the computer system to automatically forgo using the transfer amount for recurring transactions (even in response to a request for funds (of a recurring transaction) from the account with which the transfer amount has been associated (e.g., transferred to), therefore enabling the computer system to save the transfer amount for later use for an individual purchase (a non-recurring transaction) directed by the user of the account, thereby reducing the need for the user to provide input for each transaction (e.g., recurring transaction) to indicate that the transfer amount should not be used.

In some embodiments, a user receives a gift card from an acquittance that includes a certain amount of funds. When transfer the funds from the gift card to their account, the user can specify whether these funds can be used for recurring transactions. If the user selects to make these funds available for use for recurring transactions, recurring transactions (even if initially initiated prior to transferring the funds from the gift card to the user's account) can be settled using funds from the gift card. If the user selects to not make these funds available for use for recurring transactions, recurring transactions cannot be settled using funds from the gift card, thereby enabling the user to subsequently separately identify an item (e.g., a software, a game, and/or an electronic device) to purchase using the funds without worry that the funds will be used for recurring transactions. Accordingly, the user can recognize that the item was purchased using the funds from the gift card, rather than merely having those funds used to make a payment toward a service (with recurring billing) that was initiated prior to (or after) receiving the gift card.

In some embodiments, receiving the request (e.g., a request for memory allocation or a request for payment) to associate the transfer amount (e.g., allocated memory, data, a balance, and/or funds) with an account includes receiving information (e.g., a QR Code corresponding to funds, an account number of an account providing the transfer amount, a PIN, and/or a verification code) about the transfer amount using a camera of the computer system (e.g., as in FIG. 14A). In some embodiments, receiving the request (e.g., a request for memory allocation or a request for payment) to associate the transfer amount includes detecting activation of (e.g., a tap input on or a tap-and-hold input on) a notification displayed concurrently with a representation of a code (e.g., a QR code, a barcode). Using a camera of the computer system to detect information about the transfer amount (e.g., reading a QR code and, optionally, communicating with a server to determine the transfer amount based on the QR code) enables the computer system to access information about the transfer amount and to display the information without requiring additional user input, thereby reducing the number of inputs needed to perform an operation.

In some embodiments, the computer system concurrently displays, via a display generation component a camera viewfinder (e.g., 1401) (e.g., as part of a camera application confirmed to capture images and/or video and/or that includes a field-of-view of one or more cameras of the computer system) of a camera, wherein the camera viewfinder (e.g., 1401) includes a representation of a code (e.g., 1401d) (e.g., a QR code and/or a barcode) in the field-of-view of the camera and a notification (e.g., 1401a) that includes a current available transfer amount (e.g., $50 as in FIG. 14A) (e.g., current amount of funds, current amount of memory) corresponding to the code. In some embodiments, the computer system detects the code via the camera and communicates with a remove computer, such as a server, to determine the current available transfer amount associated with the code. For example, the computer system reads the QR code (e.g., which includes a gift card number) and communicates information from the QR code (e.g., the gift card number) to a server. The service provides the amount of available funds associated with the gift card, and the amount of available funds is displayed concurrently with the code. Using a camera of the computer system to detect information about the transfer amount (e.g., reading a QR code and, optionally, communicating with a server to determine the transfer amount based on the QR code) enables the computer system to access information about the transfer amount and to display the information without requiring additional user input, thereby reducing the number of inputs needed to perform an operation.

In some embodiments, a location of the notification (e.g., 1401a) that includes the current available transfer amount correspond to the code is based on the location (e.g., in the viewfinder) of the representation (e.g., 1401d) of the code. In some embodiments, the physical card (e.g., 1402) does not visually include (e.g., on the card) the notification or the current available transfer amount. In some embodiments, the notification is displayed adjacent to the representation of the code. In some embodiments, the notification overlays the viewfinder. In some embodiments, as the computer system and code move with respect to each other, the location (on the display of the computer system) of the representation of the code and the location of the notification both change such that the two elements remain adjacent to each other. Displaying the notification at a location based on the display location of the code enables the computer system to indicate to the user that the notification corresponds to (and is based on) the code, providing improved visual feedback to the user.

In some embodiments, receiving the request (e.g., a request for memory allocation or a request for payment) to associate the transfer amount (e.g., allocated memory, data, a balance, and/or funds) with an account includes receiving information (e.g., an account number of an account providing the transfer amount, a PIN, and/or a verification code) about the transfer amount via a message (e.g., 1406a) (e.g., an instant message of a message conversation) received at the computer system. In some embodiments, receiving the request (e.g., a request for memory allocation or a request for payment) to associate the transfer amount includes detecting activation of (e.g., a tap input on or a tap-and-hold input on) a notification (e.g., of the message). Receiving information about the transfer amount via a message reduces the amount of input the user needs to provide, thereby reducing the number of inputs needed to perform an operation, and enables the computer system to receive information about a transfer amount (e.g., receive a gift card) electronically without needing the user of the computer system to physically receive the information and/or manually enter the information into the computer system.

In some embodiments, subsequent to (e.g., in response to) receiving the request (e.g., a request for memory allocation or a request for payment) to associate the transfer amount (e.g., allocated memory, data, a balance, and/or funds) with the account and in accordance with a determination that a first set of provisioning criteria are met, including a first criterion that is met when the account is not provisioned on the computer system, the computer system provisions (or initiates a process to provision) the account onto the computer system (e.g., in the background, without requiring further user input, and/or without user input requesting the account be provisioned onto the computer system) (and, optionally, associating (e.g., transferring) the transfer amount to the account). Automatically provisioning the account onto the computer system enables the computer system to participate in transactions (e.g., online transactions, NFC transactions, and/or UWB transactions) using funds of the account, including the transfer amount, without requiring the user to enter account information for each transaction, thereby reducing the number of inputs needed to perform an operation.

In some embodiments, subsequent to (e.g., in response to) receiving the request to associate the transfer amount (e.g., allocated memory, data, a balance, and/or funds) with the account, in accordance with a determination that the account is provisioned onto the computer system, associating (e.g., transferring) the transfer amount to the account (without provisioning the account onto the computer system).

In some embodiments, the first set of provisioning criteria includes a second criterion that is met when the account (e.g., a payment account, a memory storage account) has not previously been removed from the computer system. In some embodiments, while the account is provisioned onto the computer system, the computer system receives user input to remove (deprovision) the account associated with the user account from the computer system. In response to receiving the user input to remove the account associated with the user account from the computer system, the computer system removes (deprovisions) the account associated with the user account from the computer system. Subsequently, the computer system does not automatically provision the account onto the computer system, even in response to detecting user input authorizing associating transfer funds with the account. Forgoing automatically initiating a process to provision the account onto the computer system when the user has previously removed the account prevents the account from being provisioned on the computer system when the user has made intentional inputs to remove the account from the computer system, thereby reducing the need (and inputs) for the user to again remove the account from the computer system.

In some embodiments, subsequent to (e.g., in response to) receiving the request (e.g., a request for memory allocation or a request for payment, at the computer system) to associate the transfer amount (e.g., allocated memory, data, a balance, and/or funds) with the account and in accordance with a determination that a second set of provisioning criteria are met, including a first criterion that is met when the account is not provisioned on an external device (e.g., a watch that is in communication with the computer system) that is paired with the computer system, the computer system provisions (or initiates a process to provision) the account onto the external device (e.g., in the background, without requiring further user input, and/or without user input requesting the account be provisioned onto the external system). In some embodiments, the same user account is logged into both the computer system and the external device. Automatically initiating a process to provision an account onto an external device reduces the need for the user to provide input to provision the account, thereby reducing the number of inputs needed to perform an operation and performing an operation when a set of conditions has been met without requiring further user input.

In some embodiments, the computer system receives input to perform a transaction for a recurring transaction. In some embodiments, in response to receiving input to perform a transaction for a recurring transaction and in accordance with a determination that the transfer amount is configured for use with recurring transactions, the computer system uses the transfer amount to perform the transaction for the recurring transaction. In some embodiments, in response to receiving input to perform a transaction for a recurring transaction and in accordance with a determination that the transfer amount is not configured for use with recurring transactions, the computer system forgoes using (e.g., declining to use) the transfer amount (e.g., those funds associated with the account) to perform the transaction for the recurring transaction.

Note that details of the processes described above with respect to method 1500 (e.g., FIG. 15) are also applicable in an analogous manner to the methods described below/above. For example, method 1800 optionally includes one or more of the characteristics of the various methods described above with reference to method 1500. For example, method 1800 may add a gift card payment to be used for payments as discussed above with reference to method 1500. For brevity, these details are not repeated below. As another example, method 1500 optionally includes one or more various methods described above with reference to method 2000. For example, computer system 1900 optionally requires entry of a numeric sequence in response to receiving a request to associate a transfer amount with an account as described in method 1500. As another example, method 1500 optionally includes one or more of the various methods described below with reference to method 2010. For example, computer system 1900 optionally locks in response a request to associate a transfer amount with an account as described in method 2010. As another example, method 1500 optionally includes one or more various methods described below with reference to method 2300. For example, computer system 1900 optionally, in response a request to associate a transfer amount with an account, displays a quantity of a first type of user interface elements as described in method 2300.

FIGS. 16A-16C FIGS. 16A-16C illustrate exemplary user interfaces for allocating memory, in accordance with some embodiments. The user interfaces in these figures are used to illustrate the processes described above, including the processes in FIG. 18.

At FIG. 16A, computer system 1600 displays user interface 1614 for transferring and/or allocating memory for a server and/or application. User interface 1614 includes transfer button 1614a. In response to detecting user input 1650a on transfer button 1614a, computer system 1600 displays user interface 1616, as shown in FIG. 16S. User interface 1616 includes transfer memory now button 1616a and transfer in installments button 1616b. At FIG. 16S, the "transfer memory now" option is selected (e.g., as a default). For transfers completed when the transfer memory now option is selected, a full transfer is made without subsequent transfers. At FIG. 16S, computer system 1600 detects user input 1650b (e.g., a tap input or a tap-and-hold input) on transfer in installments button 1616b, selecting a choice to transfer the memory over time rather than in a single transfer. In response to detecting user input 1650b, computer system 1600 displays user interface 1618, optionally including different options for transferring for the memory over time. In accordance with a determination that a first set of conditions is met (e.g., memory quantity is above a first threshold and/or below a second threshold), user interface 1618 includes installment option button 1618a associated with an installment transfer option and in accordance with a determination that a second set of conditions is met (e.g., transfer amount is above a third threshold and/or below a fourth threshold), user interface 1618 includes a second option button 1618b associated with a second transfer option.

FIGS. 17A-17Q illustrate exemplary user interfaces for selecting a transaction type, in accordance with some embodiments. The user interfaces in these figures are used to illustrate the processes described below, including the processes in FIG. 18.

FIG. 17A illustrates computer system 1700 displaying user interface 1701 associated with a shopping application (e.g., a web browser or a third-party application). Computer system 1700 displays user interface 1701 when a user has finished selecting the goods/services they would like to purchase and is ready to provide payment for the purchase. User interface 1701 includes checkout button 1701a alongside information summarizing the user's desired purchase. At FIG. 17A, computer system 1700 detects user input 1701b (e.g., a tap, swipe, and/or other gesture) on checkout button 1701a.

In response to detecting user input 1701b on checkout button 1701, computer system 1700 displays user interface 1702 (e.g., partially or full overlaid on user interface 1701), as shown in FIG. 17B. User interface 1702 is part of a payment application different from the shopping application displayed in user interface 1701 and includes pay in full button 1702a, pay later button 1702b, and information 1702c indicating the credit card to be used and the address to ship the purchased goods to when completing a process to pay for the goods in full. At FIG. 17B, the "pay in full" option is selected (e.g., as a default) as indicated by the bolded outline of pay in full button 1702a. For transactions completed when the pay in full option is selected, a full payment is made for the transaction without subsequent payments. At FIG. 17B, computer system 1700 detects user input 1702d (e.g., a tap input or a tap-and-hold input) on pay later button 1702b selecting a choice to pay for the desired goods over time rather than in a single transaction.

In response to detecting input 1702d on pay later button 1702b, computer system 1700 displays user interface 1703, optionally including different options for paying for the purchase over time. In some embodiments, user interface 1703 replaces user interface 1702 without affecting underlying user interface 1701. In accordance with a determination that a first set of conditions is met (e.g., purchase price is above a first threshold and/or below a second threshold), user interface 1703 includes installment option button 1703a associated with an installment payment option and in accordance with a determination that a second set of conditions is met (e.g., purchase price is above a third threshold and/or below a fourth threshold), user interface 1703 includes monthly option button 1703b associated with a monthly payment option with interest charges.

The installment payment option is based on the total amount of the purchase price, a predetermined number of payments, and/or a predetermined amount of time to complete payment of the purchase price. For example, when the total purchase amount is $1,128 and the predetermined number of payments is four, the installment payment option to pay over time is to pay $282 a total of four times, with payments made every two weeks. Thus, user interface 1703 includes installment option button 1703a indicating that the payment plan of $282 dollars every two weeks. In some embodiments, the installment payment option does not charge interest and thus the total amount paid over the predetermined number of installment charges totals the total purchase price of the goods.

The monthly payment option is based on the total amount of the purchase price, a payment that occurs monthly, a total length of the agreement, and an interest rate. For example, when the total purchase amount is $1,128 and the length of the agreement is one year to be paid monthly, the monthly payment option provides monthly payment amounts by applying a determined interest rate to the outstanding balance as the balance is paid over monthly.

While displaying user interface 1703, computer system 1700 receives user input. In response to receiving the user input and in accordance with a determination that the user input (e.g., user input 1703c (e.g., a tap or a tap and hold) on installment option button 1703a) corresponds to selection of installment option button 1703, computer system 1700 displays user interface 1704 as shown in FIG. 17D. User interface 1704 provides the user with information on the installment payment option including the number of payments (4), the frequency of the payments (every two weeks), and that there will be no late fees or other charges. User interface 1704 further includes button 1704a for continuing and button 1704b for going back to the transaction selection screen shown in user interface 1703.

After (e.g., in response to) receiving user input 1704c (e.g., a tap or a tap and hold) on button 1704a for continuing with the installment payment option and in accordance with a determination that user information should be collected and/or needs to be updated or confirmed, computer system 1700 displays user interface 1705 requesting user information, as shown in FIG. 17E. User interface 1705 includes information fields 1705a requesting information such as the user's first and last name, the user's date of birth, and the user's phone number. In some embodiments, the information requested includes a user's address, a user's e-mail address, a user's social security number or identifier, and/or other information that may be required to open a line of credit.

In some embodiments, information fields 1705a are automatically filled based on information already available to computer system 1700. For example, computer system 1700 may already know the user's first and last name, date of birth, and phone number based on a personal account associated with the user that is stored on computer system 1700 which includes that information. Accordingly, the data for those fields may be retrieved from the user's personal account and provided to the payment application for information fields 1705a.

In some embodiments, the user modifies or provides the information for information fields 1705a via a speech input or an input on a virtual keyboard and computer system 1700 displays the received information in information fields 1705a in response.

User interface 1705 further includes button 1705b for moving to the next step of the purchasing process and button 1705c for moving back to the previous step of the purchasing process. Computer system 1700 receives user input 1705d on button 1705b indicating that the user would like to continue with the purchasing process.

In response to receiving user input 1705d, computer system 1700 optionally confirms that the information provided in information fields 1705a is valid (e.g., in a valid format) and displays user interface 1706 providing an overview of the purchase agreement, as shown in FIG. 17F. User interface 1706 includes a breakdown of the installment payments for the installment payment option, including the amount of each payment, the frequency of the payments, and the total amount that will be paid over the agreement. User interface 1706 further includes button 1706a for agreeing to the installment payment plan. In some embodiments, computer system 1700 receives user input 1706b on button 1706a. Notably, the total for the installment payment option is the same as the total purchase amount, since the total for the installment payment option does not include interest charges.

After (e.g., in response to) receiving user input 1706b, computer system 1700 displays user interface 1707 for providing a payment method, as shown in FIG. 17G. In some embodiments, user interface 1707 is automatically populated with payment methods associated with the user and/or computer system 1700 (e.g., payment accounts provisioned onto computer system 1700, as described with respect to FIG. 7Q and/or FIGS. 11A-11D), including a debit and/or credit card or a bank account, as shown in FIG. 17G. In some embodiments, computer system 1700 receives user input selecting to add a payment method and computer system 1700 receives information associated with the payment method and processes the purchase agreement with the provided payment information. At FIG. 17G, computer system 1700 receives user input 1707b on debit card element 1707a indicating that the user would like to complete the purchase agreement with the account corresponding to the selected debit card.

After (e.g., in response to) receiving user input 1707b, computer system 1700 displays user interface 1708 summarizing the purchase agreement and requesting payment authorization, as shown in FIG. 17H. User interface 1708 includes notification 1708a indicating the details of the purchase agreement and notification 1708b requesting confirmation from the user. Computer system 1700 receives user input 1708d of a press (e.g., a single press or a double-press) of physical button 1708c, to indicate that the user confirms the purchase agreement.

After (e.g., in response to) receiving user input 1708d pressing physical button 1708c, computer system 1700 performs biometric authentication (e.g., fingerprint authentication, face recognition authentication, and/or iris authentication). In accordance with a determination that the user is not an authorized user, computer system 1700 forgoes completing the transaction. In accordance with a determination that the user is an authorized user, computer system 1700 completes the transaction and displays user interface 1708 with confirmation element 1708e, as shown in FIG. 17I. This provides a visual confirmation to the user that the purchase agreement has been completed.

Returning to FIG. 17C, while displaying user interface 1703, computer system 1700 receives user input. In response to receiving the user input and in accordance with a determination that the user input (e.g., user input 1703d (e.g., a tap) on monthly option button 1703b) corresponds to selection of monthly option button 1703b, computer system 1700 displays user interface 1709, as shown in FIG. 17J. User interface 1709 provides a summary of the monthly payment plan for the current purchase including the payment amount, the number of total payments, the start date for payments, the interest rate, and any applicable late or finance charges.

At FIG. 17J, computer system 1700 receives user input 1709b selecting confirmation element 109a to proceed with the monthly payment plan. Notably, the total for the monthly payment option is more than the total purchase amount, since the total for the monthly payment option includes (non-zero) interest charges.

After (e.g., in response to) receiving user input 1709b selecting confirmation element 1709a, computer system 1700 optionally proceeds through user interfaces 1705-1708 in substantially the same manner as described above with regard to FIGS. 17E-17H. Accordingly, after receiving user input 1708d pressing (e.g., single pressing or double-pressing) physical button 1708c, computer system 1700 performs biometric authentication and, if successful, computer system 1700 displays user interface 1708 with confirmation element 1708e, as shown in FIG. 17K.

In some embodiments, when displaying user interface 1703, in accordance with a determination that the first set of conditions is met, computer system 1700 displays installment option button 1703a as a selectable option and in accordance with a determination that the second set of conditions is met, computer system 1700 displays monthly option button 1703b as a selection option, as shown and described with respect to FIG. 17C. In some embodiments, when displaying user interface 1703, in accordance with a determination that the first set of conditions is met, computer system 1700 displays installment option button 1703a as a selectable option and in accordance with a determination that the second set of conditions is not met, computer system 1700 forgoes displaying monthly option button 1703b as a selection option, as shown in FIGS. 17L and 17M. In FIG. 17L, monthly option button 1703b is grayed out and is not selectable. In FIG. 17M, monthly option button 1703b is not displayed (and is therefore not selectable). In some embodiments, when displaying user interface 1703, in accordance with a determination that the first set of conditions is not met, computer system 1700 forgoes displaying installment option button 1703a as a selectable option and in accordance with a determination that the second set of conditions is met, computer system 1700 displays monthly option button 1703b as a selection option, as shown in FIG. 17N. In some embodiments, when displaying user interface 1703, in accordance with a determination that the first set of conditions is not met, computer system 1700 forgoes displaying installment option button 1703a as a selectable option and in accordance with a determination that the second set of conditions is not met, computer system 1700 forgoes displaying monthly option button 1703b as a selection option. For example, the first and/or second set of conditions optionally include a condition that the total purchase amount be over a predefined limit, such as 50 dollars. Thus, when the total purchase amount is $1,128, as discussed above, that condition of the first and second sets of conditions is met and user interface 1703 optionally displays installment option button 1703a and monthly option button 1703b as selectable options.

In some embodiments, as discussed above, there is a first set of conditions for displaying installment option button 1703a as a selectable option and a second set of conditions for displaying monthly option button 1703b as a selectable option. Thus, the first set of conditions can be met without the second set of conditions being met, or vice versa, causing user interface 1703 to display one of installment option button 1703a or monthly option button 1703b without the other. For example, the first set of conditions for displaying installment option button 1703a can include a condition that is met when the payment request (e.g., total purchase amount) is above a threshold limit of 25 dollars, while the second set of conditions for displaying monthly option button 1703b can include a condition that is met when the payment request (e.g., total purchase amount) is above a threshold limit of 50 dollars. Accordingly, when the payment request is for 36 dollars, as shown in FIG. 17L, user interface 1703 displays the installment option button 1703a as a selectable option, but does not display monthly option button 1703b as a selectable option.

In some embodiments, not displaying either installment option button 1703a and/or monthly option button 1703b as selectable options includes displaying either installment option button 1703a and/or monthly option button 1703b without allowing the button to be selected. For example, as shown in FIG. 17L, monthly option button 1703b is displayed in a state where it is not able to be selected by the user. In some embodiments, displaying a button in this manner includes displaying the button in a dimmed state, with an overlay of a color (e.g., grey or white) that partially obscures the button, and/or in a state were the button does not appear to extend out of user interface 1703. In this manner, the visual appearance of installment option button 1703a and/or monthly option button 1703b is changed to indicate to the user that either installment option button 1703a and/or monthly option button 1703b is not selectable because the set of conditions has not been met.

In some embodiments, not displaying either installment option button 1703a and/or monthly option button 1703b as selectable options includes displaying user interface 1703 without installment option button 1703a and/or monthly option button 1703b.

Exemplary conditions of the first and second sets of conditions include that an amount of the payment request is less than a threshold limit, an amount of the payment request is more than a threshold limit, an amount of concurrent payment plans is less than a threshold amount, an amount of concurrent payment plans is more than a threshold amount, the total amount of money owed by a user is less than a threshold amount, and/or that a credit score associated with the user is above a threshold score.

In FIG. 17O, computer system 1700 displays user interface 1710 including notification 1710a in accordance with a determination that a payment of the payment plan is due on the current date. Notification 1710a is optionally displayed on a lock or home screen of computer system 1700 and indicates to the user that a payment will be made on the current day and that the user can view details of the payment or the payment plan by selecting notification 1710a. At FIG. 17N, computer system 1700 receives user input 1710b on notification 1710a selecting notification 1710a.

In FIG. 17P, after (e.g., in response to) receiving user input 1710b, computer system 1700 displays user interface 1711 providing information about the next payment of the payment plan. User interface 1711 indicates the date of the next payment in the payment plan and that the payment will be paid automatically. User interface 1711 further includes selectable button 1711a for dismissing user interface 1711 and selectable button 1711b to manage the payment plan. At FIG. 17P, computer system 1700 receives user input 1711c on selectable button 1711b to manage the payment plan.

In some embodiments, after (e.g., in response to) receiving user input 1711c on selectable button 1711b to manage the payment plan, computer system 1700 displays one or more user interfaces that provide information to the user about the payment plan or allow the user to make additional (e.g., unscheduled) payments.

In FIG. 17Q, after (e.g., in response to) receiving user input 1711c on selectable button 1711b to manage the payment plan, computer system 1700 displays user interface 1712 including calendar 1712a. Calendar 1712a concurrently provides an overview of the user's payments plans (e.g., payment schedules for multiple purchases/transactions) and the upcoming payments for those payment plans. In this way, the user may review all of the user's payment plans and upcoming payments together when making decisions about whether to make a payment early. In some embodiments, computer system 1700 receives a user input selecting a day of calendar 1712a (and/or a payment on calendar 1712a) and, in response, displays a user interface corresponding to the selected payment plan (e.g., with additional details about the payments for the selected payment plan). In some embodiments, computer system 1700 receives user input 1712c on button 1712b and displays a user interface for making an unscheduled payment. Accordingly, the user may select an already displayed payment plan or specify a particular payment plan to make an unscheduled payment.

In some embodiments, the individual payments of the user's payment plans are added to a calendar application of computer system 1700. Accordingly, computer system 1700 can concurrently display the user's upcoming payments alongside the user's scheduled appointments in the calendar application to provide the user with a more complete picture of the user's upcoming commitments.

FIG. 18 is a flow diagram illustrating a method for selecting a transaction type in accordance with some embodiments. Method 1800 is performed at a computer system (e.g., 100, 300, 500, 700, 1100, 1400, 1700) that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface). Some operations in method 1800 are, optionally, combined, the orders of some operations are, optionally, changed, and some operations are, optionally, omitted.

As described below, method 1800 provides an intuitive way for displaying user interface elements corresponding to transaction types. The method reduces the cognitive burden on a user selecting a transaction type, thereby creating a more efficient human-machine interface. For battery-operated computing devices, enabling a user to select a transaction type faster and more efficiently conserves power and increases the time between battery charges.

The computer system (e.g., 1700) (e.g., a smartwatch, a wearable electronic device, a smartphone, a desktop computer, a laptop, or a tablet) receives (1802) a request (e.g., 1701b or 1702d) (e.g., a payment request) corresponding to a transaction for a first amount (e.g., an amount of memory, a payment balance).

In accordance with a determination that a first set of conditions is met (e.g., an amount of the payment request is less than a threshold limit, more than a threshold limit, an amount of concurrent payment plans, a total amount of money owed, and/or a credit score associated with the user is below a threshold), the computer system displays (1804), via the display generation component, a first activatable user interface element (e.g., 1703a at FIG. 17C) (e.g., a button and/or pop-up) corresponding to a first quantity of transactions (e.g., an installment transaction) and to the first amount.

In accordance with a determination that a second set of conditions is met, the computer system displays (1806), via the display generation component, a second activatable user interface element (e.g., 1703d at FIG. 17C) corresponding to a second quantity of transactions and to a second amount (e.g., the first amount and some additional amount) that is different from the first amount. In some embodiments, the additional amount (e.g., amount over the first amount) is based on an interest rate. In some embodiments, the additional amount is a static amount.

Displaying one or more respective activatable user interface elements based on sets of conditions being met for the respective activatable user interface elements provides the user with visual feedback that the respective set of conditions has been met, thereby providing improved visual feedback.

In some embodiments, the quantity of transactions is based on an amount requested. In some embodiments, the quantity of transactions is based on a desired amount for each individual transaction. In some embodiments, the quantity of transactions is based on an interest rate. In some embodiments, the quantity of transactions is predetermined (e.g., four). In some embodiments, the amount of each transaction is based on the total payment requested and the predetermined number of transactions. In some embodiments, receiving user input to set up an account after selecting an option. In some embodiments, the computer system pulls information from already established account after selecting an option.

In some embodiments, the first set of conditions includes a first threshold maximum condition that is met when the first amount is less than a first threshold amount (e.g., $5,000, $300, or a non-zero amount). Displaying one or more respective activatable user interface elements based on certain sets of conditions being met for the respective activatable user interface elements provides the user with visual feedback that the respective set of conditions has been met, thereby providing improved visual feedback.

In some embodiments, the second set of conditions includes a second threshold maximum condition that is met when the first amount is less than a second threshold amount (e.g., $4,000, $200, or a non-zero amount, different from the first threshold amount). Displaying one or more respective activatable user interface elements based on certain sets of conditions being met for the respective activatable user interface elements provides the user with visual feedback that the respective set of conditions has been met, thereby providing improved visual feedback.

In some embodiments, the first set of conditions includes a first threshold minimum condition that is met when the first amount is more than a third threshold amount (e.g., $30, $50, or a non-zero amount). Displaying one or more respective activatable user interface elements based on certain sets of conditions being met for the respective activatable user interface elements provides the user with visual feedback that the respective set of conditions has been met, thereby providing improved visual feedback.

In some embodiments, the second set of conditions includes a second threshold minimum condition that is met when the first amount is more than a fourth threshold amount (e.g., $10, $40, or a non-zero amount, different from the third threshold amount). Displaying one or more respective activatable user interface elements based on certain sets of conditions being met for the respective activatable user interface elements provides the user with visual feedback that the respective set of conditions has been met, thereby providing improved visual feedback.

In some embodiments, the first activatable user interface element corresponds to a first type of transaction and the second activatable user interface element corresponds to a second type of transaction and the second set of conditions includes a threshold pending transactions condition that is met when an account logged into the computer system has less than a threshold number (e.g., 10, 15, or a non-zero number of transactions and/or purchases) of concurrent pending (e.g., active, with payments due) transactions of the second type (e.g., with the service provider to which the account is logged into). In some embodiments, the threshold pending transactions condition (and therefore the set of conditions) is not met when the user is currently participating in (e.g., making payments for) more than a threshold number of other concurrent transactions of the second type. For example, the user is limited to participating in a maximum of 10 transactions of the second type at any time. When the user is participating in 10 transactions of the second type, the user cannot participate in an additional transaction of the second type until one of the pending transactions of the second type is full settled (e.g., paid off through payments). Displaying one or more respective activatable user interface elements based on certain sets of conditions being met for the respective activatable user interface elements provides the user with visual feedback that the respective set of conditions has been met, thereby providing improved visual feedback.

In some embodiments, the first activatable user interface element corresponds to a first type of transaction and the second activatable user interface element corresponds to a second type of transaction and the second set of conditions includes a threshold amount pending condition that is met when an account logged into the computer system has less than a threshold amount pending (e.g., $5,000, $1,500, or a non-zero amount) as part of concurrent pending (e.g., active, with payments due) transactions of the second type (e.g., with the service provider to which the account is logged into). In some embodiments, the threshold amount pending condition (and therefore the set of conditions) is not met when the user is currently participating in (e.g., making payments for) other concurrent transactions of the second type with a sum of amounts that exceeds a threshold amount. For example, when the user has performed multiple transactions of the second type that add up to $5,000 total and has paid $1,000 of the $5,000 as part of scheduled payments, the system compares the remaining $4,000 amount pending to the threshold amount. In some embodiments, if the $4,000 amount pending is higher than the threshold amount, the threshold amount pending condition (and therefore the set of conditions) is not met. Displaying one or more respective activatable user interface elements based on certain sets of conditions being met for the respective activatable user interface elements provides the user with visual feedback that the respective set of conditions has been met, thereby providing improved visual feedback.

In some embodiments, in accordance with a determination that the first set of conditions is not met, the computer system displays, via the display generation component, a third user interface element (e.g., 1703a at FIG. 17N) (e.g., grayed out version of the first activatable user interface element that is optionally not activatable), different from the first activatable user interface element, without displaying the first activatable user interface element. In some embodiments, in accordance with a determination that the first set of conditions is not met the computer system forgoes displaying the first activatable user interface element without displaying a replacement user interface element (e.g., without displaying the third user interface element). Displaying user interface elements that are visually different based on whether a sets of conditions is met for the respective user interface elements provides the user with visual feedback that the respective set of conditions has not been met, thereby providing improved visual feedback.

In some embodiments, in accordance with a determination that the second set of conditions is not met, the computer system displays, via the display generation component, a fourth user interface element (e.g., 1703d at FIG. 17C) (e.g., grayed out version of the second activatable user interface element that is optionally not activatable), different from the second activatable user interface element, without displaying the second activatable user interface element. In some embodiments, in accordance with a determination that the second set of conditions is not met the computer system forgoes displaying the second activatable user interface element without displaying a replacement user interface element (e.g., without displaying the fourth user interface element). Displaying user interface elements that are visually different based on whether a sets of conditions is met for the respective user interface elements provides the user with visual feedback that the respective set of conditions has not been met, thereby providing improved visual feedback.

In some embodiments, the first quantity of transactions (e.g., 4 transactions, 6 transactions) occur on a periodic basis (e.g., every 2 weeks for 8 weeks or every 3 weeks for 12 weeks).

In some embodiments, a first transaction of the first quantity of transactions is equal in value to a second transaction of the first quantity of transactions. In some embodiments, each transaction of the first quantity of transactions is equal. For example, the first amount is $400, the first quantity of transactions is 4, and each transaction is for $100 (e.g., collected two weeks for 6 weeks/4 payments. In some embodiments, an initial $100 transaction occurs on the day of the request (e.g., a payment request) corresponding to the transaction for the first amount is received.

In some embodiments, the first quantity of transaction is a predefined quantity of transactions (e.g., always 4 regardless of the first amount (the cost of the purchase)) and the transactions of the first quantity of transactions are scheduled a predefined duration apart (e.g., payments made towards the purchase are always spaced the same duration apart, such as every 2 weeks).

In some embodiments, a frequency of transactions (e.g., every 2 weeks or every 3 weeks) of the first quantity of transactions is different from a frequency of transactions (e.g., every month or every two months) of the second quantity of transactions.

In some embodiments, a duration between transactions of the first quantity of transactions is less than a duration between transactions of the second quantity of transactions.

In some embodiments, the computer system receives one or more user inputs. In some embodiments, in accordance with a determination that the one or more user inputs include selection of the first activatable user interface element, the computer system adds information (e.g., due dates) about the first quantity of transactions in a calendar of the computer system (without adding information about the second quantity of transactions in the calendar). In some embodiments, in accordance with a determination that the one or more user inputs include selection of the second activatable user interface element, the computer system adds transaction information about the second quantity of transactions in the calendar of the computer system (without adding information about the first quantity of transactions in the calendar).

Adding information about the transactions to a calendar of the computer system enables the computer system to provide the user with visual feedback about the timing of the transactions scheduled to be automatically performed, thereby providing the user with improved visual feedback.

In some embodiments, the computer system receives one or more user inputs. In some embodiments, in accordance with a determination that the one or more user inputs include selection of the first activatable user interface element, the computer system displays a timeline (e.g., as in FIG. 17F) for transactions of the first quantity of transactions. In some embodiments, the computer system displays a timeline that shows when each payment will be due as part of the first quantity of transactions. Displaying a timeline corresponding to the transactions enables the computer system to provide the user with visual feedback about the timing of the transactions to be scheduled to automatically be performed, thereby providing the user with improved visual feedback.

In some embodiments, the computer system displays, via the display generation component, a third activatable user interface element (e.g., 1702a) corresponding to a single transaction and to the first amount. In some embodiments, the third activatable user interface object corresponds to an option to pay for the purchase in full, without making or scheduling multiple installments/transactions.

In some embodiments, the third activatable user interface element is displayed prior to displaying the first activatable user interface element and/or the second activatable user interface element (e.g., as in FIG. 17B). In some embodiments, the default option is to pay for the purchase in full and user input is required (e.g., while displaying the third activatable user interface element) to cause display of the first activatable user interface element and/or the second activatable user interface element.

In some embodiments, the computer system receives selection of the first activatable user interface element or the second activatable user interface element. In some embodiments, subsequent to receiving selection of the first activatable user interface element or the second activatable user interface element, the computer system detects selection (e.g., 1707b) of a payment method (e.g., a particular debit card and/or a particular credit card) for performing the respective quantity of transactions.

In some embodiments, the respective quantity of transactions includes an initial transaction (e.g., payment) using the payment method on the day of selection of the payment method and one or more transactions using the payment method on later days.

In some embodiments, respective quantity of transactions are configured to be performed automatically without further user input (e.g., payments for the respective quantity of transactions are configured to be performed). In some embodiments, a user can provide input at the computer system to disable automatically performing transactions of the respective quantity of transactions. In some embodiments, the computer system receives user input and, in response, disable automatic payment of the transactions of the respective quantity of transactions. Automatically performing the transactions without requiring further user inputs reduces the number of inputs needed to perform the transactions.

In some embodiments, the computer system receives selection of the first activatable user interface element or the second activatable user interface element. In some embodiments, subsequent to receiving selection of the first activatable user interface element or the second activatable user interface element, the computer system requests (e.g., from a server and/or generating locally) a one-time-use account number (e.g., based on a selected payment account) for use in a respective transaction. In some embodiments, the computer system generates a one-time-use account (e.g., PAN) and performs an initial transaction of the first or second quantity of transactions. Requesting (and using) a one-time-use account number provides additional security. In the event that the one-time-use account number is compromised, the one-time-use account number will not be useable after the computer system has used the one-time-use account number in a transaction, thereby providing additional security.

In some embodiments, the computer system receives selection of the first activatable user interface element or the second activatable user interface element to initiate a transaction. In some embodiments, subsequent to receiving selection of the first activatable user interface element or the second activatable user interface element, the computer system detects activation (e.g., a single-press or double-press) of a physical input mechanism of the computer system to authorize a payment as part of the transaction. In some embodiment, authorizing the payment also requires biometric (facial, fingerprint, and/or iris) authentication. Detecting activation of a physical input mechanism to authorize the payment provides additional security by requiring an explicit user input before the transaction is performed, thereby improving device security and avoiding unintentional transactions.

In some embodiments, the computer system receives selection of the first activatable user interface element or the second activatable user interface element to initiate a purchase transaction. In some embodiments, subsequent to receiving selection of the first activatable user interface element or the second activatable user interface element and in accordance with determination that a payment for the purchase transaction is due, the computer system displays a notification (e.g., 1710a) indicating a date and/or amount due. In some embodiments, the notification is displayed regardless of whether automatic payments are enabled or disabled. In some embodiments, multiple notifications are displayed for each payment. In some embodiments, a first notification is displayed a week before the payment is due and a second notification is displayed the day the payment is due. Displaying a notification indicating a date and/or amount due provides the user with improved visual feedback about the state of the computer system and when a transaction will be performed.

In some embodiments, the computer system receives selection of (e.g., 1710b) (e.g., tap on) the notification (e.g., 1710a) indicating the date and/or amount due. In some embodiments, in response to receiving selection of the notification, the computer system displays a management user interface corresponding to the purchase transactions. In some embodiments, the management user interface includes details about the purchase transaction, such as other payment due dates, total amount paid, date or original purchase, and the ability to make payments in advance of their due dates. Display a management user interface corresponding to the purchase transaction when selecting the notification allows a user of the computer system to quickly and efficiently access the relevant transaction without needing to traverse a series of menus or searching for the transaction with a recent due date, thereby reducing the number of inputs needed to perform the operation.

Figure 19Q:
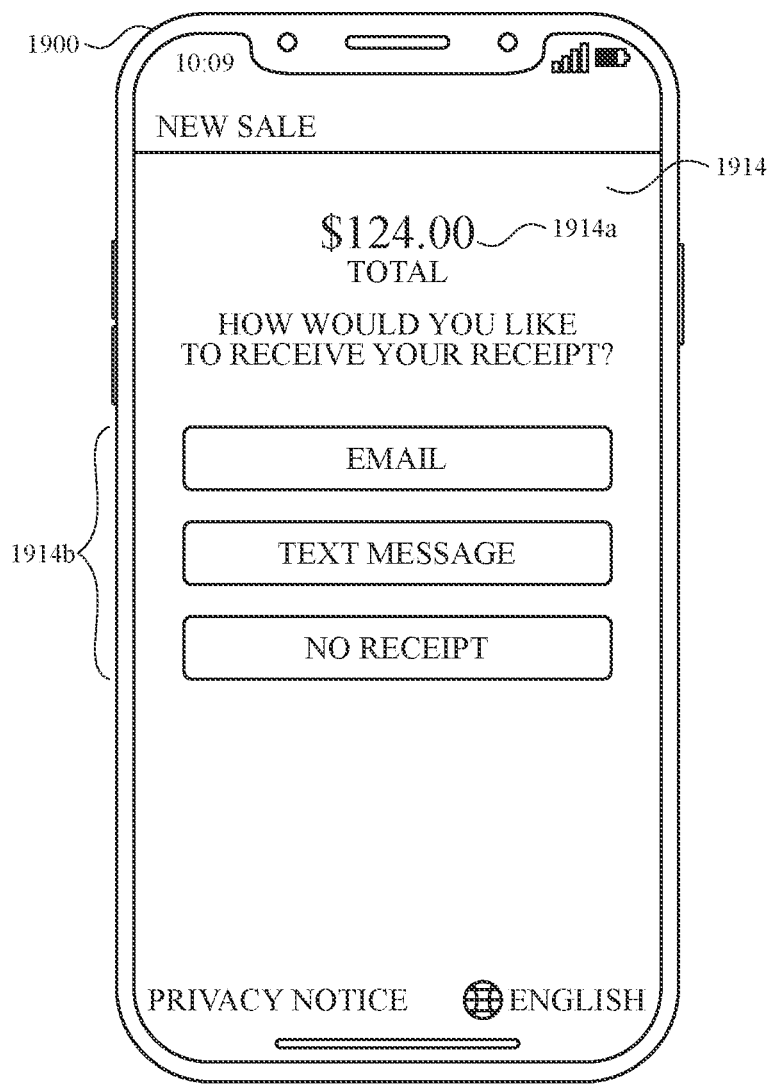

FIGS. 19A-19Q illustrate example user interfaces for entering a number sequence according to various examples.

The user interfaces in these figures are used to illustrate the processes described below, including the process in FIGS. 20A-20C.

At FIG. 19A, computer system 1900 displays user interface 1902 of a third-party application for accepting payments (e.g., a merchant application to perform a transaction to receive payment for goods selected by a buyer), such as through via short-range communication (e.g., NFC). In some embodiments, computer system 1900 is a merchant device (e.g., a smart phone of a merchant) used for processing transactions. User interface 1902 includes information about the good and/or services being purchased, such as groceries and a gift card. User interface 1902 also includes indication 1902a of the total amount of the purchase ($124) and button 1902b to initiate a process to collect the payment. At FIG. 19A, computer system 1900 detects selection of button 1902b via input 1948 (e.g., via a tap input and/or via a tap and hold input). At FIG. 19A, the computer system is held by a merchant and while displaying interface 1902 the computer system is unlocked. In some embodiments, computer system 1900 includes one or more (e.g., some or all) of the features of devices 100, 300, and/or 500.

At FIG. 19B, in response to detecting selection of button 1902b, computer system 1900 displays user interface 702 (e.g., the same as user interface 702 at FIG. 7H) and activates a wireless communication radio (e.g., an NFC radio for receiving NFC communications) of computer system 1900. In some embodiments, user interface 702 is a part of the operating system that is different from the third-party application. User interface 702 includes user interface element 702a and request element 702b. Request element 702b indicates the amount that is being requested in the current payment transaction. At FIG. 19B, computer system 1900 detects payment input 1950a. In some embodiments, payment input 1950a is received from computer system 705 (e.g., a buyer's smart phone). Computer system 705 is tapped and/or moved near (e.g., within communication range of) computer system 1900. In particular, computer system 705 is placed near (e.g., tapped on) space 702e, which indicates where a NFC reader or other wireless card reader is located in computer system 1900. This allows computer system 1900 to request data from computer system 705, including information about the credit card or bank card being displayed on computer system 705 as well as other information that computer system 1900 may use to complete a transaction (e.g., other than a PIN code for the transaction). In some embodiments, payment input 1950a is received from a contactless payment card, such as an NFC-enabled contactless payment card, that has been moved near (e.g., within communication range of) computer system 1900, rather than from computer system 705.

In some embodiments, and as illustrated in FIG. 19B, the merchant holding computer system 1900 has rotated (e.g., dipped the top of) computer system 1900 down to reveal the display of computer system 1900 to the buyer who is standing opposite the merchant. After (e.g., in response to) detecting the rotation of computer system 1900, computer system 1900 rotates one or more elements of user interface 702, as shown in FIG. 7D. This enables the buyer to more easily view and/or read the contents displayed on computer system 1900 (e.g., the relevant content is not upside-down for the buyer). In some embodiments, one or more elements are not rotated (e.g., time and/or a cancellation option (e.g., "X" button) after (e.g., in response to) detecting the rotation of computer system 1900.

In some embodiments, an authentication passcode (e.g., a PIN, a 4-digit code, a6-digit code, and/or other numeric code) is not needed to proceed with the payment. In response to detecting payment input 1950a and in accordance with a determination that an authentication passcode is not needed, computer system displays user interface 1914 of FIG. 19Q (e.g., without locking computer system 1900). Thus, for transactions where an authentication passcode is not needed to proceed with the payment, computer system 1900 does not display user interface 1906, In some embodiments, for transactions where an authentication passcode is not needed to proceed with the payment, the computer system optionally remains unlocked during the transaction process because computer system 1900 will likely remain in the possession of the merchant (who potentially has sensitive information, such as a home address and/or personal email information, stored on computer system 1900).

Some transactions optionally require an authentication passcode (e.g., a PIN, a 4-digit code, a 6-digit code, and/or other numeric code) for the payment to proceed (e.g., that the payment processor uses to authorize a payment). In response to detecting payment input 1950a and in accordance with a determination that an authentication passcode is needed, computer system 1900 displays user interface 1906, as illustrated in FIG. 19C. User interface 1906 includes user interface elements for entering an authentication passcode including keypad 1906e (e.g., with digits 0-9), backspace affordance 1906b, enter affordance 1906c, and accessibility affordance 1906d. As illustrated in FIG. 19C, the various digits of keypad 1906e are associated with respective letters of the alphabet. For example, digit 1 (e.g., a button corresponding to the number 1) of keypad 1906e is associated with the letters Q and Z. This additional visual feedback allows a user that has selected an authentication passcode based on their corresponding letters to more easily remember and/or enter the authentication passcode using keypad 1906e. Thus, one or more digits of keypad 1906e correspond to various letters of the alphabet (e.g., the button for number 1 corresponds to "QZ," 2 corresponds to "ABC," 7 corresponds to "PRS," and/or 9 corresponds to WXY"). In some embodiments, the digits of keypad 1906e, as illustrated in FIG. 19C, correspond to different letters than digits of passcode entry interface 1912, as illustrated in FIG. 19P.

In some embodiments, in response to detecting payment input 1950a and in accordance with a determination that an authentication passcode is needed, computer system 1900 locks computer system 1900, as indicated by lock indication 1906a. In some embodiments, the merchant holding computer system 1900 places computer system 1900 in the hands of the buyer while the buyer enters an authentication passcode. Handing computer system 1900 to the buyer better enables the buyer to securely enter the authentication passcode without the merchant viewing the authentication passcode being entered. By locking computer system 1900, computer system 1900 is more secure and the buyer is limited from accessing potentially sensitive information, such as a home address and/or personal email information, stored on computer system 1900.

Keypad 1906e, backspace affordance 1906b, and enter affordance 1906c cannot be used to unlock computer system 1900. In some embodiments, user interface 1906 does not include lock indication 1906, though computer system 1900 remains locked while user interface 1906 is displayed. In some embodiments, the merchant modifies the settings of the third-party application so that computer system 1900 does not lock when an authentication passcode is needed for the payment to proceed. Accordingly, the merchant can specify whether and/or which certain applications used to initiate the display of user interface 702 (shown in FIG. 7B) should cause the computer system to be locked upon display of keypad 1906*e*.

At FIG. 19D, computer system 1900 has been handed to the buyer and the buyer has rotated computer system 1900 and, as a result, computer system 1900 rotates user interface 1906 so that user interface 1906 is in an unrotated orientation. In some embodiments, the merchant holding computer system 1900 does not rotate (e.g., dips the top of) computer system 1900 down to reveal the display to a buyer who is standing opposite the merchant, and user interface 1906 is displayed in an unrotated orientation as seen in FIG. 19D. In some embodiments, a user (e.g., the buyer) enters an authentication passcode via user interface 1906, such as by tapping on a sequence of digits of keypad 1906*e*. In response to detecting user inputs 1950*b* and 1950*c* (e.g., tap inputs and/or tap and hold inputs) corresponding to digit 1 of keypad 1906*e* and digit 5 of keypad 1906*e* respectively, the two digits of the authentication passcode are entered into the computer system. These two entered digits are indicated by digit indicator 1906*f* (e.g., two dots indicating that two digits have been received). Digit indicator 1906*f* does not indicate the value of the entered digits. Optionally, the user continues to enter digits and when all digits have been entered, the user selects enter affordance 1906*c* to indicate that entry of the authentication passcode is complete. Optionally, the user selects backspace affordance 1906*b* to clear the most recently entered digit. In response to receiving selection of affordance 1906*c* to indicate that entry of the authentication passcode is complete, computer system transitions (e.g., if computer system 1900 is locked) to a process to unlock computer system 1900, such as by displaying user interface 1910 of FIG. 19M.

At FIG. 19E, user interface 1906 is displayed. Optionally, the buyer or the merchant selects accessibility affordance 1906*d* if a buyer is visually impaired and/or has difficultly entering an authentication passcode using user interface 1906. Computer system 1900 detects user input 1950*d*, which corresponds to a selection of accessibility affordance 1906*d*.

At FIG. 19F, after (e.g., in response to) user input 1950*d*, user interface 1908 is displayed. Thus, rather than using keypad 1906*e*, which uses user inputs that target the various digits of keypad 1906*e*, computer system transitions to user interface 1908, which does not include keypad 1906*e*, does not include buttons or keys corresponding to numbers and/or letters, and does not include an enter or backspace button. When computer system 1900 displays user interface 1908, the computer system outputs audio instructions 1908*a*, which describe the process and/or provide instructions for a user (e.g., the buyer) to input digits of an authentication passcode using user interface 1908. User interface 1908 also optionally includes instructions 1908*d*, which describe the process and/or provide instructions for the user to input digits of an authentication passcode using user interface 1908. In some embodiments, a digit is entered when a set of tap gestures is detected (e.g., at a touch-sensitive surface and/or at a touchscreen) followed by a pause (e.g., of a predetermined duration) in detecting inputs (e.g., at a touch-sensitive surface and/or at a touchscreen) which demarks the end of the set of tap gestures at (e.g., on the display of) computer system 1900. Optionally, a user enters a completed authentication passcode using a swipe gesture (e.g., after entering a plurality of digits, the user provides a swipe gesture), clears the most recently entered digit using a long press gesture, and/or clears all entered digits using two long press gestures.

In some embodiments, user interface 1908 includes lock indication 1908*b*. As described in relation to FIG. 19C, computer system 1900 optionally locks after detecting payment input 1950*a*. Inputs received via user interface 1908 will not unlock computer system 1900. User interface 1908 includes accessibility affordance 1908*c* that, when activated, causes computer system 1900 to cancel entry of an authentication passcode using user interface 1908 and return to displaying user interface 1906.

At FIG. 19G, a first digit of an authentication passcode is being entered by the buyer. Computer system 1900 detects four user inputs in sequence: 1950*e*, 1950*f*, 1950*g*, and 1950*h* (e.g., tap inputs and/or tap and hold inputs). User inputs 1950*e*, 1950*f*, 1950*g*, and 1950*h* are not a single four-finger input, but four inputs that are detected one after the other. At FIG. 19H, after detecting user inputs 1950*e*, 1950*f*, 1950*g*, and 1950*h*, computer system 1900 does not detect additional inputs for a length of time that is more than a predetermined duration. In some embodiments the predetermined duration is 1 second, 2 seconds, 5 seconds, or 10 seconds.

At FIG. 19I after detecting user inputs 1950*e*, 1950*f*, 1950*g*, and 1950*h* and not detecting additional input for the predetermined duration, the first digit of the authentication passcode is entered, and is indicated by digit indication 1908*e*. Computer system 1900 detected four inputs (e.g., four tap inputs) before not detecting additional inputs for the predetermined period of time, and therefore a "4" is entered as the first digit of the authentication passcode. After (e.g., in response to) entering the first digit of the authentication passcode, computer system 1900 outputs alert 1908*f* (e.g., an audio and/or haptic alert). Alert 1908*f* indicates that a digit has been entered but does not indicate the value of digit entered (e.g., alert 1908*f* does not announce the number "four" nor does it vibrate four times to indicate the value of the entered digit). In some embodiments alert 1908*f* includes a single vibration and/or a single chime. In some embodiments alert 1908*f* indicates which digit has been entered (e.g., after the first digit alert 1908*f* includes a single vibration and after the second digit 1908*f* includes two vibrations).

At FIG. 19J, computer system detects user inputs 1950*i*, 1950*j*, and 1950*k* (e.g., tap inputs and/or tap and hold inputs). User inputs 1950*i*, 1950*j*, and 1950*k* are inputs detected in sequence, one after another other (e.g., 1950*i*, 1950*j*, and 1950*k* are not a three finger input detected concurrently). After detecting user inputs 1950*i*, 1950*j*, and 1950*k*, computer system 1900 does not detect additional input for a length of time that is more than the predetermined duration. In some embodiments the predetermined duration is 1 second, 2 seconds, 5 seconds, or 10 seconds. After detecting user inputs 1950*i*, 1950*j*, and 1950*k* and not detecting additional input for a length of time, the second digit of the authentication passcode is entered. Computer system 1900 detects three inputs (e.g., three tap inputs) before not detecting additional inputs for the predetermined period of time, and therefore a "3" is entered as the second digit of the authentication passcode. After (e.g., in response to) entering the second digit, computer system 1900 outputs alert 1908*f* (e.g., an audio and/or haptic alert).

At FIG. 19K, digit indication 1908*e* indicates that two digits have been entered. At FIG. 19K, the buyer realizes a mistake was made while entering the authentication passcode and provides user input 1950*l*. The computer system detects user input 1950*l*. In some embodiments user input 1950*l* is a long press gesture (e.g., a tap and hold gesture), a swipe gesture in a first direction, and/or a multi-finger swipe gesture in a first direction. After (e.g., in response to) detecting user input 1950*l* computer system 1900 clears the second entered digit and displays user interfaced 1908 as shown in FIG. 19I. In some embodiments user input 1950*l* is two long press gestures, a swipe gesture in a second direction (e.g., different from the first direction), and/or a multi-finger swipe gesture in a second direction and, in response to detecting user input 1950*l*, computer system 1900 clears all entered digits and computer system displays user interface 1908 as shown in FIG. 19H.

At FIG. 19L the buyer has entered the buyer's complete authentication passcode (e.g., using the same process described when entering the first and second digits) and wishes to submit (e.g., via user input 1950*m*) the authentication passcode for verification. Computer system 1900 detects user input 1950*m*. In some embodiments, user input 1950*m* is a swipe gesture in a third direction (e.g., different from the first and second directions), and/or a multi-finger swipe gesture in a third direction. After (e.g., in response to) detecting user input 1950*m*, computer system 1900 submits the authentication passcode for verification to the third-party application and/or to a processing service.

At FIG. 19M, after (e.g., in response to) detecting user input 1950*m* and, optionally, after submitting the authentication passcode for verification, computer system 1900 initiates a process to unlock computer system 1900, such as by displaying user interface 1910. User interface 1910 includes prompt 1910*a*, which describes that the computer system is locked and requires an authentication input (e.g., biometric data and/or a passcode) to unlock computer system 1900 and, optionally, complete the transaction. User interface 1910 includes unlock button 1910*b*. In some embodiments, in response to detecting an input on unlock button 1910*b* computer system 1900 displays user interface 1912, which is depicted in FIG. 19P.

At FIG. 19N computer system 1900 detects biometric data (e.g., face, iris, and/or fingerprint data) and displays biometric authentication user interface 1910*c*. If the biometric data does not match an authorized user, computer system 1900 displays failure user interface 1910*d*, as shown in FIG. 19O. At FIG. 19O, computer system displays authentication failure message 1910*d*. Optionally, the user (e.g., the merchant) reattempts to unlock computer system 1900 using biometric authentication or uses a passcode. If biometric data matches an authorized user, computer system 1900 is unlocked and displays user interface 1914 as shown in FIG. 19Q.

At FIG. 19P, user interface 1912 is displayed (e.g., in response to multiple fails biometric authentications and/or selection of unlock button 1910*b*). User interface 1912 is used to unlock computer system 1900 and includes passcode entry interface 1912*a* which includes buttons corresponding to digits 0-9, but optionally does not include an enter, backspace, and/or clear button. In some embodiments, a backspace button is displayed as part of passcode entry interface 1912*a* once one or more digits are entered. The numbers buttons of passcode entry interface 1912*a* correspond to letters, however some numbers correspond to different letters than the numbers of keypad 1906 (e.g., 1 corresponds to no letters, 7 corresponds to "PQRS", and/or 9 corresponds to "WXYZ"). If the entered passcode matches an authorized passcode, computer system 1900 is unlocked and displays user interface 1914. In some embodiments, passcode entry interface 1912*a* is visually different from keypad 1906*e*. In some embodiments, passcode entry interface 1912*a* has a first color background and keypad 1906*e* has a second color, different from the first color, background.

In some embodiments, passcode entry interface 1912*a* has third color keys and keypad 1906*e* has fourth color, different from the third color, keys. In some embodiments, passcode entry interface 1912*a* has fifth color text in the keys and keypad 1906*e* has sixth color, different from the fifth color, text in the keys. In some embodiments, user interface 1912 indicates (e.g., using circles that are not filled in) how many digit should be entered (e.g., because computer system 1900 is aware of how many digits the passcode is), while user interface 1906 (e.g., at FIGS. 19C and 19D) does not indicate how many digits should be entered (e.g., because the authentication passcode may have a variable number of digits that computer system 1900 does not have access to).

At FIG. 19Q, in response to receiving a valid passcode, computer system 1900 is unlocked and displays user interface 1914 of the third-party application. User interface 1914 includes indication 1914*a* of the total amount of the purchase ($124) and buttons 1914*b* to select the type of receipt sent to the buyer (e.g., email, text message, and/or no receipt). Unlocking computer system 1900 is not based on the digits entered using user interfaces 1906 and/or 1908 are not used.

Figure 19R:
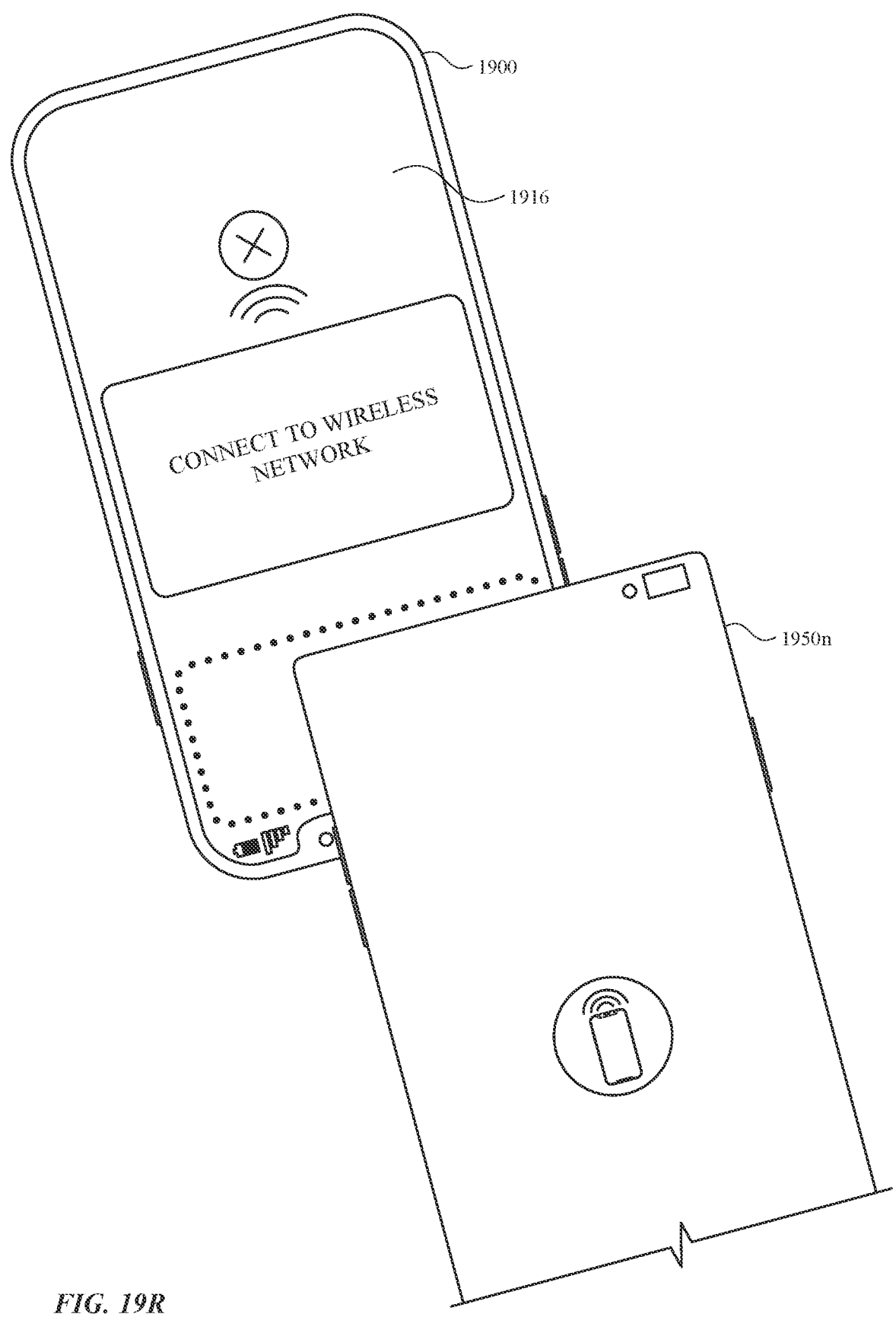
Figure 19S:
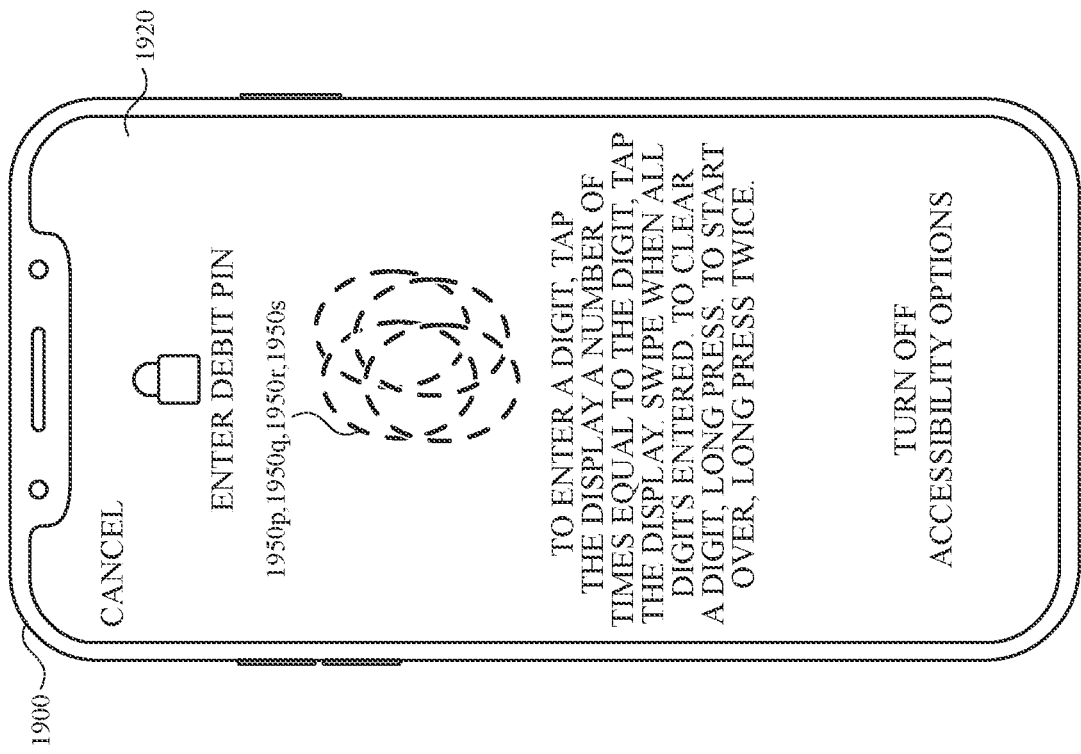

At FIG. 19R, computer system 1900 displays user interface 1916 of an application for a secure operation (e.g., a file transfer, a request for access to wireless network, and/or opening a secured file). Computer system 1900 detects user input 1950*n* (e.g., an NFC input) which corresponds to a request to begin the secure operation. In some embodiments, in response to detecting user input 1950*n*, computer system 1900 locks. At FIG. 19S, in response to detecting user input 1950*n*, computer system 1900 displays user interface 1918 including keypad 1918*a*, which includes buttons corresponding to numbers and/or letters for entering an authentication passcode. Optionally a user inputs an authentication passcode using keypad 1918*a*, or if a user is visually impaired, optionally selects accessibility options 1918*b* via user input 1950*o* (e.g., a tap input).

Figure 19T:
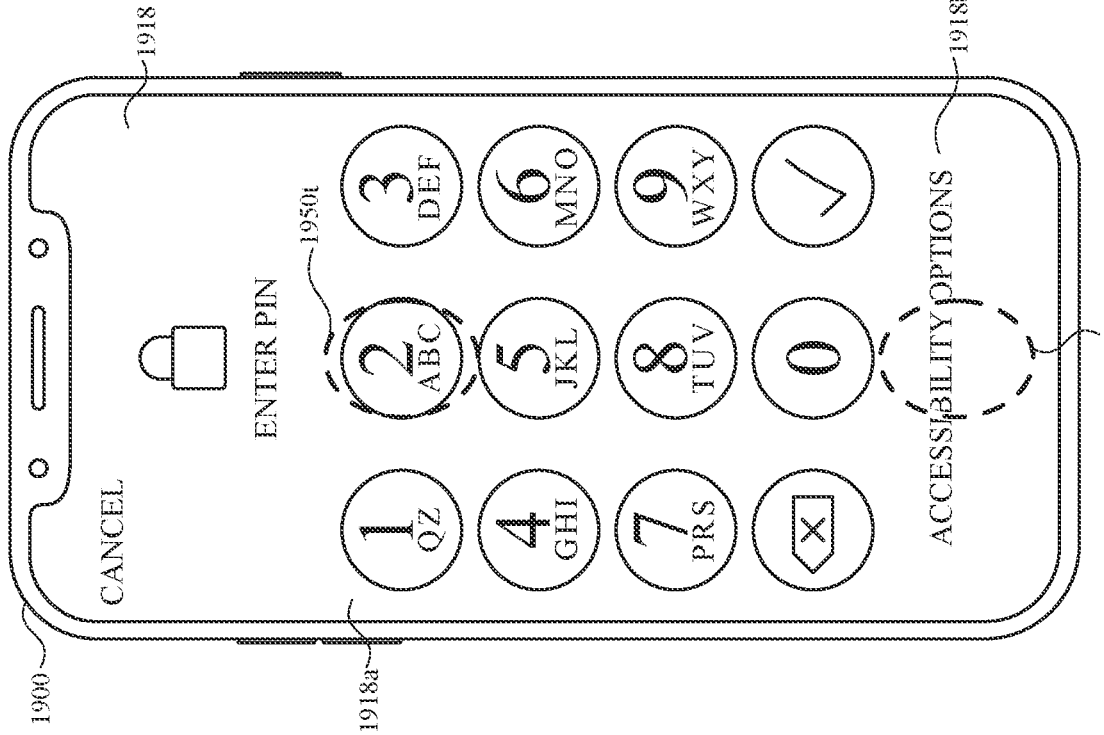

At FIG. 19T, in response to detecting user input 1950*o*, computer system 1900 displays user interface 1920. User interface 1920 does not include buttons corresponding to numbers and/or letters. Computer system 1900 detects four user inputs in sequence: 1950*p*, 1950*q*, 1950*r*, and 1950*s* (e.g., tap inputs and/or tap and hold inputs) and after detecting the user inputs computer system 1900 does not detect additional inputs for a length of time that is more than a predetermined duration. In response to not detecting additional input for a length of time a digit of the authentication passcode is entered. Optionally a user repeats this method to enter additional authentication passcode digits.

At FIG. 19U, after (e.g., in response to) computer system 1900 detects a completed entered authentication passcode via user interface 1918 or user interface 1920, computer system 1900 initiates a process to unlock computer system 1900, such as by displaying user interface 1922 which includes prompt 1924*a*, which describes that the computer system is locked and requires an authentication input (e.g., biometric data and/or passcode) to unlock computer system 1900 and, optionally, complete the secure operation. Computer system 1900 detects biometric data (e.g., face, iris, and/or fingerprint data) and displays biometric authentication user interface 1924*c*.

As described below, method 2000 provides an intuitive way for entering a numeric sequence using a computer system. The method reduces the cognitive burden on a user for entering a numeric sequence using a computer system, thereby creating a more efficient human-machine interface. For battery-operated computing devices, enabling a user to enter a numeric sequence using a computer system faster and more efficiently conserves power and increases the time between battery charges.

FIG. 20A is a flow diagram illustrating a method for entering a numeric sequence using a computer system (e.g., 1900) in accordance with some embodiments. Method 2000 is performed at computer system (e.g., 1900) (e.g., a smartwatch, a wearable electronic device, a smartphone, a desktop computer, a laptop, and/or a tablet) that is in communication with a display generation component (e.g., a display controller and/or a touch-sensitive display system) and with one or more input devices (e.g., a button, a rotatable input mechanism, a speaker, a camera, a motion detector (e.g., an accelerometer and/or gyroscope), and/or a touch-sensitive surface). Some operations in method 2000 are optionally, combined, the orders of some operations are, optionally, changed, and some operations are, optionally omitted.

As described, method 2000 provides an intuitive way for entering a numeric sequence using a computer system (e.g., 1900). The method reduces the cognitive burden on a user for entering a numeric sequence using a computer system, thereby creating a more efficient human-machine interface. For battery-operated computing devices, enabling a user to for entering a numeric sequence using a computer system faster and more efficiently conserves power and increases the time between battery charges.

The computer system (e.g., 1900) detects (2002), via the one or more input devices, a first user input (e.g., 1950*d* and/or 1950*o*) (e.g., activation of a selectable user interface object, a press of a button, a press or rotation of the rotatable input mechanism, and/or a touch gesture on a touch-sensitive surface). In some embodiments, the first user input corresponds to a selection of a selectable user interface object that is concurrently displayed with a numeric keypad (e.g., 1906*d* and/or 1918*b*). In some embodiments, selection of the selectable user interface object corresponds to a request to initiate an accessibility mode. In response to detecting the first user input, the computer system displays (2004), via the display generation component, a numeric entry user interface (e.g., 1908 and/or 1920) (e.g., a user interface that allows a user to input numeric digits). In some embodiments, the numeric entry user interface does not display a numeric keypad (e.g., the number entry user interface does not include selectable digits 0-9, an enter affordance, a cancel affordance, and/or a clear affordance). While displaying the numeric entry user interface, the computer system detects (2006), via the one or more input devices, a second user input that includes a first set of one or more gestures (e.g., 1950*e*, 1950*f*, 1950*g*, 1950*h*, and/or 1950*p*, 1950*q*, 1950*r*, 1950*s*) (e.g., one or more tap inputs and/or swipe inputs on the one or more input devices (e.g., a touch-sensitive surface)). In some embodiments, the first set of one or more gestures are detected within a predetermined time period. In some embodiments, a second gesture of the first set of the one or more gestures is detected within a predetermined time period after an initial gesture of the first set of the one or more gestures is detected. In response to detecting a completion of (e.g., via a pause in input or an input that indicates completion) (e.g., as illustrated in FIG. 19H) the first set of one or more gestures, the computer system enters (2008) (e.g., translating the first of one or more gesture into) a numeric digit (e.g., a numeral between 0-9, inclusive) of a numeric sequence, the numeric digit based on a quantity of gestures in the first set of one or more gestures (e.g., the quantity of gestures in the first set of one or more gestures determines the entered numeric digit (e.g., a set of one gesture corresponds to the digit "1", a set of four gestures corresponds to the digit "4", a set of ten gestures corresponds to the digit "0")). Displaying the numeric entry user interface and entering a digit in response to a set of gestures provides the user with an alternative method of entering a numeric digit based on a quantity of gestures and provides the user with a method of entering a numeric digit that does not require performing a touch gesture in a particular location on the display, thereby providing the user with additional control options without cluttering the user interface with additional displayed controls and enables a vision-impaired user to provide numeric inputs.

In some embodiments, the pause in input (e.g., as illustrated in FIG. 19H) is determined to indicate a completion of entry based on the pause being for greater than a predetermined duration. In some embodiments, detecting completion of the first set of one or more gestures includes detecting a lack of inputs for a predetermined duration. In some embodiments, detecting completion of the first set of one or more gestures includes detecting a specific gesture (e.g., 1950*m* and/or 1950*l*) (e.g., a swipe up gesture and/or a long press gesture) that corresponds to completion of the input. In some embodiments, the quantity of gestures of the set of one or more gestures is determined such that each input that that contacts a touch-sensitive surface (of the one or more input devices) and then ceases to contact the touch-sensitive surface is considered as one gesture (e.g., a tap input is considered as one gesture, a swipe input is considered as one gesture, a double-tap input is considered as two gestures, and/or a triple-tap input is considered as three gestures).

In some embodiments, while displaying, via the display generation component, the numeric entry user interface, the computer system (e.g., 1900) detects, via the one or more input devices (e.g., a button, a rotatable input mechanism, a speaker, a camera, a motion detector (e.g., an accelerometer and/or gyroscope), and/or a touch-sensitive surface), a third user input that includes a second set of one or gestures (e.g., 1950*i* 1950*j*, and 1950*k*) (e.g., one or more tap inputs and/or swipe inputs on the one or more input devices (e.g., a touch-sensitive surface)). In some embodiments, the second set of one or more gestures are detected within a predetermined time period. In some embodiments, a second gesture of the second set of the one or more gestures is detected within a predetermined time period after an initial gesture of the second set of the one or more gestures is detected. In response to detecting a completion of (e.g., via a pause in input or an input that indicates completion) the second set of one or more gestures, the computer system enters a second numeric digit (e.g., a numeral between 0-9, inclusive) of the numeric sequence, the second numeric digit based on a quantity of gestures in the second set of one or more gestures (e.g., the quantity of gestures in the second set of one or more gestures determines the entered numeric digit (e.g., a set of one gesture corresponds to the digit "1", a set of four gestures corresponds to the digit "4", a set of ten gestures corresponds to the digit "0")). Entering a second numeric digit in response to detecting a completion of the second set of one or more gestures provides the user with an alternative method of entering a numeric digit based on a quantity of gestures and provides the user with a method of entering a numeric digit that does not require performing a touch gesture in a particular location on the display, thereby providing the user with additional control options without cluttering the UI with additional displayed controls and enables a vision impaired user to provide numeric inputs.

In some embodiments, displaying, via the display generation component, the numeric entry user interface (e.g., 1908) (e.g., a user interface that allows a user to input numeric digits) does not include displaying a numeric keypad (e.g., 1906e) (e.g., with displayed selectable buttons corresponding to digits 0-9). Displaying the numeric entry user interface without a numeric keypad provides the user with a method of entering a numeric digit that does not require performing a touch gesture in a particular location on the display, thereby providing the user with additional control options without cluttering the UI with additional displayed controls and enables a vision impaired user to provide numeric inputs. In some embodiments, a numeric keypad is not displayed concurrently with the numeric entry user interface. In some embodiments, the numeric entry user interface does not include location-specific entry locations for entering numeric digits (e.g., on the display generation component or on a touch-sensitive surface). In some embodiments, the computer system (e.g., 1900) detects entry of a first digit (e.g., "5") at the same location on a touch-sensitive surface as entry of a second digit that is different from the first digit (e.g., "3").

In some embodiments, the computer system includes one or more output devices (e.g., a tactile generation device and/or an audio output device). In response to detecting the completion (e.g., as illustrated in FIG. 19H) of (e.g., via a pause in input or an input that indicates completion) the first set of one or more gestures (e.g., 1950e, 1950f, 1950g, 1950h) (and, optionally, while displaying, via the display generation component, the numeric entry user interface (e.g., 1908) (e.g., a user interface that allows a user to input numeric digits)), the computer system (e.g., 1900) outputs, via the one or more output devices, a non-visual alert (e.g., 1908f) (e.g., an audio and/or a tactile alert). In some embodiments, the same alert is output in response to multiple (e.g., after the first and the second and/or after every) completions of sets of gestures for numeric digit entries. Outputting a non-visual alert in response to detecting completion of the first set of one or more gestures provides the user with feedback that the digit has been entered and further inputs may now be received, thereby providing the user with improved feedback.

In some embodiments, the non-visual alert (e.g., 1908f) does not correspond to a value of the numeric digit (e.g., the non-visual alert does not indicate what value the computer system (e.g., 1900) received/entered). Outputting a non-visual alert after entering the numeric digit of the numeric sequence wherein the alert does not correspond to a value of the numeric digit provides the user with feedback that the digit has been entered without indicating to other people present the value of the numeric digit, thereby providing the user with improved feedback with increased security. In some embodiments, outputting the non-visual alert indicates to the user that a digit was entered by the computer system. In some embodiments, the alert indicates to the user which digit was entered (e.g., how many digits have been entered, and/or the first entered digit may be followed by an alert that includes one auditory chime and/or one haptic vibration and the second recorded digit may be followed by an alert that includes two auditory chimes and/or two haptic vibrations.).

In some embodiments, the computer system (e.g., 1900) includes one or more output devices (e.g., a tactile generation device and/or an audio output device). In response to detecting, via the one or more input devices, the first user input, the computer system outputs audio instructions (e.g., 1908a). Outputting audio instructions provides the user with understanding of how to use the numeric entry user interface without the user needing to read or see the instructions, and therefore without the need to display the instructions, thereby providing the user with improved feedback on how to control the computer system. In some embodiments the audio instructions describe how to interact with the numeric entry user interface (e.g., 1908) (e.g., the computer system will detect a set of taps (e.g., 1950e, 1950f, 1950g, 1950h) followed by a pause (e.g., as illustrated in FIG. 19H) to enter a digit, a first touch gesture (e.g., a swipe in a first direction (e.g., 1950m)) will enter the numeric sequence, and/or a second touch gesture (e.g., 1950l) (e.g., a swipe gesture in a second direction) will clear a digit.)

In some embodiments, in response to detecting completion (e.g., via a pause in input (e.g., as illustrated in FIG. 19H) or an input that indicates completion) of the first set of one or more gestures, the computer system (e.g., 1900) displays, via the display generation component, an indication that a numeric digit has been entered (1908e). Displaying an indication that a digit has been entered provides the user with feedback that a set of gestures (e.g., 1950e, 1950f, 1950g, and 1950h) has been received and indicates that the computer system is ready to receive additional input, thereby providing the user with improved visual feedback. In some embodiments, the indication does not correspond to the value of the entered digit. In some embodiments, the indication is a black dot (e.g., one black dot for one digit entered and/or two black dots for two digits entered).

In some embodiments, subsequent to entering a one or more (e.g., one or a plurality of) numeric digits of the numeric sequence, the computer system (e.g., 1900) detects, via the one or more input devices, a fourth user input (e.g., 1950m) (e.g., one or more tap inputs and/or swipe inputs on the one or more input devices (e.g., a touch-sensitive surface)). In response to detecting the fourth user input and in accordance with a determination that the fourth user input is of a first type of input (e.g., a type indicating completion (e.g., a swipe input (e.g., swipe up and/or swipe down), a press-and-hold input, and/or a multi-finger input) of the numeric sequence), the computer system enters the numeric sequence (e.g., submitting the numeric sequence for processing and/or no longer enabling the user to enter additional numeric digits). In response to detecting the fourth user input and in accordance with a determination that the fourth user input is not of the first type of input, forgoing entering the numeric sequence (e.g., enabling the user to enter additional numeric digits). Entering the numeric sequence in response to detecting the fourth user input provides the user with a simple way to enter the sequence without the need to display additional user interface elements, thereby providing additional control options without cluttering the user interface with additional displayed controls. In some embodiments the fourth user input is a multi-contact tap and/or swipe input (e.g., a tap gesture with one or more fingers and/or a swipe gesture with one or more fingers). In some embodiments the fourth user input is a tap and hold (e.g., a long press) gesture.

In some embodiments, the first type of input indicating completion of the numeric sequence is a swipe gesture (e.g., 1950m) (e.g., in a particular direction, regardless of the direction, length, and/or duration of the swipe gesture). Entering the numeric sequence in response to detecting a swipe gesture provides the user with a simple way to enter the sequence without the need to display additional user interface elements, thereby providing additional control options without cluttering the user interface. In some embodiments the type of input indicating completion of the numeric sequence is a swipe gesture that includes one or more fingers. In some embodiments the type of input indicating completion of the numeric sequence is a swipe gesture in a first direction and/or a second direction that is different from the first direction.

In some embodiments, detecting the completion of the first set of one or more gestures (e.g., 1950*e*, 1950*h*, 1950*g*, 1950*h*) includes detecting that no input is detected (e.g., as illustrated in FIG. 19H) (e.g., no input corresponding to the numeric entry user interface is detected and/or no input (or no tap input) is detected on a touch-sensitive surface or touch screen of the computer system (e.g., 1900)) for a predetermined period of time after detecting the first set of one or more gestures (e.g., a pause in detecting input after detecting the last gesture of the first set of one or more gestures). Completing the first set of one or more gestures in response to detecting no input for a predetermined period of time provides the user with a simple way to signal that all gestures of a set have been entered and the corresponding digit may now be entered without requiring the user to perform additional input and/or gestures, thereby reducing the number of inputs needed to perform an operation. In some embodiments, the predetermined period of time is 1 second, 3 seconds, 5 seconds, or 8 seconds. In some embodiments, the computer system detects no input for a period of time, and in response to detecting no input for the period of time: in accordance with a determination that the period of time exceeds the predetermined period of time (e.g., a timeout threshold) considers a respective set of one or more gestures complete (e.g., enters a numeric value based on the number of tap inputs received after the last entry and up until the predetermined period of time was exceeded) and in accordance with a determination that the period of time does not exceed the predetermined period of time (e.g., the timeout threshold) does not consider the respective set of one or more gestures complete and continues to wait for additional gestures.

In some embodiments, while displaying, via the display generation component, the numeric entry user interface (e.g., 1908) (e.g., a user interface that allows a user to input numeric digits) the computer system (e.g., 1900) detects, via the one or more input devices, a fifth user input (e.g., 1950*l*) (e.g., a press and hold gesture, one or more tap inputs, and/or swipe inputs on the one or more input devices (e.g., a touch-sensitive surface)). In response to detecting the fifth user input, the computer system clears a most recently entered numeric digit of the numeric sequence (e.g., the most recently entered digit of the numeric sequence is deleted, optionally without deleting any other previously entered digits or with deleting all previously entered digits). Clearing the last entered numeric digit in response to detecting the fifth user input provides the user with a simple way to clear a digit without needing to provide additional displayed controls, thereby providing additional control options without cluttering the user interface with additional displayed controls. In some embodiments, the fifth user input is a swipe gesture that includes one or more fingers. In some embodiments, the fifth user input is a swipe gesture in a first direction. In some embodiments, the fifth user input is a swipe gesture in a second direction. In some embodiments, the fifth user input is a press and hold gesture. In some embodiments, in response to detecting the fifth user input: in accordance with a determination that the fifth user input is of a second type of user input (e.g., a long press or swipe left), clearing the most recently entered numeric digit of the numeric sequence without deleting any other previously entered numeric digits of the numeric sequences, and in accordance with a determination that the fifth user input is of a third type of user input (e.g., a double-long press or a two finger swipe) different from the second type of user input, clearing a plurality of (e.g., two of or all of) the numeric digits of the numeric sequence.

In some embodiments, the fifth user input (e.g., 1950*l*) includes (or is) a long press input (e.g., a tap and hold input with one or more fingers and/or swipe and hold input with one or more fingers on the one or more input devices (e.g., a touch-sensitive surface)). Clearing the last entered numeric digit in response to detecting a long press input provides the user with a simple way to clear a numeric digit without needing to provide additional displayed controls, thereby providing additional control options without cluttering the user interface with additional displayed controls.

In some embodiments, the fifth user input (e.g., 1950*l*) includes (or is) two long press inputs (e.g., a tap and hold input followed by a second tap and hold input and/or a swipe and hold input with one or more fingers on the one or more input devices (e.g., a touch-sensitive surface) followed by a second swipe and hold input with one or more fingers). In response to detecting the fifth user input, the computer system (e.g., 1900) clears a plurality of (e.g., two of or all of) the numeric digits of the numeric sequence. Clearing all entered numeric digits in response to detecting two long press input provides the user with a simple way to clear all entered numeric digits without needing to provide additional displayed controls, thereby providing additional control options without cluttering the user interface with additional displayed controls.

In some embodiments, the first user input (e.g., 1950*d*) is detected while the computer system (e.g., 1900) displays a numeric keypad (e.g., 1906*e*) for entering the numeric sequence (e.g., the numeric keypad includes selectable digits 0-9, an enter affordance, a cancel affordance, and/or a clear affordance). Providing a mechanism by which a user of the computer system can access a user interface for entering the numeric sequence without using a numeric keypad 1908) provides the user (e.g., a vision impaired user) with the ability to interact: with the computer system without relying on displayed content, thereby improving the man-machine interface. In some embodiments, in response to detecting the first user input, the computer system ceases to display the numeric keypad.

In some embodiments, subsequent to entering the numeric digit of the numeric sequence (e.g., subsequent to entering a plurality of numeric digits), the computer system (e.g., 1900) detects, via the one or more input devices, a user input indicating completion of the numeric sequence (e.g., 1950*m*). In response to receiving the user input indicating completion of the numeric sequence and in accordance with a determination that the quantity of numeric digits of the numeric sequence is within a predefined range (e.g., between 4 and 6 (inclusive), between 4 and 8 (inclusive), or between 6 and 10 (inclusive)), the computer system enters the numeric sequence (e.g., submitting the numeric sequence for processing and/or no longer enabling the user to enter additional numeric digits). In response to receiving the user input indicating completion of the numeric sequence and in accordance with a determination that the quantity of numeric digits of the numeric sequence is not within the predefined range (e.g., between 4 and 6 (inclusive), between 4 and 8 (inclusive), or between 6 and 10 (inclusive)), the computer system forgoes entering the numeric sequence (and, optionally, indicating (e.g., via audio, haptic, and or display) the error to the user).

In some embodiments, the numeric digit entered is not based on a location of the first set of one or more gestures (e.g., the value of the numeric digit is determined by the number of gestures in the first set of one or more gestures, not on where the location of the gestures occurred on the display generation component and/or the one or more input devices (e.g., a touch-sensitive surface)). Determining numeric digit independently of the location of the first set of one more gestures provides the user with a simple way to input digits without requiring a gesture be performed on a specific location on the touch-sensitive surface or touchscreen and provides the user with a method of entering digits without needing to view the display, thereby providing additional control options without cluttering the user interface with additional display controls. In some embodiments, the numeric digit entered is not based on locations corresponding to digits on a keypad.

In some embodiments, the numeric digit is not based on a duration of one or more gestures of the first set of one or more gestures (e.g., the value of the numeric digit is determined by the number of gestures in the first set of one or more gestures, not on whether some of the gestures are longer or shorter than others). Determining numeric digit independently of the duration of the first set of one more gestures provides the user with a simple way to input digits without requiring a user to perform gestures of a specific duration and provides the user with a method of entering digits without needing to view the display, thereby providing additional control options without cluttering the user interface with additional display controls. In some embodiments, the numeric digit is not based on morse code.

In some embodiments, the computer system (e.g., 1900) is in a locked state while the numeric entry user interface (e.g., 1908) is displayed and entry of the numeric sequence using the numeric entry user interface cannot unlock the computer system. Maintaining the computer system in a locked state while the numeric entry user interface is displayed increases the security of the computer system by allowing a non-owner of the computer system to enter the numeric sequence without risking the non-owner accessing unauthorized information on the computer system. In some embodiments, user inputs cannot navigate away from the numeric entry user interface and/or access other functions of the computer system unless the computer system first receives authentication (e.g., a passcode authentication or biometric authentication) to unlock the computer system. In some embodiments, authentication to unlock the computer system is not based on (does not use) the numeric sequence entered using the numeric entry user interface. In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is power on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Note that details of the processes described above with respect to method 2000 (e.g., FIG. 20A) are also applicable in an analogous manner to the methods described below/above. For example, method 800, 900, 1200, 1500, 1800, 2010, and 2300 optionally includes one or more of the characteristics of the various methods described above with reference to method 2000. For example, method 2000 optionally includes one or more various methods described above with reference to method 800. For example, during numeric sequence entry computer system 1900 optionally rotates one of user interface elements in response to detecting movement of computer system 1900 as described in method 800. As another example, method 2000 optionally includes one or more various methods described above with reference to method 900. For example, computer system 1900 optionally requires entry of a numeric sequence in response to initiating a transaction request as described in method 900. As another example, method 2000 optionally includes one or more various methods described above with reference to method 1200. For example, computer system 1900 optionally requires entry of a numeric sequence in response to detecting a sign-in of a user account as described in method 1200. As another example, method 2000 optionally includes one or more various methods described above with reference to method 1500. For example, computer system 1900 optionally requires entry of a numeric sequence in response to receiving a request to associate a transfer amount with an account as described in method 1500. As another example, method 2000 optionally includes one or more various methods described above with reference to method 1800. For example, computer system 1900 optionally requires entry of a numeric sequence in response to receiving a request corresponding to a transaction for a first amount as described in method 1800. As another example, method 2000 optionally includes one or more of the various methods described below with reference to method 2010. For example, computer system 1900 optionally locks during entry of a numeric sequence as described in method 2010. As another example, method 2000 optionally includes one or more various methods described below with reference to method 2300. For example, computer system 1900 optionally, in response to entry of a numeric sequence, displays a quantity of a first type of user interface elements as described in method 2300. For brevity, these details are not repeated below.

As described below, method 2010 provides an intuitive way for locking a computer system while a numeric sequence is entered using a computer system. The method reduces the cognitive burden on a user for locking a computer system while a numeric sequence is entered using a computer system, thereby creating a more efficient human-machine interface. For battery-operated computing devices, enabling a user to lock a computer system while a numeric sequence is entered using a computer system faster and more efficiently conserves power and increases the time between battery charges.

FIGS. 20B-20C are a flow diagram illustrating a method for locking a computer system while a numeric sequence is entered using a computer system in accordance with some embodiments. Method 2010 is performed at computer system 1900 (e.g., a smartwatch, a wearable electronic device, a smartphone, a desktop computer, a laptop, a head mounted device (e.g., a head mounted augmented reality and/or extended reality device), and/or a tablet) that is in communication with a display generation component (e.g., a display controller, a head mounted display system, and/or a touch-sensitive display system) and with one or more input devices (e.g., a button, a rotatable input mechanism, a speaker, one or more cameras (e.g., infrared and/or visible light cameras), a motion detector (e.g., an accelerometer and/or gyroscope), and/or a touch-sensitive surface). Some operations in method 700 are, optionally, combined, the orders of some operations are, optionally, changed, and some operations are, optionally, omitted.

As described below, method 2010 provides an intuitive way for locking a computer (e.g., 1900) system while a numeric sequence is entered using a computer system. The method reduces the cognitive burden on a user for locking a computer system while a numeric sequence is entered using a computer system thereby creating a more efficient human-machine interface. For battery-operated computing devices, enabling a user to for locking a computer system while a numeric sequence is entered using a computer system faster and more efficiently conserves power and increases the time between battery charges.

In method 2010, while the computer system (e.g., 1900) is unlocked and while displaying, via the display generation component, a user interface of a first application (e.g., 702, 1902, and/or 1916) (e.g., a security application and/or a transaction processing application), receiving (2012), via the one or more input devices, a first input (e.g., receiving information via 1950a and/or 1950n) (e.g., a user input for performing a secure operation, detecting of an external device, and/or near field communication input for a transaction). In some embodiments, the first input includes detecting a payment card within an RF (e.g., a near-field communication) field of the computer system and/or detecting an external device within a predetermined range (e.g., 705) (e.g., distance and/or RF range) of the computer system. In response to receiving the first input (2014), the computer system displays a first numeric keypad (e.g., 1906e and/or 1918a) (e.g., of the first application, of a second application different from the first application, of a system application, and/or of an operating system of the computer system). In accordance with a first set of lock conditions being met (e.g., the user has indicated that the device should lock in response to receiving the first input while using the first application), the computer system locks the computer system (2018) (e.g., prevent user navigating away from the transaction numeric keypad). In accordance with the first set of lock conditions not being met, the computer system forgoes locking the computer system (2020). While displaying the first numeric keypad, the computer system receives (2022), via the one or more input devices and using the first numeric keypad, a second input (e.g., 1950b, 1950c, and/or input on keys of 1918a) (e.g., one or more touch gestures on the touch-sensitive surface at location(s) corresponding to the first numeric keypad displayed via the display generation component) corresponding to a numeric sequence, wherein the computer system does not unlock based on the second input that uses the first numeric keypad regardless of the numeric sequence (e.g., a user input on the first numeric keypad (e.g., a PIN or another number) cannot unlock the device). In some embodiments, the second input is the input of a PIN to proceed with or to complete a transaction (e.g., a secure transaction and/or a payment transaction). Subsequent to receiving the second input and while the computer system is locked, the computer system receives (2024), via the one or more input devices, a third input (e.g., at FIGS. 19N and/or 19U) (e.g., one or more gestures (e.g., a tap gesture and/or a swipe gesture) on a touch-sensitive surface, and biometric information (e.g., facial information, fingerprint information, and/or iris information) for use for biometric recognition/authentication) that does not use the first numeric keypad (e.g., a passcode (e.g., an alpha-numeric sequence used to unlock a device) on a second numeric keypad and/or the detection of biometric data, such as via a fingerprint sensor, an iris sensor, and/or camera). In some embodiments, the first numeric keypad is not displayed when the third input is received. In response to receiving the third input (2026) and in accordance with a determination, independent of the numeric sequence corresponding to the second input, that the third input matches an enrolled credential (e.g., a stored passcode and/or stored biometric data), the computer system unlocks (2028) the computer system. In response to receiving the third input (2026) and in accordance with a determination, independent of the numeric sequence corresponding to the second input, that the third input does not match an enrolled credential (e.g., a passcode and/or biometric data), the computer system forgoes (2030) unlocking the computer system. Locking the computer system in accordance with a first set of lock conditions being met provides the user with additional security while the numeric sequence is entered without requiring additional input or action on the part of the user, thereby increasing security and performing an operation when a set of conditions has been met without requiring further user input.

In some embodiments, the computer system (e.g., 1900) is in a locked state or an unlocked state. In the locked state, the computer system is powered on and operational but is prevented from performing a predefined set of operations in response to the user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions of the computer system. In the unlocked state, the computer system is power on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off. When the computer system is in the locked state, the computer system is said to be locked.

In some embodiments, the first numeric keypad (e.g., 1906e) is displayed as part of a user interface (e.g., 1906) of a second application (a system application and/or of an operating system of the computer system (e.g., 1900)) that is (optionally) different from the first application. Subsequent to (e.g., in response to) receiving the second input (e.g., 1950b) corresponding to the numeric sequence (e.g., a PIN entry and/or one or more touch gestures on the touch-sensitive surface at location(s) corresponding to the first numeric keypad displayed via the display generation component), the computer system transmits the numeric sequence from the second application to the first application (e.g., a security application and/or a transaction processing application). Passing the numeric sequence from the second application to the first application allows the entering of the numeric sequence to be handled securely and uniformly by the second application without requiring the user to manage multiple applications or inputs, thereby increasing the security of the device.

In some embodiments, subsequent to receiving the second input (e.g., 1950*b*) (e.g., one or more touch gestures on the touch-sensitive surface at location(s) corresponding to the first numeric keypad displayed via the display generation component), and while the computer system (e.g., 1900) is locked (e.g., the computer system prevents the user navigating away from the transaction numeric keypad), the computer system displays, via the display generation component (e.g., a display controller, a head mounted display system, and/or a touch-sensitive display system), a second numeric keypad (e.g., 1912*a*), wherein the second numeric keypad is different from the first numeric keypad (e.g., of a second application different from the first application, of a system application, and/or of an operating system of the computer system) (e.g., the first numeric keypad is visually different (e.g., different color and/or different correspondence of letters to numbers) from the second numeric keypad). Receiving the third input includes receiving, using the second numeric keypad (e.g., one or more touch gestures on the touch-sensitive surface at location(s) corresponding to the second numeric keypad displayed via the display generation component), one or more inputs (e.g., one, two, or a plurality of inputs) corresponding to a second numeric sequence. In some embodiments, the second numeric sequence is different from the first numeric sequence. Entering the third input using the second numeric keypad provides the user with visual feedback that the third input will unlock the computer system and further helps differentiate between whether the computer system expects to receive a numeric sequence for the first application or a numeric sequence to unlock the computer system, thereby providing the user with improved visual feedback. In some embodiments, the first numeric keypad includes selectable digits 0-9 (e.g., 1906*e*), an enter affordance (e.g., 1906*c*), a cancel affordance, and/or a clear affordance (e.g., 1906*b*). In some embodiments the selectable digits 0-9 of the first numeric keypad correspond to letters of the alphabet (e.g., each selectable digit corresponds to a set of letters (e.g., numeral 1 corresponds to "Q" and "Z"; numeral 2 corresponds to "A," "B," and "C"; and/or numeral 7 corresponds to "P," "R," and "S")). In some embodiments the second numeric keyboard, includes selectable digits 0-9. In some embodiments the second numeric keypad does not include an enter affordance, a cancel affordance, and/or a clear affordance. In some embodiments selectable digits 0-9 of the second numeric keypad correspond to different sets of letters than selectable digits 0-9 of the first numeric keypad (e.g., numeral 1 does not correspond to a set of letters; numeral 2 corresponds to "A," "B," and "C"; and/or numeral 7 corresponds to "P," "Q," "R," and "S").

In some embodiments, the third input is a biometric input (e.g., facial information, fingerprint information, and/or iris information detected via the one or more input devices (e.g., a button, a rotatable input mechanism, one or more cameras (e.g., infrared and/or visible light cameras), a motion detector (e.g., an accelerometer and/or gyroscope), and/or a touch-sensitive surface)).

In some embodiments, the biometric input is a facial input and/or iris input (e.g., facial information and/or iris information (detected via the one or more input devices including a button, a rotatable input mechanism, a speaker, one or more cameras (e.g., infrared and/or visible light cameras), a motion detector (e.g., an accelerometer and/or gyroscope), and/or a touch-sensitive surface)).

In some embodiments, biometric input is a fingerprint input (detected via the one or more input devices including a button, a rotatable input mechanism, one or more cameras (e.g., infrared and/or visible light cameras), and/or a touch-sensitive surface)).

In some embodiments, the first set of lock conditions includes a condition that is met when the first application (e.g., a security application and/or a transaction processing application) is an application of a first type (e.g., the settings of the first application have been set so that the computer system (e.g., 1900) should lock during entry of the numeric sequence while using the first application). Locking the computer system when the first application is an application of a first type provides the user with a way of locking the computer system when transitioning to displaying the first numeric keypad from the application without the need for the user to lock the computer system manually before entering the second input, thereby reducing the number of inputs needed to perform an operation and making the computer system more secure. In some embodiments, the settings of the first application may be set to be of a second type so that the computer system does not lock during entry of the numeric sequence. In some embodiments, the computer system does not lock while using a second application that is of a second type (e.g., the settings of the second application have been set so that the computer system does not lock during entry of the numeric sequence).

In some embodiments, in response to receiving the third input and in accordance with the determination, independent of the numeric sequence corresponding to the second input, that the third input matches the enrolled credential (e.g., a stored passcode and/or stored biometric data) (and subsequent to (e.g., in response to) unlocking the computer system (e.g., 1900)), the computer system displays, via the display generation component (e.g., a display controller, a head mounted display system, and/or a touch-sensitive display system), a second user interface of the first application (e.g., 1914) (e.g., same as or different from the user interface of the first application). Displaying a second user interface of the first application subsequent to unlocking the computer system provides the user with feedback that the computer system is unlocked and further inputs can now be inputted into the computer system, thereby providing the user with improved visual feedback. In some embodiments, in response to receiving the third input and in accordance with the determination, independent of the numeric sequence corresponding to the second input, that the third input does not match the enrolled credential, forgoing displaying the second user interface of the first application.

In some embodiments, while displaying the first numeric keypad (e.g., 1906*e*) the computer system (e.g., 1900) receives a notification (e.g., of a newly received message or email, of a reminder, of an upcoming calendar event). In response to receiving the notification and in accordance with a determination that the computer system is not locked, displaying, via the display generation component, the notification (e.g., partially overlaid on the first numeric keypad). In accordance with a determination that the computer system is locked, forgoing display of the notification. Forgoing displaying a notification that is received while the computer system is locked and the first numeric keypad remains displayed provides enhanced security for the owner of the computer system because a non-owner using the computer system to enter a PIN using the first numeric keypad would not see the notification, thereby enhancing the security of the computer system. In some embodiments, a notification received while displaying the first numeric keypad is not displayed while the first numeric keypad is displayed, regardless of whether the computer system is locked or unlocked. In some embodiments (when the notification is not displayed while displaying the first numeric keypad), the notification is displayed once the first application is displayed (e.g., concurrently with the second user interface of the first application and/or in response to the computer system being unlocked).

In some embodiments, while displaying, via the display generation component, the first numeric keypad (e.g., 1906e) (and, optionally, one or more other user interface objects), the computer system (e.g., 1900) detects a rotation (e.g., a rotation in a predetermined direction, a rotation above a predetermined threshold, and/or detecting that the computer system is being dipped) of the computer system. In response to detecting the rotation of the computer system, rotating the first numeric keypad (and, optionally, forgoing to rotate the one or more other user interface objects). Rotating the first numeric keypad is response to detecting a rotation of the computer system enables the computer system to allow a secondary user to enter the numeric sequence without requiring the user to manually rotate the orientation of the computer system, thereby reducing the number of inputs needed to perform an operation. In some embodiments the rotation of the computer system includes the computer system been dipped toward a second user (e.g., a customer). In some embodiments, in response to detecting the rotation of the computer system, the first numeric keypad is rotated so that it is not oriented toward a first user (e.g., a merchant and/or owner of the computer system) but is oriented toward the second user (e.g., the customer who needs to enter a PIN using the first numeric keypad). In some embodiments, the orientation of one or more other elements on the display (e.g., an indication of time, an indication of connection to a remote system, and/or an indication of a transactional total) does not rotate in response to detecting the rotation.

In some embodiments the first application is a third-party application. The first application being a third-party application enables the computer system (e.g., 1900) to use the first numeric keypad to collect account information for a third-party application, thereby improving the security of the computer system. In some embodiments, the third-party application is a payment application. In some embodiments, the third-party application is an application that is not provided by the manufacturer of the computer system. In some embodiments, the first numeric keypad is displayed as part of a user interface of a first-party application and/or an operating system application of the computer system.

In some embodiments, the first input is a near-field communication (e.g., a user bringing a second computer system (e.g., 1900) near (e.g., into an RF field of) the first computer system and/or a user bringing a payment card near (e.g., into an RF field of) the first computer system) that includes account credentials (e.g., payment credentials and/or loyalty card credentials). Automatically displaying the first numeric keypad (and, optionally, automatically locking the computer system) when a near-field communication is detected enables the computer system to display the keypad without requiring additional user inputs, thereby reducing the number of user inputs required to perform an operation.

Note that details of the processes described above with respect to method 2010 (e.g., FIGS. 20B-20C) are also applicable in an analogous manner to the methods described below/above. For example, method 800, 900, 1200, 1500, 2000, and 2300 optionally includes one or more of the characteristics of the various methods described above with reference to method 2010. For example, method 2010 optionally includes one or more various methods described above with reference to method 800. For example, computer system 1900 optionally rotates one of user interface elements in response to detecting movement of computer system 1900 as described in method 800. As another example, method 2010 optionally includes one or more various methods described above with reference to method 900. For example, computer system 1900 optionally locks the computer system in response to initiating a transaction request as described in method 900. As another example, method 2010 optionally includes one or more various methods described above with reference to method 1200. For example, computer system 1900 optionally locks when a first set of provisioning criteria are met as described in method 1200. As another example, method 2010 optionally includes one or more various methods described above with reference to method 1500. For example, computer system 1900 optionally locks in response to receiving user input corresponding to a second for the first user interface element or the second user interface element as described in method 1500. As another example, method 2010 optionally includes one or more various methods described above with reference to method 1800. For example, computer system 1900 optionally locks in response to receiving a request corresponding to a transaction for a first amount as described in method 1800. As another example, method 2010 optionally includes one or more of the various methods described above with reference to method 2000. For example, during numeric sequence entry computer system 1900 optionally locks during entry of a numeric sequence using user interface 1908 as described in method 2000. As another example, method 2010 optionally includes one or more various methods described below with reference to method 2300. For example, computer system 1900 in response to unlocking the computer system, displays a quantity of a first type of user interface elements as described in method 2300. For brevity, these details are not repeated below.

FIGS. 21A-21D illustrate exemplary user interfaces for managing photos on a photo server, in accordance with some embodiments. The user interfaces in these figures are used to illustrate the processes described below, including the processes in FIG. 23A-23B.

FIG. 21A illustrates computer system 2100 displaying photo summary user interface 2102. Photo summary user interface 2102 includes upload summary user interface 2110. At FIG. 21A, computer system 2100 displays upload summary user interface 2110 without any user interface elements because the user has not uploaded any photos to a photos server. Photo summary user interface 2102 also includes deletion information 2108. Deletion information 2108 includes cumulative deletion information 2108a and scheduled deletion information 2108b. Cumulative deletion information 2108a provides an indication of a total number of photos to be deleted and scheduled deletion information 2108b indicates a number of photos that need to be deleted in the next 30 days. Because no photos have been uploaded to the photo server, cumulative deletion information 2108a indicates that zero photos need to be deleted and scheduled deletion information 2108b indicates that zero photos need to be deleted in the next 30 days.

As illustrated in FIG. 21A, photos summary user interface 2102 includes upcoming deletions information 2114. Upcoming deletions information 2114 indicates the dates on which photos that are uploaded to the photo server will be automatically deleted. At FIG. 21A, computer system 2100 receives an indication that the user has uploaded three photos to the photos server.

At FIG. 21B, in response to receiving the indication that the user has uploaded three photos to the photos server, computer system 2100 begins to display photo user interface element 2120a, photo user interface element 2120b, and photo user interface element 2120c as animating in (e.g., drop in) from the top of upload summary user interface 2110. Each of photo user interface elements 2120a, 2120b, and 2120c correspond to a respective photo that the user has uploaded to the photos server.

As illustrated in FIG. 21B, cumulative deletion information 2108a indicates that a total of three photos now need to be deleted from the photos server and scheduled deletion information 2108b indicates that one photo needs to be deleted from the photos server in the next 30 days. Further, as illustrated in FIG. 21B, upcoming deletions information 2114 indicates that one photo will be automatically deleted from the photos server on February 10$^{th}$ and one photo will be automatically deleted from the photos server on March 12$^{th}$.

At FIG. 21C, computer system 2100 has completed displaying each of photo user interface elements 2120a, 2120b, and 2120c as animating into the top of upload summary user interface 2110. As illustrated in FIG. 21C, at the conclusion of the animation, computer system 2100 displays each of photo user interface elements 2120a, 2120b, and 2120c near the top of upload summary user interface 2110. At FIG. 21C, computer system 2100 receives an indication that the user has deleted the photo that corresponds to photo user interface element 2120a from the photos server.

At FIG. 21D, in response to receiving the indication that the user has deleted the photo that corresponds to photo user interface element 2120a from the photos server, computer system 2100 ceases to display photo user interface element 2120a. As illustrated in FIG. 21D, because computer system 2100 received an indication that the user has deleted a photo from the photos server, cumulative deletion information 2108a indicates that a total of two photos need to be deleted from the photo servers (e.g., one less than the number of photos that cumulative deletion information 2108a indicated needed to be deleted at FIG. 21C) and scheduled deletion information 2108b indicates that zero photos need to be deleted in the next thirty days (e.g., one less than the number of photos that scheduled deletion information 2108b indicated needed to be deleted in the next thirty days at FIG. 21C).

FIGS. 22A-22H illustrate exemplary user interfaces for managing one or more pending loans, in accordance with some embodiments. The user interfaces in these figures are used to illustrate the processes described below, including the processes in FIG. 23A-23B.

FIG. 22A illustrates computer system 2200 displaying wallet user interface 2202. Wallet user interface 2202 corresponds to a wallet application that is installed on computer system 2200. As illustrated in FIG. 22A, wallet user interface 2202 includes set of digital cards 2210. The digital cards that are included in set of digital cards 2210 allow computer system 2200 to perform a variety of functions such as unlock a car, make a payment (e.g., an in-store payment and/or an online payment), unlock a hotel room, and/or view information regarding one or more loans. Computer system 2200 displays additional information regarding a respective digital card in response to computer system 2200 detecting a tap input that corresponds to selection of the respective digital card. Set of digital cards 2210 includes later digital card 2210a. Later digital card 2210a corresponds to one or more loan agreements where the user of computer system 2200 is the loanee. At FIG. 22A, computer system 2200 detects input 2250a that corresponds to selection of later digital card 2210a.

As illustrated in FIG. 22B, in response to detecting input 2250a, computer system 2200 displays loan user interface 2206. Loan user interface 2206 includes an expanded version of later digital card 2210a (e.g., the display of later digital card 2210a in loan user interface 2206 is larger than the display of later digital card 2210a in wallet user interface 2202). At FIG. 22B, a determination is made that the user of computer system 2200 is not subject to any pending loan agreements. Because a determination is made that the user of computer system 2200 is not subject to any pending loan agreements, computer system 2200 displays later digital card 2210a as a blank card (e.g., computer system 2200 does not display any user interface elements within later digital card 2210a as described below in relation to FIG. 22D, other than, for example, a title and/or image identifying later digital card 2210a). As illustrated in FIG. 22B, loan user interface 2206 includes done affordance 2212. At FIG. 22B, computer system 2200 detects tap input 2250b that corresponds to selection of done affordance 2212.

As illustrated in FIG. 22C, in response to detecting tap input 2250b, computer system 2200 displays wallet user interface 2202 (e.g., as described above in relation to FIG. 22A). At FIG. 22C, computer system 2200 receives an indication (e.g., via a wireless signal such as Wi-Fi and/or a cellular signal) that the user of computer system 2200 has entered into a loan agreement. In some embodiments, the loan agreement is for a total of $80.00 to be paid back in four prescheduled monthly payments of $20.00, with the first payment having been made at the time of the loan. In some embodiments, the loan agreement is for a total of $60.00 to be paid back in three prescheduled monthly payments of $20.00. At FIG. 22C, after computer system 2200 has received the indication that the user of computer system 2200 has entered into the loan agreement, computer system 2200 detects tap input 2250c that corresponds to selection of later digital card 2210a. In some embodiments, the loan agreement corresponds to a web based purchase the user of computer system 2200 has made. In some embodiments, the loan agreement corresponds to an in-store purchase the user of computer system 2200 has made. In some embodiments, the loan agreement corresponds to a purchase that was made using near field communication technology (e.g., the user places computer system 2200 in close proximity with a payment terminal (e.g., not pictured in FIG. 22C) as part of an in-store payment using a payment account that is provisioned onto computer system 2200). In some embodiments, the user of computer system 2200 is the loanee and the manufacturer of computer system 2200 is the loaner. In some embodiments, the user of computer system 2200 is the loanee and a third external party (e.g., a bank) is the loaner. In some embodiments, while displaying wallet user interface 2202, computer system 2200 displays one or more user interface elements (e.g., as described below in relation to FIG. 22D) that correspond to each scheduled payment (that has not been paid) in the loan agreement within later digital card 2210a in response to receiving the indication that the user of computer system 2200 has entered into a loan agreement.

As illustrated in FIG. 22D, in response to detecting tap input 2250c, computer system 2200 displays loan user interface 2206. Because the user of computer system 2200 is subject to a pending loan agreement, computer system 600 displays loan user interface 2206 with information regarding the pending loan agreement. As illustrated in FIG. 22D, computer system 2200 displays user interface element 2218a, user interface element 2218b, and user interface element 2218c, at the top of later digital card 2210a. Because each of user interface elements 2218a, 2218b, and 2218c are initially displayed at FIG. 22D, computer system 2200 displays each of user interface elements 2218a, 2218b, and 2218c as animating in from the top of later digital card 2210a (e.g., computer system 2200 displays each of user interface elements 2218a, 2218b, and 2218c as dropping in from the top of later digital card 2210a) as a part of displaying loan user interface 2206.

Each of user interface elements 2218a, 2218b, and 2218c represent a payment that is due in the pending loan. As explained above in relation to FIG. 22C, the user of computer system is subject to a loan agreement for a total of $80.00, with three payments of $20.00 remaining. Accordingly, each of user interface elements 2218a, 2218b, and 2218c represents a respective $20.00 remaining payment of the loan agreement. Further, as illustrated in FIG. 22D, pay later digital card 2210a includes loan balance information 2230. Loan balance information 2230 indicates the remaining balance of the pending loan. In some embodiments, computer system 2200 sequentially displays each of user interface elements 2218a, 2218b, and 2218c as animating in from the top of later digital card 2210a. In some embodiments, computer system 2200 displays each of user interface elements 2218a, 2218b, and 2218c within pay later card 2210a (e.g., while displaying pay later card 2210a computer system 2200 displays each of user interface elements 2218a, 2218b, and 2218c within pay later card 2210a in response to receiving an indication that the user of computer system 2200 has entered into a loan agreement).

As illustrated in FIG. 22D, loan user interface 2206 includes payment information 2220 about the pending loan. Payment information 2220 incudes cumulative payment information 2220a and scheduled payment information 2220b. Similar to loan balance information 2230, cumulative payment information 2220a provides an indication of the remaining balance of the pending loan. Scheduled payment information 2220b provides an indication of scheduled payments that are due in the next 30 days. Additionally, as illustrated in FIG. 22D, loan user interface 2206 includes upcoming payment information 2222. Upcoming payment information 2222 provides an indication of both the date at which scheduled payments are due and the amount of the scheduled payments. In some embodiments, computer system 2200 displays payment information 2220 and upcoming payment information 2222 when the user of computer system 2200 is not subject to any loan agreements (e.g., cumulative payment information 2220a indicates that zero dollars are due and scheduled payment information 2220b indicate that zero dollars are due in the next 30 days). In some embodiments, while displaying loan user interface 2206, computer system 2200 updates the display of cumulative payment information 2220a and scheduled payment information 2220b (e.g., in real time and/or not in real time) in response to receiving an indication that the user has entered a loan agreement or in response to receiving an indication that the user has made a payment on an existing loan agreement.

At FIG. 22E, computer system 2200 finishes displaying the animation of user interface elements 2218a, 2218b, and 2218c animating in from the top of later digital card 2210a. Computer system 2200 displays user interface elements that are representative of new loans near the top of later digital card 2210a. Accordingly, as illustrated in FIG. 22E, computer system 2200 displays each of user interface elements 2218a, 2218b, and 2218c (optionally) near the top of later digital card 2210a at the conclusion of the animation. Computer system 2200 displays each respective user interface element that corresponds to the same shopping category with the same visual appearance. Each of user interface elements 2218a, 2218b, and 2218c corresponds to the same shopping category (e.g., entertainment, travel, or shopping) (e.g., because each of user interface elements 2218a, 2218b, and 2218c corresponds to the same loan). Accordingly, as illustrated in FIG. 22E, computer system 2200 displays each of user interface elements 2218a, 2218b, and 2218c with the same visual appearance (e.g., same oval shape, same size, same type of hatching, and/or same color). In some embodiments, in accordance with a determination that the loan that corresponds to each of user interface elements 2218a, 2218b, and 2218c corresponds to an entertainment spending category, computer system 2200 displays each of user interface elements 2218a, 2218b, and 2218c with a pink color. In some embodiments, in accordance with a determination that the loan that corresponds to each of user interface elements 2218a, 2218b, and 2218c corresponds to a travel spending category, computer system 2200 displays each of user interface elements 2218a, 2218b, and 2218c with a green color. In some embodiments, in accordance with a determination that that the loan that corresponds to each of user interface elements 2218a, 2218b, and 2218c corresponds to a shopping spending category, computer system 2200 displays each of user interface elements 2218a, 2218b, and 2218c with a yellow color.

Further, as illustrated in FIG. 22E, upcoming payment information 2222 indicates that the next two scheduled payments for the pending loan are due on February 12$^{th}$ and March 12$^{th}$. At FIG. 22E, computer system 2200 receives an indication (e.g., via a wireless signal) that the user has made a $20.00 payment on the loan. In some embodiments, the payment is a manual payment that the user manually initiated. In some embodiments, the payment is an automatic payment that was automatically scheduled.

At FIG. 22F, computer system 2200 displays loan user interface 2206 at a later point in time than the display of loan user interface 2206 at FIG. 22E (e.g., six minutes or two hours have elapsed). At FIG. 22F, in response to receiving the indication that the user has made a payment on the pending loan, computer system 2200 displays later digital card 2210a without user interface element 2218c. As explained above, each of user interface elements 2218a, 2218b, and 2218c corresponds to a respective payment of the pending loan. Accordingly, computer system 2200 displays later digital card 2210a with one fewer user interface element every time the user makes a payment on the pending loan. As illustrated in FIG. 22F, loan balance information 2230 indicates that the current balance on the pending loan is $40.00. At FIG. 22E, loan balance information 2230 indicated that the current balance on the pending loan was $60.00. At FIG. 22F, because the user made a $20.00 payment on the loan, the amount due on the loan as indicated by loan balance information 2230 of loan is reduced by $20.00.

As illustrated in FIG. 22F, similar to loan balance information 2230, cumulative payment information 2220a indicates that the pending balance on the loan is $40.00. Because the user made a $20.00 payment on the loan, the amount due on the loan as indicated by cumulative payment information 2220a is reduced by $20.00. Further, as illustrated in FIG.

22F, scheduled payment information 2220b indicates that $0.00 is due on the pending loan in the next 30 days. The user has satisfied their payment obligations for the next 30 days because the user made a $20.00 payment on the loan. Additionally, as illustrated in FIG. 22F, upcoming payment information 2222 indicates that the next two scheduled payments are now due now March 12$^{th}$ and April 12$^{th}$ (e.g., as opposed to February 12$^{th}$ and March 12 as shown in FIG. 22E). Because the user made a payment, the scheduled payment for February 12th (e.g., as shown in FIG. 22E) has been satisfied. At FIG. 22F, computer system 2200 receives an indication that the user of computer system 2200 has entered into a second loan agreement that for a value of $150.00 to be paid off over 15 prescheduled payments. In some embodiments, computer system 2200 updates cumulative payment information 2220a, loan balance information 2230, and scheduled payment information 2220b in realtime (e.g., computer system 2200 updates cumulative payment information 2220a, loan balance information 2230, and scheduled payment information 2220b while computer system 2200 displays loan user interface 2206 in response to receiving the indication that the user has made a payment on the loan).

At FIG. 22G, computer system 2200 displays loan user interface 2206 at a later point in time than the display of loan user interface 2206 at FIG. 22F (e.g., six minutes have elapsed). As illustrated in FIG. 22G, in response to receiving the indication that the user of computer system 2200 has entered into a second loan agreement, computer system 2200 displays set of user interface elements 2232 within later digital card 2210a. Further, as illustrated in FIG. 22G, computer system 2200 displays user interface element 2218a and user interface element 2218b within later digital card 2210a, while computer system 2200 displays set of user interface elements 2232.

Set of user interface elements 2232 corresponds to the second loan agreement. Similar to user interface element 2218a and user interface element 2218b, each respective user interface element in set of user interface elements 2232 corresponds to a respective payment in the second loan agreement. Because the second loan agreement is valued at $150.00 remaining (e.g., $200 original loan to be paid over 4 payments, with the first payment made at the time of the loan), to be paid over 3 remaining payments, each user interface element in set of user interface elements 2232 corresponds to a $50.00 payment. Accordingly, set of user interface elements 2232 includes three user interface elements. In some embodiments, as described with respect to the initial loan agreement and second loan agreement, each loan represented by loan user interface 2206 is based on the same number of payments (e.g., each loan is scheduled to be repaid over four payments, with the first payment made at the time of the respective loan). In some embodiments, the number of payments varies for different loans (e.g., a loan can be 4 payments while another loan can be 12 payments). In some embodiments, some (e.g., less than all or all) loans are based on an initial repayment scheduled for the day and/or time that the loan is initiated. In some embodiments, the initial repayment is not scheduled for the day and/or time that the loan is initiated.

Computer system 2200 displays user interface elements that correspond to newer loans above user interface elements that correspond to older loans. Accordingly, as illustrated in FIG. 22G, computer system 2200 displays user interface element 2218a and user interface element 2218b beneath set of user interface elements 2232. In some embodiments, computer system 2200 displays user interface elements that correspond to an older loan as shifting down within later digital card 2010a while computer system 2200 displays user interface elements as animating in from the top of later digital card 2010a.

The second loan is associated with a purchase from a different spending category than the purchase that is associated with the initial loan. Accordingly, set of user interface elements 2232 corresponds to a spending category that is different than the spending category that corresponds to user interface element 2218a and user interface element 2218b. Because set of user interface elements 2232 corresponds to a spending category that is different from the spending category that corresponds to user interface element 2218a and user interface element 2218b, computer system 2200 displays each respective user interface element in set of user interface elements 2232 with a different visual appearance (e.g., different color, size, and/or shape) than the visual appearance of user interface element 2218a and user interface element 2218b.

At FIG. 22G, cumulative payment information 2220a indicates the outstanding amount due from the initial loan and the second loan. As illustrated in FIG. 22G, cumulative payment information 2220a indicates that the outstanding amount due from the initial loan and second loan is $190.00. $190.00 represents the outstanding $150.00 due from the second loan and the outstanding $40.00 due from the initial loan. Further, similar to cumulative payment information 2220a, loan balance information 2230 indicates that the outstanding amount due from the initial loan and the second loan is $190.00. Further, as illustrated in FIG. 22G, scheduled payment information 2220b indicates that $50.00 are due in the next 30 days. $50.00 represents the cumulative amount that is due from both the initial loan and the second loan in the next 30 days.

Computer system 2200 displays each respective user interface element as a smaller size when the number of outstanding payments for a user is greater than a threshold (e.g., 4, 15, 25, or 40 outstanding payments). At FIG. 22G, a determination is made that the number of outstanding payments for the user is greater than the threshold. Because a determination is made that the total number of outstanding payments for the user is greater than the threshold, computer system 2200 displays each respective user interface element with a smaller size (e.g., in comparison to the size of user interface elements 2218a and 2218b in FIGS. 22D-22F). At FIG. 22G, computer system 220 detects tap input 2250g that corresponds to selection of user interface element 2218b.

At FIG. 22H, in response to detecting tap input 2250g, computer system 2200 maintains the display of loan user interface 2206. That is, the various user interface elements are not selectable. In some embodiments, computer system 2200 displays additional information regarding a respective loan in response to detecting a tap input on a user interface element (e.g., computer system 2200 displays information about the initial loan in response to detecting a tap input (e.g., 2250g) that corresponds to selection of user interface element 2218a and/or user interface element 2218b and/or computer system 2200 displays information about the second loan in response to detecting a tap input that corresponds to selection of a respective user interface element in set of user interface elements 2232.

FIGS. 23A-23B are flow diagrams illustrating a method for managing information, such as one or more pending loans or one or more uploaded photos, using a computer system in accordance with some embodiments. Method 2300 is performed at a computer system (e.g., 2100 or 2200) (e.g., a smartwatch, a wearable electronic device, a smartphone, a desktop computer, a laptop, and/or a tablet) that is in communication with a display generation component (e.g., a display controller and/or a touch-sensitive display system) and one or more input devices (e.g., a wireless interface, a touch-sensitive surface, a keyboard, and/or a mouse). Some operations in method 2300 are optionally, combined, the orders of some operations are, optionally, changed, and some operations are, optionally omitted.

As described below, method 2300 provides an intuitive way for managing information. The method reduces the cognitive burden on a user for managing information using a computer system, thereby creating a more efficient human-machine interface. For battery-operated computing devices, enabling a user to manage information using a computer system faster and more efficiently conserves power and increases the time between battery charges.

The computer system receives (2302) (e.g., acquiring, detecting, and/or obtaining) (e.g., detecting via a wireless signal (e.g., Wi-Fi or a cellular signal)), via the one or more input devices, an indication that a first set of transfer obligations has been generated (e.g., receiving data that is representative of the set of transfer obligations) (e.g., a requirement to delete images from a transfer account by a set schedule, a loan with scheduled payments (e.g., scheduled payments every week, 2 weeks, once a month, or every three months) has been generated, a loan where the manufacturer of the computer system is the loaner and the user of the computer system is the loanee, and/or a loan where an external party (e.g., not the user of the computer system and not the manufacturer of the computer system) is the loaner).

The computer system receives (2304), via the one or more input devices, a request (e.g., 2250*a* and/or 2250*c*) (e.g., a user input (e.g., a tap, a press and hold, a swipe, and/or activation of a hardware button that is coupled to the computer system)) to display a transfer summary user interface (e.g., 2110, 2206, and/or 2210*a*) (e.g., a user interface that includes a summary of pending images to be deleted or a user interface that includes a summary of pending loans (e.g., upcoming payment amounts, amount due on the loan, and/or date of scheduled payments) (e.g., loans where the user of the computer system is the loanee)).

In response to receiving the request to display the transfer summary user interface, the computer system displays (2306), via the display generation component, the transfer summary user interface including a quantity of a first type of user interface elements (e.g., 2120*a*, 2120*b*, 2120*c*, 2218*a*, 2218*b*, 2218*c*, and/or 2232), wherein as a part of displaying the transfer summary user interface: in accordance with a determination that the first set of transfer obligations includes a first quantity of transfer obligations, the computer system displays (2308), based on the first quantity, at least the first quantity (and, optionally, no more than and no less than the first quantity) of the first type (e.g., three of the first type of user interface elements or seven of the first type of user interface elements) of user interface elements (e.g., as described above in relation to FIG. 22E) (e.g., each user interface element of the first type has the same appearance (e.g., same size, same color, and/or same shape (e.g., oval shaped user interface elements)), a symbol, a shape, and/or non-numerical user interface element, and/or each user interface element represents a respective scheduled payment in the loan) and in accordance with a determination that the first set of transfer obligations includes a second quantity of transfer obligations (e.g., different (e.g., greater than the first quantity or less than the first quantity) from the first quantity), the computer system displays (2310), based on the second quantity, at least the second quantity (and, optionally, no more than and no less than the second quantity) of the first type (e.g., eight of the first type of user interface elements or eleven of the first type of user interface elements) of user interface elements.

Subsequent to displaying the transfer summary user interface, the computer system receives (2312) an indication (e.g., via a wireless signal (e.g., Wi-Fi or a cellular connection signal)) that a respective transfer obligation in the first set of transfer obligations (e.g., a scheduled payment has been paid (e.g., automatically paid or manually paid) or an image scheduled to be deleted has been automatically or manually deleted) has been satisfied (e.g., as described above in relation to FIGS. 22E and 22F).

Subsequent to receiving the indication that a respective transfer obligation in the first set of transfer obligations has been satisfied, the computer system displays (2314) (e.g., in response to a request to display the transfer summary user interface), via the display generation component and based on the indication that the respective transfer obligation in the first set of transfer obligations has been satisfied, the transfer summary user interface with one less than the quantity of the first type of user interface elements (e.g., as described above in relation to FIG. 22F) (e.g., and continuing to display one or more respective interface elements of the first type) (e.g., the transfer summary user interface is displayed in response to the computer system receiving a second request to display the transfer summary user interface). In some embodiments, the first type of user interface elements are displayed while a second type of user interface elements that correspond to a second loan are displayed. In some embodiments, the first type of user interface elements are displayed while additional information (e.g., total amount of payments, upcoming scheduled payments, amount due in an upcoming time period, completed payments, an indication (e.g., graphical indication and/or textual indication) of the purchase that corresponds to the set of transfer obligations) is displayed. In some embodiments, each user interface element of the first type (and/or of the second type) is displayed at a different angular orientation (e.g., oriented randomly or pseudo-randomly). In some embodiments, the display of a first respective user interface element overlaps with the display of a second respective user interface (e.g., a portion of the first respective user interface element is overlaid on top of a portion of the second respective user interface element). In some embodiments, displaying the transfer summary user interface with one less than the quantity of the first type of user interface elements includes fading out a respective first type of user interface element in response to receiving the indication that the respective transfer obligation in the set of transfer obligations has been satisfied. In some embodiments, displaying the user interface elements of the first type includes displaying an animation of the user interface elements of the first type being displayed (e.g., each user interface element of the first type fades in at the same time or each user interface element of the first type fades in sequentially). Displaying a quantity of the first type of user interface elements based on the quantity of outstanding payments (e.g., transfer obligations) in a pending loan allows the computer system to automatically manage the number of user interface elements that are displayed in order to indicate to a user how many outstanding payments are due on a pending loan, thereby providing the user with improved visual feedback. Displaying the transfer summary user interface with one less than the quantity of the first type of user interface elements subsequent to receiving the indication that a respective transfer obligation in the first set of transfer obligations has been satisfied provides the user with visual feedback regarding the state of the computer system (e.g., the computer system has received the indication that the respective transfer obligation has been satisfied), which provides improved visual feedback.

In some embodiments, in accordance with a determination that the first set of transfer obligations corresponds to a first spending category (e.g., as described above in relation to FIG. 22E) (e.g., the purchase that corresponds to the first set of transfer obligations (e.g., the loan) belongs to the first spending category (e.g., shopping, entertainment, or travel)), the first type of user interface elements (e.g., 2120a, 2120b, 2120c, 2218a, 2218b, 2218c and/or 2232) are displayed with a first visual appearance (e.g., the appearance of 2218a, 2218b, and/or 2218c or the appearance of 2232) (e.g., a respective shape, size, color, and/or orientation that corresponds to the first spending category) and in accordance with a determination that the first set of transfer obligations corresponds to a second spending category (e.g., as described above in relation to FIG. 22E) (e.g., that is different from the first spending category), the first type of user interface elements are displayed with a second visual appearance (e.g., the appearance of 2218a, 2218b, and/or 2218c or the appearance of 2232) that is different than the first visual appearance. In some embodiments, the first visual appearance and the second visual appearance have overlapping visual characteristics (e.g., same size, same color, same orientation, and/or same shape). In some embodiments, when the set of transfer obligations corresponds to an entertainment spending category (e.g., dining, movies theaters, sports, amusement parks, and/or recreational activities), the first type of user interface elements are displayed with a pink color. In some embodiments, when the set of transfer obligations corresponds to a travel spending category (e.g., airline tickets, cruises, hotel stays, and/or taxis) the first type of user interface elements are displayed with a green color. In some embodiments, when the set of transfer obligations corresponds to a shopping spending category (e.g., purchase of clothes, electronics, home goods and/or sport equipment), the first type of user interface elements are displayed with a yellow color. Displaying the first type of user interface elements with a first appearance when a first set of conditions are met (e.g., in accordance with a determination that the first set of transfer obligations corresponds to a first spending category) and displaying the first type of user interface elements with a second appearance when a second set of conditions are met (e.g., in accordance with a determination that the first set of transfer obligations corresponds to a second spending category) provides the user with visual feedback about which set of conditions have been met.

In some embodiments, the first type of user interface elements are displayed at a first size (e.g., the size of 2218a, 2218b, or 2218c at FIGS. 22D-22F) (e.g., a length of 0.1 inches, 0.3 inches, or 0.5 inches). In some embodiments, subsequent to displaying the transfer summary user interface (e.g., 2206 and/or 2210a), the computer system (e.g., 2100 and/or 2200) receives, via the one or more input devices, an indication that a second set of transfer obligations has been generated (e.g., as described above in relation to FIGS. 22C, 22D, 22F and/or 22G) (e.g., a second set of transfer obligations that is different from the first set of transfer obligations (e.g., the second set of transfer obligations corresponds to a second loan)). In some embodiments, the computer system receives (e.g., subsequent to receiving the indication that the second set of transfer obligations has been generated), via the one or more input devices, a second request (e.g., 2250c and/or 2250a) (e.g., one or more user inputs) to display the transfer summary user interface. In some embodiments, in response to receiving the second request to display the transfer summary user interface, the computer system displays, via the display generation component, the transfer summary user interface including a third quantity of the first type of user interface elements (e.g., 2218a, 2218b, and/or 2218c at FIGS. 22D-22F) (e.g., the third quantity is different than the first quantity and the second quantity) based on the first set of transfer obligations and the second set of transfer obligations (e.g., as described above in relation to FIG. 22G) (e.g., each respective user interface element in the third quantity of the first type of user interface elements corresponds to a respective payment obligation in the first set of transfer obligations or the second set of transfer obligations), wherein: in accordance with a determination that the third quantity of the first type of user interface elements is greater than a quantity threshold (e.g., a quantity of 5, 10, 25, 30, 45, or 50 user interface elements), the first type of user interface elements are displayed at a second size (e.g., 2218a, 2218b, 2218c, and/or 2232 at FIGS. 22G-22H) (e.g., as described above in relation to FIG. 22G), that is smaller than the first size (e.g., the second size is smaller than the first size by a multiple (e.g., 2×, 3×, or 4×)) (e.g., the computer system displays the user interface element at a reduced when the total number of displayed user interface elements exceeds a threshold) and in accordance with a determination that the third quantity of the first type of user interface elements is less than the quantity threshold, the first type of user interface elements are displayed at the first size. In some embodiments, the computer system changes the size of the first type of user interface elements from the second size to the first time in real time in accordance with a determination that the third quantity of the displayed first type of user interface elements is below the quantity threshold. In some embodiments, the computer system dynamically changes the size of the first type of user interface elements based on the amount of the first type of user interface elements that are displayed. Displaying the first type of user interface elements at a second size when conditions are met (e.g., in accordance with a determination that the third quantity of the first type of user interface elements is greater than a quantity threshold) allows the computer system to automatically manage the size of the display of the first type of user interface elements such that a user can easily view each respective user interface element of the first type and indicates to the user that there are more than the quantity threshold, thereby providing the user with improved visual feedback.

In some embodiments, the transfer summary user interface (e.g., 2206, 2110 or 2210a) includes a second type of user interface elements (e.g., 2120a, 2120b, 2120c, 2218a, 2218b, 2218c, and/or 2232) that correspond to a third set of transfer obligations (e.g., as described above in relation to FIGS. 22F and 22G) (e.g., that corresponds to a loan that is different from the loan that corresponds to the first set of transfer obligations), wherein the first type of user interface elements (e.g., 2120a, 2120b, 2120e, 2218a, 2218b, 2218c, and/or 2232) correspond to the first set of transfer obligations, and wherein as a part of displaying the transfer summary user interface: in accordance with a determination that the third set of transfer obligations was generated at a point in time before the first set of transfer obligations (e.g., the computer system received an indication that the user entered into the loan agreement that corresponds to the third set of transfer obligations before the computer system received an indication that the user entered into the loan agreement that corresponds to the first set of transfer obligations), the computer system (e.g., 2100 or 2200) displays the first type of user interface elements above (e.g., as described above in relation to FIG. 22G) (e.g., 2232 at FIG. 22G) (e.g., closer to a respective side (e.g., the top) of the computer system) the second type of user interface elements (e.g., 2218*a* and/or 2218*b* at FIG. 22G) (e.g., the majority of the first type of user interface elements are displayed above the majority of the second type of user interface elements) and in accordance with a determination that the third set of transfer obligations was generated at a point in time after the first set of transfer obligations, the computer system displays the first type of user interface elements below the second type of user interface elements. In some embodiments, the second type of user interface elements is visually distinct from the first type of user interface elements. In some embodiments, the second type of user interface elements are not visually distinct from the first type of user interface elements. In some embodiments, there is no vertical relationship between the first type of user interface elements and the second type of user interface elements when the user enters into the loan agreement that corresponds to the first set of transfer obligations and the loan agreement that corresponds to the second set of transfer obligations at substantially the same time. Displaying the first type of user interface elements above the second type of user interface elements when conditions are met (e.g., in accordance with a determination that the third set of transfer obligations was generated at a point in time before the first set of transfer obligations) allows the computer system to automatically manage the display of two types of user interface elements such that the display of user interface elements that correspond to a newer loan are prioritized over the display of user interface elements that correspond to an older loan, which performs an operation when a set of conditions has been meet without additional user input. Displaying user interface elements representative of payments in a newer loan above user interface elements representative of payments in an older loan provides the user with visual feedback regarding the number of outstanding payments for the newer loan in comparison to the amount of outstanding payment for the older loan, which provides improved visual feedback.

In some embodiments, the second type of user interface elements (e.g., 2120*a*, 2120*b*, 2120*c*. 2218*a*, 2218*b*, 2218*c*, and/or 2232) that correspond to the third set of transfer obligations are displayed at a first location (e.g., the location of 2218*a* and/or 2218*b* at FIGS. 22E and 22F) on the transfer summary user interface (e.g., 2206, 2110, and/or 2210*a*) prior to the display of the first type of user interface elements, wherein as a part of displaying the first type of user interface: in accordance with a determination that the third set of transfer obligations was generated at a point in time before the first set of transfer obligations, the computer system (e.g., 2100 or 2200) moves (e.g., animating) the second type of user interface elements from the first location to a second location (e.g., the location of 2218*a* and/or 2218*b* at FIG. 22G) (e.g., as described above in relation to FIG. 22G) (e.g., the second location is different from the first location), wherein the second location is beneath the first location. In some embodiments, the computer system displays the first type of user interface elements at the first location while the computer system displays second type of user interface elements at the second location. In some embodiments, the computer system moves the second type of user interface elements from the second location to the first location as a part of ceasing to display the first type of user interfaces (e.g., in response to receiving an indication that the user has satisfied every transfer obligation in the set of transfer obligations). In some embodiments, the computer system sequentially displays easy respective user interface element of the second type of user interface elements as moving from the first location on the transfer summary user interface to the second location on the transfer summary user interface. Moving the second type of user interface elements from the first location to the second location when a set of conditions are met (e.g., in accordance with a determination that the third set of transfer obligations was generated at a point in time before the first set of transfer obligations) allows the computer system to automatically manage the display of two types of user interface elements such that the display of user interface elements that correspond to a newer loan are prioritized over user interface elements that correspond to an older loan, which performs an operation when a set of conditions has been meet without additional user input.

In some embodiments, subsequent to displaying the transfer summary user interface (e.g., 2206, 2110, and/or 2210*a*), the computer system (e.g., 2100 and/or 2200) receives, via the one or more input devices, an indication that the first set of transfer obligations has been satisfied (e.g., as described above in relation to FIGS. 22E and 22F) (e.g., the user has made all of the scheduled payments on the loan (e.g., the user is not subject to any pending loans) and, optionally, there are no other outstanding transfer obligations). In some embodiments, subsequent to receiving the indication that the first set of transfer obligations has been satisfied, the computer system receives receiving (e.g., while the transfer summary user interface is not displayed), via the one or more input devices, a third request (e.g., 2250*a* and/or 2250*c*) (e.g., one or more user inputs) to display the transfer summary user interface. In some embodiments, in response to receiving the third request to display the transfer summary user interface, the computer system displays, via the display generation component, the transfer summary user interface without the first type of user interface elements (e.g., 2206, 2210*a* at FIG. 22B and/or 2110 at FIG. 21A) (e.g., the transfer summary user interface does not include any type of user interface elements that corresponds to scheduled payments for a loan) (e.g., the transfer summary user interface is displayed as a solid color (e.g., black, white, or grey)). Displaying the transfer summary user interface without the first type of user interface elements subsequent to receiving an indication that the first set of transfer obligations has been satisfied provides the user with visual feedback regarding whether the user is currently subject to a pending loan agreement, which provides improved visual feedback.

In some embodiments, subsequent to displaying the transfer summary user interface, the computer system (e.g., 2100 and/or 2200) receives, via the one or more input devices, an indication that a fourth set of transfer obligations has been generated (e.g., as described above in relation to FIGS. 22C, 22D, 22F and 22G) (e.g., that is different from the first set of transfer obligations) (e.g., that corresponds to a loan that is different than the loan that corresponds to the first set of transfer obligations). In some embodiments, the computer system receives, via the one or more input devices, a fourth request (e.g., 2250*a* and/or 2250*c*) (e.g., one or more inputs) (e.g., while the transfer summary user interface is not displayed) to display the transfer summary user interface (e.g., 2110, 2206, and/or 2210*a*). In some embodiments, in response to receiving the fourth request to display the transfer summary user interface, the computer system displays, via the display generation component, the transfer summary user interface, wherein as a part of displaying the transfer summary user interface: the computer system displays the quantity of the first type of user interface elements with a third visual appearance (e.g., the appearance of 2218a, 2218b, and/or 2218c) (e.g., a respective shape, color, and/or size) and the computer system displays based on the fourth set of transfer obligations, a quantity of a third type of user interface elements (e.g., based on the fourth set of transfer obligations) with a fourth visual appearance (e.g., the appearance of 2232) that is different than the first visual appearance (e.g., the third type of user interface elements are visually distinct from the first type of user interface elements). In some embodiments, the first type of user interface elements and the third type of user interface elements share a at least one visual characteristic (e.g., size, shape, and/or color). Displaying the first type of user interface elements that correspond to payments of a first loan with a third appearance and displaying the third type of user interface elements that correspond to payments of a second loan with a fourth appearance that is different from the third appearance provides the user with visual feedback regarding the number of outstanding payments due on both the first loan and the second loan by allowing the user to easily distinguish user interface elements that are associated with the first loan and the second loan, which provides improved visual feedback.

In some embodiments, each respective user interface element in the quantity of the first type of user interface elements is not selectable (e.g., as described in relation to FIG. 22H). In some embodiments, while the first type of user interface elements are displayed, the computer system receives user input (e.g., a tap input or a tap-and-hold input) at a location corresponding to a respective user interface element and, in response to receiving the user input at the location corresponding to the respective user interface element, the computer system forgoes displaying additional information about the transfer obligation associated with the respective user interface element (and, optionally, the computer system does not display any content in response to receiving the user input). In embodiments where the respective user interface elements are selectable, in response to detecting selection of a respective user interface element, the computer system displays (while maintaining display of the transfer summary user interface) information regarding the loan that corresponds to the selected user interface element (e.g., information about the purchase (e.g., the total cost of the purchase associated with the, date of purchase, what was bought with the purchase, and/or the merchant associated with the purchase), payment due dates for the loan, and/or options for paying the loan off). In some embodiments, the computer system ceases to display the transfer summary user interface in response to detecting selection of a respective user interface element.

Note that details of the processes described above with respect to method 2300 (e.g., FIG. 23A-23B are also applicable in an analogous manner to the methods described above. For example, methods 800, 900, 1200, 1500, 1800, 2000 and 2010 optionally includes one or more of the characteristics of the various methods described above with reference to method 700. For example, the method of locking the computer system as described above in reference to method 2010 can be used to lock the computer system upon display of the loan summary user interface. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve requesting and provisioning accounts for users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted account services to users. Accordingly, use of such personal information data enables users to have calculated control of the account services. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Account-ability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of receiving information and provisioning accounts, the present technology can be configured to allow users to select to "opt in" or "opt out" of participation in the collection of personal information data during registration for services or anytime thereafter. In another example, users can select not to provide data for targeted account services. In yet another example, users can select to limit the length of time data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, account services can be selected and delivered to users by inferring preferences based on non-personal information data or a bare minimum amount of personal information, such as the content being requested by the device associated with a user, other non-personal information available to the account services, or publicly available information.

What is claimed is:

1. A computer system that is in communication with a display generation component and one or more input devices, the computer system comprising:
one or more processors; and
memory storing one or more programs configured to be executed by the one or more processors, the one or more programs including instructions for:
detecting, via the one or more input devices, a first user input while displaying a numeric keypad for entering a numeric sequence;
in response to detecting the first user input:
ceasing to display the numeric keypad; and
displaying, via the display generation component, a numeric entry user interface;
while displaying the numeric entry user interface, detecting, via the one or more input devices, a second user input that includes a first set of one or more gestures; and
in response to detecting a completion of the first set of one or more gestures:
entering a numeric digit of a numeric sequence, the numeric digit having a value based on a quantity of gestures in the first set of one or more gestures;
in accordance with a determination that a first quantity of digits of the numeric sequence has been entered, outputting a first quantity of haptic alerts, wherein the first quantity of haptic alerts identifies the first quantity of digits of the numeric sequence that has been entered without indicating the value of the numeric digit; and
in accordance with a determination that a second quantity of digits of the numeric sequence has been entered, outputting a second quantity of haptic alerts, wherein the second quantity of haptic alerts identifies the second quantity of digits of the numeric sequence that has been entered without indicating the value of the numeric digit, wherein the second quantity of haptic alerts is different from the first quantity of haptic alerts.

2. The computer system of claim 1, the one or more programs further including instructions for:
while displaying, via the display generation component, the numeric entry user interface, detecting, via the one or more input devices, a third user input that includes a second set of one or gestures; and
in response to detecting a completion of the second set of one or more gestures, entering a second numeric digit of the numeric sequence, the second numeric digit based on a quantity of gestures in the second set of one or more gestures.

3. The computer system of claim 1, wherein displaying, via the display generation component, the numeric entry user interface does not include displaying a numeric keypad.

4. The computer system of claim 1, wherein the computer system includes one or more output devices, the one or more programs further including instructions for:
in response to detecting the completion of the first set of one or more gestures, outputting, via the one or more output devices, a non-visual alert.

5. The computer system of claim 1, wherein the computer system includes one or more output devices, the one or more programs further including instructions for:
in response to detecting, via the one or more input devices, the first user input, outputting audio instructions.

6. The computer system of claim 1, the one or more programs further including instructions for:
in response to detecting completion of the first set of one or more gestures, displaying, via the display generation component, an indication that a numeric digit has been entered.

7. The computer system of claim 1, the one or more programs further including instructions for:
subsequent to entering one or more numeric digits of the numeric sequence, detecting, via the one or more input devices, a fourth user input; and in response to detecting the fourth user input:
   in accordance with a determination that the fourth user input is of a first type of input, entering the numeric sequence; and
   in accordance with a determination that the fourth user input is not of the first type of input, forgoing entering the numeric sequence.

8. The computer system of claim 7, wherein the first type of input is a swipe gesture.

9. The computer system of claim 1, wherein detecting the completion of the first set of one or more gestures includes detecting that no input is detected for a predetermined period of time after detecting the first set of one or more gestures.

10. The computer system of claim 1, the one or more programs further including instructions for:
   while displaying, via the display generation component, the numeric entry user interface, detecting, via the one or more input devices, a fifth user input; and
   in response to detecting the fifth user input, clearing a most recently entered numeric digit of the numeric sequence.

11. The computer system of claim 1, the one or more programs further including instructions for:
   subsequent to entering the numeric digit of the numeric sequence, detecting, via the one or more input devices, a user input indicating completion of the numeric sequence; and
   in response to receiving the user input indicating completion of the numeric sequence:
     in accordance with a determination that the quantity of numeric digits of the numeric sequence is within a predefined range, entering the numeric sequence; and
     in accordance with a determination that the quantity of numeric digits of the numeric sequence is not within the predefined range, forgoing entering the numeric sequence.

12. The computer system of claim 1, wherein the numeric digit entered is not based on a location of the first set of one or more gestures.

13. The computer system of claim 1, wherein the numeric digit is not based on a duration of one or more gestures of the first set of one or more gestures.

14. The computer system of claim 1, wherein the computer system is in a locked state while the numeric entry user interface is displayed and entry of the numeric sequence using the numeric entry user interface cannot unlock the computer system.

15. A non-transitory computer-readable storage medium storing one or more programs configured to be executed by one or more processors of a computer system with a display generation component and with one or more input devices, the one or more programs including instructions for:
   detecting, via the one or more input devices, a first user input while displaying a numeric keypad for entering a numeric sequence;
   in response to detecting the first user input:
     ceasing to display the numeric keypad; and
     displaying, via the display generation component, a numeric entry user interface;
   while displaying the numeric entry user interface, detecting, via the one or more input devices, a second user input that includes a first set of one or more gestures; and
   in response to detecting a completion of the first set of one or more gestures:
     entering a numeric digit of a numeric sequence, the numeric digit having a value based on a quantity of gestures in the first set of one or more gestures;
     in accordance with a determination that a first quantity of digits of the numeric sequence has been entered, outputting a first quantity of haptic alerts, wherein the first quantity of haptic alerts identifies the first quantity of digits of the numeric sequence that has been entered without indicating the value of the numeric digit; and
     in accordance with a determination that a second quantity of digits of the numeric sequence has been entered, outputting a second quantity of haptic alerts, wherein the second quantity of haptic alerts identifies the second quantity of digits of the numeric sequence that has been entered without indicating the value of the numeric digit, wherein the second quantity of haptic alerts is different from the first quantity of haptic alerts.

16. The non-transitory computer-readable storage medium of claim 15, the one or more programs further including instructions for:
   while displaying, via the display generation component, the numeric entry user interface, detecting, via the one or more input devices, a third user input that includes a second set of one or gestures; and
   in response to detecting a completion of the second set of one or more gestures, entering a second numeric digit of the numeric sequence, the second numeric digit based on a quantity of gestures in the second set of one or more gestures.

17. The non-transitory computer-readable storage medium of claim 15, wherein displaying, via the display generation component, the numeric entry user interface does not include displaying a numeric keypad.

18. The non-transitory computer-readable storage medium of claim 15, wherein the computer system includes one or more output devices, the one or more programs further including instructions for:
   in response to detecting the completion of the first set of one or more gestures, outputting, via the one or more output devices, a non-visual alert.

19. The non-transitory computer-readable storage medium of claim 15, wherein the computer system includes one or more output devices, the one or more programs further including instructions for:
   in response to detecting, via the one or more input devices, the first user input, outputting audio instructions.

20. The non-transitory computer-readable storage medium of claim 15, the one or more programs further including instructions for:
   in response to detecting completion of the first set of one or more gestures, displaying, via the display generation component, an indication that a numeric digit has been entered.

21. The non-transitory computer-readable storage medium of claim 15, the one or more programs further including instructions for:
   subsequent to entering one or more numeric digits of the numeric sequence, detecting, via the one or more input devices, a fourth user input; and in response to detecting the fourth user input:
   in accordance with a determination that the fourth user input is of a first type of input, entering the numeric sequence; and
   in accordance with a determination that the fourth user input is not of the first type of input, forgoing entering the numeric sequence.

22. The non-transitory computer-readable storage medium of claim 21, wherein the first type of input is a swipe gesture.

23. The non-transitory computer-readable storage medium of claim 15, wherein detecting the completion of the first set of one or more gestures includes detecting that no input is detected for a predetermined period of time after detecting the first set of one or more gestures.

24. The non-transitory computer-readable storage medium of claim 15, the one or more programs further including instructions for:
   while displaying, via the display generation component, the numeric entry user interface, detecting, via the one or more input devices, a fifth user input; and
   in response to detecting the fifth user input, clearing a most recently entered numeric digit of the numeric sequence.

25. The non-transitory computer-readable storage medium of claim 15, the one or more programs further including instructions for:
   subsequent to entering the numeric digit of the numeric sequence, detecting, via the one or more input devices, a user input indicating completion of the numeric sequence; and
   in response to receiving the user input indicating completion of the numeric sequence:
     in accordance with a determination that the quantity of numeric digits of the numeric sequence is within a predefined range, entering the numeric sequence; and
     in accordance with a determination that the quantity of numeric digits of the numeric sequence is not within the predefined range, forgoing entering the numeric sequence.

26. The non-transitory computer-readable storage medium of claim 15, wherein the numeric digit entered is not based on a location of the first set of one or more gestures.

27. The non-transitory computer-readable storage medium of claim 15, wherein the numeric digit is not based on a duration of one or more gestures of the first set of one or more gestures.

28. The non-transitory computer-readable storage medium of claim 15, wherein the computer system is in a locked state while the numeric entry user interface is displayed and entry of the numeric sequence using the numeric entry user interface cannot unlock the computer system.

29. A method, comprising:
   at a computer system that is in communication with a display generation component and with one or more input devices:
     detecting, via the one or more input devices, a first user input while displaying a numeric keypad for entering a numeric sequence;
     in response to detecting the first user input:
       ceasing to display the numeric keypad; and
       displaying, via the display generation component, a numeric entry user interface;
     while displaying the numeric entry user interface, detecting, via the one or more input devices, a second user input that includes a first set of one or more gestures; and
     in response to detecting a completion of the first set of one or more gestures:
       entering a numeric digit of a numeric sequence, the numeric digit having a value based on a quantity of gestures in the first set of one or more gestures;
       in accordance with a determination that a first quantity of digits of the numeric sequence has been entered, outputting a first quantity of haptic alerts, wherein the first quantity of haptic alerts identifies the first quantity of digits of the numeric sequence that has been entered without indicating the value of the numeric digit; and
       in accordance with a determination that a second quantity of digits of the numeric sequence has been entered, outputting a second quantity of haptic alerts, wherein the second quantity of haptic alerts identifies the second quantity of digits of the numeric sequence that has been entered without indicating the value of the numeric digit, wherein the second quantity of haptic alerts is different from the first quantity of haptic alerts.

30. The method of claim 29, further comprising:
   while displaying, via the display generation component, the numeric entry user interface, detecting, via the one or more input devices, a third user input that includes a second set of one or gestures; and
   in response to detecting a completion of the second set of one or more gestures, entering a second numeric digit of the numeric sequence, the second numeric digit based on a quantity of gestures in the second set of one or more gestures.

31. The method of claim 29, wherein displaying, via the display generation component, the numeric entry user interface does not include displaying a numeric keypad.

32. The method of claim 29, wherein the computer system includes one or more output devices, the method further comprising:
   in response to detecting the completion of the first set of one or more gestures, outputting, via the one or more output devices, a non-visual alert.

33. The method of claim 29, wherein the computer system includes one or more output devices, the method further comprising:
   in response to detecting, via the one or more input devices, the first user input, outputting audio instructions.

34. The method of claim 29, further comprising:
   in response to detecting completion of the first set of one or more gestures, displaying, via the display generation component, an indication that a numeric digit has been entered.

35. The method of claim 29, further comprising:
   subsequent to entering one or more numeric digits of the numeric sequence, detecting, via the one or more input devices, a fourth user input; and
   in response to detecting the fourth user input:
     in accordance with a determination that the fourth user input is of a first type of input, entering the numeric sequence; and in accordance with a determination that the fourth user input is not of the first type of input, forgoing entering the numeric sequence.

36. The method of claim 35, wherein the first type of input is a swipe gesture.

37. The method of claim 29, wherein detecting the completion of the first set of one or more gestures includes detecting that no input is detected for a predetermined period of time after detecting the first set of one or more gestures.

38. The method of claim 29, further comprising:
while displaying, via the display generation component, the numeric entry user interface, detecting, via the one or more input devices, a fifth user input; and
in response to detecting the fifth user input, clearing a most recently entered numeric digit of the numeric sequence.

39. The method of claim 29, further comprising:
subsequent to entering the numeric digit of the numeric sequence, detecting, via the one or more input devices, a user input indicating completion of the numeric sequence; and
in response to receiving the user input indicating completion of the numeric sequence:
in accordance with a determination that the quantity of numeric digits of the numeric sequence is within a predefined range, entering the numeric sequence; and
in accordance with a determination that the quantity of numeric digits of the numeric sequence is not within the predefined range, forgoing entering the numeric sequence.

40. The method of claim 29, wherein the numeric digit entered is not based on a location of the first set of one or more gestures.

41. The method of claim 29, wherein the numeric digit is not based on a duration of one or more gestures of the first set of one or more gestures.

42. The method of claim 29, wherein the computer system is in a locked state while the numeric entry user interface is displayed and entry of the numeric sequence using the numeric entry user interface cannot unlock the computer system.

* * * * *